(12) United States Patent
Nakagawa et al.

(10) Patent No.: US 8,432,617 B2
(45) Date of Patent: Apr. 30, 2013

(54) IMAGE FORMING OPTICAL SYSTEM AND ELECTRONIC IMAGE PICKUP APPARATUS EQUIPPED WITH SAME

(75) Inventors: Atitaka Nakagawa, Kokubunji (JP); Hisashi Goto, Tokyo (JP)

(73) Assignee: Olympus Corporation, Tokyo (JP)

( * ) Notice: Subject to any disclaimer, the term of this patent is extended or adjusted under 35 U.S.C. 154(b) by 138 days.

(21) Appl. No.: 13/066,203

(22) Filed: Apr. 7, 2011

(65) Prior Publication Data

US 2011/0279909 A1 Nov. 17, 2011

(51) Int. Cl.
G02B 15/14 (2006.01)
(52) U.S. Cl.
USPC .......................................... 359/683; 359/676
(58) Field of Classification Search .................. 348/340; 359/676, 683, 684
See application file for complete search history.

(56) References Cited

U.S. PATENT DOCUMENTS

| | | | | |
|---|---|---|---|---|
| 7,869,136 | B2 * | 1/2011 | Nakagawa et al. | 359/686 |
| 8,164,674 | B2 * | 4/2012 | Imamura et al. | 348/335 |
| 2011/0286104 | A1 * | 11/2011 | Nakagawa et al. | 359/683 |
| 2011/0286109 | A1 * | 11/2011 | Nakagawa et al. | 359/690 |

FOREIGN PATENT DOCUMENTS

| | | |
|---|---|---|
| JP | 2006-349947 | 12/2006 |
| JP | 2007-163964 | 6/2007 |
| JP | 2007-298555 | 11/2007 |

* cited by examiner

Primary Examiner — David N Spector
(74) Attorney, Agent, or Firm — Kenyon & Kenyon LLP

(57) ABSTRACT

An image forming optical system includes in order from an object side to an image side, a first lens group having a positive refractive power, a second lens group having a negative refractive power, and an image-side lens group having a positive refractive power. A distance between the first lens group and the second lens group changes at the time of zooming. A refractive optical element A having a positive refractive power is positioned in the first lens group. The image forming optical system satisfies the following conditional expression (1-1), conditional expression (1-2), and conditional expression (2).

$$\nu d_A < 30 \tag{1-1}$$

$$0.54 < \theta g F_A < 0.9 \tag{1-2}$$

$$|fG1/fG2| > 6.4 \tag{2}$$

25 Claims, 65 Drawing Sheets

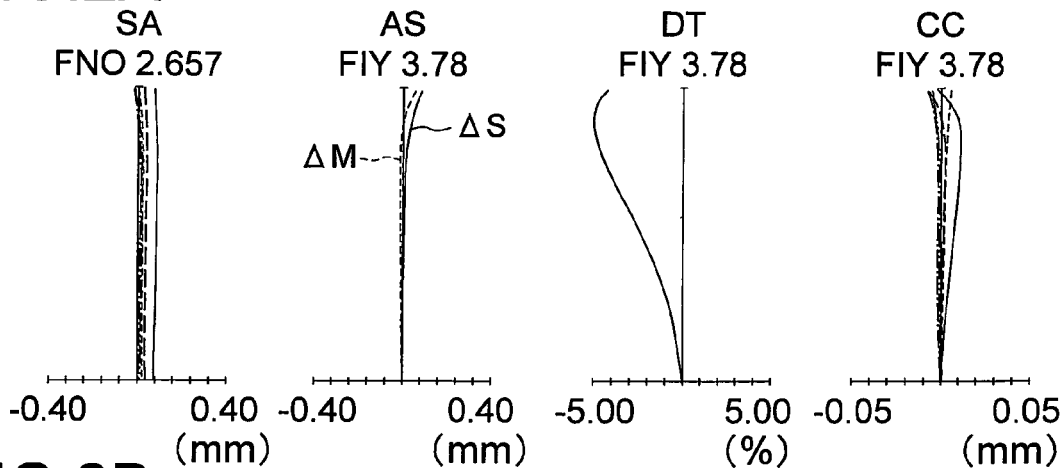
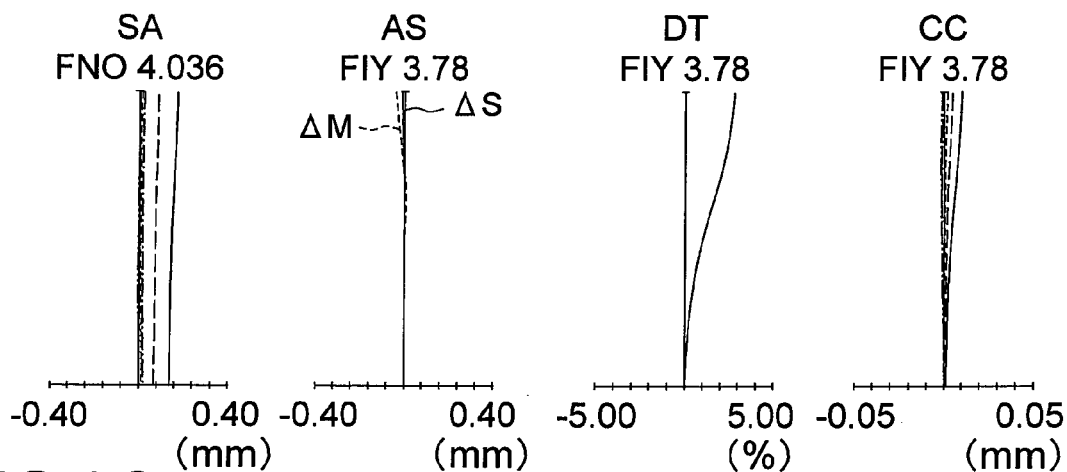
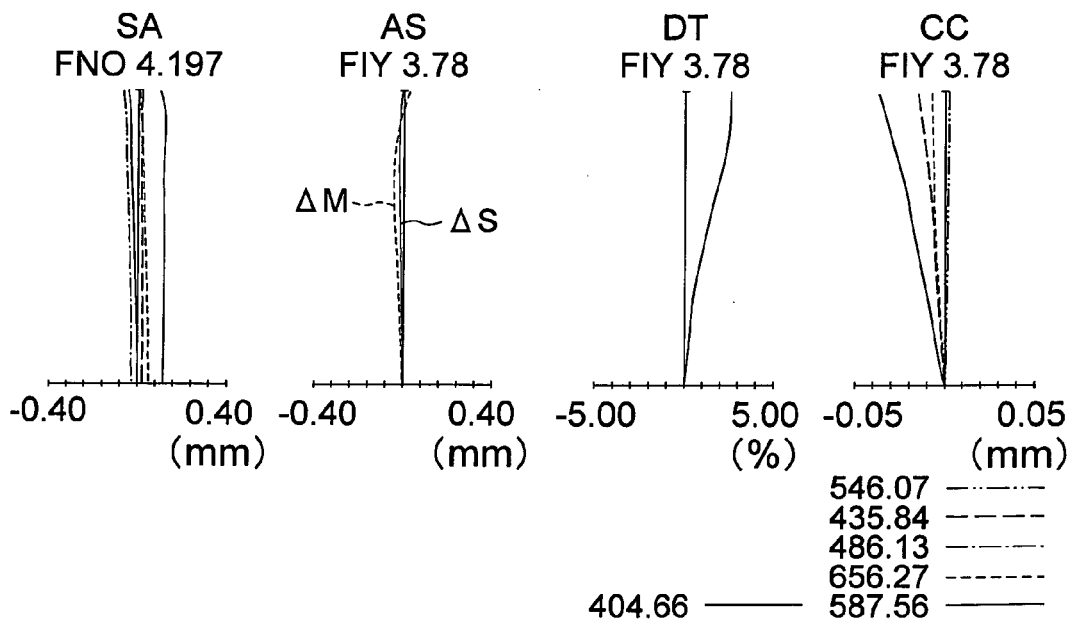

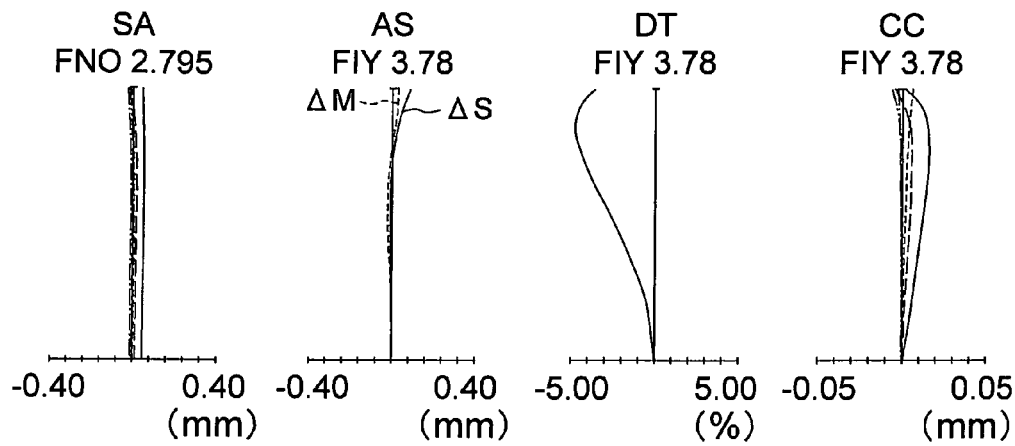
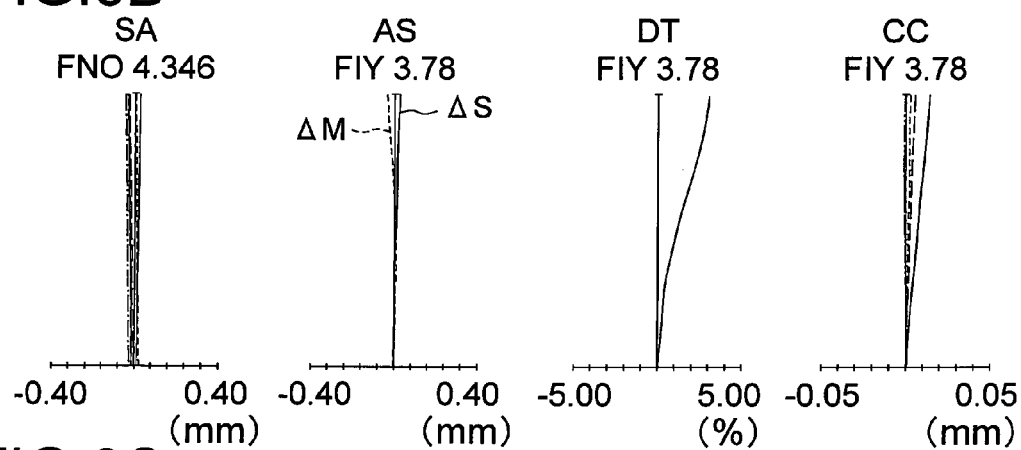
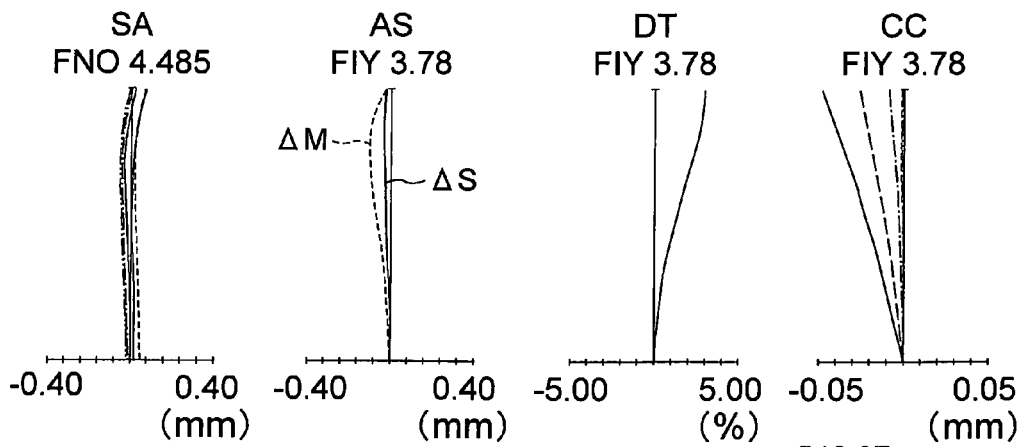

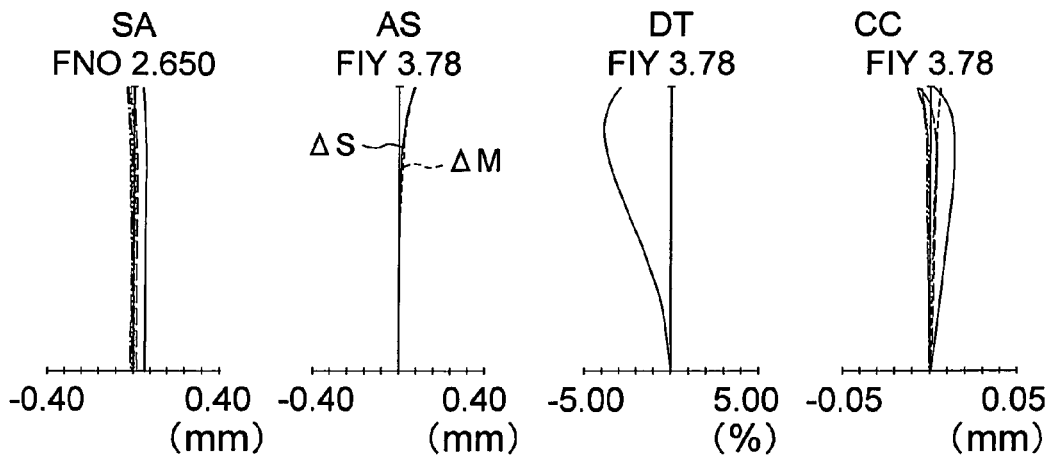
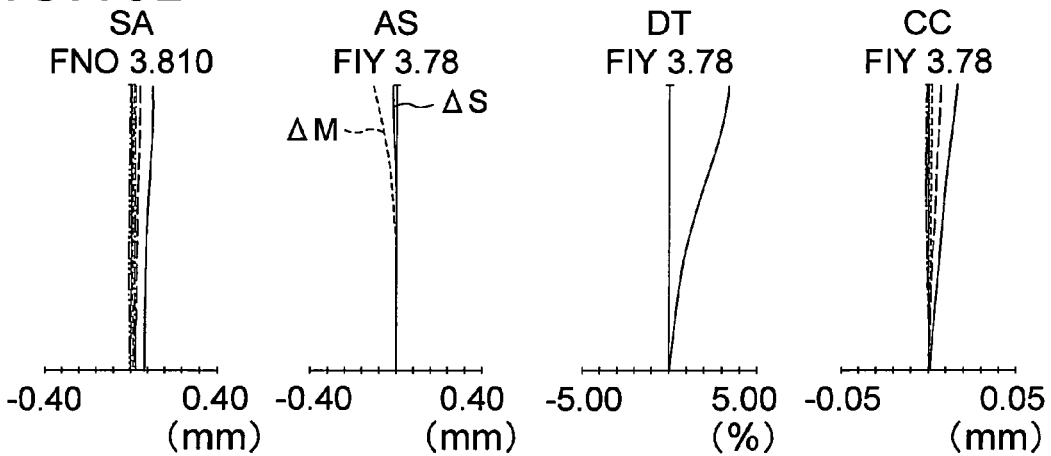
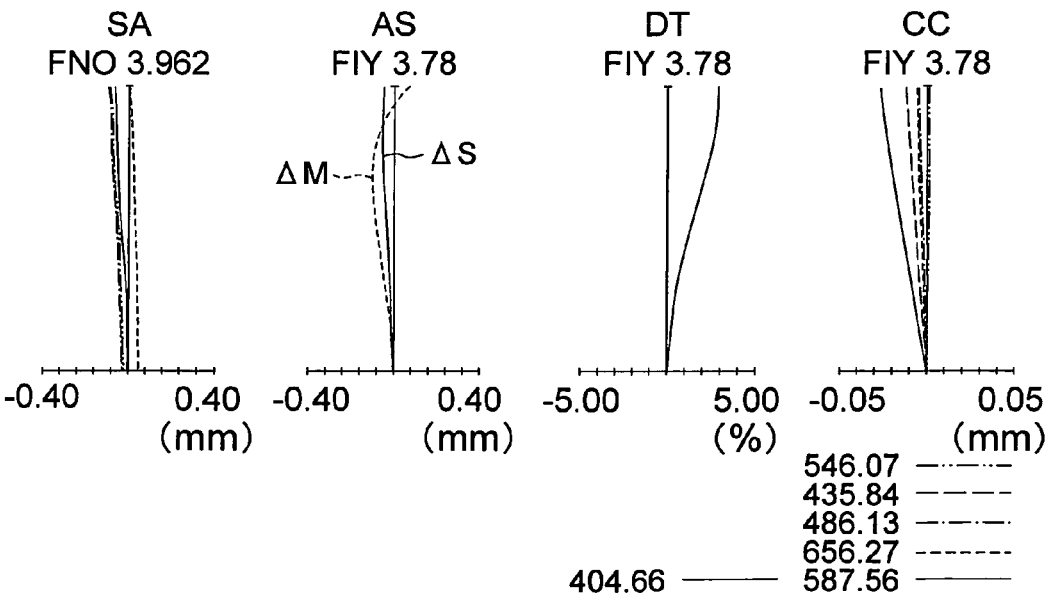

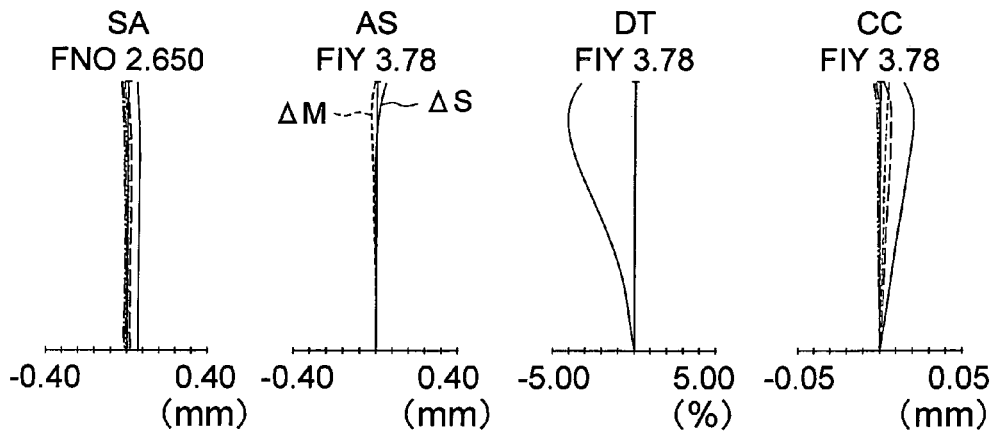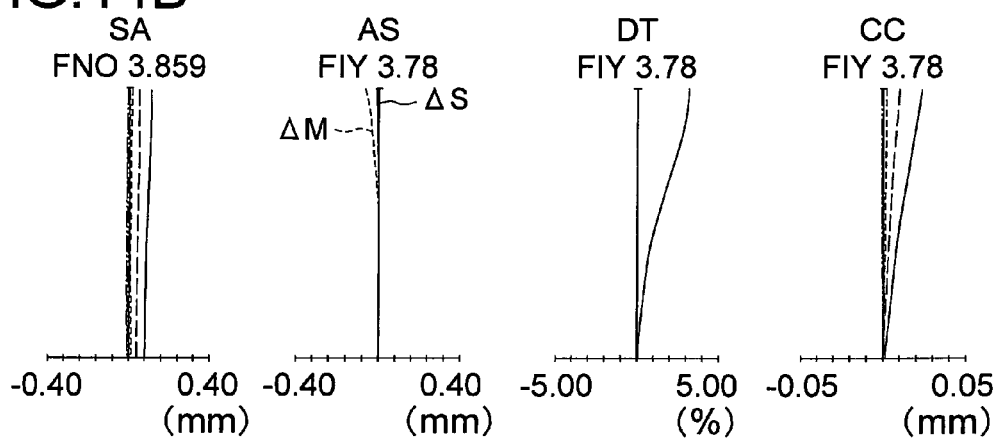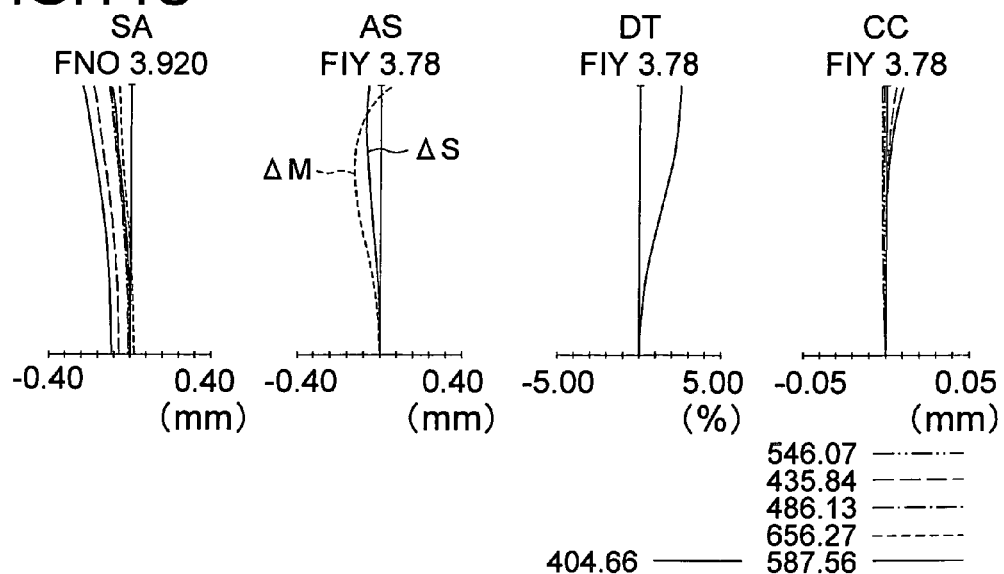

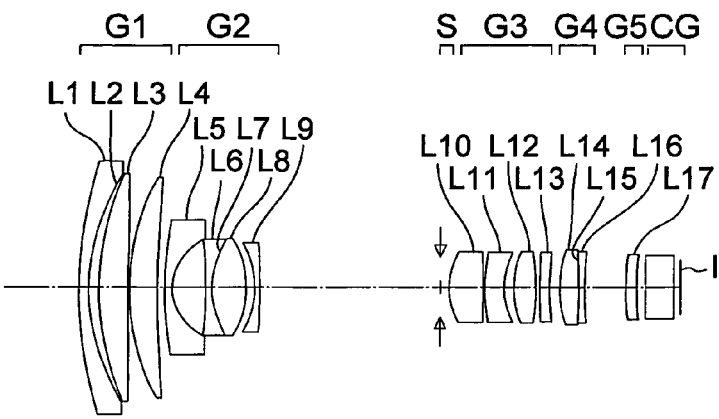
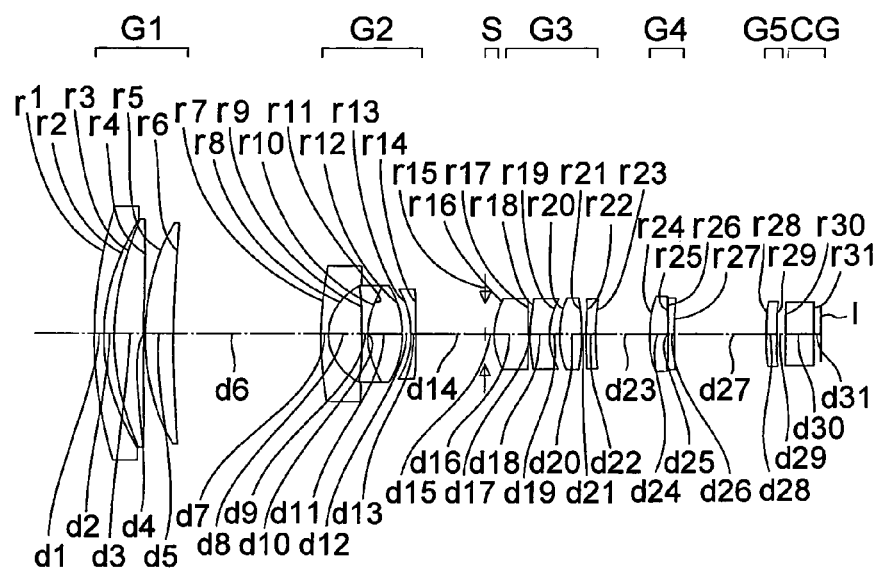
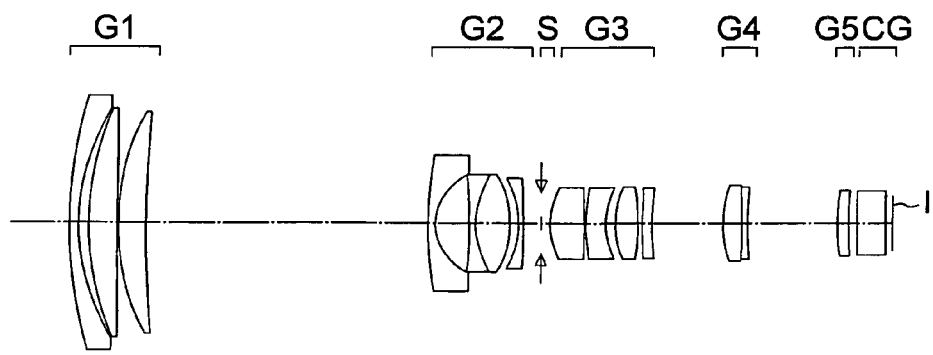

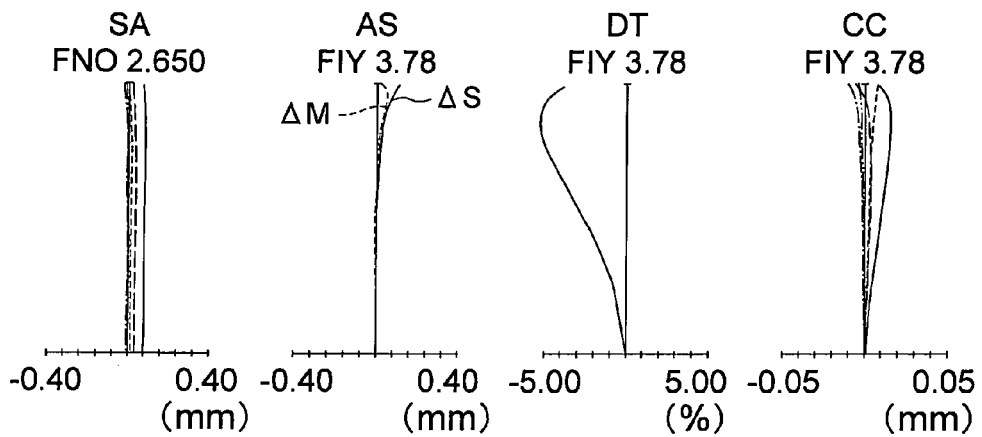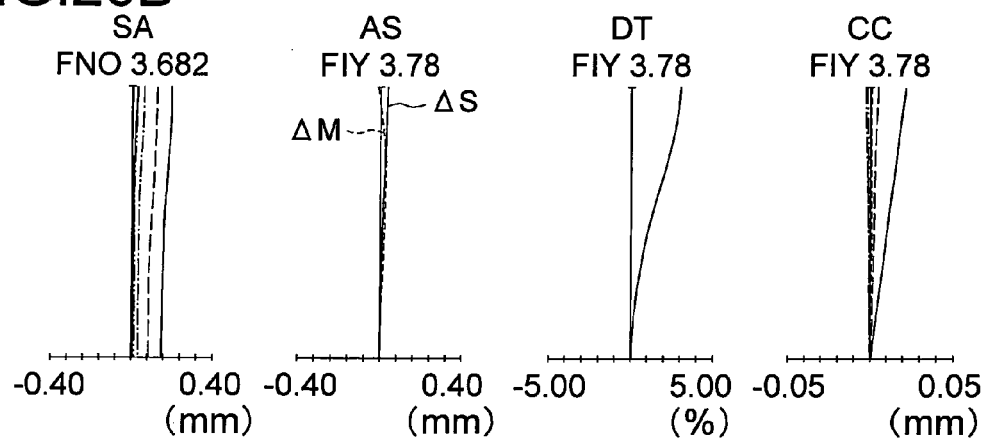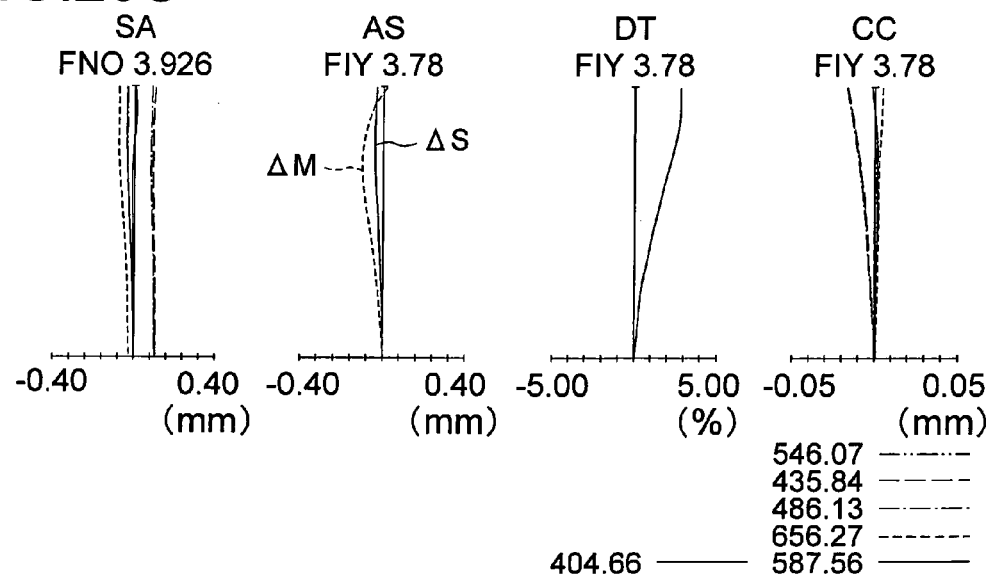

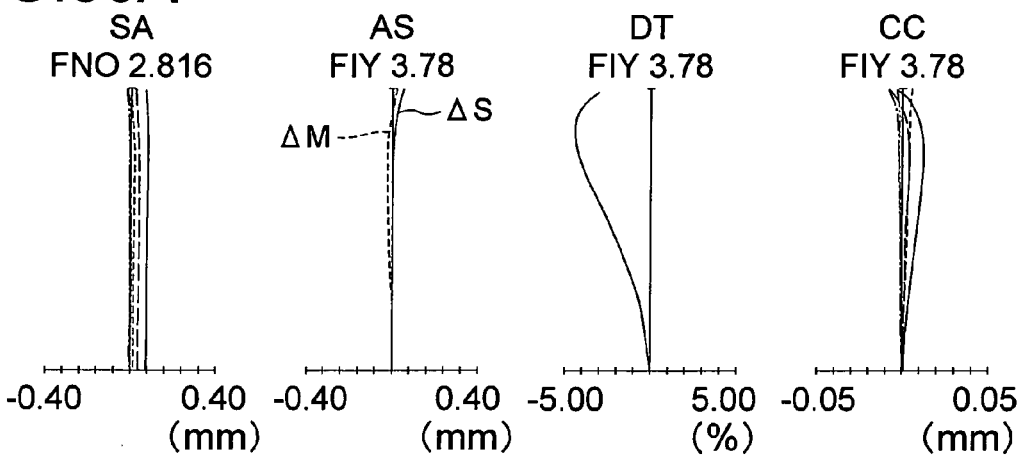
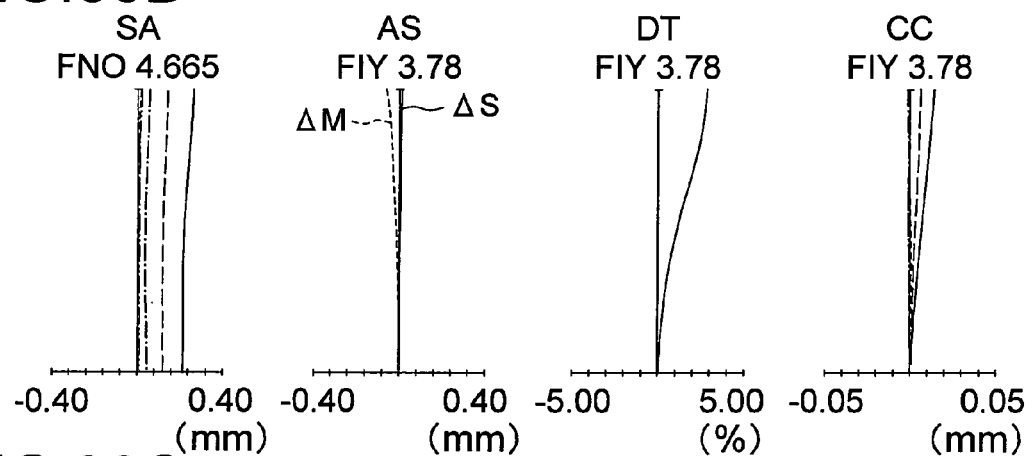
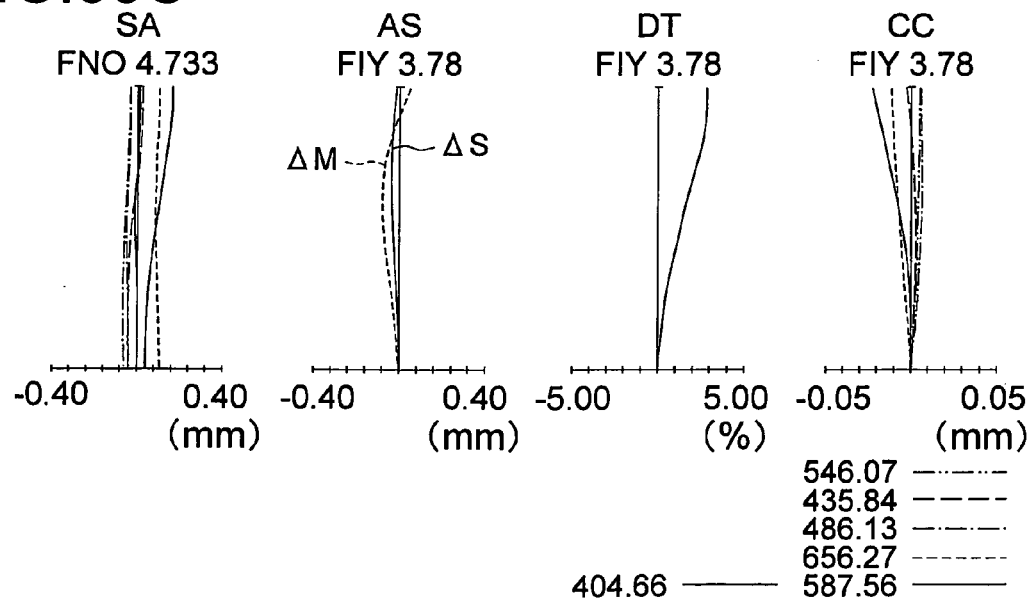

IMAGE FORMING OPTICAL SYSTEM AND ELECTRONIC IMAGE PICKUP APPARATUS EQUIPPED WITH SAME

BACKGROUND OF THE INVENTION

1. Field of the Invention

The present invention relates to an image forming optical system and an electronic image pickup apparatus equipped with the same.

2. Description of the Related Art

In recent years, an image pickup apparatus such as a digital camera has become popular, replacing a silver-salt film camera. In a digital camera, an object is captured by using a solid image pickup element such as a CCD (charge coupled device) and a CMOS (complementary metal oxide semiconductor). It is desirable that an image pickup lens which is to be used in such image pickup apparatus is a zoom lens (image forming lens) with a high zoom ratio.

Moreover, in such image pickup lens, it is desirable that an aberration related to an image forming performance (such as a spherical aberration and a coma aberration) with single color has been corrected favorably. Furthermore, it is desirable that a correction of the chromatic aberration related to color spreading and resolution of image is corrected sufficiently.

On the other hand, shortening of an overall length of lens (overall optical length) is desired. Incidentally, as shortening of the overall length of lens and small-sizing of an optical system as a whole are facilitated, various aberrations, particularly the chromatic aberration occur substantially, and the image forming performance tends to be degraded. Particularly, in a zoom lens having a long focal length at a telephoto end with a high zoom ratio, as a correction of the chromatic aberration, a reduction of a secondary spectrum in addition to a primary achromatism has been sought.

As a method for reducing an occurrence of such chromatic aberration, a method in which an optical material having an abnormal partial dispersion ratio is to be used, has been known (Japanese Patent Application Laid-open Publication Nos. 2007-163964, 2006-349947, and 2007-298555).

Moreover, it is desirable that a zoom lens to be used in the image pickup apparatus has a predetermined zoom ratio, and a wide angle end is a wide angle of field, and has a brighter and improved performance. For improving the performance of the zoom lens, it is necessary to correct the chromatic aberration favorably over the entire zoom range.

SUMMARY OF THE INVENTION

An image forming optical system according to a first aspect of the present invention includes in order from an object side to an image side a first lens group having a positive refractive power;

a second lens group having a negative refractive power; and an image-side lens group having a positive refractive power, and a distance between the first lens group and the second lens group changes at the time of zooming, and a refractive optical element A having a positive refractive power is positioned in the first lens group, and the image forming optical system satisfies the following conditional expression (1-1), conditional expression (1-2), and conditional expression (2)

$$vd_A < 30 \quad (1\text{-}1)$$

$$0.54 < \theta gF_A < 0.9 \quad (1\text{-}2)$$

$$|fG1/fG2| > 6.4 \quad (2)$$

where, $nd_A$, $nC_A$, $nF_A$, and $ng_A$ denote refractive indices of the refractive optical element A for a d-line, a C-line, an F-line, and a g-line respectively, $vd_A$ denotes Abbe's number $(nd_A-1)/(nF_A-nC_A)$ for the refractive optical element A, $\theta gF_A$ denotes a partial dispersion ratio $(ng_A-nF_A)/(nF_A-nC_A)$ of the refractive optical element A, fG1 denotes a focal length of the first lens group, and fG2 denotes a focal length of the second lens group.

An electronic image pickup apparatus according to a second aspect of the present invention includes an image forming optical system, and an image pickup element, and the image forming optical system includes in order from an object side to an image side, a first lens group having a positive refractive power, a second lens group having a negative refractive power, and an image-side lens group having a positive refractive power, and a distance between the first lens group and the second lens group changes at the time of zooming, and a refractive optical element having a positive refractive power is positioned in the first lens group, and the refractive optical element satisfies the following conditional expression (3-2)

$$0 < (Zb(3.3a) - Za(3.3a))/(Zb(2.5a) - (Za(2.5a)) < 0.895 \quad (3\text{-}2)$$

where, fw denotes a focal length of the image forming optical system, at a wide angle end, ft denotes a focal length of the image forming optical system, at a telephoto end, IH denotes the maximum image height on the image pickup element, Za(h) denotes an optical axial distance between an apex (a vertex) of an object-side surface on an optical axis, of the refractive optical element A and a position at a height h on the object side of the refractive optical element A, Zb(h) denotes an optical axial distance between the apex of the object-side surface on the optical axis, of the refractive optical element and a position at a height h on the image side of the refractive optical element A, a denotes a value defined by the following expression (3-1)

$$a = \{(IH)^2 \times \log_{10}(ft/fw)\}/fw \quad (3\text{-}1).$$

An electronic image pickup apparatus according to a third aspect of the present invention includes an image forming optical system; and an image pickup element, and the image forming optical system includes in order from an object side to an image side, a first lens group having a positive refractive power, a second lens group having a negative refractive power, and an image-side lens group having a positive refractive power, and a distance between the first lens group and the second lens group changes at the time of zooming, and a cemented optical element D is provided in the first lens group, and the cemented optical element D is arranged such that, a refractive optical element A having a positive refractive power is positioned between an optical element B which is positioned on the object side and an optical element C which is positioned on the image side, and the electronic image pickup apparatus satisfies the following conditional expression (4-1), conditional expression (4-2), and conditional expression (4-3)

$$vd_A<30 \quad (4\text{-}1)$$

$$0.54<\theta gF_A<0.9 \quad (4\text{-}2)$$

$$0.387<(Tnglw(0.7)/Tbasw(0.7))/(Tngl(0)/Tbas(0))\\<0.525 \quad (4\text{-}3)$$

where, $vd_A$ denotes Abbe's number $(nd_A-1)/(nF_A-nC_A)$ for the refractive optical element A, $\theta gF_A$ denotes a partial dispersion ratio $(ng_A-nF_A)/(nF_A-nC_A)$ of the refractive optical element A, $nd_A$, $nC_A$, $nF_A$, and $ng_A$ denote refractive indices of the refractive optical element A for a d-line, a C-line, an F-line, and a g-line respectively, Tngl(0) denotes a central thickness on an axis of the refractive optical element A, Tnglw(0.7) denotes a length of a light ray having a height 70% of the maximum light ray height on the image pickup element at the wide angle end, passing through the refractive optical element A, Tbas(0) denotes a central thickness on an axis of the optical element B, and Tbasw(0.7) denotes a length of a light ray having a height 70% of the maximum light ray height on the image pickup element at the wide angle end, passing through the optical element B.

An electronic image pickup apparatus according to a fourth aspect of the present invention includes an image forming optical system, and an image pickup element, and the image forming optical system is the abovementioned image forming optical system, and satisfies the following conditional expression (3-2)

$$0<(Zb(3.3a)-Za(3.3a))/(Zb(2.5a)-(Za(2.5a))<0.895 \quad (3\text{-}2)$$

where, fw denotes a focal length of the image forming optical system, at a wide angle end, ft denotes a focal length of the image forming optical system, at a telephoto end, IH denotes the maximum image height on the image pickup element, Za(h) denotes an optical axial distance between an apex of an object-side surface on an optical axis, of the refractive optical element A and a position at a height h on the object side of the refractive optical element A, Zb(h) denotes an optical axial distance between the apex of the object-side surface on the optical axis, of the refractive optical element and a position at a height h on the image side of the refractive optical element A, a denotes a value defined by the following expression (3-1)

$$a=\{(IH)^2\times\log_{10}(ft/fw)\}/fw \quad (3\text{-}1).$$

BRIEF DESCRIPTION OF THE DRAWINGS

FIG. 1A shows a state at a wide angle end, FIG. 1B shows an intermediate focal length state, and FIG. 1C shows a state at a telephoto end;

FIG. 2A, FIG. 2B, and FIG. 2C are diagrams showing a spherical aberration, an astigmatism, a distortion, and a chromatic aberration of magnification at the time of infinite object point focusing of the zoom lens according to the first embodiment, where, FIG. 2A shows a state at the wide angle end, FIG. 2B shows an intermediate focal length state, and FIG. 2C shows a state at the telephoto end;

FIG. 3A shows a state at a wide angle end, FIG. 3B shows an intermediate focal length state, and FIG. 3C shows a state at a telephoto end;

FIG. 4A shows a state at the wide angle end, FIG. 4B shows an intermediate focal length state, and FIG. 4C shows a state at the telephoto end;

FIG. 5A shows a state at a wide angle end, FIG. 5B shows an intermediate focal length state, and FIG. 5C shows a state at a telephoto end;

FIG. 6A, FIG. 6B, and FIG. 6C are diagrams showing a spherical aberration, an astigmatism, a distortion, and a chromatic aberration of magnification at the time of infinite object point focusing of the zoom lens according to the third embodiment, where, FIG. 6A shows a state at the wide angle end, FIG. 6B shows an intermediate focal length state, and FIG. 6C shows a state at the telephoto end;

FIG. 7A shows a state at a wide angle end, FIG. 7B shows an intermediate focal length state, and FIG. 7C shows a state at a telephoto end;

FIG. 8A shows a state at the wide angle end, FIG. 8B shows an intermediate focal length state, and FIG. 8C shows a state at the telephoto end;

FIG. 9A shows a state at a wide angle end, FIG. 9B shows an intermediate focal lengths state, and FIG. 9C shows a state at a telephoto end;

FIG. 10A, FIG. 10B, and FIG. 10C are diagrams showing a spherical aberration, an astigmatism, a distortion, and a chromatic aberration of magnification at the time of infinite object point focusing of the zoom lens according to the fifth embodiment, where, FIG. 10A shows a state at the wide angle end, FIG. 10B shows an intermediate focal length state, and FIG. 10C shows a state at the telephoto end;

FIG. 11A shows a state at a wide angle end, FIG. 11B shows an intermediate focal length state, and FIG. 11C shows a state at a telephoto end;

FIG. 12A shows a state at the wide angle end, FIG. 12B shows an intermediate focal length state, and FIG. 12C shows a state at the telephoto end;

FIG. 13A shows a state at a wide angle end, FIG. 13B shows an intermediate focal length state, and FIG. 13C shows a state at a telephoto end;

FIG. 14A, FIG. 14B, and FIG. 14C are diagrams showing a spherical aberration, an astigmatism, a distortion, and a chromatic aberration of magnification at the time of infinite object point focusing of the zoom lens according to the seventh embodiment, where, FIG. 14A shows a state at the wide angle end, FIG. 14B shows an intermediate focal length state, and FIG. 14C shows a state at the telephoto end;

FIG. 15A shows a state at a wide angle end, FIG. 15B shows an intermediate focal length state, and FIG. 15C shows a state at a telephoto end;

FIG. 16A shows a state at the wide angle end, FIG. 16B shows an intermediate focal length state, and FIG. 16C shows a state at the telephoto end;

FIG. 17A shows a state at a wide angle end, FIG. 17B shows an intermediate focal length state, and FIG. 17C shows a state at a telephoto end;

FIG. 18A shows a state at the wide angle end, FIG. 18B shows an intermediate focal length state, and FIG. 18C shows a state at the telephoto end;

FIG. 19A, FIG. 19B, and FIG. 19C are cross-sectional views along an optical axis showing an optical arrangement at the time of infinite object point focusing of a zoom lens according to a tenth embodiment of the present invention, where, FIG. 19A shows a state at a wide angle end, FIG. 19B shows an intermediate focal length state, and FIG. 19C shows a state at a telephoto end;

FIG. 20A shows a state at the wide angle end, FIG. 20B shows an intermediate focal length state, and FIG. 20C shows a state at the telephoto end;

FIG. 21A shows a state at a wide angle end, FIG. 21B shows an intermediate focal length state, and FIG. 21C shows a state at a telephoto end;

FIG. 22A shows a state at the wide angle end, FIG. 22B shows an intermediate focal length state, and FIG. 22c shows a state at the telephoto end;

FIG. 23A shows a state at a wide angle end, FIG. 23B shows an intermediate focal length state, and FIG. 23C shows a state at a telephoto end;

FIG. 24A shows a state at the wide angle end, FIG. 24B shows an intermediate focal length state, and FIG. 24C shows a state at the telephoto end;

FIG. 25A shows a state at a wide angle end, FIG. 25B shows an intermediate focal length state, and FIG. 25C shows a state at a telephoto end;

FIG. 26A, FIG. 26B, and FIG. 26C are diagrams showing a spherical aberration, an astigmatism, a distortion, and a chromatic aberration of magnification at the time of infinite object point focusing of the zoom lens according to the thirteenth embodiment, where, FIG. 26A shows a state at the wide angle end, FIG. 26B shows an intermediate focal length state, and FIG. 26C shows a state at the telephoto end;

FIG. 27A shows a state at a wide angle end, FIG. 27B shows an intermediate focal length state, and FIG. 27C shows a state at a telephoto end;

FIG. 28A shows a state at the wide angle end, FIG. 28B shows an intermediate focal length state, and FIG. 28C shows a state at the telephoto end;

FIG. 29A shows a state at a wide angle end, FIG. 29B shows an intermediate focal length state, and FIG. 29C shows a state at a telephoto end;

FIG. 30A, FIG. 30B, and FIG. 30C are diagrams showing a spherical aberration, an astigmatism, a distortion, and a chromatic aberration of magnification at the time of infinite object point focusing of the zoom lens according to the fifteenth embodiment, where, FIG. 30A shows a state at the wide angle end, FIG. 30B shows an intermediate focal length state, and FIG. 30C shows a state at the telephoto end;

FIG. 31A shows a state at a wide angle end, FIG. 31B shows an intermediate focal length state, and FIG. 31C shows a state at a telephoto end;

FIG. 32A shows a state at the wide angle end, FIG. 32B shows an intermediate focal length state, and FIG. 32C shows a state at the telephoto end;

FIG. 33A shows a state at a wide angle end, FIG. 33B shows an intermediate focal length state, and FIG. 33C shows a state at a telephoto end;

FIG. 34A shows a state at the wide angle end, FIG. 34B shows an intermediate focal length state, and FIG. 34C shows a state at the telephoto end;

FIG. 35A shows a state at a wide angle end, FIG. 35B shows an intermediate focal length state, and FIG. 35C shows a state at a telephoto end;

FIG. 36A shows a state at the wide angle end, FIG. 36B shows an intermediate focal length state, and FIG. 36C shows a state at the telephoto end;

FIG. 37A shows a state at a wide angle end, FIG. 37B shows an intermediate focal length state, and FIG. 37C shows a state at a telephoto end;

FIG. 38A shows a state at the wide angle end, FIG. 38B shows an intermediate focal length state, and FIG. 38C shows a state at the telephoto end;

FIG. 39A shows a state at a wide angle end, FIG. 39B shows an intermediate focal length state, and FIG. 39C shows a state at a telephoto end;

FIG. 40A shows a state at the wide angle end, FIG. 40B shows a intermediate focal length state, and FIG. 40C shows a state at the telephoto end;

FIG. 41A shows a state at a wide angle end, FIG. 41B shows an intermediate focal length state, and FIG. 41C shows a state at a telephoto end;

FIG. 42A shows a state at the wide angle end, FIG. 42B shows an intermediate focal length state, and FIG. 42C shows a state at the telephoto end;

FIG. 43A shows a state at a wide angle end, FIG. 43B shows an intermediate focal length state, and FIG. 43C shows a state at a telephoto end;

FIG. 44A shows a state at the wide angle end, FIG. 44B shows an intermediate focal length state, and FIG. 44C shows a state at the telephoto end;

FIG. 45A shows a state at a wide angle end, FIG. 45B shows an intermediate focal length state, and FIG. 45C shows a state at a telephoto end;

FIG. 46A shows a state at the wide angle end, FIG. 46B shows an intermediate focal length state, and FIG. 46C shows a state at the telephoto end;

FIG. 47A shows a state at a wide angle end, FIG. 47B shows an intermediate focal length state, and FIG. 47C shows a state at a telephoto end;

FIG. 48A shows a state at the wide angle end, FIG. 48B shows an intermediate focal length state, and FIG. 48C shows a state at the telephoto end;

FIG. 49A shows a state at a wide angle end, FIG. 49B shows an intermediate focal length state, and FIG. 49C shows a state at a telephoto end;

FIG. 50A shows a state at the wide angle end, FIG. 50B shows an intermediate focal length state, and FIG. 50C shows a state at the telephoto end;

FIG. 51A shows a state at a wide angle end, FIG. 51B shows an intermediate focal length state, and FIG. 51C shows a state at a telephoto end;

FIG. 52A shows a state at the wide angle end, FIG. 52B shows an intermediate focal length state, and FIG. 52C shows a state at the telephoto end;

FIG. 53A shows a state at a wide angle end, FIG. 53B shows an intermediate focal length state, and FIG. 53C shows a state at a telephoto end;

FIG. 54A shows a state at the wide angle end, FIG. 54B shows an intermediate focal length state, and FIG. 54C shows a state at the telephoto end;

FIG. 55A shows a state at a wide angle end, FIG. 55B shows an intermediate focal length state, and FIG. 55C shows a state at a telephoto end;

FIG. 56A shows a state at the wide angle end, FIG. 56B shows an intermediate focal length state, and FIG. 56C shows a state at the telephoto end;

FIG. 57A shows a state at a wide angle end, FIG. 57B shows an intermediate focal length state, and FIG. 57C shows a state at a telephoto end;

FIG. 58A shows a state at the wide angle end, FIG. 58B shows an intermediate focal length state, and FIG. 58C shows a state at the telephoto end;

FIG. 65A is a front view of a mobile telephone 400, FIG. 65B is a side view of the mobile telephone 400, and FIG. 65C is a cross-sectional view of a photographic optical system 405.

DETAILED DESCRIPTION OF THE PREFERRED EMBODIMENTS

Figure 1A:
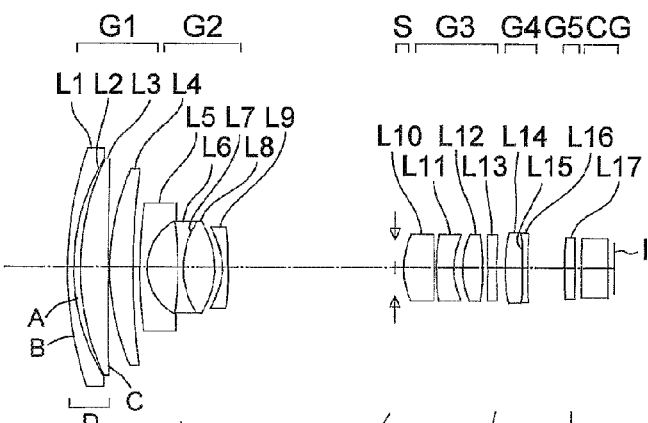
FIG. 1A, FIG. 1B, and FIG. 1C are cross-sectional views along an optical axis showing an optical arrangement at the time of infinite object focusing of a zoom lens (image forming optical system) according to a first embodiment of the present invention, where.

Exemplary embodiments in which, an image forming optical system according to the present invention is applied to a zoom optical system will be described below in detail by referring to the accompanying diagrams.

In other words, the description of the exemplary embodiments includes specific details for exemplification. Various modifications and variations made in the embodiments described below fairly fall within the basic teachings herein set forth. Consequently, the exemplary embodiments of the present invention which will be described below do not lead to loss of generality of the invention for which, application for right has been made, and the present invention is not restricted to the embodiments described below.

Prior to the description of the embodiments, an action and an effect of an image forming optical system according to the embodiments will be described below.

<Description about Effective Partial Dispersion Ratio>

Firstly, Abbe's number and a partial dispersion ratio for one optical element are as follow.

$$\nu d = (nd-1)/(nF-nC)$$

$$\theta gF = (ng-nF)/(nF-nC)$$

$$\theta hg = (nh-ng)/(nF-nC)$$

where, nd, NC, nF, ng, and nH denote refractive indices of optical elements of wavelength 587.6 nm (d-line), wavelength 656.3 nm (C-line), wavelength 486.1 nm (F-line), wavelength 435.8 nm (g-line), and wavelength 404.7 nm (h-line), νd denotes Abbe's number for the optical element, θgF denotes a partial dispersion ratio of the optical element for the g-line and the F-line, and θhg denotes a partial dispersion ratio of the optical element for the h-line and the g-line.

Next, a cemented optical element in which, two optical elements are cemented will be described below. An effective partial dispersion ratio when the cemented optical element (having two optical elements cemented) is considered as one optical element can be calculated by the following expression.

$$\theta gF_{21} = f_{21} \times \nu_{21} \times (\theta gF_1 \times \phi_1/\nu d_1 + \theta gF_2 \times \phi_2/\nu d_2) \quad (A)$$

where, $f_{21}$ denotes a combined focal length of the two optical elements, $\nu_{21}$ denotes Abbe's number when the two optical elements are considered as one optical element, $\theta gF_1$ denotes a partial dispersion ratio of one optical element, $\phi_1$ denotes a refractive power of the one optical element, $vd_1$ denotes Abbe's number for the one optical element, $\theta gF_2$ denotes a partial dispersion ratio of the other optical element, $\phi_2$ denotes a refractive power of the other optical element, and $vd_2$ denotes Abbe's number for the other optical element.

$f_{21}$, $\nu_{21}$, $\phi_1$, and $\phi_2$ are expressed by the following expressions respectively.

$$1/f_{21} = 1/f_1 + 1/f_2$$

$$\nu_{21} = 1/(f_{21} \times (\phi_1/vd_1 + \phi_2/vd_2))$$

$$\phi_1 = 1/f_1$$

$$\phi_2 = 1/f_2$$

where, $f_1$ denotes a foal length of the one optical element, and $f_2$ denotes a focal length of the other optical element.

In the following description, the partial dispersion ratio is a partial dispersion ratio for the g-line and the F-line, unless being restricted in particular.

An image forming optical system according to a first aspect includes in order from an object side to an image side a first lens group having a positive refractive power, a second lens group having a negative refractive power, and an image-side lens group having a positive refractive power, and a distance between the first lens group and the second lens group changes at the time of zooming, and a refractive optical element A having a positive refractive power is positioned in the first lens group, and the image forming optical system satisfies the following conditional expression (1-1), conditional expression (1-2), and conditional expression (2).

$$vd_A < 30 \qquad (1\text{-}1)$$

$$0.54 < \theta gF_A < 0.9 \qquad (1\text{-}2)$$

$$|fG1/fG2| > 6.4 \qquad (2)$$

where, $nd_A$, $nC_A$, $nF_A$, and $ng_A$ denote refractive indices of the refractive optical element A for a d-line, a C-line, an F-line, and a g-line respectively, $vd_A$ denotes Abbe's number $(nd_A - 1)/(nF_A - nC_A)$ for the refractive optical element A, $\theta gF_A$ denotes a partial dispersion ratio $(ng_A - nF_A)/(nF_A - nC_A)$ of the refractive optical element A, fG1 denotes a focal length of the first lens group, and fG2 denotes a focal length of the second lens group.

For achieving a high magnification in the image forming optical system in which, the first lens group has a positive refractive power, it is necessary to increase a negative refractive power of the second lens group. However, by increasing the negative refractive power of the second lens group, an aberration which has occurred in the first lens group is spread to lens groups from the second lens group onward. Therefore, an optical performance of the overall image forming optical system is degraded. Particularly at a telephoto end, a chromatic aberration is degraded. In other words, for improving a zoom ratio while improving or maintaining to be high the optical performance, carrying out correction of the chromatic aberration in the first lens group becomes significant.

Therefore, in the image forming optical system according to the first embodiment, the refractive optical element A having a positive refractive power is disposed in the first lens group, and the image forming optical system is let to satisfy conditional expression (1-1) and conditional expression (1-2). By making such an arrangement, it is possible to reduce the chromatic aberration, particularly a secondary spectrum, which occurs in the first lens group. Furthermore, by satisfying conditional expression (2), it is possible to achieve an image forming optical system having a high zoom ratio and improved performance, in which the chromatic aberration has been corrected.

When an upper limit of conditional expression (1-1) is surpassed, a primary achromatism becomes difficult in the first lens group. As a result, a resolution at the wide angle end and a telephoto end is degraded, and the performance is deteriorated. For this reason, the image forming optical system with high zoom ratio cannot be achieved. When an upper limit of conditional expression (1-2) is surpassed, correction of the secondary spectrum becomes excessive in the first lens group. For this reason, a chromatic aberration of magnification and a longitudinal chromatic aberration at the telephoto end are deteriorated. As a result, color spreading due to the secondary spectrum occurs, and the performance is degraded. Therefore, the image forming optical system with high zoom ratio cannot be achieved.

On the other hand, when a lower limit of conditional expression (1-1) and a lower limit of conditional expression (1-2) are surpassed, the refractive power of the refractive optical element A increases. Therefore, a spherical aberration at the telephoto end and the chromatic aberration of magnification at the wide angle end are deteriorated. As a result, color spreading and degradation of resolution occur, and the performance is deteriorated. Therefore, the image forming optical system with high zoom ratio cannot be achieved.

When a lower limit of conditional expression (2) is surpassed, a ratio of a refractive power of the first lens group and a refractive power of the second lens group becomes small. Here, the first lens group and the second lens group being lens groups having a zoom effect, the zoom ratio becomes small. Consequently, achieving the image forming optical system having a high zoom ratio becomes difficult. Furthermore, in a case in which, the ratio of the refractive power of the first lens group and the refractive power of the second lens group becomes small, regarding the negative refractive power, contribution of the second lens group to the image forming optical system becomes small. Therefore, Petzval's sum becomes positive for the overall image forming optical system. Consequently, a curvature of field occurs and the performance is deteriorated. Therefore it is not desirable.

Moreover, in the image forming optical system according to the first aspect, it is preferable that a cemented optical element D is provided in the first lens group, and the cemented optical element D is arranged such that, the refractive optical element A is positioned between an optical element B which is positioned on the object side and an optical element C which is positioned on the image side.

As it has been mentioned above, it is preferable to position the refractive optical element A between the optical element B and the optical element C, and to form an optical element D by three optical elements which are cemented. Accordingly, a shape of a surface of the refractive optical element A is determined by the optical element B and the optical element C. When such an arrangement is made, a change in the shape of the surface due to a change in the environment occurs in the refractive optical element A. Therefore, it is possible to achieve correction of chromatic aberration stably in the optical element D which is formed by three optical elements which are cemented.

Moreover, it is desirable that the image forming optical system according to the first embodiment satisfies the following conditional expression (5).

$$0.4 < \theta hg_A < 1.2 \quad (5)$$

where, $\theta hg_A$ denotes a partial dispersion ratio $(nh_A - ng_A)/(nF_A - nC_A)$ of the refractive optical element A for an h-line, and $nh_A$ denotes a refractive index of the refractive optical element A for the h-line.

For improvement of an image forming performance, correction of the chromatic aberration is necessary. Abbe's number is related to a primary achromatism, and the partial dispersion ratio is related to a secondary spectrum. Particularly, the partial dispersion ratio is related to occurrence of color spreading in the image forming performance. Here, the color spreading is a phenomenon in which, a color which is not in an object occurs at a boundary of a strong contrasting portion of a brightness difference.

For rectifying the primary achromatism and the color spreading, an optical material having the optimum Abbe's number and the partial dispersion ratio is available. By using such optical material in the refractive optical element, it is possible to improve the image forming performance. However, only by using the refractive optical element in which, only the partial dispersion ratio has been taken into consideration, the color spreading cannot be corrected sufficiently. Without a refractive optical element in which, a correction of the h-line (404 nm) together with the Abbe's number and the partial dispersion ratio is also taken into consideration, the color spreading cannot be corrected sufficiently.

Therefore, in the image forming optical system according to the first aspect, it is desirable to satisfy conditional expression (5). By satisfying conditional expression (5), it is possible to carry out further reduction of the color spreading. As a result, it is possible achieve the improvement of the image forming performance in the image forming optical system.

When an upper limit of conditional expression (5) is surpassed, the h-line is corrected excessively. In this case, the color spreading becomes conspicuous on the contrary, and therefore it is not desirable. Whereas, when a lower limit of conditional expression (5) is surpassed, the correction of the h-line becomes insufficient. In this case, the color spreading becomes conspicuous, and therefore it is not desirable.

Moreover, the image forming optical system according to the first aspect includes in order from an object side to an image side a first lens group having a positive refractive power,
a second lens group having a negative refractive power,
an aperture stop,
a third lens group having a positive refractive power,
a fourth lens group having a positive refractive power, and
a fifth lens group having a positive refractive power, and
zooming is carried out by changing distances between the adjacent lens groups such that, at a telephoto end, a distance between the first lens group and the second lens group becomes longer, a distance between the second lens group and the third lens group becomes shorter, and a distance between the third lens group and the fourth lens group becomes longer, as compared to at a wide angle end.

Moreover, according to a preferable aspect of the present invention, it is desirable that a distance between the fourth lens group and the fifth lens group of the image forming optical system satisfies the following conditional expression (20).

$$0 < TG_{45}/WG_{45} < 5 \quad (20)$$

where, $WG_{45}$ denotes the distance between the fourth lens group and the fifth lens group at the wide angle end, and $TG_{45}$ denotes the distance between the fourth lens group and the fifth lens group at the telephoto end.

When an upper limit of conditional expression (20) is surpassed, it becomes difficult to correct an image-plane fluctuation which occurs due to zooming, and the image forming performance is degraded, and therefore it is not desirable. Whereas, a lower limit of conditional expression (20) is never surpassed, as both a denominator and a numerator of conditional expression (20) are positive values.

In this manner, in the image forming optical system according to the first aspect, the optical system is formed of five lens groups, and an arrangement is made such that each lens group moves at the time of zooming. By making such an arrangement, it becomes possible to suppress a fluctuation in brightness between two zoom states. Furthermore, by correcting mainly the chromatic aberration in the first lens group, and letting a high zoom ratio in the second lens group, it is possible to carry out mainly a correction of a single color in the lens groups from the third lens group onward.

Moreover, it is desirable that the image forming optical system according to the first aspect includes an optical element B, and satisfies the following conditional expression (6).

$$|f_B/f_A| > 0.15 \quad (6)$$

where, $f_A$ denotes a focal length of the refractive optical element A, and $f_B$ denotes a focal length of the optical element B.

In a case in which, the image forming optical system includes the optical element B, in the image forming optical system according to the first aspect, the refractive optical element A and the optical element B are cemented, and a cemented optical element AB is formed. Furthermore, the optical element C is cemented to the cemented optical element AB, and accordingly, the cemented optical element D is formed. In this case, for lowering an effective partial dispersion ratio of the cemented optical element AB than a partial dispersion ratio of the optical element B, it is desirable to satisfy conditional expression (6). By satisfying conditional expression (6), it is possible to lower the effective partial dispersion ration of the cemented optical element AB than the partial dispersion ratio of the optical element B. Therefore, by using the cemented optical element D, it is possible to correct the secondary spectrum all the more as compared to a case of using only the optical element B. Therefore, an improvement of performance due to the rectification of the chromatic aberration is achieved.

When a lower limit of conditional expression (6) is surpassed, the positive refractive power of the refractive optical element A decreases. In this case, an amount lowered of the effective partial dispersion ratio of the cemented optical element AB in which, two optical elements are cemented, with respect to the partial dispersion ratio of the optical element B becomes small. Moreover, with decrease in the amount of the effective partial dispersion ratio of the cemented optical element AB, an amount of lowering of an effective partial dispersion ratio of the cemented optical element D becomes small. As a result, a difference in the partial dispersion ratio of the optical element B and the effective partial dispersion ratio of the cemented optical element D becomes small. In this case, even when the cemented optical element D in which three optical elements are cemented is formed by the cemented optical element AB in which two optical elements are cemented, since an effect of correction of the secondary spectrum due to the cemented lens D in which three optical elements are cemented becomes small, it is not desirable.

Moreover, it is desirable that the image forming optical system according to the first aspect includes an optical element B, and satisfies the following conditional expression (7).

$$0 < \theta gF_B - \theta gF_{BA} < 0.25 \qquad (7)$$

where, $nd_B$, $nC_B$, $nF_B$, and $ng_B$ denote refractive indices of the optical element B for a d-line, a C-line, an F-line, and a g-line, $vd_B$ denotes Abbe's number $(nd_B-1)/(nF_B-nC_B)$ for the optical element B, $\theta gF_B$ denotes a partial dispersion ratio $(ng_B-nF_B)/(nF_B-nC_B)$ of the optical element B, $\theta gF_{BA}$ denotes an effective partial dispersion ratio when the refractive optical element A and the optical element B are considered as one optical element, and is expressed by the following expression $$\theta gF_{BA} = f_{BA} \times v_{BA} \times (\theta gF_A \times \phi_A/vd_A + \theta gF_B \times \phi_B/vd_B)$$

where, $f_{BA}$ denotes a combined focal length of the optical element B and the refractive optical element A, and is expressed by the following expression $$1/f_{BA} = 1/f_A + 1/f_B,$$

$v_{BA}$ denotes Abbe's number when the refractive optical element A and the optical element B are considered as one optical element, and is expressed by the following expression $$v_{BA} = 1/(f_{BA} \times (\phi_A/vd_A + \phi_B/vd_B))$$

where, $\phi_A$ denotes a refractive power $(\phi_A=1/f_A)$ of the refractive optical element A, $\phi_B$ denotes a refractive power $(\phi_B=1/f_B)$ of the optical element B, and $\phi_{BA}$ denotes a combined refractive power $(\phi_{BA}=1/f_{BA})$ of the optical element B and the refractive optical element A.

In a case in which, the image forming optical system includes the optical element B, it is preferable to use the optical element B as the combined optical element AB in which two optical elements are cemented, rather than using the optical element B singly. Accordingly, the secondary spectrum is corrected further. As a result, an improvement of performance due to the rectification of the color spreading is achieved.

When an upper limit of conditional expression (7) is surpassed, the color spreading due to excessive correction of the secondary spectrum occurs, and therefore it is not desirable. Whereas, when a lower limit of conditional expression (7) is surpassed, the effective partial dispersion ratio $(\theta gF_{BA})$ of the cemented optical element AB in which, two optical elements are cemented becomes higher than the partial dispersion ratio $(\theta gF_B)$ of the optical element B. In other words, the secondary spectrum is made to occur by the refractive optical element A. Therefore, as a result, the color spreading increases to be more than the color spreading before cementing, and therefore it is not desirable.

Moreover, it is desirable that the image forming optical system according to the first aspect satisfies the following conditional expression (8).

$$1.0 < f_A/fG1 < 8.0 \qquad (8)$$

where, $f_A$ denotes the focal length of the refractive optical element A, and fG1 denotes a focal length of the first lens group.

For improving or maintaining to be high the optical performance in the image forming optical system, it is significant to carry out sufficiently the correction of the chromatic aberration in the first lens group. Particularly, it is desirable to carry out the correction of the secondary spectrum in the first lens group, and to satisfy conditional expression (8) for rectifying the color spreading.

When an upper limit of conditional expression (8) is surpassed, a refractive power in the refractive optical component A becomes weak. In this case, it becomes difficult to lower the effective partial dispersion ratio of the cemented optical element D (or the cemented optical element AB in which two optical elements are cemented) than the partial dispersion ratio of the optical element B. As a result, there is color spreading due to insufficient correction of the secondary spectrum, and therefore it is not desirable.

On the other hand, when a lower limit of conditional expression (8) is surpassed, the refractive power in the refractive optical element A becomes strong. In this case, it is possible to lower the effective partial dispersion ratio of the cemented optical component D (or the cemented optical component AB in which two optical components are cemented) than the partial dispersion ratio of the optical element B singly. However, this also leads to the excessive correction of the secondary spectrum. In other words, the secondary spectrum is made to occur due to the refractive optical element A. As a result, the color spreading increases, and therefore it is not desirable.

Moreover, it is desirable that the image forming optical system according to the first aspect satisfies the following conditional expression (9).

$$-25 < (Ra+Rb)/(Ra-Rb) < -0.5 \qquad (9)$$

where,

Ra denotes a radius of curvature on the object side of the refractive optical element A, and Rb denotes a radius of curvature on the image side of the refractive optical element A.

When an upper limit of conditional expression (9) is surpassed, the spherical aberration increases toward a negative side at the telephoto end. Moreover, when a lower limit of conditional expression (9) is surpassed, the spherical aberration increases toward a positive side. Since the image forming performance is degraded in both cases, it is not desirable.

Moreover, an electronic image pickup apparatus according to the first aspect includes an image forming optical system, and an image pickup element, and the image forming optical system includes in order from an object side to an image side, a first lens group having a positive refractive power, a second lens group having a negative refractive power, and an image-side lens group having a positive refractive power, and a distance between the first lens group and the second lens group changes at the time of zooming, and a refractive optical element A having a positive refractive power is positioned in the first lens group, and the refractive optical element A satisfies the following conditional expression (3-2).

$$0 < (Zb(3.3a)-Za(3.3a))/(Zb(2.5a)-(Za(2.5a)) < 0.895 \qquad (3-2)$$

where, fw denotes a focal length of the image forming optical system, at a wide angle end, ft denotes a focal length of the image forming optical system, at a telephoto end, IH denotes the maximum image height on the image pickup element, Za(h) denotes an optical axial distance between an apex of an object-side surface on an optical axis, of the refractive optical element A and a position at a height h on the object side of the refractive optical element A, Zb(h) denotes an optical axial distance between the apex of the object-side surface on the optical axis, of the refractive optical element A and a position at a height h on the image side of the refractive optical element A, a denotes a value defined by the following expression (3-1)

$$a = \{(IH)^2 \times \log_{10}(ft/fw)\}/fw \qquad (3\text{-}1).$$

In the electronic image pickup apparatus according to the first aspect, the refractive optical element A having a positive refractive power is positioned in the first lens group. A distance and a position of a light ray which passes through the refractive optical element A differ according to an angle of field and a zoom state. Therefore, even when a shape of the refractive optical element is fixed, an effect of aberration correction in the refractive optical element A differs according to the angle of field and the zoom state. Therefore, for making a favorable aberration state over the entire zoom range, it is necessary that the shape of the refractive optical element A is determined upon taking into consideration the angle of field, a zoom ratio, and an image height.

When a height of a chief ray which is incident at the maximum image height at a distance L from an aperture is let to be a, a is to be expressed as follows.

$$a = L \times IH/fw$$

where, tan (angle of field) can be let to be tan(angle of field)=$IH/fw$,

L can be let to be

L∝IH×$\log_{10}$(ft/fw)

Consequently, when m is let to be a factor of proportionality, a is expressed by expression (3-1).

A light-ray height and the angle of field, and a zoom ratio and an image height are related by conditional expression (3-1). Therefore, it is desirable that the image forming optical system according to the present invention satisfies conditional expression (3-2).

Here, what is sought in the first lens group having a positive refractive power is to let the chromatic aberration of magnification at the wide angle end, and the longitudinal chromatic aberration and the spherical aberration at the telephoto end have a favorable state. Accordingly, it is possible to realize favorable image forming performance in the image forming optical system.

When an upper limit of conditional expression (3-2) is surpassed, a change in a ratio of an axial central thickness and a peripheral central thickness of the refractive optical element A is small. Therefore, correction of the chromatic aberration of magnification at the wide angle end becomes excessive. Furthermore, correction of the longitudinal chromatic aberration and the spherical aberration at the telephoto end is insufficient. As a result, it becomes difficult to realize the favorable image forming performance, and therefore it is not desirable. On the other hand, when a lower limit of conditional expression (3-2) is surpassed, a numerator part of conditional expression becomes negative. This means that the refractive optical element A cannot realize a physical shape as an optical element.

Moreover, an electronic image pickup apparatus according to a second aspect of the present invention includes an image forming optical system, and an image pickup element, and the image forming optical system is one of the image forming optical systems described above, and satisfies the following conditional expression (3-3).

$$0 < (Zb(3.3a) - Za(3.3a))/(Zb(2.5a) - (Za(2.5a)) < 0.990 \qquad (3\text{-}3)$$

where, fw denotes a focal length of the image forming optical system, at a wide angle end, ft denotes a focal length of the image forming optical system, at a telephoto end, IH denotes the maximum image height on the image pickup element, Za(h) denotes an optical axial distance between an apex of an object-side surface on an optical axis, of the refractive optical element A and a position at a height h on the object side of the refractive optical element A, Zb(h) denotes an optical axial distance between the apex of the object-side surface on the optical axis, of the refractive optical element and a position at a height h on the image side of the refractive optical element A, a denotes a value defined by the following expression (3-1)

$$a = \{(IH)^2 \times \log_{10}(ft/fw)\}/fw \qquad (3\text{-}1).$$

Description of conditional expression (3-3) is as described in the abovementioned conditional expression (3-2).

Moreover, it is preferable that the electronic image pickup apparatus according to the first aspect satisfies the following conditional expression (1-1), conditional expression (1-2), and conditional expression (2).

$$vd_A < 30 \qquad (1\text{-}1)$$

$$0.54 < \theta gF_A < 0.9 \qquad (1\text{-}2)$$

$$|fG1/fG2| > 6.4 \qquad (2)$$

where, $nd_A$, $nC_A$, $nF_A$, and $ng_A$ denote refractive indices of the refractive optical element A for a d-line, a C-line, an F-line, and a g-line respectively, $vd_A$ denotes Abbe's number $(nd_A - 1)/(nF_A - nC_A)$ of the refractive optical element A, $vgF_A$ denotes a partial dispersion ratio $(ng_A - nF_A)/(nF_A - nC_A)$ of the refractive optical element A, fG1 denotes a focal length of the first lens group, and fG2 denotes a focal length of the second lens group.

Description of conditional expression (1-1), conditional expression (1-2), and conditional expression (2) is as mentioned in the description of the image forming optical system according to the first aspect.

Moreover, it is preferable that the electronic image pickup apparatus according to the abovementioned aspects includes a refractive optical element A, and an optical element B, and satisfies the following conditional expression (1-1), conditional expression (1-2), and conditional expression (4-3).

$$vd_A < 30 \qquad (1\text{-}1)$$

$$0.54 < \theta gF_A < 0.9 \qquad (1\text{-}2)$$

$$0.05 < (Tnglw(0.7)/Tbasw(0.7))/(Tngl(0)/Tbas(0)) < 0.75 \qquad (4\text{-}3)$$

where, $nd_A$, $nC_A$, $nF_A$, and $ng_A$ denote refractive indices of the refractive optical element A for a d-line, a C-line, an F-line, and a g-line respectively, $vd_A$ denotes Abbe's number $(nd_A-1)/(nF_A-nC_A)$ for the refractive optical element A, $\theta gF_A$ denotes a partial dispersion ratio $(ng_A-nF_A)/(nF_A-nC_A)$ of the refractive optical element A, Tngl(0) denotes a central thickness on an axis of the refractive optical element A, Tnglw(0.7) denotes a length of a light ray having a height 70% of the maximum light ray height on the image pickup element at the wide angle end, passing through the refractive optical element A, Tbas(0) denotes a central thickness on an axis of the optical element B, and Tbasw(0.7) denotes a length of a light ray having a height 70% of the maximum light ray height on the image pickup element at the wide angle end, passing through the optical element B.

For correcting favorably the longitudinal chromatic aberration and the chromatic aberration of magnification at the wide angle end, and having the correction of the longitudinal chromatic aberration and the chromatic aberration of magnification in a balanced manner, it is desirable that the electronic image pickup apparatus satisfies conditional expression (1-1), conditional expression (1-2), and conditional expression (4-3).

When an upper limit of each of conditional expression (1-1), conditional expression (1-2), and conditional expression (4-3) is surpassed, the correction of the chromatic aberration of magnification becomes more than the correction of the longitudinal chromatic aberration. Moreover, when an amount of correction of the chromatic aberration of magnification is appropriate, an amount of correction of the longitudinal chromatic aberration is insufficient. As a result, an axial performance is degraded, and therefore it is not desirable.

When a lower limit of each of conditional expression (1-1), conditional expression (1-2), and conditional expression (4-3) is surpassed, the correction of the chromatic aberration of magnification becomes smaller than the correction of the longitudinal chromatic aberration. Moreover, when the amount of correction of the longitudinal chromatic aberration is appropriate, the amount of correction of the chromatic aberration of magnification is insufficient. As a result, the axial performance is degraded, and therefore it is not desirable. Furthermore, both the denominator and the numerator of each of conditional expression (1-1), conditional expression (1-2), and conditional expression (4-3) being positive values, the lower limit of each of conditional expression (1-1), conditional expression (1-2), and conditional expression (4-3) cannot become a negative value.

Moreover, it is preferable that the electronic image pickup apparatus according to the abovementioned aspects satisfies one of the following conditional expression (10-1a), conditional expression (10-1b), conditional expression (10-1c), conditional expression (10-2a), and conditional expression (10-2b).

$$0.3 < Tngl(0)/Tbas(0) < 10 \quad (10\text{-}1a)$$

$$0.15 < Tnglt(0.7)/Tbast(0.7) < 3.0 \quad (10\text{-}1b)$$

$$0.1 < Tnglt(0.9)/Tbast(0.9) < 2.0 \quad (10\text{-}1c)$$

$$0.1 < (Tnglt(0.7)/Tbast(0.7))/(Tngl(0)/Tbas(0)) < 0.85 \quad (10\text{-}2a)$$

$$0.05 < (Tnglt(0.9)/Tbast(0.9))/(Tngl(0)/Tbas(0)) < 0.75 \quad (10\text{-}2b)$$

where,

Tngl(0) denotes the central thickness on the axis of the refractive optical element A, Tnglt(0.7) denotes a length of a light ray having a height 70% of the maximum light ray height on the image pickup element at the telephoto end, passing through the refractive optical element A, Tnglt(0.9) denotes a length of a light ray having a height 90% of the maximum light ray height on the image pickup element at the telephoto end, passing through the refractive optical element A, Tbas(0) denotes the central thickness on the axis of the optical element B, Tbast(0.7) denotes a length of a light ray having a height 70% of the maximum light ray height on the image pickup element at the telephoto end, passing through the optical element B, and Tbast(0.9) denotes a length of a light ray having a height 90% of the maximum light ray height on the image pickup element at the telephoto end, passing through the optical element B.

When the electronic image pickup apparatus satisfies one of conditional expression (10-1a), conditional expression (10-1b), conditional expression (10-1c), conditional expression (10-2a), and conditional expression (10-2b), it is possible to correct favorably the longitudinal chromatic aberration and the chromatic aberration of magnification at the telephoto end. Furthermore, it is possible to correct the longitudinal chromatic aberration and the chromatic aberration of magnification in a balanced manner.

When an upper limit of one of conditional expression (10-1a), conditional expression (10-1b), and conditional expression (10-1c) is surpassed, the longitudinal chromatic aberration is corrected excessively on an axis at the telephoto end, and the chromatic aberration of magnification is corrected excessively off the axis at the telephoto end. As a result, the image forming performance of the overall optical system is degraded, and therefore it is not desirable.

When a lower limit of one of conditional expression (10-1a), conditional expression (10-1b), and conditional expression (10-1c) is surpassed, correction of the longitudinal chromatic aberration is insufficient on the axis at the telephoto end, and correction of the chromatic aberration of magnification is insufficient off the axis at the telephoto end. Furthermore, an edge thickness cannot be achieved at the extreme off-axis, and manufacturing becomes difficult. Therefore it is not desirable.

When an upper limit of each of conditional expression (10-2a) and conditional expression (10-2b) is surpassed, the correction of the chromatic aberration of magnification becomes more than the correction of the longitudinal chromatic aberration. In this case, when the amount of correction of the chromatic aberration of magnification is appropriate, the amount of correction of the longitudinal chromatic aberration is insufficient. As a result, the axial performance is degraded, and therefore it is not desirable.

When a lower limit of each of conditional expression (10-2a) and conditional expression (10-2b) is surpassed, the correction of the chromatic aberration of magnification is smaller than the correction of the longitudinal chromatic aberration. In this case, when the amount of correction of the longitudinal chromatic aberration is appropriate, the amount of correction of the chromatic aberration of magnification is insufficient. As a result, the axial performance is degraded, and therefore, it is not desirable. Both the denominator and the numerator of each of conditional expression (10-2a) and conditional expression (10-2b) being positive values, the lower limit of each of conditional expression (10-2a) and conditional expression (10-2b) cannot become a negative value.

Moreover, it is desirable that the electronic image pickup apparatus according to the abovementioned aspects satisfies one of the following conditional expression (11a) and conditional expression (11b).

$$0.5 < (Tnglw(0.7)/(Tngl(0)) < 0.95 \quad (11a)$$

$$0.3 < (Tnglw(0.9)/(Tngle(0)) < 0.9 \quad (11b)$$

where,

Tngl(0) denotes the central thickness on the axis of the refractive optical element A, Tnglw(0.7) denotes the length of the light ray having a height 70% of the maximum light ray height on the image pickup element at the wide angle end, passing through the refractive optical element A, and Tnglw(0.9) denotes a length of a light ray having a height 90% of the maximum light ray height on the image pickup element at the wide angle end, passing through the refractive optical element A.

When the electronic image pickup apparatus satisfies one of conditional expression (11a) and conditional expression (11b), it is possible to correct favorably the longitudinal chromatic aberration and the chromatic aberration of magnification at the wide angle end. Furthermore, it is possible to correct the longitudinal chromatic aberration and the chromatic aberration of magnification in a balanced manner.

When an upper limit of one of conditional expression (11a) and conditional expression (11b) is surpassed, a difference in a central thickness on axis and a central thickness off axis of the refractive optical element A ceases to exist. In this case, the correction of the chromatic aberration of magnification is excessive with respect to the correction of the longitudinal chromatic aberration. As a result, the image forming performance of the overall optical system is degraded, and therefore it is not desirable. On the other hand, when a lower limit of one of conditional expression (11a) and conditional expression (11b) is surpassed, the correction of the chromatic aberration of magnification is insufficient with respect to the correction of the longitudinal chromatic aberration. Even in this case, the image forming performance of the overall optical system is degraded, and therefore it is not desirable.

Moreover, it is desirable that the electronic image pickup apparatus according to the abovementioned aspects satisfies one of the following conditional expression (12a) and conditional expression (12b).

$$0.5 < (Tnglt(0.7)/(Tngl(0)) < 0.95 \quad (12a)$$

$$0.3 < (Tnglt(0.9)/(Tngl(0)) < 0.9 \quad (12b)$$

where,

Tngl(0) denotes the central thickness on the axis of the refractive optical element A, Tnglt(0.7) denotes the length of the light ray having a height 70% of the maximum light ray height on the image pickup element at the telephoto end, passing through the refractive optical element A, and Tnglt(0.9) denotes the length of the light ray having a height 90% of the maximum light ray height on the image pickup element at the telephoto end, passing through the refractive optical element A.

When the electronic image pickup apparatus satisfies one of conditional expression (12a) and conditional expression (12b), it is possible to correct favorably the longitudinal chromatic aberration and the chromatic aberration of magnification at the telephoto end. Furthermore, it is possible to correct the longitudinal chromatic aberration and the chromatic aberration of magnification in a balanced manner.

When an upper limit of one of conditional expression (12a) and conditional expression (12b) is surpassed, the difference in the central thickness on axis and the central thickness off axis of the refractive optical element A ceases to exist. In this case, the correction of the chromatic aberration of magnification is insufficient with respect to the correction of the longitudinal chromatic aberration. As a result, the image forming performance of the overall optical system is degraded, and therefore it is not desirable. On the other hand, when a lower limit of one of conditional expression (12a) and conditional expression (12b) is surpassed, the correction of the chromatic aberration of magnification is excessive with respect to the correction of the longitudinal chromatic aberration. As a result, the image forming performance of the overall optical system is degraded, and therefore it is not desirable.

Moreover, it is preferable that the electronic image pickup apparatus according to the abovementioned aspects satisfies one of the following conditional expression (13-1a), conditional expression (13-1b), conditional expression (13-1c), and conditional expression (13-2).

$$0.3 < Tngl(0)/Tbas(0) < 10 \quad (13\text{-}1a)$$

$$0.15 < Tnglw(0.7)/Tbasw(0.7) < 2.0 \quad (13\text{-}1b)$$

$$0 < Tnglw(0.9)/Tbasw(0.9) < 0.9 \quad (13\text{-}1c)$$

$$0 < (Tnglw(0.9)/Tbasw(0.9))/(Tngl(0)/Tbas(0)) < 0.5 \quad (13\text{-}2)$$

where,

Tngl(0) denotes the central thickness on the axis of the refractive optical element A, Tnglw(0.7) denotes the length of the light ray having a height 70% of the maximum light ray height on the image pickup element at the wide angle end, passing through the refractive optical element A, Tnglw(0.9) denotes the length of the light ray having a height 90% of the maximum light ray height on the image pickup element at the wide angle end, passing through the refractive optical element A, Tbas(0) denotes the central thickness on the axis of the optical element B, Tbasw(0.7) denotes the length of the light ray having a height 70% of the maximum light ray height on the image pickup element at the wide angle end, passing through the optical element B, and Tbasw(0.9) denotes a length of a light ray having a height 90% of the maximum light ray height on the image pickup element at the telephoto end, passing through the optical element B.

For correcting favorably the longitudinal chromatic aberration and the chromatic aberration of magnification at the wide angle end, and having the correction of the longitudinal chromatic aberration and the chromatic aberration of magnification in a balanced manner, it is desirable that the electronic image pickup apparatus satisfies one of conditional expression (13-1a), conditional expression (13-1b), and conditional expression (13-1c).

When an upper limit of one of conditional expression (13-1a), conditional expression (13-1b), and conditional expression (13-1c) is surpassed, the correction of the longitudinal chromatic aberration becomes excessive on axis at the wide angle end. Moreover, the correction of the chromatic aberration of magnification becomes excessive off axis at the wide angle end. As a result, the image forming performance is degraded, and therefore it is not desirable. On the other hand, when a lower limit of any of conditional expression (13-1a), conditional expression (13-1b), and conditional expression (13-1c) is surpassed, the correction of the longitudinal chromatic aberration is insufficient on axis at the wide angle end. Moreover, the correction of the chromatic aberration of magnification is insufficient off axis at the wide angle end. Furthermore, an edge thickness cannot be achieved at the extreme off-axis. Therefore, as manufacturing becomes difficult, it is not desirable.

When an upper limit of conditional expression (13-2) is surpassed, the correction of the chromatic aberration of magnification is more than the correction of the longitudinal chromatic aberration. Therefore, when the amount of correction of the chromatic aberration of magnification is appropriate, the amount of correction of the longitudinal chromatic aberration is insufficient. As a result, the axial performance is degraded, and therefore it is not desirable. Both the denominator and the numerator of conditional expression (13-2) being positive values, a lower limit of conditional expression (13-2) cannot be surpassed.

Moreover, it is preferable that the image forming optical system according to the abovementioned aspects satisfies the following conditional expression (9').

$$-25<(Ra+Rb)/(Ra-Rb)<-2 \quad (9')$$

where,

Ra denotes a radius of curvature on the object side of the refractive optical element A, and Rb denotes a radius of curvature on the image side of the refractive optical element A.

When an upper limit of conditional expression (9') is surpassed, the spherical aberration increases toward the negative side at the telephoto end. Moreover, when a lower limit of conditional expression (9') is surpassed, the spherical aberration increases toward the positive side. Since the image forming performance is degraded in both cases, it is not desirable.

Moreover, an electronic image pickup apparatus according to another aspect of the present invention includes an image forming optical system, and an image pickup element, and the image forming optical system includes in order from an object side to an image side, a first lens group having a positive refractive power, a second lens group having a negative refractive power, and an image-side lens group having a positive refractive power, and a distance between the first lens group and the second lens group changes at the time of zooming, and a cemented optical element D is provided in the first lens group, and the cemented optical element D is arranged such that, a refractive optical element A having a positive refractive power is positioned between an optical element B which is positioned on the object side and an optical element C which is positioned on the image side, and the electronic image pickup apparatus satisfies the following conditional expression (4-1), conditional expression (4-2), and conditional expression (4-3).

$$vd_A<30 \quad (4-1)$$

$$0.54<\theta gF_A<0.9 \quad (4-2)$$

$$0.387<(Tnglw(0.7)/Tbasw(0.7))/(Tngl(0)/Tbas(0))<0.525 \quad (4-3)$$

where, $vd_A$ denotes Abbe's number $(nd_A-1)/(nF_A-nC_A)$ for the refractive optical element A, $\theta gF_A$ denotes a partial dispersion ratio $(ng_A-nF_A)/(nF_A-nC_A)$ of the refractive optical element A, $nd_A$, $nC_A$, $nF_A$, and $ng_A$ denote refractive indices of the refractive optical element A for a d-line, a C-line, an F-line, and a g-line respectively, Tngl(0) denotes a central thickness on an axis of the refractive optical element A, Tnglw(0.7) denotes a length of a light ray having a height 70% of the maximum light ray height on the image pickup element at the wide angle end, passing through the refractive optical element A, Tbas(0) denotes a central thickness on an axis of the optical element B, and Tbasw(0.7) denotes a length of a light ray having a height 70% of the maximum light ray height on the image pickup element at the wide angle end, passing through the optical element B.

In the zoom lens in which the first lens group has a positive refractive power, since an aberration which has occurred in the first lens group, particularly the chromatic aberration at the wide angle end, increases in lens groups from the second lens group onward, the performance is degraded. In other words, for improving or maintaining to be high the optical performance, carrying out correction of the chromatic aberration in the first lens group becomes significant.

The electronic image pickup apparatus satisfies conditional expression (4-1) and conditional expression (4-2), and furthermore, the refractive optical element A having a positive refractive power in which, an object side and an image side is let to be an air surface, is disposed in the first lens group. Accordingly, it is possible to reduce the chromatic aberration which occurs in the first lens group.

Regarding conditional expression (4-1) and conditional expression (4-2), the description is same as the description of the image forming optical system according to the abovementioned aspect.

When the electronic image pickup apparatus satisfies conditional expression (4-3), it is possible to correct favorably the longitudinal chromatic aberration and the chromatic aberration of magnification at the wide angle end. Furthermore, it is possible to correct the longitudinal chromatic aberration and the chromatic aberration of magnification in a balanced manner.

When an upper limit of conditional expression (4-3) is surpassed, the correction of the chromatic aberration of magnification is more than the correction of the longitudinal chromatic aberration. In this case, when the amount of correction of the chromatic aberration of magnification is appropriate, the amount of correction of the longitudinal chromatic aberration is insufficient, and the axial performance being degraded, it is not desirable.

When a lower limit of conditional expression (4-3) is surpassed, the correction of the chromatic aberration of magnification is smaller than the correction of the longitudinal chromatic aberration. In this case, when the amount of correction of the longitudinal chromatic aberration is appropriate, the amount of correction of the chromatic aberration of magnification is insufficient, and the axial performance being degraded, it is not desirable.

Both the denominator and the numerator of conditional expression (4-3) being positive values, the lower limit of conditional expression (4-3) cannot become a negative value.

Moreover, in the electronic image pickup apparatus according to the abovementioned aspect, the image forming optical system includes the cemented optical component D.

The cemented optical element D is formed of three optical elements. Here, the cemented optical element D is formed by the refractive optical element A being positioned between the optical element B and the optical element C. By making such an arrangement, a shape of a surface of the refractive optical element A is determined by the optical element B and the optical element C. In this case, change in the shape of the surface of the refractive optical element A due to a change in the environment does not occur. Therefore, it is possible to achieve correction of chromatic aberration stably in the cemented optical element D.

Moreover, it is preferable that the electronic image pickup apparatus according to the second embodiment satisfies the following conditional expression (2).

$$|fG1/fG2|>6.4 \quad (2)$$

where,
fG1 denotes a focal length of the first lens group, and
fG2 denotes a focal length of the second lens group.

Regarding condition expression (2), the description is same as in the description of the abovementioned image forming optical system.

Moreover, an electronic image pickup apparatus according to another aspect of the present invention includes
an image forming optical system, and
an image pickup element, and
the image forming optical system is one of the abovementioned image forming optical systems, and satisfies the following conditional expression (3-2).

$$0<(Zb(3.3a)-Za(3.3a))/(Zb(2.5a)-(Za(2.5a))<0.895 \quad (3\text{-}2)$$

where,
fw denotes a focal length of the image forming optical system, at a wide angle end,
ft denotes a focal length of the image forming optical system, at a telephoto end,
IH denotes the maximum image height on the image pickup element,
Za(h) denotes an optical axial distance between an apex of an object-side surface on an optical axis, of the refractive optical element A and a position at a height h on the object side of the refractive optical element A,
Zb(h) denotes an optical axial distance between the apex of the object-side surface on the optical axis, of the refractive optical element and a position at a height h on the image side of the refractive optical element A,
a denotes a value defined by the following expression (3-1)

$$a=\{(IH)^2 \times \log_{10}(ft/fw)\}/fw \quad (3\text{-}1).$$

Regarding conditional expression (3-3), the description is same as already described.

Moreover, it is preferable that an image forming optical system according to the second aspect and the third aspect of the present invention satisfies the following conditional expression (4-1), conditional expression (4-2), and conditional expression (2).

$$vd_A<30 \quad (4\text{-}1)$$

$$0.54<\theta gF_A<0.9 \quad (4\text{-}2)$$

$$|fG1/fG2|>6.4 \quad (2)$$

where,
$nd_A$, $nC_A$, $nF_A$, and $ng_A$ denote refractive indices of the refractive optical element A for a d-line, a C-line, an F-line, and a g-line respectively,
$vd_A$ denotes Abbe's number $(nd_A-1)/(nF_A-nC_A)$ of the refractive optical element A, $\theta gF_A$ denotes a partial dispersion ratio $(ng_A-nF_A)/(nF_A-nC_A)$ of the refractive optical element A,
fG1 denotes a focal length of the first lens group, and
fG2 denotes a focal length of the second lens group.

Regarding conditional expression (4-1), conditional expression (4-2), and conditional expression (2), the description is same as already described.

Moreover, it is preferable that the electronic image pickup apparatus satisfies one of the following conditional expression (10-1a'), conditional expression (10-1b'), conditional expression (10-1c'), conditional expression (10-2a'), and conditional expression (10-2b').

$$0.3<Tngl(0)/Tbas(0)<3 \quad (10\text{-}1a')$$

$$0.2<Tnglt(0.7)/Tbast(0.7)<2.0 \quad (10\text{-}1b')$$

$$0.1<Tnglt(0.9)/Tbast(0.9)<1.4 \quad (10\text{-}1c')$$

$$0.2<(Tnglt(0.7)/Tbast(0.7))/(Tngl(0)/Tbas(0))<0.85 \quad (10\text{-}2a')$$

$$0.10<(Tnglt(0.9)/Tbast(0.9))/(Tngl(0)/Tbas(0))<0.75 \quad (10\text{-}2b)$$

where,
Tngl(0) denotes the central thickness on the axis of the refractive optical element A,
Tnglt(0.7) denotes a length of a light ray having a height 70% of the maximum light ray height on the image pickup element at the telephoto end, passing through the refractive optical element A,
Tnglt(0.9) denotes a length of a light ray having a height 90% of the maximum light ray height on the image pickup element at the telephoto end, passing through the refractive optical element A,
Tbas(0) denotes the central thickness on the axis of the optical element B,
Tbast(0.7) denotes a length of a light ray having a height 70% of the maximum light ray height on the image pickup element at the telephoto end, passing through the optical element B, and
Tbast(0.9) denotes a length of a light ray having a height 90% of the maximum light ray height on the image pickup element at the telephoto end, passing through the optical element B.

When the electronic image pickup apparatus satisfies one of conditional expression (10-1a'), conditional expression (10-1b'), conditional expression (10-1c'), conditional expression (10-2a'), and conditional expression (10-2b'), it is possible to correct favorably the longitudinal chromatic aberration and the chromatic aberration of magnification at the telephoto end. Furthermore, it is possible to correct the longitudinal chromatic aberration and the chromatic aberration of magnification in a balanced manner.

When an upper limit of one of conditional expression (10-1a'), conditional expression (10-1b'), and conditional expression (10-1c') is surpassed, the longitudinal chromatic aberration is corrected excessively on an axis at the telephoto end, and the chromatic aberration of magnification is corrected excessively off the axis at the telephoto end. As a result, the image forming performance of the overall optical system is degraded, and therefore it is not desirable.

When a lower limit of one of conditional expression (10-1a'), conditional expression (10-1 b'), and conditional expression (10-1c') is surpassed, correction of the longitudinal chromatic aberration is insufficient on the axis at the telephoto end, and correction of the chromatic aberration of magnification is insufficient off the axis at the telephoto end. Furthermore, the edge thickness cannot be achieved at the extreme off-axis, and manufacturing becomes difficult. Therefore it is not desirable.

When an upper limit of each of conditional expression (10-2a') and conditional expression (10-2b') is surpassed, the correction of the chromatic aberration of magnification becomes more than the correction of the longitudinal chromatic aberration. In this case, when the amount of correction of the chromatic aberration of magnification is appropriate, the amount of correction of the longitudinal chromatic aberration is insufficient. As a result, the axial performance is degraded, and therefore it is not desirable.

When a lower limit of each of conditional expression (10-2a') and conditional expression (10-2b') is surpassed, the correction of the chromatic aberration of magnification is smaller than the correction of the longitudinal chromatic aberration. In this case, when the amount of correction of the longitudinal chromatic aberration is appropriate, the amount of correction of the chromatic aberration of magnification is insufficient. As a result, the axial performance is degraded, and therefore, it is not desirable. Both the denominator and the numerator of each of conditional expression (10-2a') and conditional expression (10-2b') being positive, the lower limit of each of conditional expression (10-2a') and conditional expression (10-2b') cannot become a negative value.

Moreover, it is desirable that the electronic image pickup apparatus satisfies one of the following conditional expression (11a) and conditional expression (11b').

$$0.5 < (Tnglw(0.7)/(Tngl(0)) < 0.95 \qquad (11a)$$

$$0.3 < (Tnglw(0.9)/(Tngle(0)) < 0.85 \qquad (11b')$$

where,

Tngl(0) denotes the central thickness on axis of the refractive optical element A, Tnglw(0.7) denotes the length of the light ray having a height 70% of the maximum light ray height on the image pickup element at the wide angle end, passing through the refractive optical element A, and Tnglw(0.9) denotes a length of a light ray having a height 90% of the maximum light ray height on the image pickup element at the wide angle end, passing through the refractive optical element A.

When the electronic image pickup apparatus satisfies one of conditional expression (11a) and conditional expression (11b'), it is possible to correct favorably the longitudinal chromatic aberration and the chromatic aberration of magnification at the wide angle end. Furthermore, it is possible to correct the longitudinal chromatic aberration and the chromatic aberration of magnification in a balanced manner.

When an upper limit of one of conditional expression (11a) and conditional expression (11b') is surpassed, the difference in a central thickness on axis and a central thickness off axis of the refractive optical element A ceases to exist. In this case, the correction of the chromatic aberration of magnification is excessive with respect to the correction of the longitudinal chromatic aberration. As a result, the image forming performance of the overall optical system is degraded, and therefore it is not desirable. On the other hand, when a lower limit of one of conditional expression (11a) and conditional expression (11b') is surpassed, the correction of the chromatic aberration of magnification is insufficient with respect to the correction of the longitudinal chromatic aberration. Even in this case, the image forming performance of the overall optical system is degraded, and therefore it is not desirable.

Moreover, it is desirable that the electronic image pickup apparatus satisfies one of the following conditional expression (12a) and conditional expression (12b).

$$0.5 < (Tnglt(0.7)/(Tngl(0)) < 0.95 \qquad (12a)$$

$$0.3 < (Tnglt(0.9)/(Tngl(0)) < 0.9 \qquad (12b)$$

where,

Tngl(0) denotes the central thickness on the axis of the refractive optical element A, Tnglt(0.7) denotes the length of the light ray having a height 70% of the maximum light ray height on the image pickup element at the telephoto end, passing through the refractive optical element A, and Tnglt(0.9) denotes the length of the light ray having a height 90% of the maximum light ray height on the image pickup element at the telephoto end, passing through the refractive optical element A.

When the electronic image pickup apparatus satisfies one of conditional expression (12a) and conditional expression (12b), it is possible to correct favorably the longitudinal chromatic aberration and the chromatic aberration of magnification at the telephoto end. Furthermore, it is possible to correct the longitudinal chromatic aberration and the chromatic aberration of magnification in a balanced manner.

When an upper limit of one of conditional expression (12a) and conditional expression (12b) is surpassed, the difference in the central thickness on axis and the central thickness off axis of the refractive optical element A ceases to exist. In this case, the correction of the chromatic aberration of magnification is insufficient with respect to the correction of the longitudinal chromatic aberration, and therefore it is not desirable. On the other hand, when a lower limit of one of conditional expression (12a) and conditional expression (12b) is surpassed, the correction of the chromatic aberration of magnification is excessive with respect to the correction of the longitudinal chromatic aberration. As a result, the image forming performance of the overall optical system is degraded, and therefore it is not desirable.

Moreover, it is preferable that the electronic image pickup apparatus satisfies one of the following conditional expression (13-1a'), conditional expression (13-1b'), conditional expression (13-1c'), and conditional expression (13-2).

$$0.3 < Tngl(0)/Tbas(0) < 2.5 \qquad (13\text{-}1a')$$

$$0.215 < Tnglw(0.7)/Tbasw(0.7) < 1.4 \qquad (13\text{-}1b')$$

$$0 < Tnglw(0.9)/Tbasw(0.9) < 0.7 \qquad (13\text{-}1c')$$

$$0 < (Tnglw(0.9)/Tbasw(0.9))/(Tngl(0)/Tbas(0)) < 0.5 \qquad (13\text{-}2)$$

where,

Tngl(0) denotes the central thickness on the axis of the refractive optical element A, Tnglw(0.7) denotes the length of the light ray having a height 70% of the maximum light ray height on the image pickup element at the wide angle end, passing through the refractive optical element A, Tnglw (0.9) denotes the length of the light ray having a height 90% of the maximum light ray height on the image pickup element at the wide angle end, passing through the refractive optical element A, Tbas(0) denotes the central thickness on the axis of the optical element B, Tbasw(0.7) denotes the length of the light ray having a height 70% of the maximum light ray height on the image pickup element at the wide angle end, passing through the optical element B, and Tbasw(0.9) denotes a length of a light ray having a height 90% of the maximum light ray height on the image pickup element at the telephoto end, passing through the optical element B.

When the electronic image pickup apparatus satisfies one of conditional expression (13-1a'), conditional expression (13-1b'), conditional expression (13-1c'), and conditional expression (13-2), it is possible to correct favorably the longitudinal chromatic aberration and the chromatic aberration of magnification at the wide angle end. Furthermore, it is possible to correct the longitudinal chromatic aberration and the chromatic aberration of magnification in a balanced manner.

When an upper limit of one of conditional expression (13-1a'), conditional expression (13-1b'), and conditional expression (13-1c') is surpassed, the correction of the longitudinal chromatic aberration becomes excessive on axis at the wide angle end, and the correction of the chromatic aberration of magnification becomes excessive off axis at the wide angle end. As a result, the image forming performance of the overall optical system is degraded, and therefore it is not desirable.

On the other hand, when a lower limit of one of conditional expression (13-1a'), conditional expression (13-1b'), and conditional expression (13-1c') is surpassed, the correction of the longitudinal chromatic aberration is insufficient on axis at the wide angle end, and the correction of the chromatic aberration of magnification is insufficient off axis at the wide angle end. Furthermore, the edge thickness cannot be achieved at the extreme off-axis. Therefore, as manufacturing becomes difficult, it is not desirable.

When an upper limit of conditional expression (13-2) is surpassed, the correction of the chromatic aberration of magnification is more than they correction of the longitudinal chromatic aberration. Therefore, when the amount of correction of the chromatic aberration of magnification is appropriate, the amount of correction of the longitudinal chromatic aberration is insufficient, and performance on axis is degraded. Therefore it is not desirable.

Both the denominator and the numerator of conditional expression (13-2) being positive values, the lower limit of conditional expression (13-2) cannot be surpassed.

[Embodiments]

Exemplary embodiments of the image forming optical system and the electronic image pickup apparatus according to the present invention will be described below in detail by referring to the accompanying diagrams. However, the present invention is not restricted to the embodiments described below. In the following description, the optical element B is called appropriately as an object-side substrate optical element B, and the optical element is called appropriately as an image-side substrate optical element C.

The embodiments of the zoom lens (image forming optical system) according to the present invention, and the electronic image pickup apparatus equipped with the same will be described below.

A zoom lens according to each embodiment is a taking lens system which is to be used in an electronic image pickup apparatus such as a video camera, a digital camera, and a silver-salt film camera.

In the following embodiments, a wide angle end and a telephoto end are zoom positions when a lens group for zooming is positioned at two ends of a movable range on an optical axis of a mechanism.

Each embodiment is a zoom lens which includes in order from an object side to an image side, a first lens group having a positive refractive power, a second lens group having a negative refractive power, and an image-side lens group.

In the present invention, the number of lens groups in the image-side lens group is arbitrary, and it is preferable that the image-side lens group has at least one lens group. In other words, it is preferable that the zoom lens according to the present invention has three or more lens groups.

The embodiments of the zoom lens and the electronic image pickup apparatus according to the present invention will be described below in detail by referring to the accompanying diagrams.

In embodiments from a first embodiment to a fourteenth embodiment, the following arrangement and action are same. Firstly, a first lens group G1 has a negative lens (an object-side substrate optical element B), the abovementioned refractive optical element A having a positive refractive power, and two positive lenses. Correction of chromatic aberration at the telephoto end is carried out effectively by an arrangement of the refractive optical element A and the first lens group G1.

A second lens group G2 includes a negative lens, a negative lens, a positive lens, and a negative lens. A high zoom ratio is achieved by an arrangement of the second lens group G2.

Moreover, in the zoom lens, zooming is carried out by changing distances between the adjacent lens groups such that, at the telephoto end, a distance between the first lens group G1 and the second lens group G2 becomes longer, a distance between the second lens group G2 and a third lens group G3 becomes shorter, and a distance between the third lens group G3 and a fourth lens group G4 becomes longer, as compared to the distances at the wide angle end.

Moreover, the fourth lens group G4 corrects an image-plane fluctuation due to zooming, and at this time, a distance between the fourth lens group G4 and a fifth lens group G5 satisfies conditional expression (20).

Figure 1B:
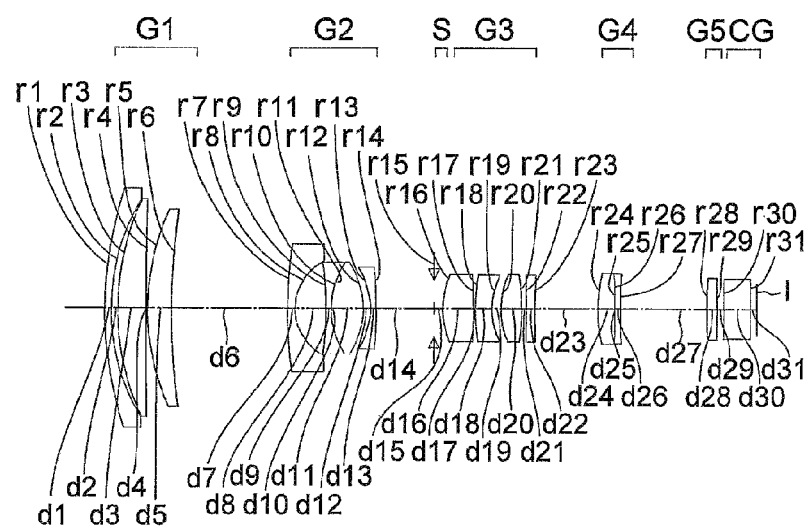
Figure 1C:
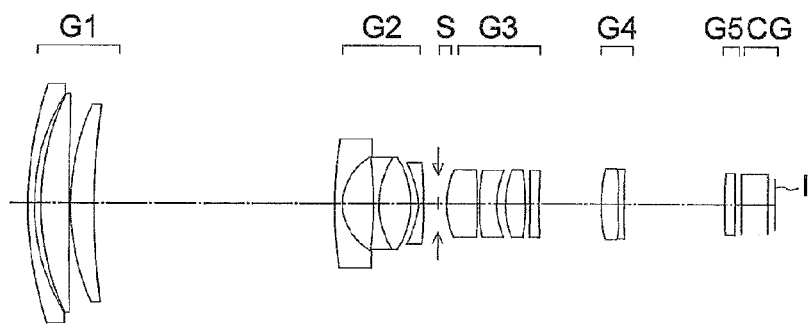

To start with, a zoom lens according to the first embodiment of the present invention will be described below. FIG. 1A, FIG. 1B, and FIG. 1C are cross-sectional views along an optical axis showing an optical arrangement at the time of infinite object point focusing of the zoom lens according to the first embodiment of the present invention, where, FIG. 1A shows a state at a wide angle end, FIG. 1B shows an intermediate focal length state, and FIG. 1C shows a state at a telephoto end.

FIG. 2A, FIG. 2B, and FIG. 2C are diagrams showing a spherical aberration (SA), an astigmatism (AS), a distortion (DT), and a chromatic aberration of magnification (CC) at the time of infinite object point focusing of the zoom lens according to the first embodiment, where, FIG. 2A shows a state at the wide angle end, FIG. 2B shows an intermediate focal length state, and FIG. 2C shows a state at the telephoto end. Moreover, FIY denotes an image height. Reference numerals in aberration diagrams are same in the embodiments which will be described later.

The zoom lens according to the first embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power. In all the following embodiments, in lens cross-sectional views, CG denotes a cover glass and I denotes an image pickup surface of an electronic image pickup element.

The first lens group G1 includes in order from the object side, a cemented lens of a negative meniscus lens L1 (optical element B) having a convex surface directed toward the object side, a positive meniscus lens L2 (refractive optical element A) having a convex surface directed toward the object side, and a positive meniscus lens L3 having a convex surface directed toward the object side, and a positive meniscus lens L4 having a convex surface directed toward the object side, and has a positive refractive power as a whole. Here, a partial dispersion ratio θgF (θgF$_A$) of the refractive optical element A of the cemented lens in the first lens group G1 is 0.668. Moreover, Abbe's number (vd$_A$) for the refractive optical element A is 23.38.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

In all the following embodiments, L7 is a cemented layer. The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

In all the following embodiments, L15 is a cemented layer.

The fifth lens group G5 includes a biconvex positive lens L17, and has a positive refractive power as a whole.

At the time of zooming from the wide angle end to the telephoto end, the first lens group G1 moves toward the object side. The second lens group G2 moves toward the image side. The third lens group G3 moves toward the object side. The fourth lens group G4 moves toward the object side. The fifth lens group G5 is fixed.

Figure 3A:
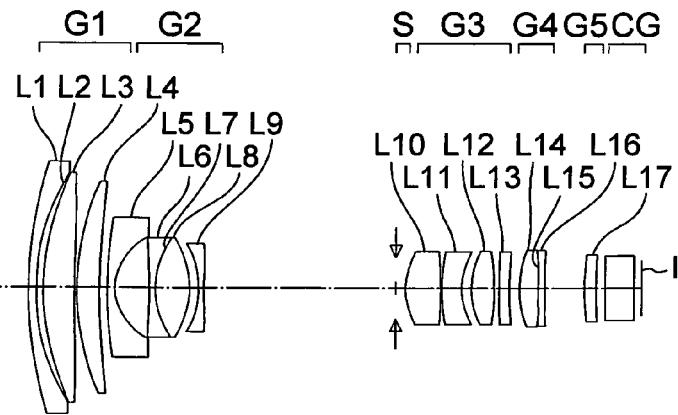
FIG. 3A, FIG. 3B, and FIG. 3C are cross-sectional views along an optical axis showing an optical arrangement at the time of infinite object point focusing of a zoom lens according to a second embodiment of the present invention, where.
Figure 3B:
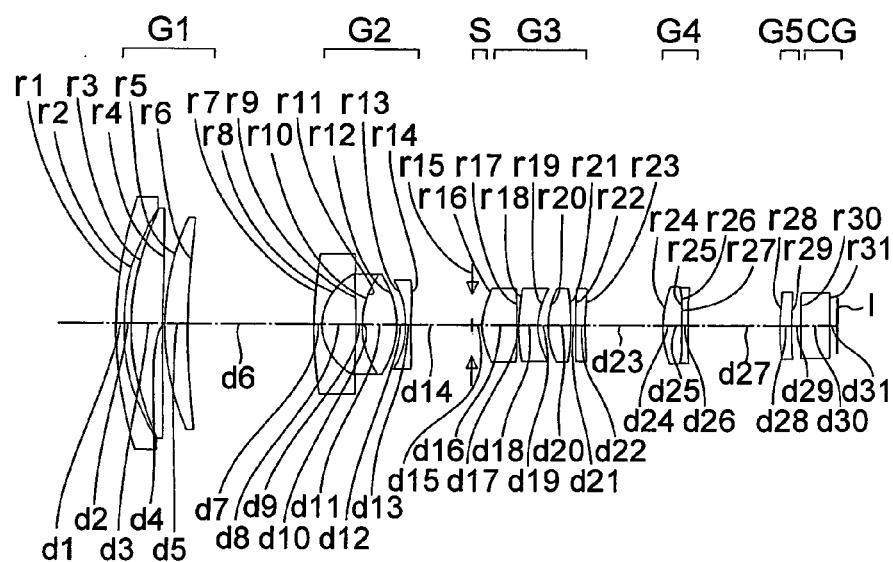
Figure 3C:
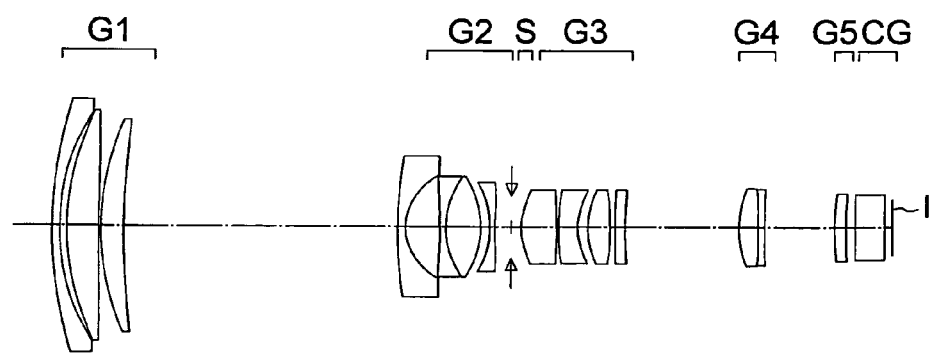

Next, a zoom lens according to a second embodiment of the present invention will be described below. FIG. 3A, FIG. 3B, and FIG. 3C are cross-sectional views along an optical axis showing an optical arrangement at the time of infinite object point focusing of the zoom lens according to the second embodiment of the present invention, where, FIG. 3A shows a state at a wide angle end, FIG. 3B shows an intermediate focal length state, and FIG. 3C shows a state at a telephoto end.

Figure 4A:
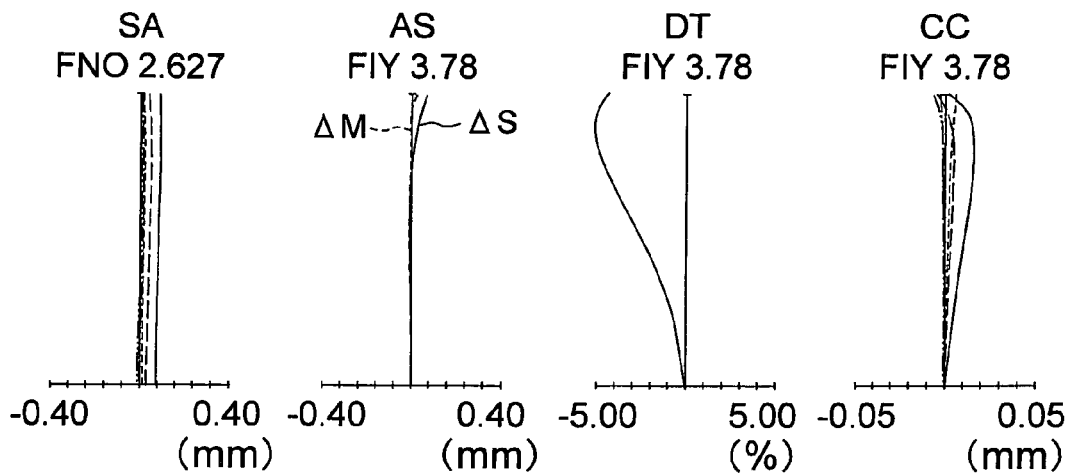
FIG. 4A, FIG. 4B, and FIG. 4C are diagrams showing a spherical aberration, an astigmatism, a distortion, and a chromatic aberration of magnification at the time of infinite object point focusing of the zoom lens according to the second embodiment, where.
Figure 4B:
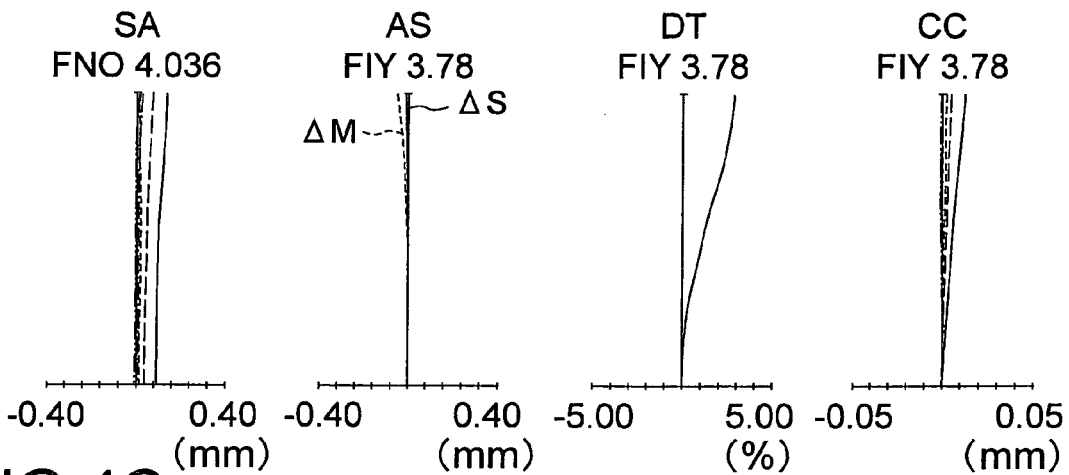
Figure 4C:
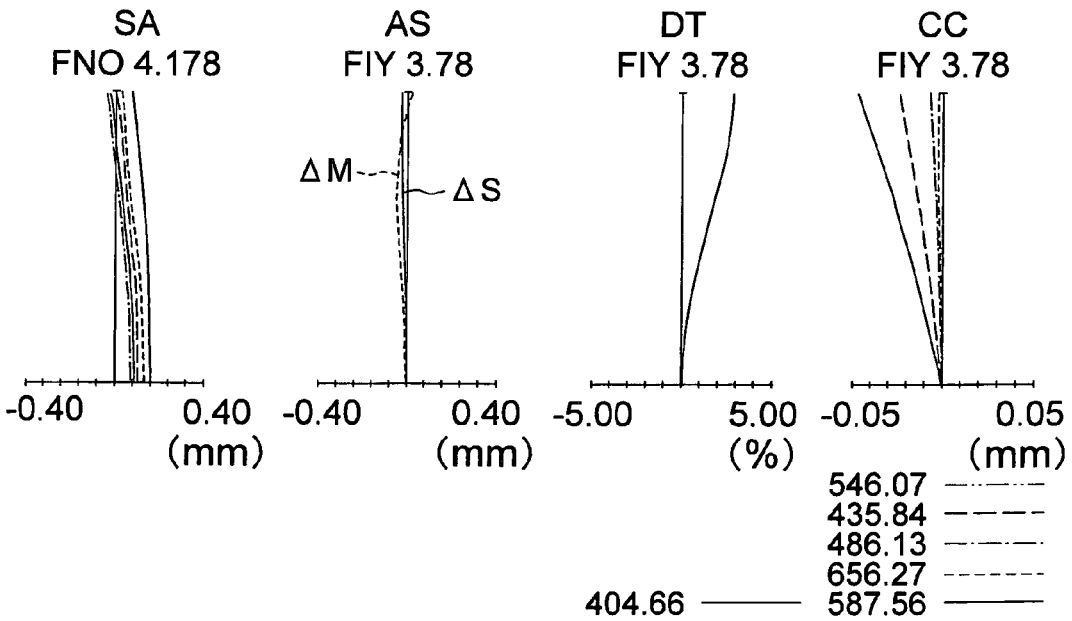

FIG. 4A, FIG. 4B, and FIG. 4C are diagrams showing a spherical aberration (SA), an astigmatism (AS), a distortion (DT), and a chromatic aberration of magnification (CC) at the time of infinite object point focusing of the zoom lens according to the second embodiment, where, FIG. 4A shows a state at the wide angle end, FIG. 4B shows an intermediate focal length state, and FIG. 4C shows a state at the telephoto end.

The zoom lens according to the second embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a cemented lens of a negative meniscus lens L1 (optical element B) having a convex surface directed toward the object side, a positive meniscus lens L2 (refractive optical element A) having a convex surface directed toward the object side, and a positive meniscus lens L3 having a convex surface directed toward the object side, and a positive meniscus lens L4 having a convex surface directed toward the object side, and has a positive refractive power as a whole. Here, a partial dispersion ratio θgF of the refractive optical element A of the cemented lens in the first lens group G1 is 0.668. Moreover, Abbe's number (vd$_A$) for the refractive optical element A is 23.38.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2 moves toward the image side. The third lens group G3 moves toward the object side. The fourth lens group G4, after moving toward the object side, moves toward the image side. The fifth lens group G5 is fixed.

Figure 5A:
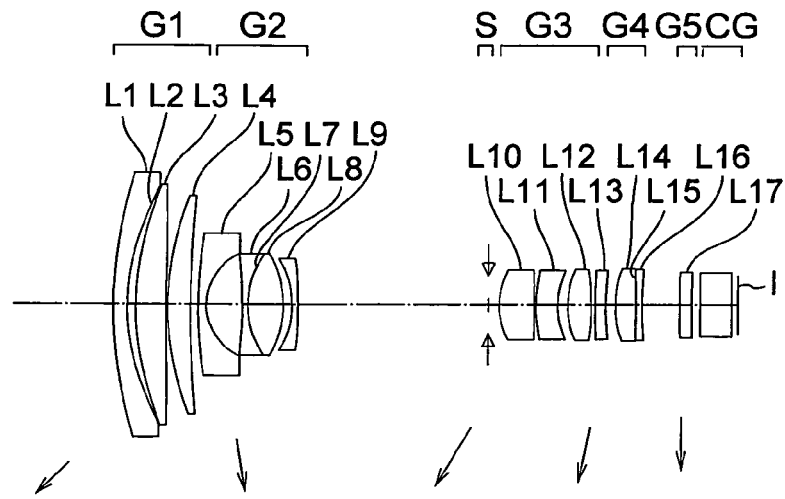
FIG. 5A, FIG. 5B, and FIG. 5C are cross-sectional views along an optical axis showing an optical arrangement at the time of infinite object point focusing of a zoom lens according to a third embodiment of the present invention, where.
Figure 5B:
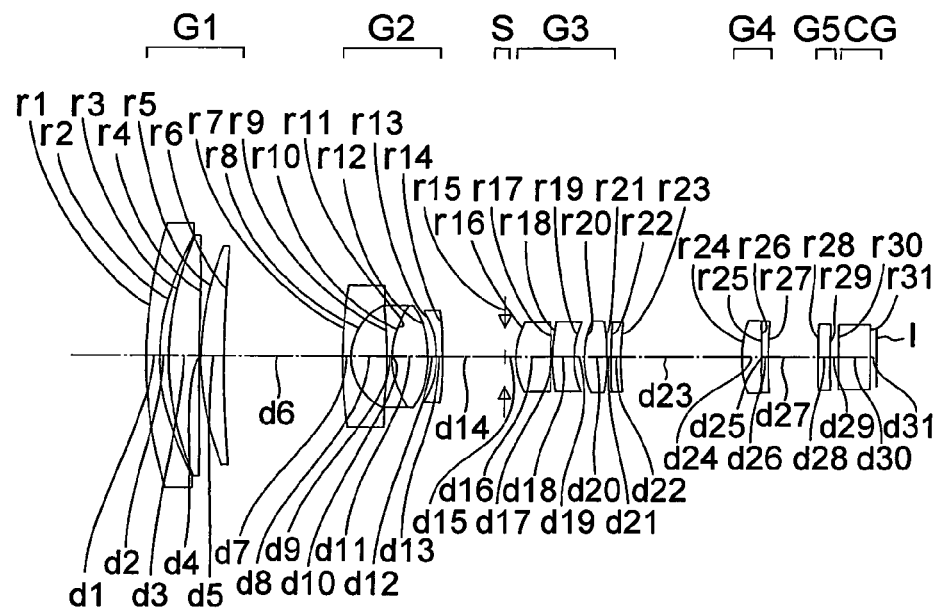
Figure 5C:
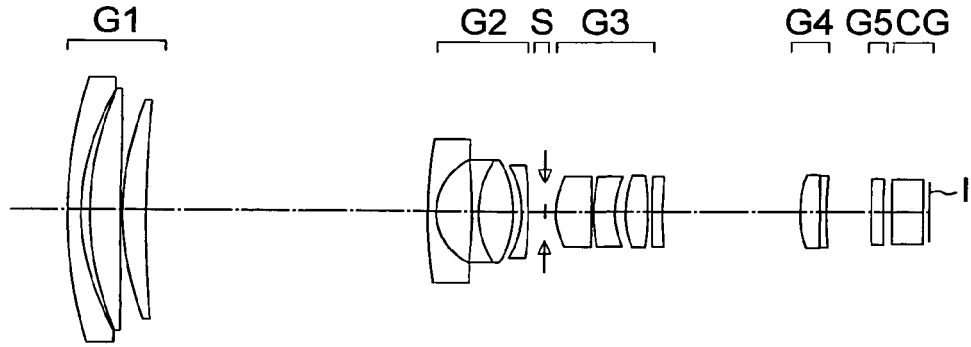

Next, a zoom lens according to a third embodiment of the present invention will be described below. FIG. 5A, FIG. 5B, and FIG. 5C are cross-sectional views along an optical axis showing an optical arrangement at the time of infinite object point focusing of the zoom lens according to the third embodiment of the present invention, where, FIG. 5A shows a state at a wide angle end, FIG. 5B shows an intermediate focal length state, and FIG. 5C shows a state at a telephoto end.

FIG. 6A, FIG. 6B, and FIG. 6C are diagrams showing a spherical aberration (SA), an astigmatism (AS), a distortion (DT), and a chromatic aberration of magnification (CC) at the time of infinite object point focusing of the zoom lens according to the third embodiment, where, FIG. 6A shows a state at the wide angle end, FIG. 6B shows an intermediate focal length state, and FIG. 6C shows a state at the telephoto end.

The zoom lens according to the third embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a cemented lens of a negative meniscus lens L1 (optical element B) having a convex surface directed toward the object side, a positive meniscus lens L2 (refractive optical element A) having a convex surface directed toward the object side, and a positive meniscus lens L3 having a convex surface directed toward the object side, and a positive meniscus lens L4 having a convex surface directed toward the object side, and has a positive refractive power as a whole. Here, a partial dispersion ratio θgF of the refractive optical element A of the cemented lens in the first lens group G1 is 0.668. Moreover, Abbe's number (vd$_A$) for the refractive optical element A is 23.38.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L7, and has a positive refractive power as a whole.

At the time of zooming from the wide angle end to the telephoto end, the first lens group G1 moves toward the object side. The second lens group G2 moves toward the image side. The third lens group G3 moves toward the object side. The fourth lens group G4, after moving toward the object side, moves toward the image side. The fifth lens group G5 is fixed.

Figure 7A:
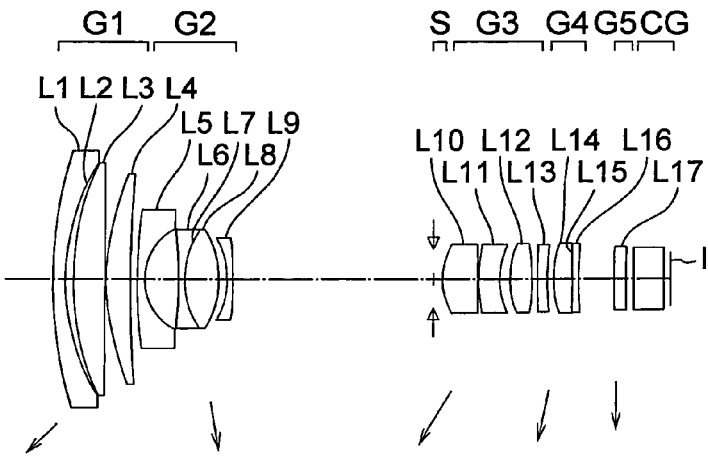
FIG. 7A, FIG. 7B, and FIG. 7C are cross-sectional views along an optical axis showing an optical arrangement at the time of infinite object point focusing of a zoom lens according to a fourth embodiment of the present invention, where.
Figure 7B:
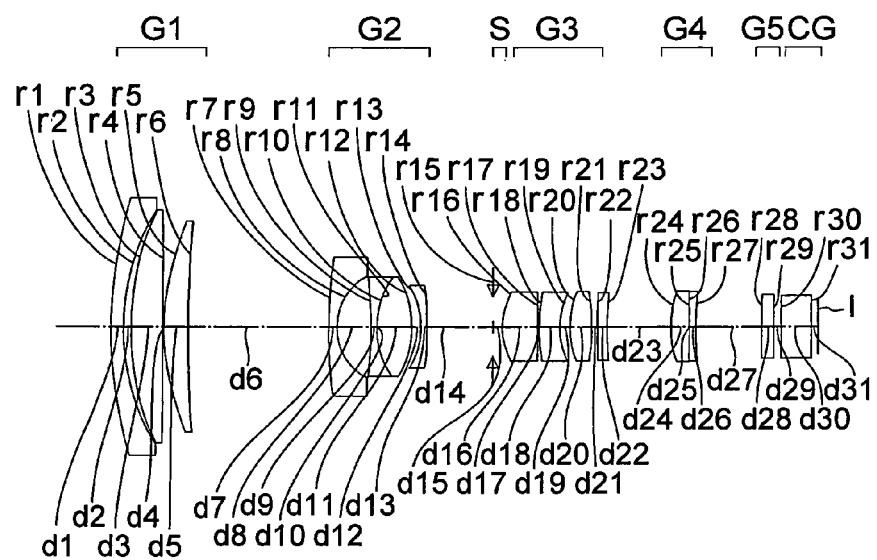
Figure 7C:
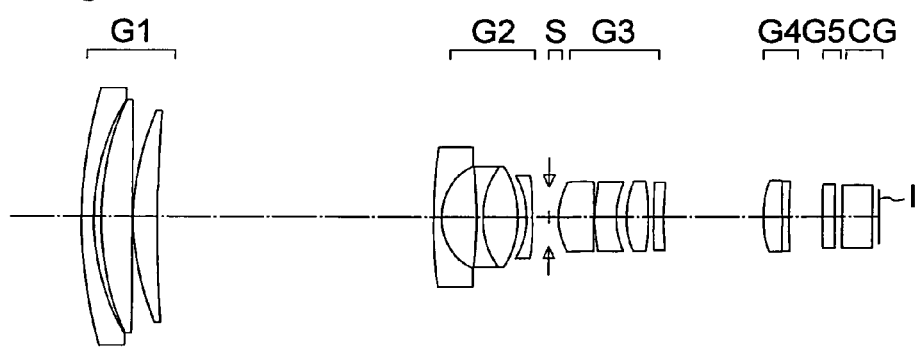

Next, a zoom lens according to a fourth embodiment of the present invention will be described below. FIG. 7A, FIG. 7B, and FIG. 7C are cross-sectional views along an optical axis showing an optical arrangement at the time of infinite object point focusing of the zoom lens according to the fourth embodiment of the present invention, where, FIG. 7A shows a state at a wide angle end, FIG. 7B shows an intermediate focal length state, and FIG. 7C shows a state at a telephoto end.

Figure 8A:
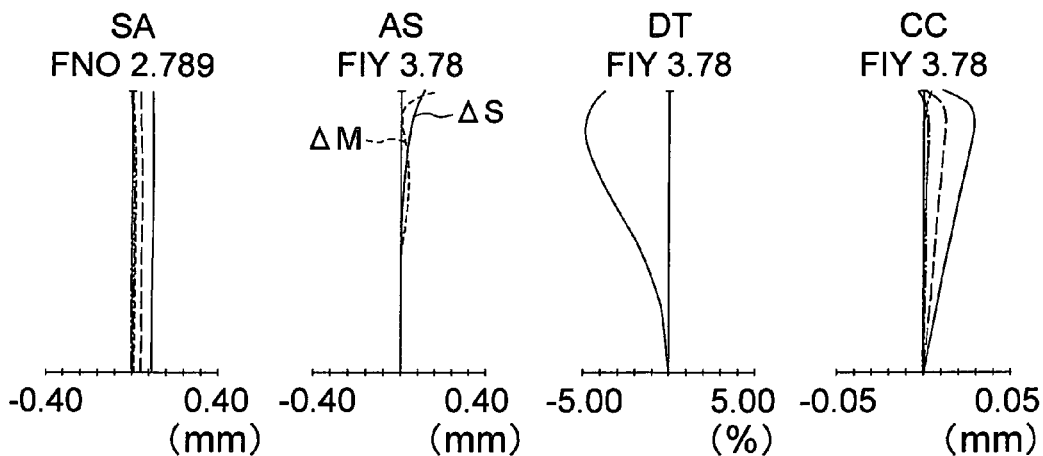
FIG. 8A, FIG. 8B, and FIG. 8C are diagrams showing a spherical aberration, an astigmatism, a distortion, and a chromatic aberration of magnification at the time of infinite object point focusing of the zoom lens according to the fourth embodiment, where.
Figure 8B:
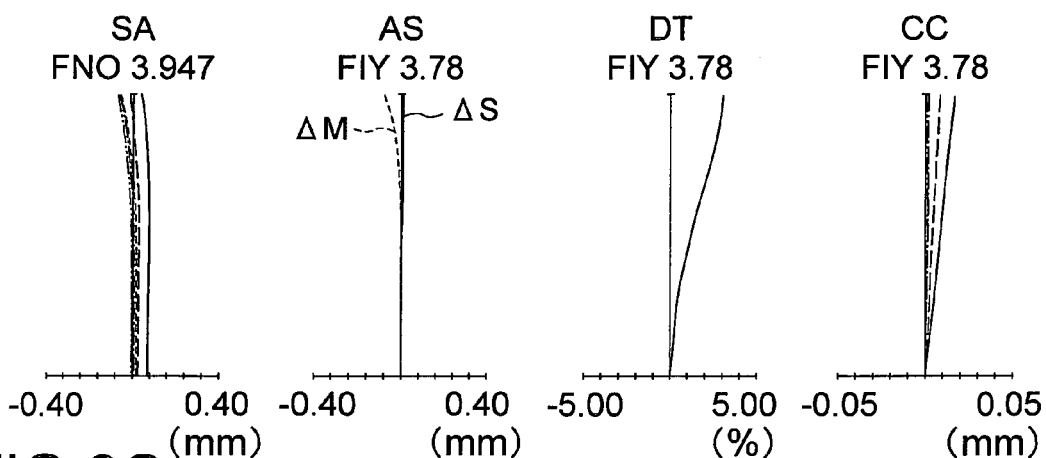
Figure 8C:
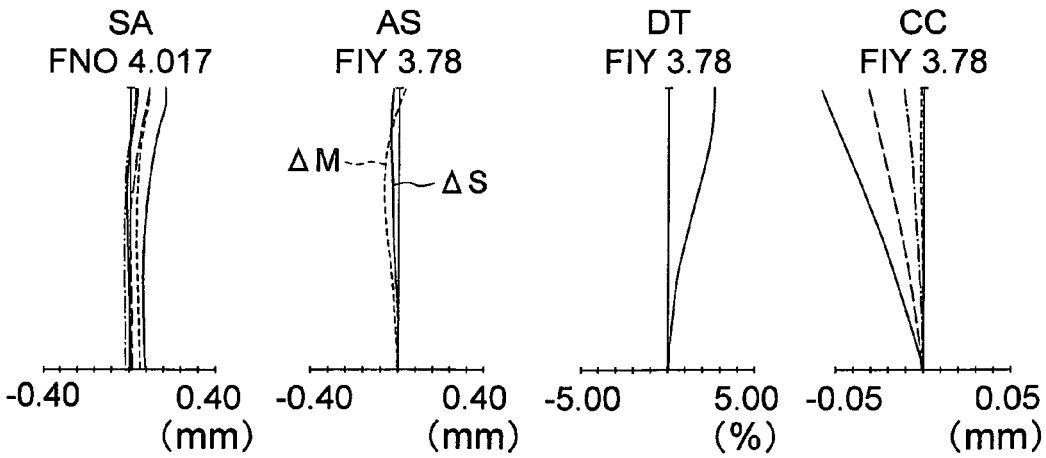

FIG. 8A, FIG. 8B, and FIG. 8C are diagrams showing a spherical aberration (SA), an astigmatism (AS), a distortion (DT), and a chromatic aberration of magnification (CC) at the time of infinite object point focusing of the zoom lens according to the fourth embodiment, where, FIG. 8A shows a state at the wide angle end, FIG. 8B shows an intermediate focal length state, and FIG. 8C shows a state at the telephoto end.

The zoom lens according to the fourth embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a cemented lens of a negative meniscus lens L1 (optical element B) having a convex surface directed toward the object side, a positive meniscus lens L2 (refractive optical element A) having a convex surface directed toward the object side, and a positive meniscus lens L3 having a convex surface directed toward the object side, and a positive meniscus lens L4 having a convex surface directed toward the object side, and has a positive refractive power as a whole. Here, a partial dispersion ratio θgF of the refractive optical element A of the cemented lens in the first lens group G1 is 0.668. Moreover, Abbe's number ($vd_A$) for the refractive optical element A is 23.38.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2 moves toward the image side. The third lens group G3 moves toward the object side. The fourth lens group G4, after moving toward the object side, moves toward the image side. The fifth lens group G5 is fixed.

Figure 9A:
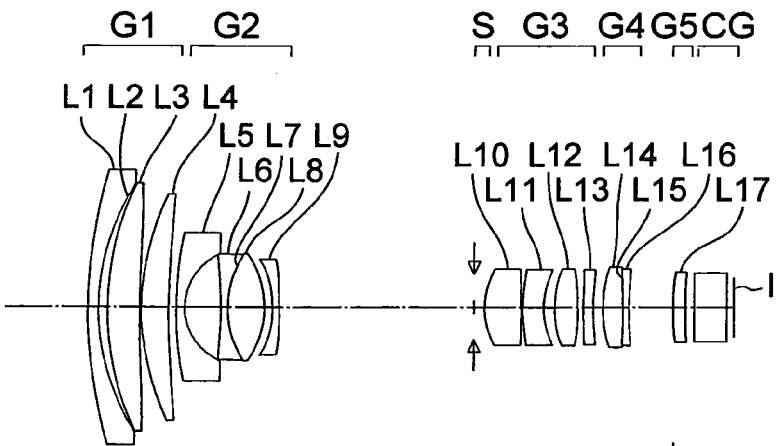
FIG. 9A, FIG. 9B, and FIG. 9C are cross-sectional views along an optical axis showing an optical arrangement at the time of infinite object point focusing of a zoom lens according to a fifth embodiment of the present invention, where.
Figure 9B:
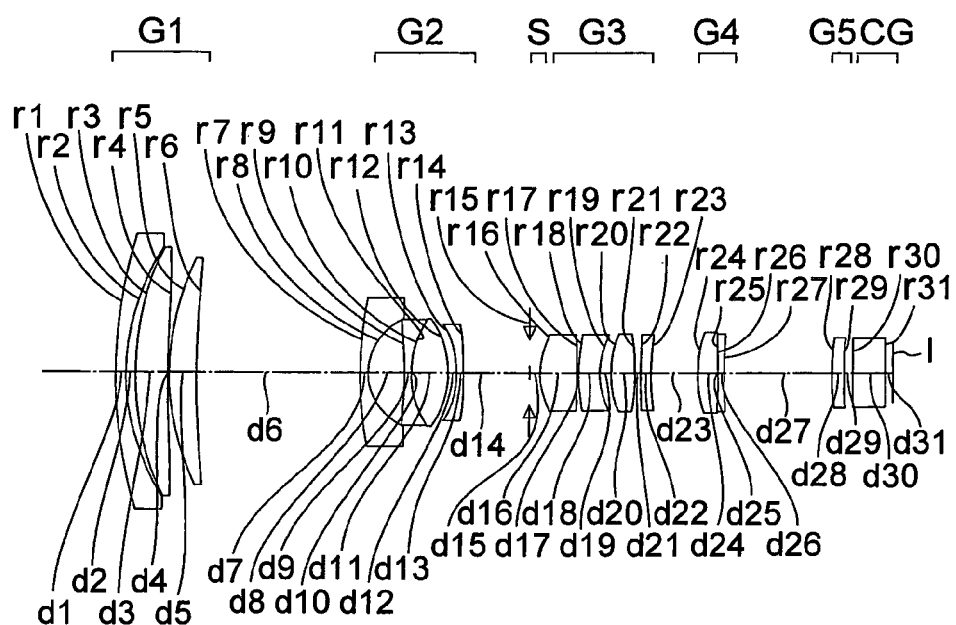
Figure 9C:
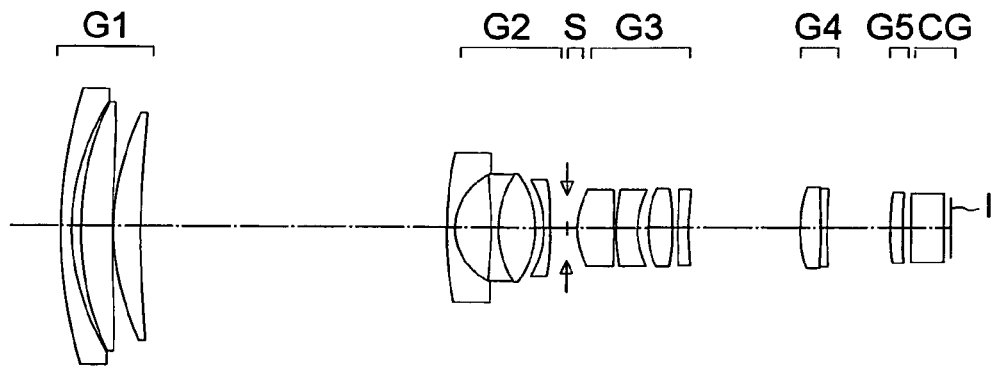

Next, a zoom lens according to a fifth embodiment of the present invention will be described below. FIG. 9A, FIG. 9B, and FIG. 9C are cross-sectional views along an optical axis showing an optical arrangement at the time of infinite object point focusing of the zoom lens according to the fifth embodiment of the present invention, where, FIG. 9A shows a state at a wide angle end, FIG. 9B shows an intermediate focal length state, and FIG. 9C shows a state at a telephoto end.

FIG. 10A, FIG. 10B, and FIG. 10C are diagrams showing a spherical aberration (SA), an astigmatism (AS), a distortion (DT), and a chromatic aberration of magnification (CC) at the time of infinite object point focusing of the zoom lens according to the fifth embodiment, where, FIG. 10A shows a state at the wide angle end, FIG. 10B shows an intermediate focal length state, and FIG. 100 shows a state at the telephoto end.

The zoom lens according to the fifth embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a cemented lens of a negative meniscus lens L1 (optical element B) having a convex surface directed toward the object side, a positive meniscus lens L2 (refractive optical element A) having a convex surface directed toward the object side, and a positive meniscus lens L3 having a convex surface directed toward the object side, and a positive meniscus lens L4 having a convex surface directed toward the object side, and has a positive refractive power as a whole. Here, a partial dispersion ratio θgF of the refractive optical element A of the cemented lens in the first lens group G1 is 0.690. Moreover, Abbe's number ($vd_A$) for the refractive optical element A is 20.00.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2 moves toward the image side. The third lens group G3 moves toward the object side. The fourth lens group G4, after moving toward the object side, moves toward the image side. The fifth lens group G5 is fixed.

Figure 11A:
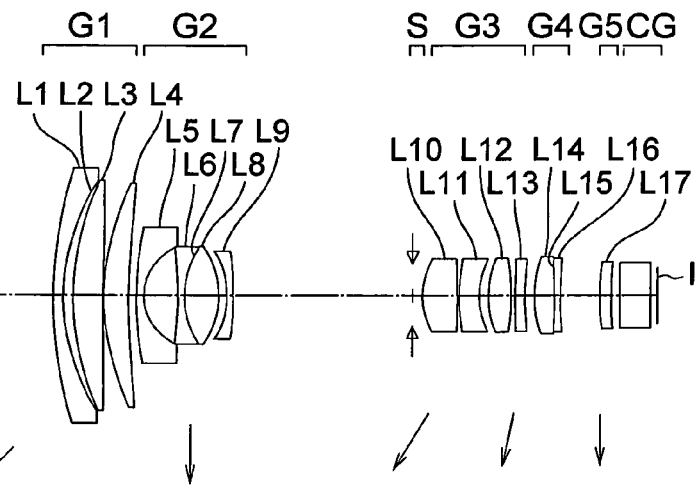
FIG. 11A, FIG. 11B, and FIG. 11C are cross-sectional views along an optical axis showing an optical arrangement at the time of infinite object point focusing of a zoom lens according to a sixth embodiment of the present invention, where.
Figure 11B:
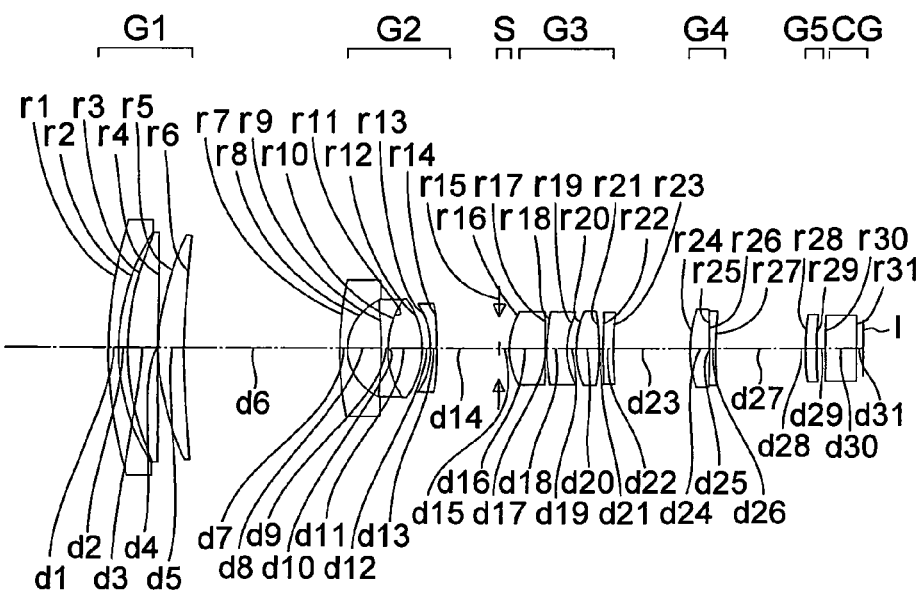
Figure 11C:
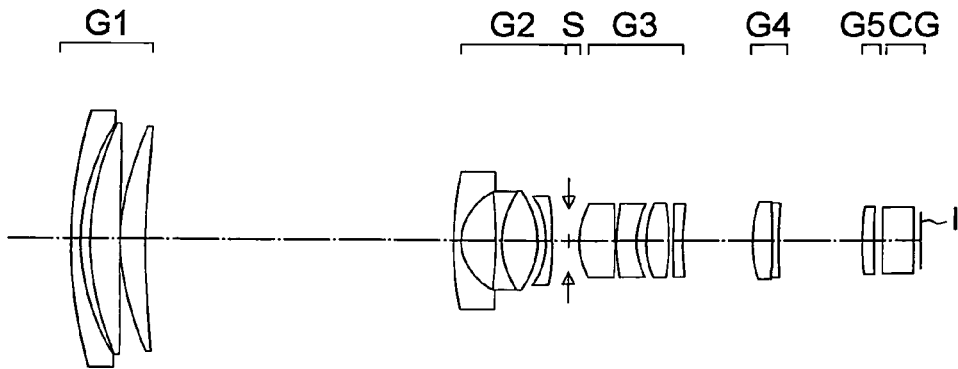

Next, a zoom lens according to a sixth embodiment of the present invention will be described below. FIG. 11A, FIG. 11B, and FIG. 11C are cross-sectional views along an optical axis showing an optical arrangement at the time of infinite object point focusing of the zoom lens according to the sixth embodiment of the present invention, where, FIG. 11A shows a state at a wide angle end, FIG. 11B shows an intermediate focal length state, and FIG. 11C shows a state at a telephoto end.

Figure 12A:
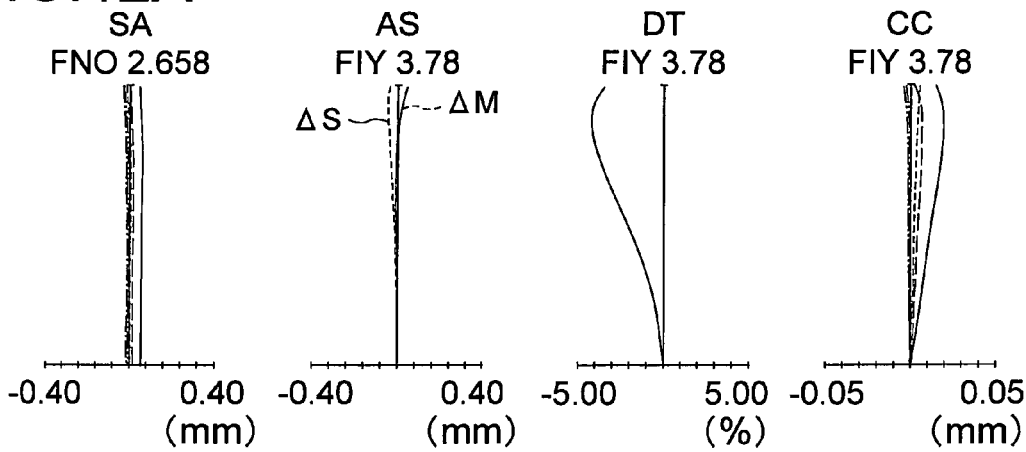
FIG. 12A, FIG. 12B, and FIG. 12C are diagrams showing a spherical aberration, an astigmatism, a distortion, and a chromatic aberration of magnification at the time of infinite object point focusing of the zoom lens according to the sixth embodiment, where.
Figure 12B:
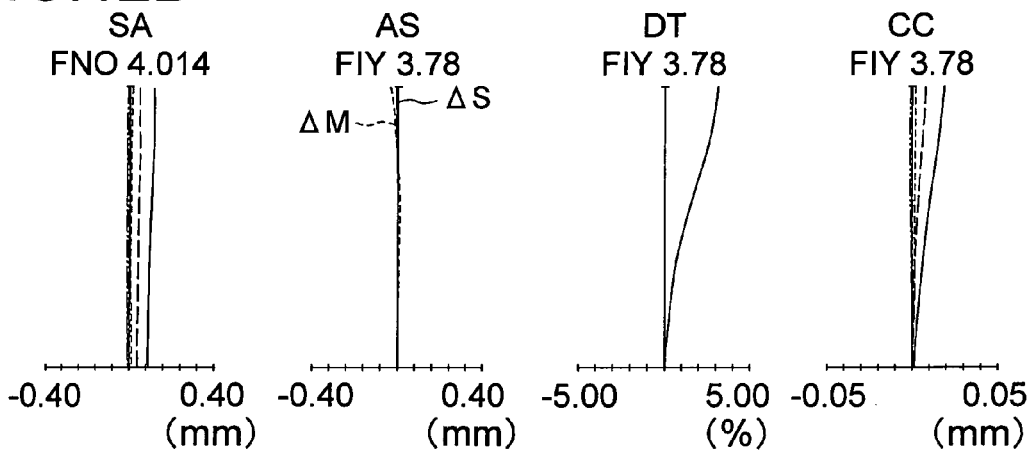
Figure 12C:
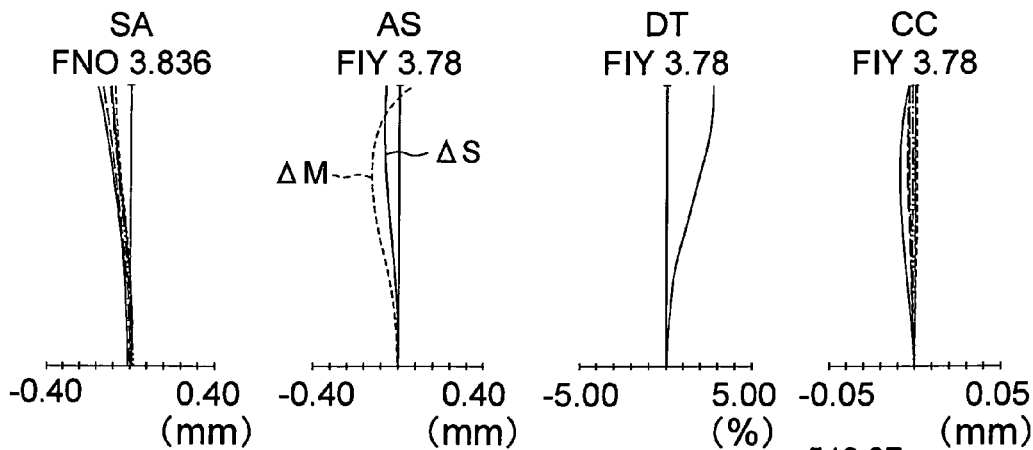

FIG. 12A, FIG. 12B, and FIG. 12C are diagrams showing a spherical aberration (SA), an astigmatism (AS), a distortion (DT), and a chromatic aberration of magnification (CC) at the time of infinite object point focusing of the zoom lens according to the sixth embodiment, where, FIG. 12A shows a state at the wide angle end, FIG. 12B shows an intermediate focal length state, and FIG. 12C shows a state at the telephoto end.

The zoom lens according to the sixth embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a cemented lens of a negative meniscus lens L1 (optical element B) having a convex surface directed toward the object side, a positive meniscus lens L2 (refractive optical element A) having a convex surface directed toward the object side, and a positive meniscus lens L3 having a convex surface directed toward the object side, and a positive meniscus lens L4 having a convex surface directed toward the object side, and has a positive refractive power as a whole. Here, a partial dispersion ratio θgF of the refractive optical element A of the cemented lens in the first lens group G1 is 0.718. Moreover, Abbe's number ($vd_A$) for the refractive optical element A is 17.00.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2 moves toward the image side. The third lens group G3, after moving toward the object side, moves toward the image side. The fourth lens group G4, after moving toward the object side, moves toward the image side. The fifth lens group G5 is fixed.

Figure 13A:
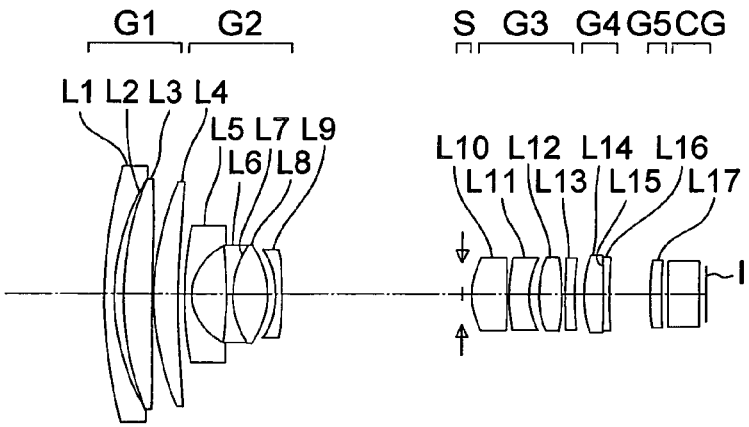
FIG. 13A, FIG. 13B, and FIG. 13C are cross-sectional views along an optical axis showing an optical arrangement at the time of infinite object point focusing of a zoom lens according to a seventh embodiment of the present invention, where.
Figure 13B:
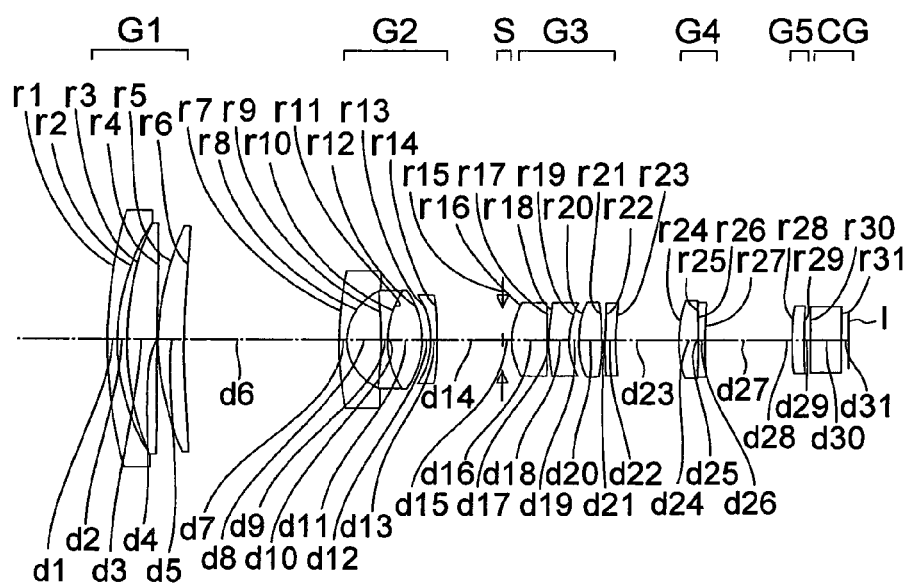
Figure 13C:
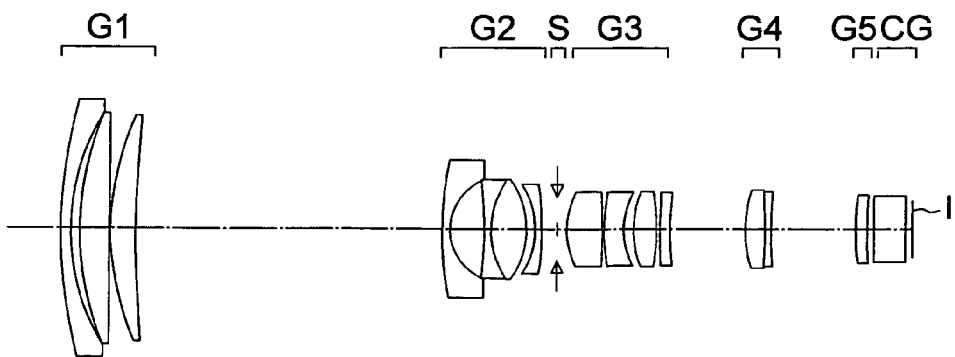

Next, a zoom lens according to a seventh embodiment of the present invention will be described below. FIG. 13A, FIG. 13B, and FIG. 13C are cross-sectional views along an optical axis showing an optical arrangement at the time of infinite object point focusing of the zoom lens according to the seventh embodiment of the present invention, where, FIG. 13A shows a state at a wide angle end, FIG. 13B shows an intermediate focal length state, and FIG. 13C shows a state at a telephoto end.

FIG. 14A, FIG. 14B, and FIG. 14C are diagrams showing a spherical aberration (SA), an astigmatism (AS), a distortion (DT), and a chromatic aberration of magnification (CC) at the time of infinite object point focusing of the zoom lens according to the seventh embodiment, where, FIG. 14A shows a state at the wide angle end, FIG. 14B shows an intermediate focal length state, and FIG. 14C shows a state at the telephoto end.

The zoom lens according to the seventh embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a cemented lens of a negative meniscus lens L1 (optical element B) having a convex surface directed toward the object side, a positive meniscus lens L2 (refractive optical element A) having a convex surface directed toward the object side, and a positive meniscus lens L3 having a convex surface directed toward the object side, and a positive meniscus lens L4 having a convex surface directed toward the object side, and has a positive refractive power as a whole. Here, a partial dispersion ratio θgF of the refractive optical element A of the cemented lens in the first lens group G1 is 0.718. Moreover, Abbe's number ($vd_A$) for the refractive optical element A is 17.00.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2 moves toward the image side. The third lens group G3 moves toward the object side. The fourth lens group G4, after moving toward the object side, moves toward the image side. The fifth lens group G5 is fixed.

Figure 15A:
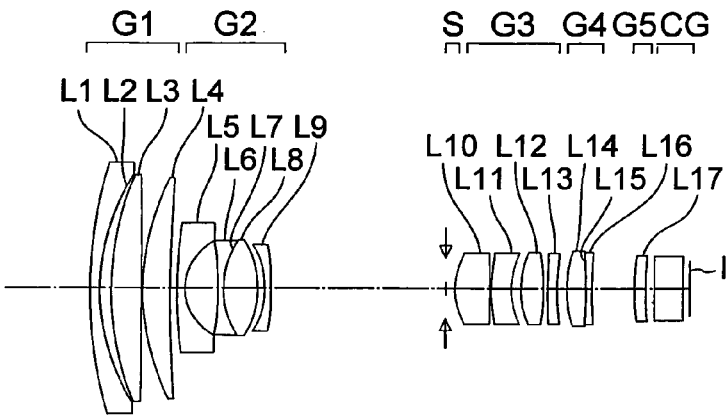
FIG. 15A, FIG. 15B, and FIG. 15C are cross-sectional views along an optical axis showing an optical arrangement at the time of infinite object point focusing of a zoom lens according to an eighth embodiment of the present invention, where.
Figure 15B:
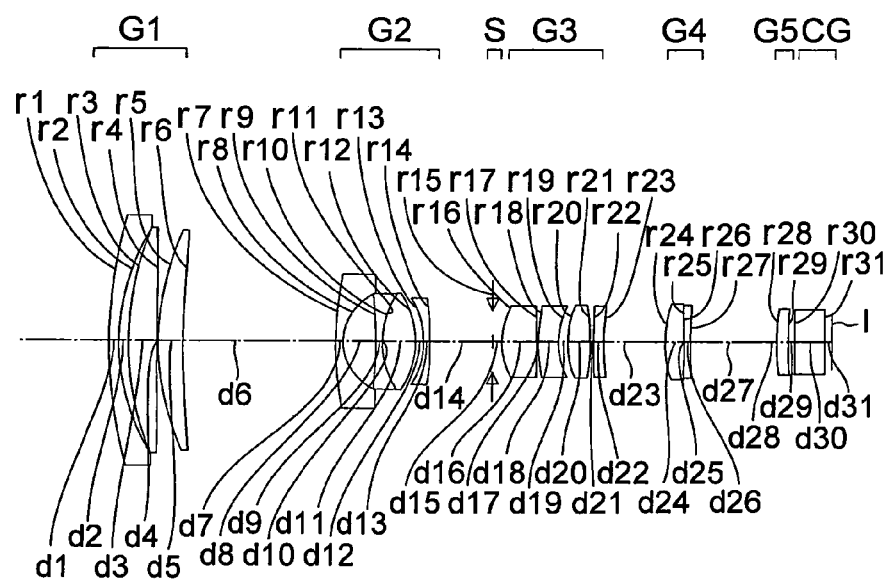
Figure 15C:
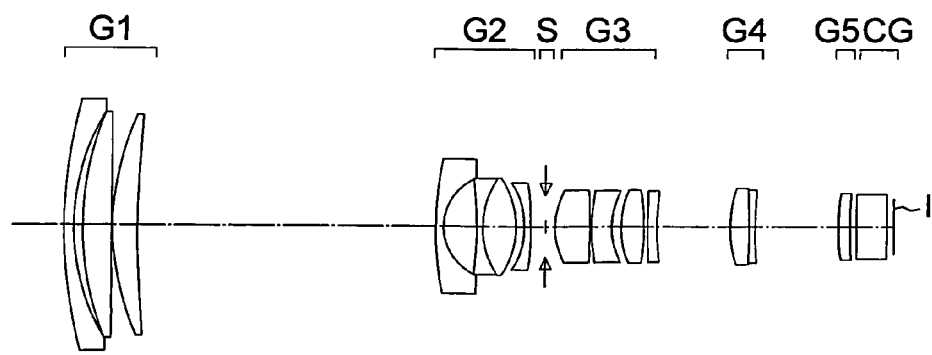

Next, a zoom lens according to an eighth embodiment of the present invention will be described below. FIG. 15A, FIG. 15B, and FIG. 15C are cross-sectional views along an optical axis showing an optical arrangement at the time of infinite object point focusing of the zoom lens according to the eighth embodiment of the present invention, where, FIG. 15A shows a state at a wide angle end, FIG. 15B shows an intermediate focal length state, and FIG. 15C shows a state at a telephoto end.

Figure 16A:
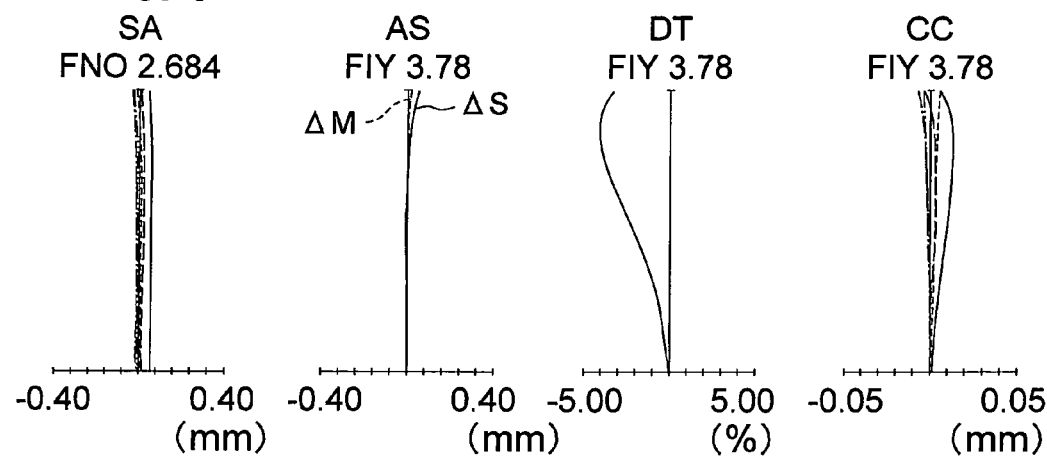
FIG. 16A, FIG. 16B, and FIG. 16C are diagrams showing a spherical aberration, an astigmatism, a distortion, and a chromatic aberration of magnification at the time of infinite object point focusing of the zoom lens according to the eighth embodiment, where.
Figure 16B:
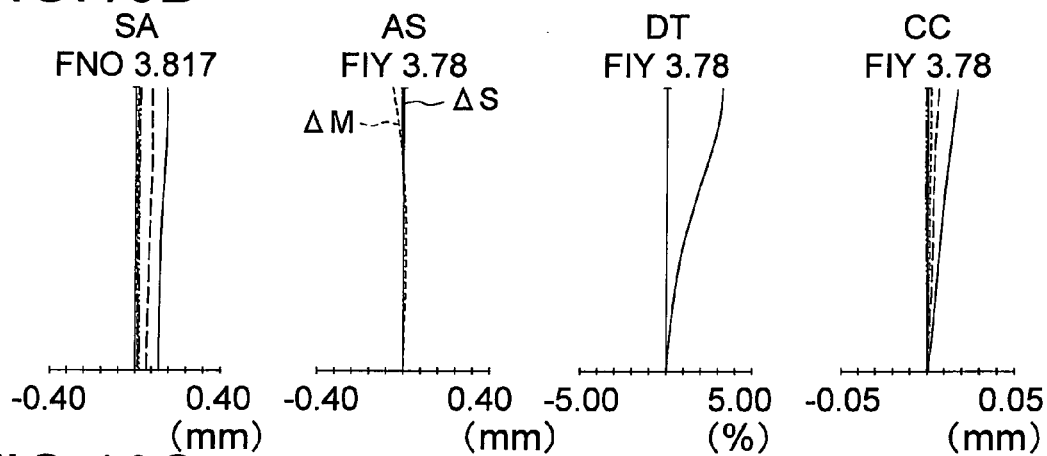
Figure 16C:
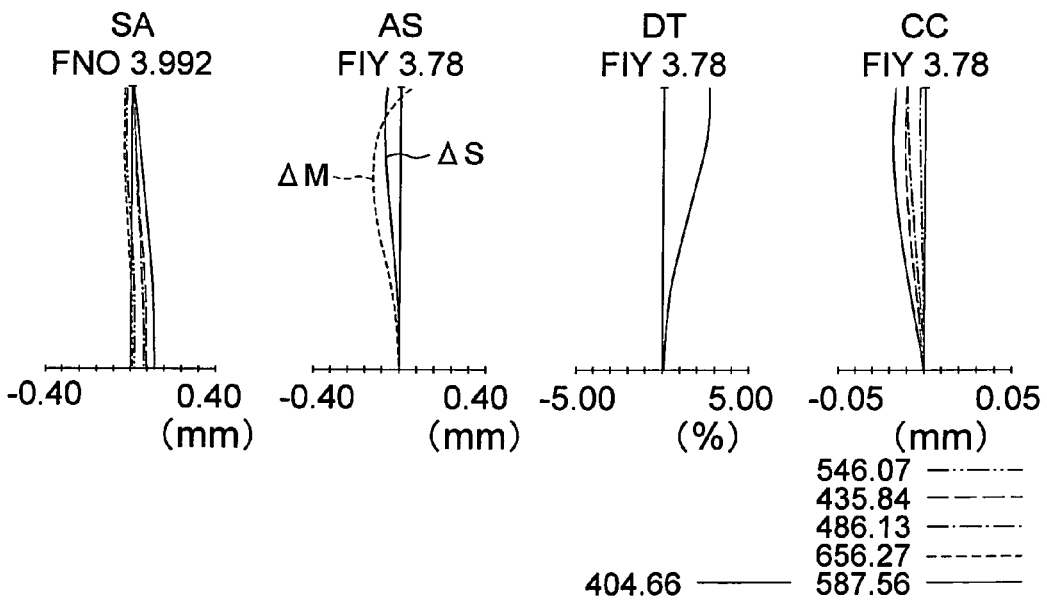

FIG. 16A, FIG. 16B, and FIG. 16C are diagrams showing a spherical aberration (SA), an astigmatism (AS), a distortion (DT), and a chromatic aberration of magnification (CC) at the time of infinite object point focusing of the zoom lens according to the eighth embodiment, where, FIG. 16A shows a state at the wide angle end, FIG. 16B shows an intermediate focal length state, and FIG. 16C shows a state at the telephoto end.

The zoom lens according to the eighth embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a cemented lens of a negative meniscus lens L1 (optical element B) having a convex surface directed toward the object side, a positive meniscus lens L2 (refractive optical element A) having a convex surface directed toward the object side, and a positive meniscus lens L3 having a convex surface directed toward the object side, and a positive meniscus lens L4 having a convex surface directed toward the object side, and has a positive refractive power as a whole. Here, a partial dispersion ratio θgF of the refractive optical element A of the cemented lens in the first lens group G1 is 0.718. Moreover, Abbe's number ($vd_A$) for the refractive optical element A is 17.00.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2 moves toward the image side. The third lens group G3 moves toward the object side. The fourth lens group G4, after moving toward the object side, moves toward the image side. The fifth lens group G5 is fixed.

Figure 17A:
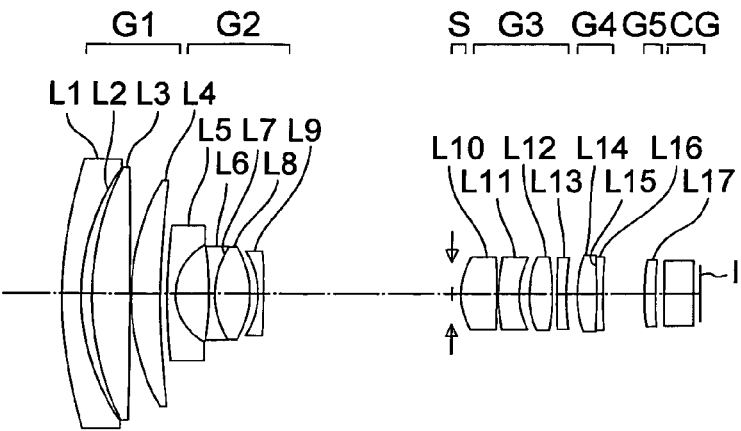
FIG. 17A, FIG. 17B, and FIG. 17C are cross-sectional views along an optical axis showing an optical arrangement at the time of infinite object point focusing of a zoom lens according to a ninth embodiment of the present invention, where.
Figure 17B:
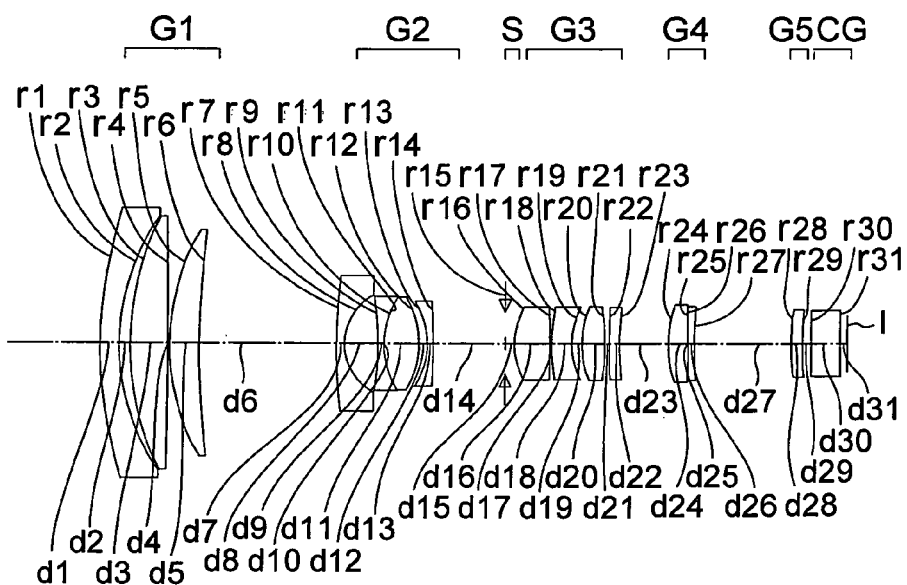
Figure 17C:
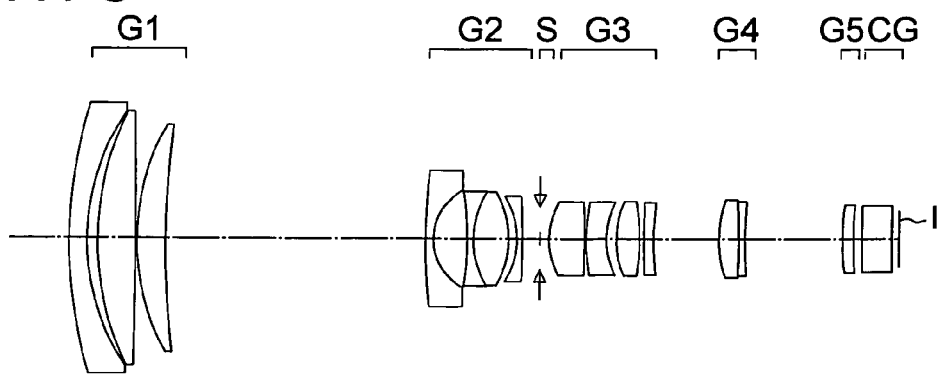

Next, a zoom lens according to a ninth embodiment of the present invention will be described below. FIG. 17A, FIG. 17B, and FIG. 17C are cross-sectional views along an optical axis showing an optical arrangement at the time of infinite object point focusing of the zoom lens according to the ninth embodiment of the present invention, where, FIG. 17A shows a state at a wide angle end, FIG. 17B shows an intermediate focal length state, and FIG. 17C shows a state at a telephoto end.

Figure 18A:
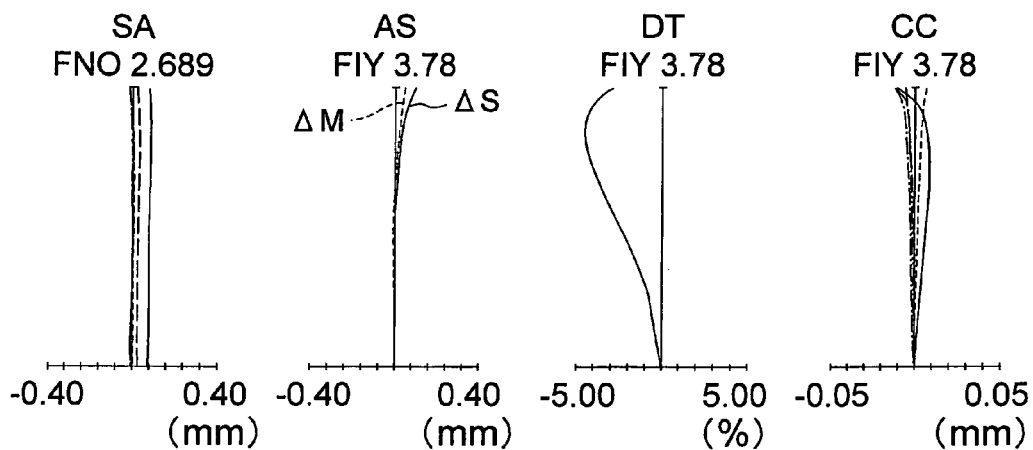
FIG. 18A, FIG. 18B, and FIG. 18C are diagrams showing a spherical aberration, an astigmatism, a distortion, and a chromatic aberration of magnification at the time of infinite object point focusing of the zoom lens according to the ninth embodiment, where.
Figure 18B:
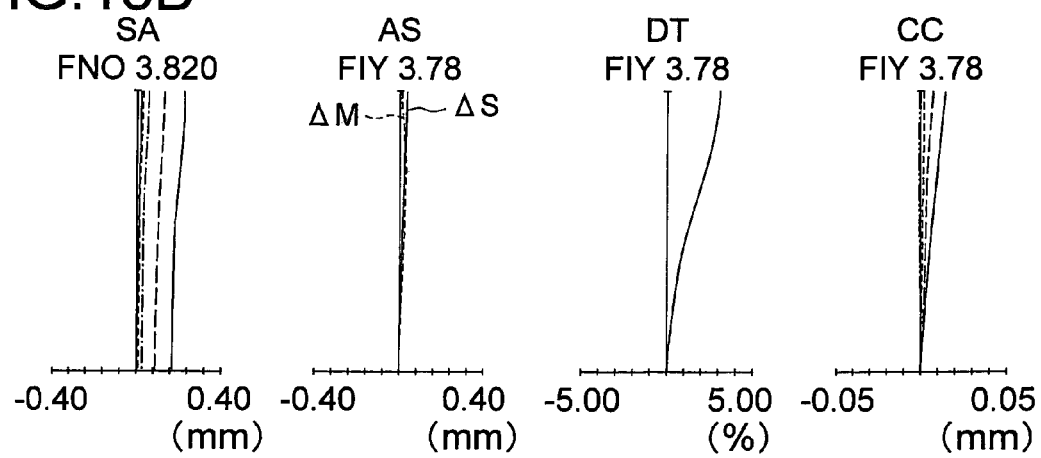
Figure 18C:
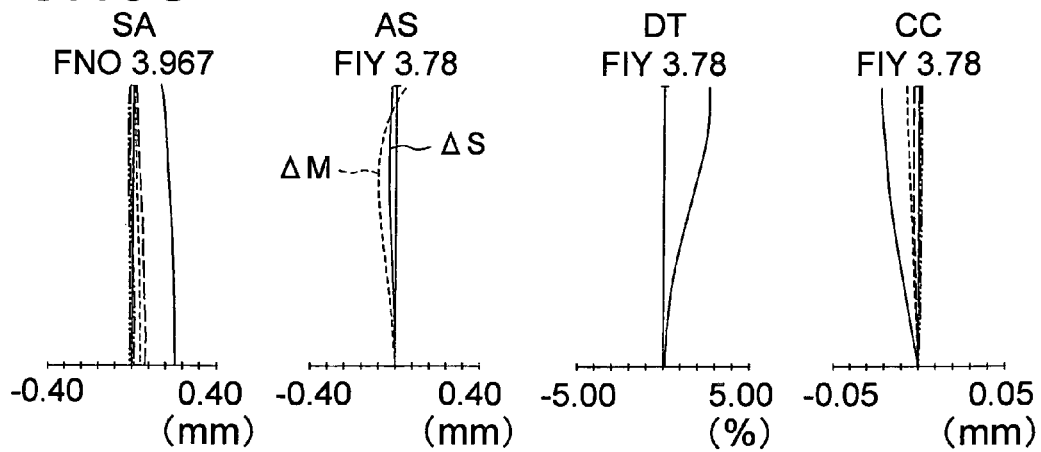

FIG. 18A, FIG. 18B, and FIG. 18C are diagrams showing a spherical aberration (SA), an astigmatism (AS), a distortion (DT), and a chromatic aberration of magnification (CC) at the time of infinite object point focusing of the zoom lens according to the ninth embodiment, where, FIG. 18A shows a state at the wide angle end, FIG. 18B shows an intermediate focal length state, an FIG. 18C shows a state at the telephoto end.

The zoom lens according to the ninth embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a cemented lens of a negative meniscus lens L1 (optical element B) having a convex surface directed toward the object side, a positive meniscus lens L2 (refractive optical element A) having a convex surface directed toward the object side, and a biconvex positive lens L3, and a positive meniscus lens L4 having a convex surface directed toward the object side, and has a positive refractive power as a whole. Here, a partial dispersion ratio θgF of the refractive optical element A of the cemented lens in the first lens group G1 is 0.738. Moreover, Abbe's number ($vd_A$) for the refractive optical element A is 15.00.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2 moves toward the image side. The third lens group G3 moves toward the object side. The fourth lens group G4, after moving toward the object side, moves slightly and assumes almost a fixed state. The fifth lens group G5 is fixed.

Next, a zoom lens according to a tenth embodiment of the present invention will be described below. FIG. 19A, FIG. 19B, and FIG. 19C are cross-sectional views along an optical axis showing an optical arrangement at the time of infinite object point focusing of the zoom lens according to the tenth embodiment of the present invention, where, FIG. 19A shows a state at a wide angle end, FIG. 19B shows an intermediate focal length state, and FIG. 19C shows a state at a telephoto end.

Figure 20A:
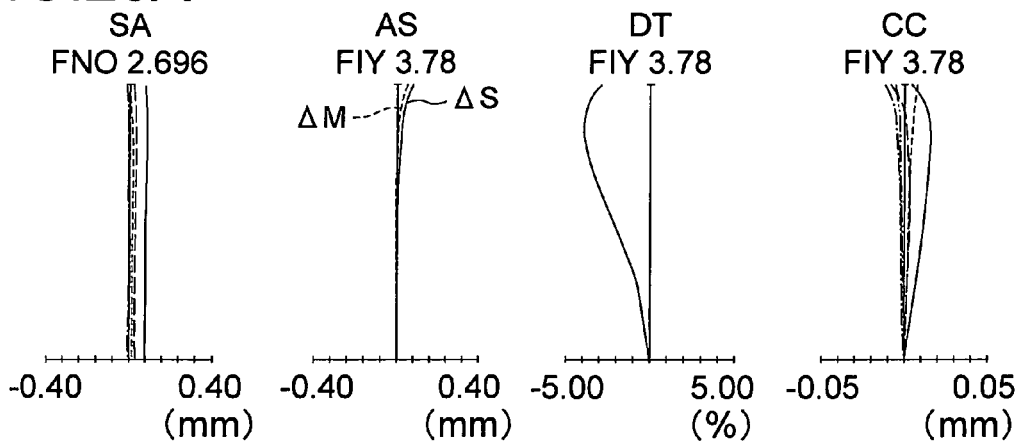
FIG. 20A, FIG. 20B, and FIG. 20C are diagrams showing a spherical aberration, an astigmatism, a distortion, and a chromatic aberration of magnification at the time of infinite object point focusing of the zoom lens according to the tenth embodiment, where.
Figure 20B:
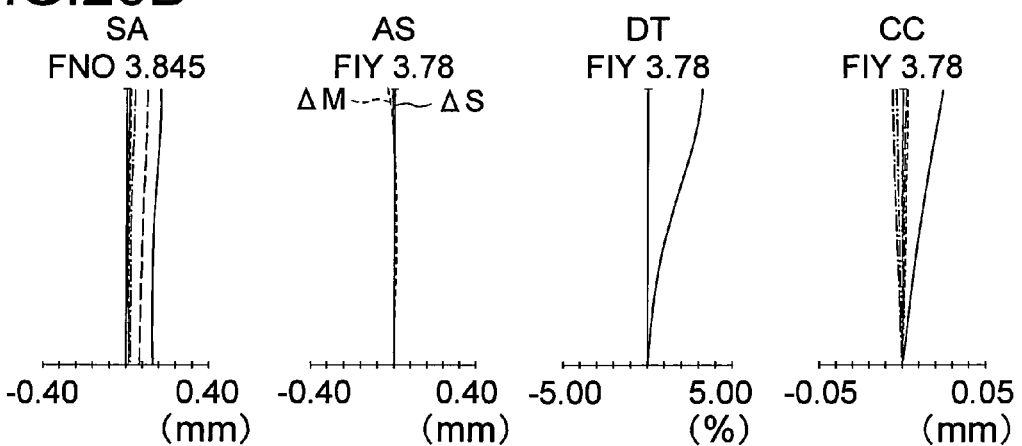
Figure 20C:
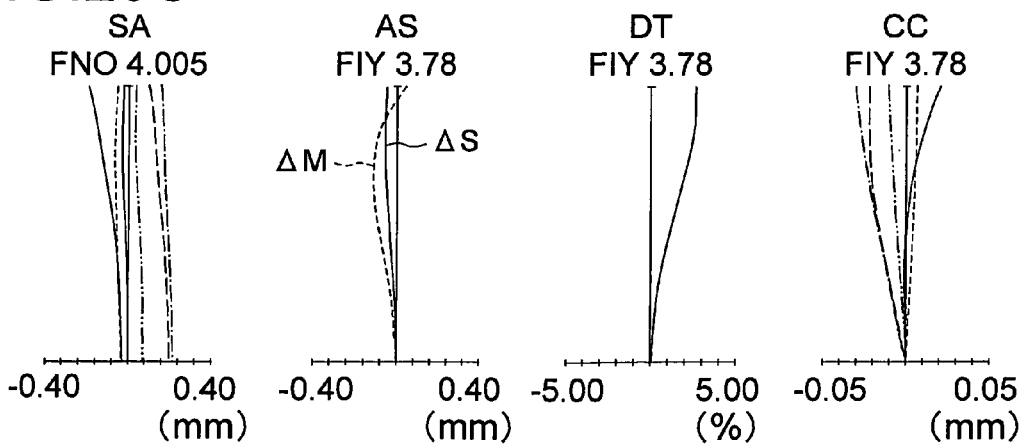

FIG. 20A, FIG. 20B, and FIG. 20C are diagrams showing a spherical aberration (SA), an astigmatism (AS), a distortion (DT), and a chromatic aberration of magnification (CC) at the time of infinite object point focusing of the zoom lens according to the tenth embodiment, where, FIG. 20A shows a state at the wide angle end, FIG. 20B shows an intermediate focal length state, and FIG. 20C shows a state at the telephoto end.

The zoom lens according to the tenth embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a cemented lens of a negative meniscus lens L1 (optical element B) having a convex surface directed toward the object side, a positive meniscus lens L2 (refractive optical element A) having a convex surface directed toward the object side, and a positive meniscus lens L3 having a convex surface directed toward the object side, and a positive meniscus lens L4 having a convex surface directed toward the object side, and has a positive refractive power as a whole. Here, a partial dispersion ratio θgF of the refractive optical element A of the cemented lens in the first lens group G1 is 0.761. Moreover, Abbe's number ($vd_A$) for the refractive optical element A is 17.01.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming form the wide angle end to the telephoto end, the first lens group G1 moves toward the object side. The second lens group G2 moves toward the image side. The third lens group G3 moves toward the object side. The fourth lens group G4, after moving to the object side, moves slightly and assumes almost a fixed state. The fifth lens group G5 is fixed.

Figure 21A:
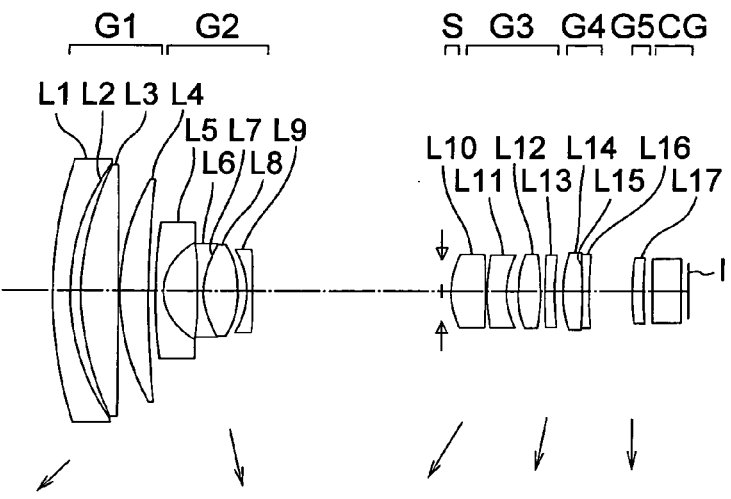
FIG. 21A, FIG. 21B, and FIG. 21C are cross-sectional views along an optical axis showing an optical arrangement at the time of infinite object point focusing of a zoom lens according to an eleventh embodiment of the present invention, where.
Figure 21B:
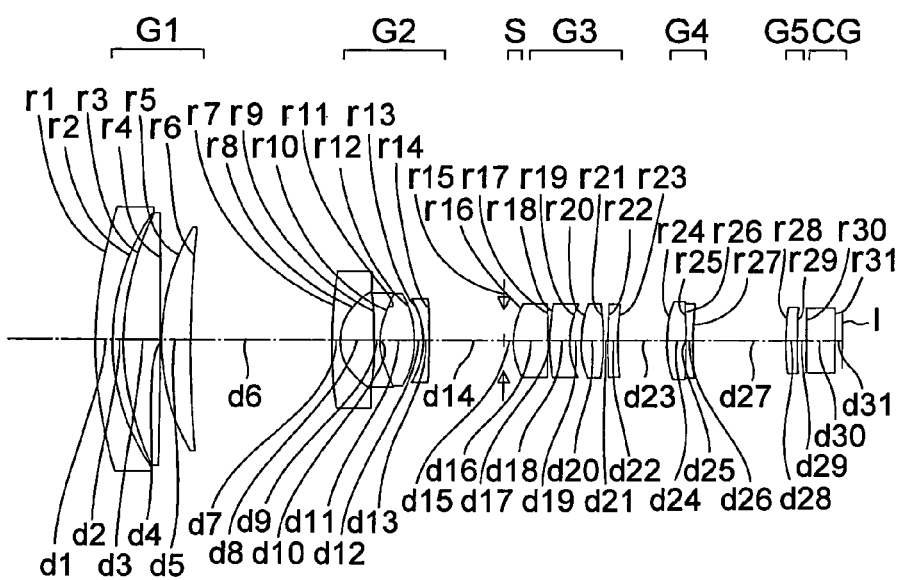
Figure 21C:
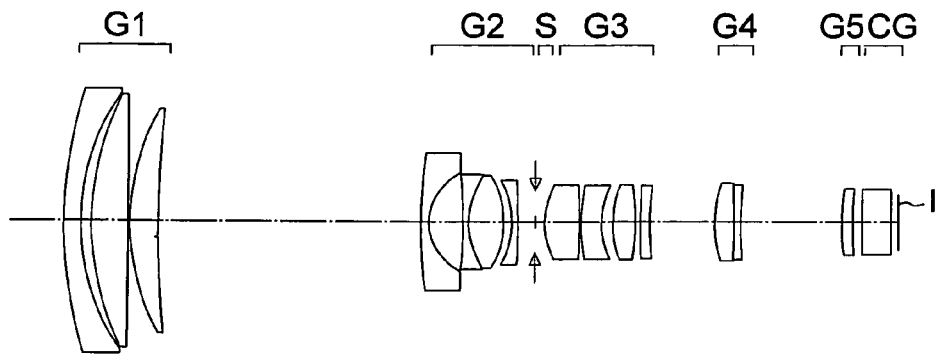

Next, a zoom lens according to en eleventh embodiment of the present invention will be described below. FIG. 21A, FIG. 21B, and FIG. 21C are cross-sectional views along an optical axis showing an optical arrangement at the time of infinite object point focusing of the zoom lens according to the eleventh embodiment of the present invention, where, FIG. 21A shows a state at a wide angle end, FIG. 21B shows an intermediate focal length state, and FIG. 21C shows a state at a telephoto end.

Figure 22A:
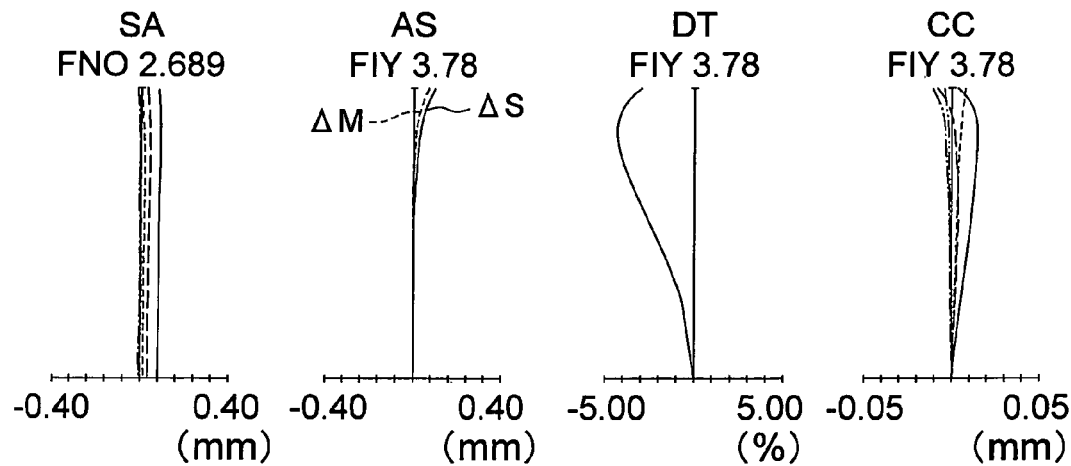
FIG. 22A, FIG. 22B, and FIG. 22C are diagrams showing a spherical aberration, an astigmatism, a distortion, and a chromatic aberration of magnification at the time of infinite object point focusing of the zoom lens according to the eleventh embodiment, where.
Figure 22B:
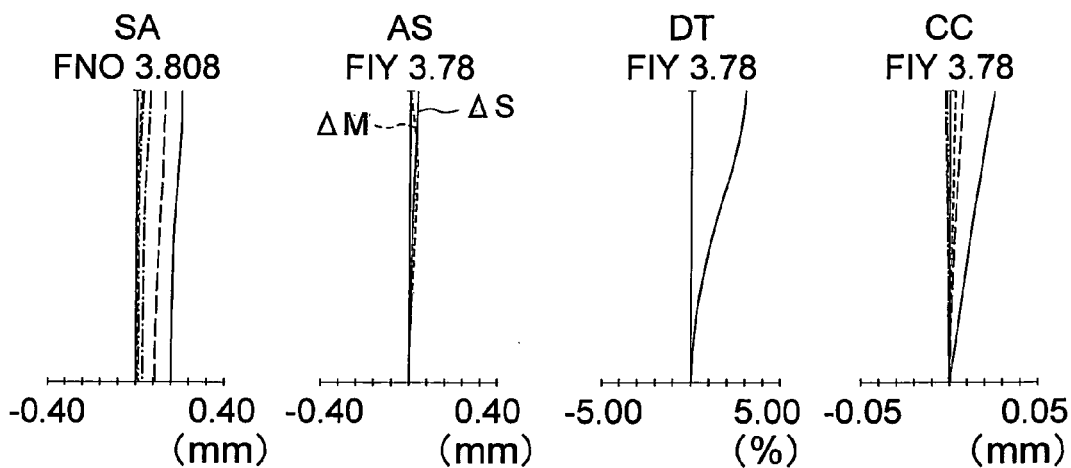
Figure 22C:
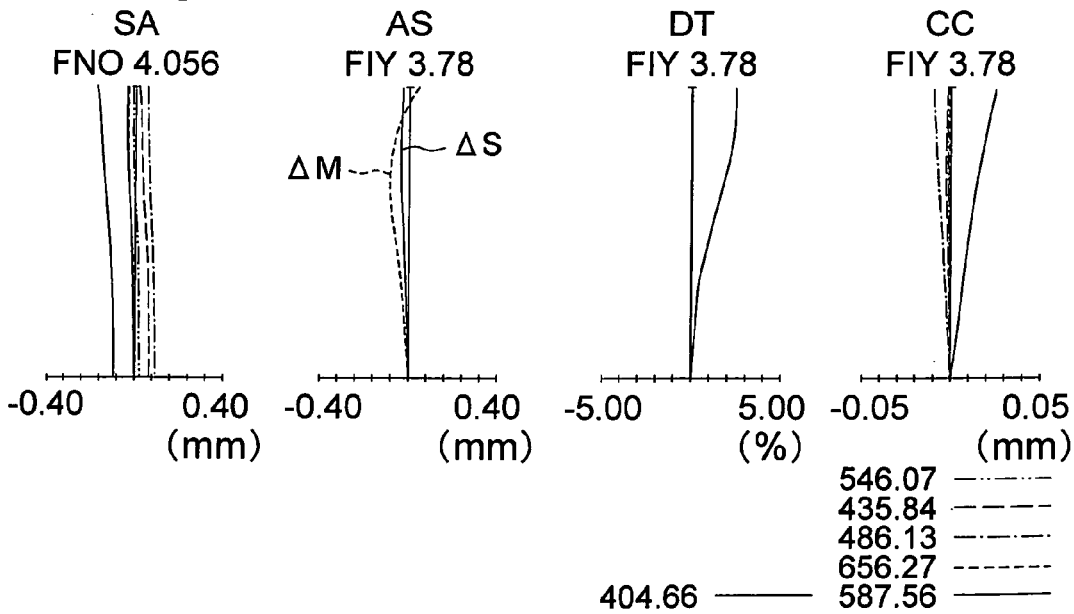

FIG. 22A, FIG. 22B, and FIG. 22C are diagrams showing a spherical aberration (SA), an astigmatism (AS), a distortion (DT), and a chromatic aberration of magnification (CC) at the time of infinite object point focusing of the zoom lens according to the eleventh embodiment, where, FIG. 22A shows a state at the wide angle end, FIG. 22B shows an intermediate focal length state, and FIG. 22C shows a state at the telephoto end.

The zoom lens according to the eleventh embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power. The first lens group G1 includes in order from the object side a cemented lens of a negative meniscus lens L1 (optical element B) having a convex surface directed toward the object side, a positive meniscus lens L2 (refractive optical element A) having a convex surface directed toward the object side, and a biconvex positive lens L3, and a positive meniscus lens L4 having a convex surface directed toward the object side, and has a positive refractive power as a whole. Here, a partial dispersion ratio θgF of the refractive optical element A of the cemented lens in the first lens group G1 is 0.761. Moreover, Abbe's number ($vd_A$) for the refractive optical element A is 17.01.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2 moves toward the image side. The third lens group G3 moves toward the object side. The fourth lens group G4 moves toward the object side. The fifth lens group G5 is fixed.

Figure 23A:
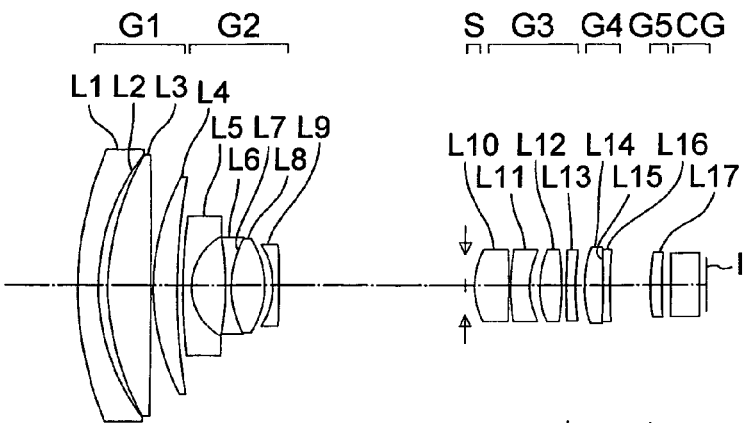
FIG. 23A, FIG. 23B, and FIG. 23C are cross-sectional views along an optical axis showing an optical arrangement at the time of infinite object point focusing of a zoom lens according to a twelfth embodiment of the present invention, where.
Figure 23B:
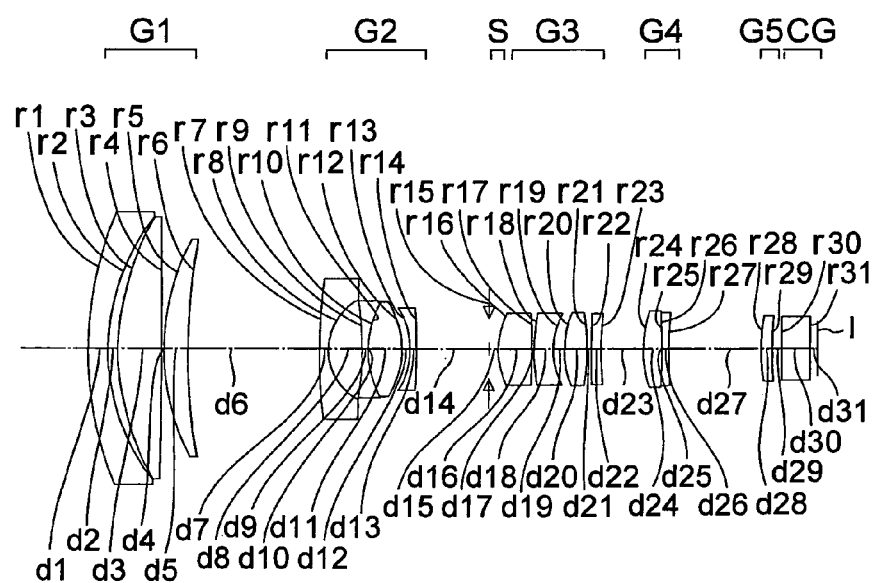
Figure 23C:
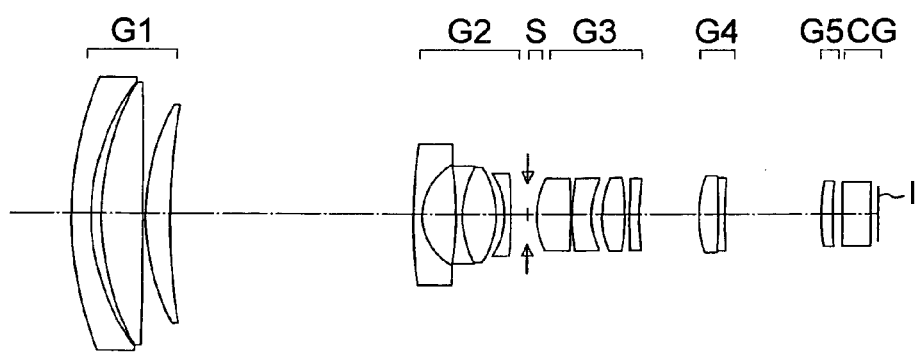

Next, a zoom lens according to a twelfth embodiment of the present invention will be described below. FIG. 23A, FIG. 23B, and FIG. 23C are cross-sectional views along an optical axis showing an optical arrangement at the time of infinite object point focusing of the zoom lens according to the twelfth embodiment of the present invention, where, FIG. 23A shows a state at a wide angle end, FIG. 23B shows an intermediate focal length state, and FIG. 23C shows a state at a telephoto end.

Figure 24A:
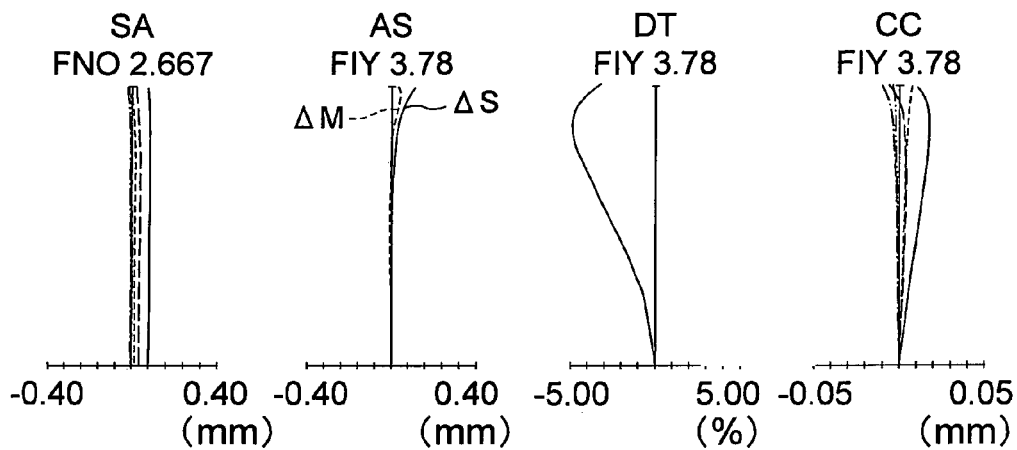
FIG. 24A, FIG. 24B, and FIG. 24C are diagrams showing a spherical aberration, an astigmatism, a distortion, and a chromatic aberration of magnification at the time of infinite object point focusing of the zoom lens according to the twelfth embodiment, where.
Figure 24B:
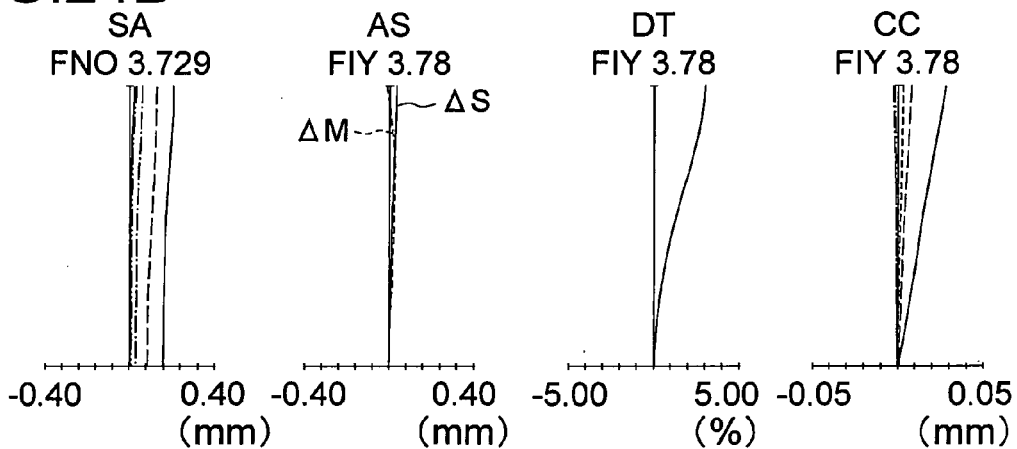
Figure 24C:
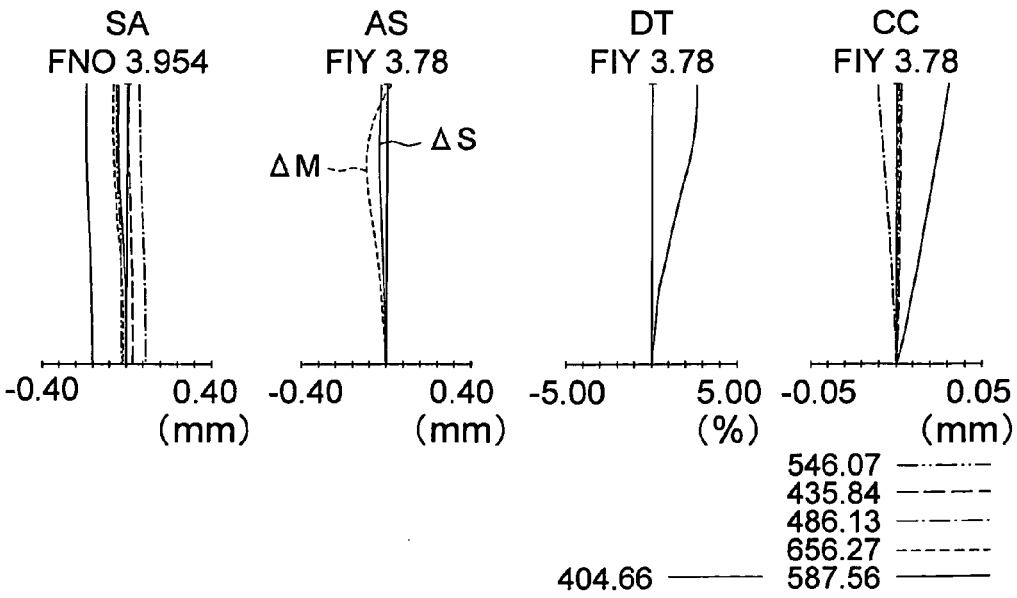

FIG. 24A, FIG. 24B, and FIG. 24C are diagrams showing a spherical aberration (SA), an astigmatism (AS), a distortion (DT), and a chromatic aberration of magnification (CC) at the time of infinite object point focusing of the zoom lens according to the twelfth embodiment, where, FIG. 24A shows a state at the wide angle end, FIG. 24B shows an intermediate focal length state, and FIG. 24C shows a state at the telephoto end.

The zoom lens according to the twelfth embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a cemented lens of a negative meniscus lens L1 (optical element B) having a convex surface directed toward the object side, a positive meniscus lens L2 (refractive optical element A), having a convex surface directed toward the object side, and a biconvex positive lens L3, and a positive meniscus lens L4 having a convex surface directed toward the object side, and has a positive refractive power as a whole. Here, a partial dispersion ratio θgF of the refractive optical element A of the cemented lens in the first lens group G1 is 0.817. Moreover, Abbe's number ($vd_A$) for the refractive optical element A is 16.99.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2 moves toward the image side. The third lens group G3 moves toward the object side. The fourth lens group G4 moves toward the object side. The fifth lens group G5 is fixed.

Figure 25A:
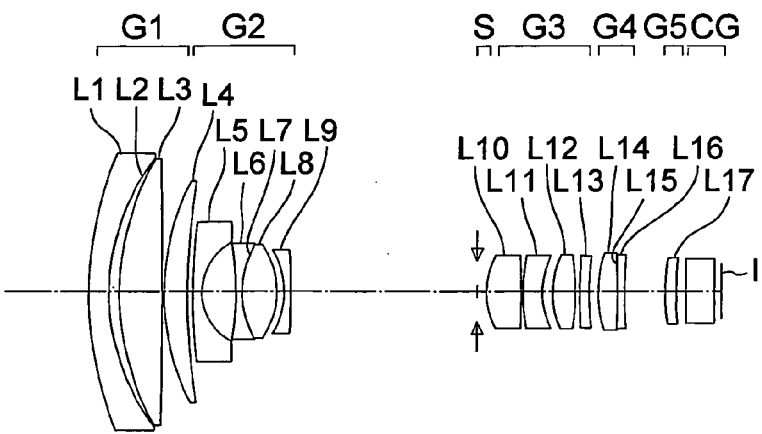
FIG. 25A, FIG. 25B, and FIG. 25C are cross-sectional views along an optical axis showing an optical arrangement at the time of infinite object point focusing of a zoom lens according to a thirteenth embodiment of the present invention, where.
Figure 25B:
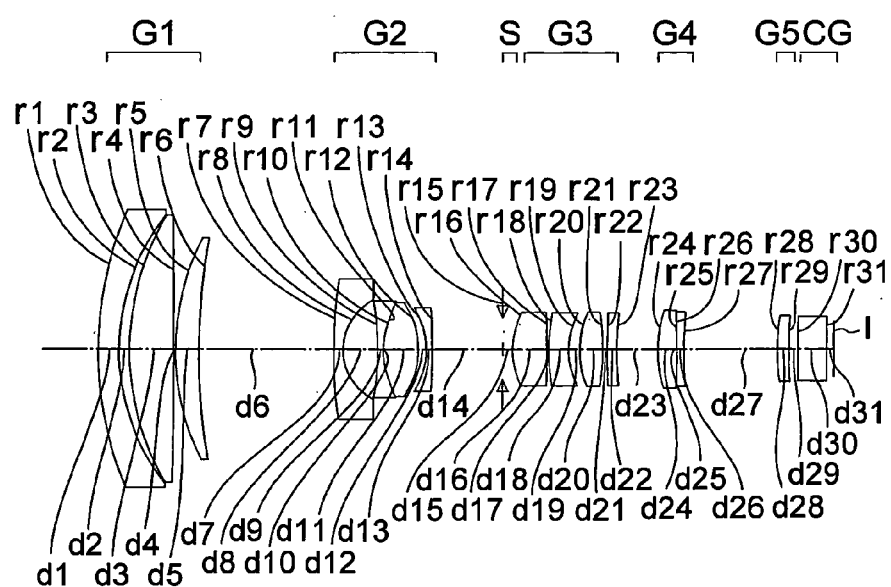
Figure 25C:
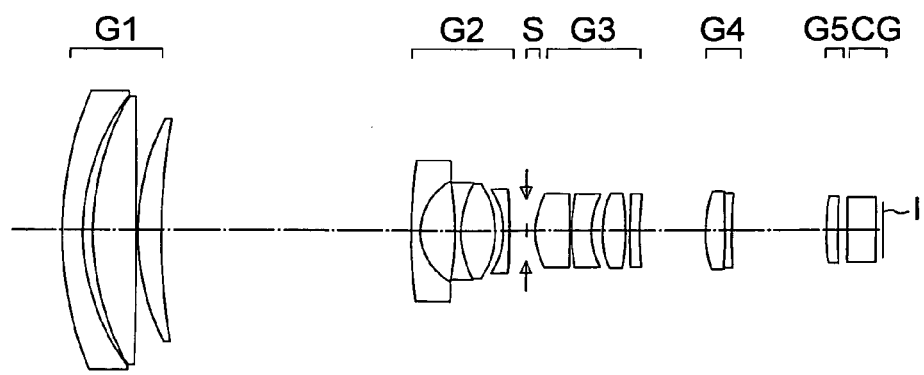

Next, a zoom lens according to a thirteenth embodiment of the present invention will be described below. FIG. 25A, FIG. 25B, and FIG. 25C are cross-sectional views along an optical axis showing an optical arrangement at the time of infinite object point focusing of the zoom lens according to the thirteenth embodiment of the present invention, where, FIG. 25A shows a state at a wide angle end, FIG. 25B shows an intermediate focal length state, and FIG. 25C shows a state at a telephoto end.

FIG. 26A, FIG. 26B, and FIG. 26C are diagrams showing a spherical aberration (SA), an astigmatism (AS), a distortion (DT), and a chromatic aberration of magnification (CC) at the time of infinite object point focusing of the zoom lens according to the thirteenth embodiment, where, FIG. 26A shows a state at the wide angle end, FIG. 26B shows an intermediate focal length state, and FIG. 26C shows a state at the telephoto end.

The zoom lens according to the thirteenth embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a cemented lens of a negative meniscus lens L1 (optical element B) having a convex surface directed toward the object side, a positive meniscus lens L2 (refractive optical element A) having a convex surface directed toward the object side, and a biconvex positive lens L3, and a positive meniscus lens L4 having a convex surface directed toward the object side, and has a positive refractive power as a whole. Here, a partial dispersion ratio θgF of the refractive optical element A of the cemented lens in the first lens group G1 is 0.817. Moreover, Abbe's number ($vd_A$) for the refractive optical element A is 16.99.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2 moves toward the image side. The third lens group G3 moves toward the object side. The fourth lens group G4, after moving toward the object side, moves slightly and assumes almost a fixed state.

Figure 27A:
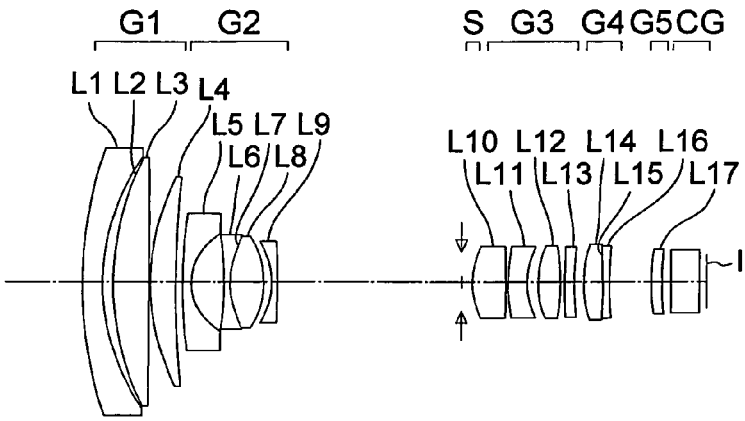
FIG. 27A, FIG. 27B, and FIG. 27C are cross-sectional views along an optical axis showing an optical arrangement at the time of infinite object point focusing of a zoom lens according to a fourteenth embodiment of the present invention, where.
Figure 27B:
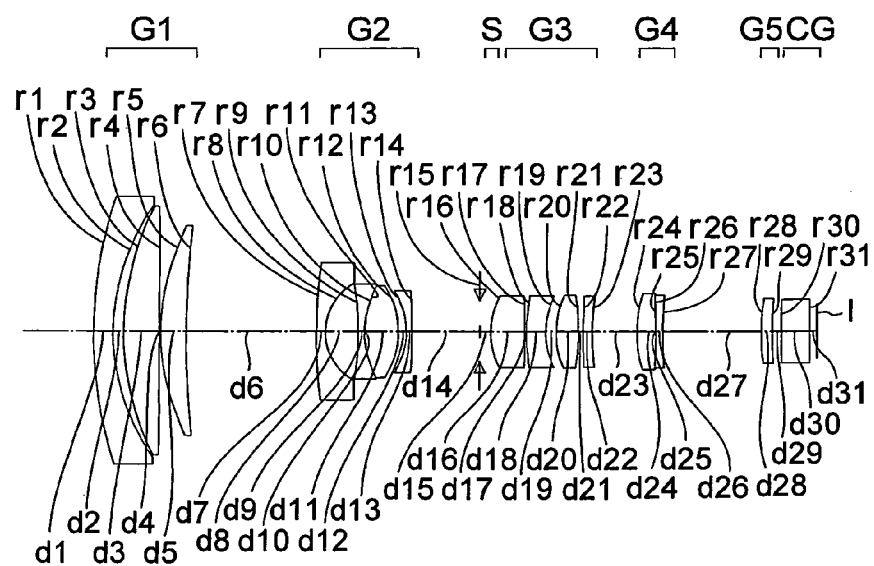
Figure 27C:
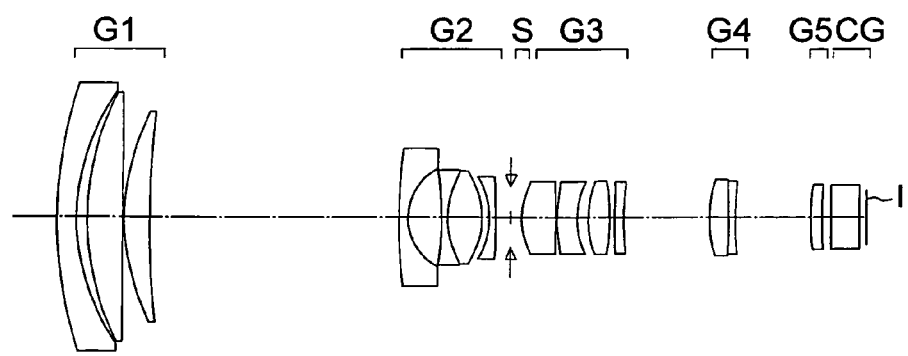

Next, a zoom lens according to a fourteenth embodiment of the present invention will be described below. FIG. 27A, FIG. 27B, and FIG. 27C are cross-sectional views along an optical axis showing an optical arrangement at the time of infinite object point focusing of the zoom lens according to the fourteenth embodiment of the present invention, where, FIG. 27A shows a state at a wide angle end, FIG. 27B shows an intermediate focal length state, and FIG. 27C shows a state at a telephoto end.

Figure 28A:
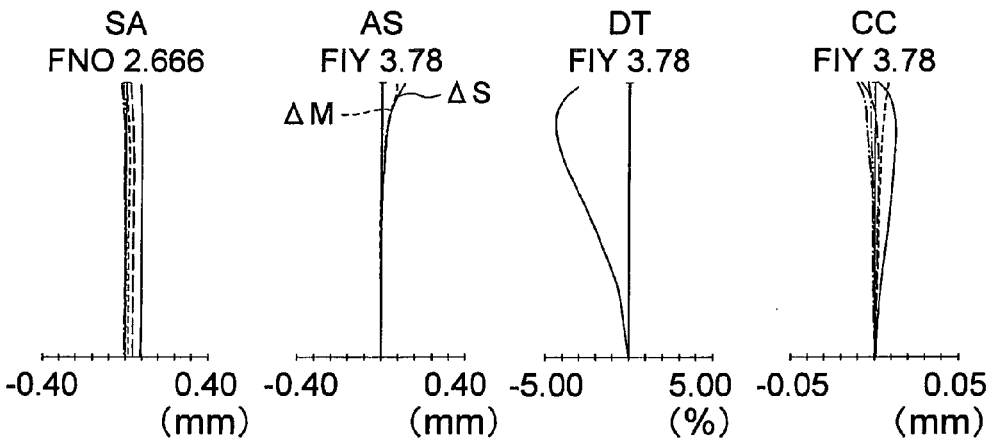
FIG. 28A, FIG. 28B, and FIG. 28C are diagrams showing a spherical aberration, an astigmatism, a distortion, and a chromatic aberration of magnification at the time of infinite object point focusing of the zoom lens according to the fourteenth embodiment, where.
Figure 28B:
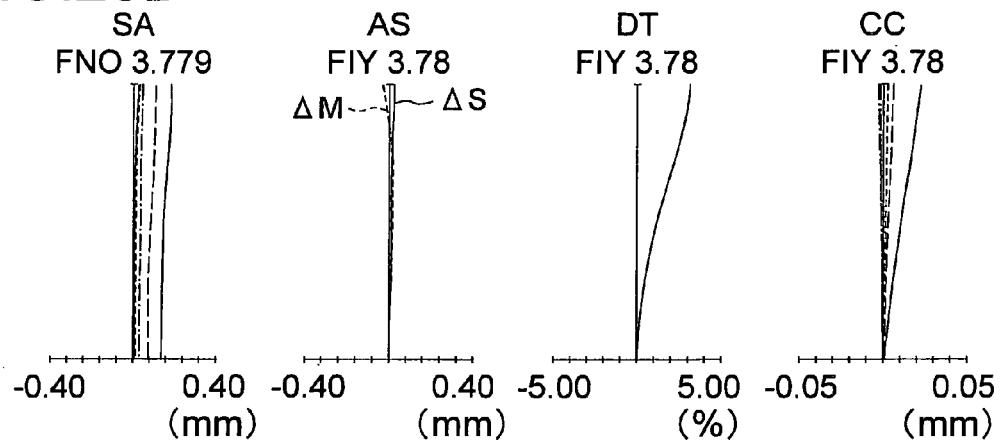
Figure 28C:
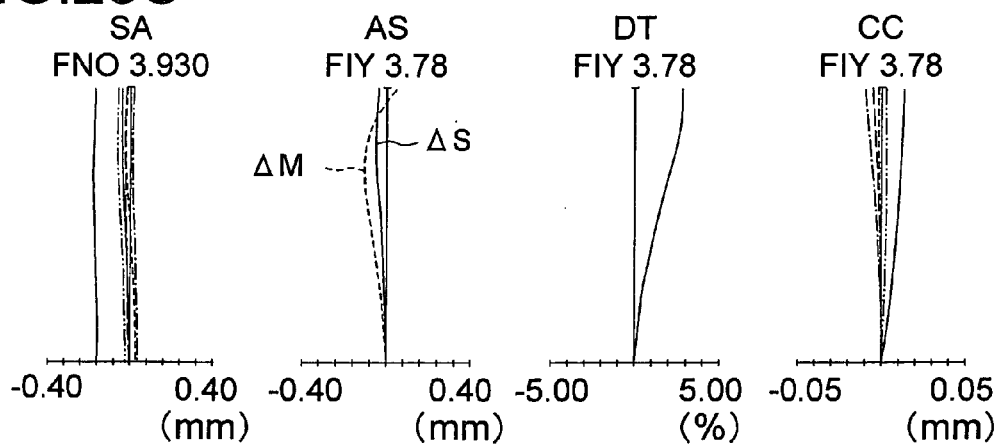

FIG. 28A, FIG. 28B, and FIG. 28C are diagrams showing a spherical aberration (SA), an astigmatism (AS), a distortion (DT), and a chromatic aberration of magnification (CC) at the time of infinite object point focusing of the zoom lens according to the fourteenth embodiment, where, FIG. 28A shows a state at the wide angle end, FIG. 28B shows an intermediate focal length state, and FIG. 28C shows a state at the telephoto end.

The zoom lens according to the fourteenth embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a cemented lens of a negative meniscus lens L1 (optical element B) having a convex surface directed toward the object side, a positive meniscus lens L2 (refractive optical element A) having a convex surface directed toward the object side, and a positive meniscus lens L3 having a convex surface directed toward the object side, and a positive meniscus lens L4 having a convex surface directed toward the object side, and has a positive refractive power as a whole. Here, a partial dispersion ratio θgF of the refractive optical element A of the cemented lens in the first lens group G1 is 0.817. Moreover, Abbe's number ($vd_A$) for the refractive optical element A is 23.36.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2 moves toward the image side. The third lens group G3 moves toward the object side. The fourth lens group G4, after moving toward the object side, moves toward the image side. The fifth lens group G5 is fixed.

Next, embodiments from a fifteenth embodiment to an eighteenth embodiment will be described below. In the embodiments from the fifteenth embodiment to the eighteenth embodiment, the following arrangement and action are same.

A zoom lens according to the fifteenth embodiment includes in order from an object side, a first lens group having a positive refractive power, a second lens group having a negative refractive power, an aperture stop, a third lens group having a positive refractive power, a fourth lens group having a positive refractive power, and a fifth lens group having a positive refractive power. The first lens group G1 has the abovementioned refractive optical element A having a positive refractive power, a negative lens (optical element B), and two positive lenses. Correction of chromatic aberration at the telephoto end is carried out effectively by an arrangement of the refractive optical element A and the first lens group G1.

The second lens group includes a negative lens, a negative lens, a positive lens, and a negative lens. A high zoom ratio is achieved by an arrangement of the second lens group G2.

Moreover, in the zoom lens, zooming is carried out by changing distances between the adjacent lens groups such that, at the telephoto end, a distance between the first lens group G1 and the second lens group G2 becomes longer, a distance between the second lens group G2 and the third lens group G3 becomes shorter, and a distance between the third lens group G3 and the fourth lens group G4 becomes longer, as compared to the distances at the wide angle end.

Moreover, the fourth lens group G4 corrects an image-plane fluctuation due to zooming, and at this time, a distance between the fourth lens group G4 and the fifth lens group G5 satisfies conditional expression (20).

Figure 29A:
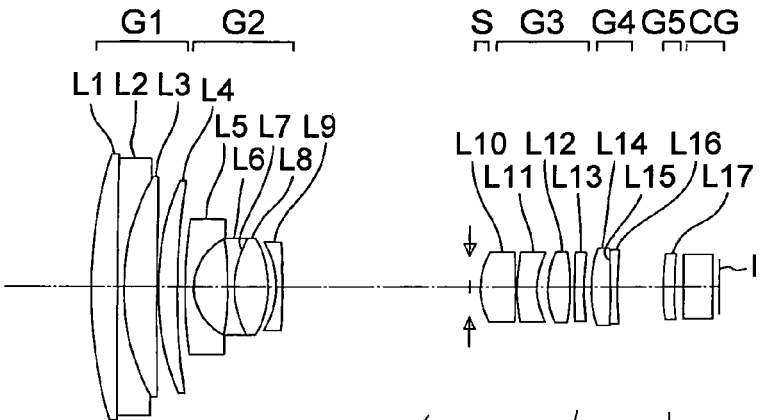
FIG. 29A, FIG. 29B, and FIG. 29C are cross-sectional views along an optical axis showing an optical arrangement at the time of infinite object point focusing of a zoom lens according to a fifteenth embodiment of the present invention, where.
Figure 29B:
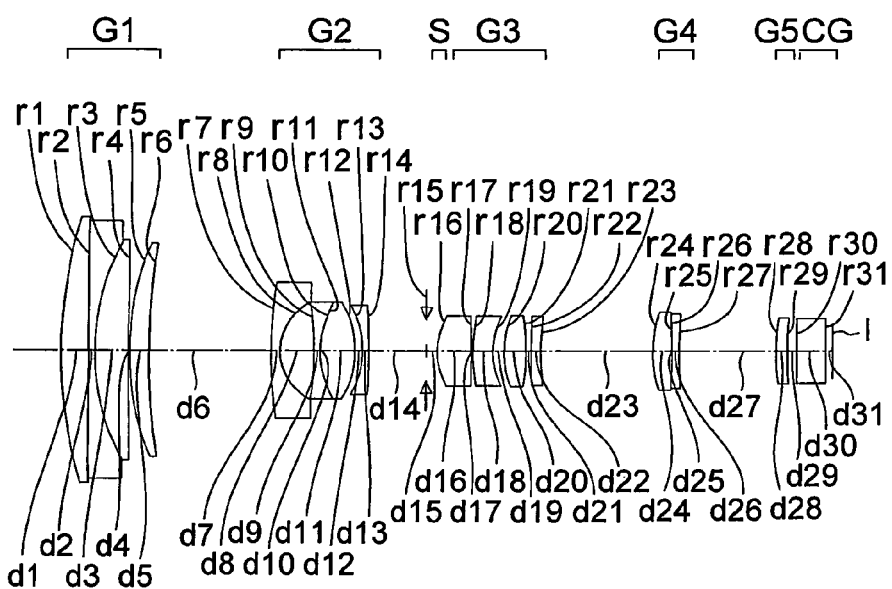
Figure 29C:
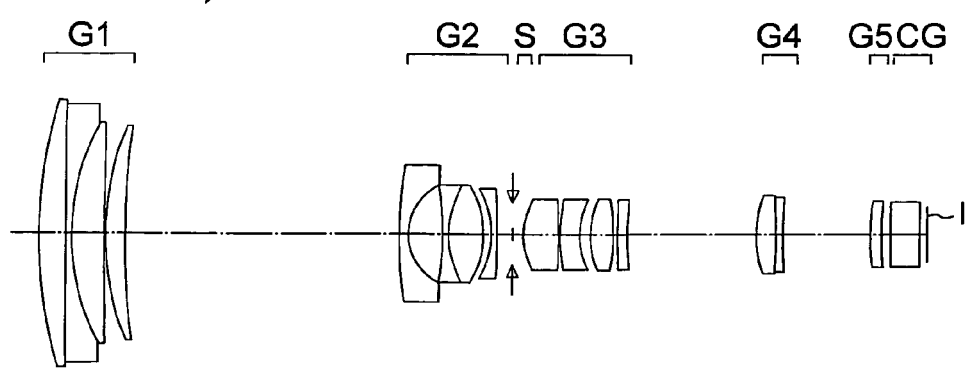

Firstly, the zoom lens according to the fifteenth embodiment of the present invention will be described below. FIG. 29A, FIG. 29B, and FIG. 29C are cross-sectional views along an optical axis showing an optical arrangement at the time of infinite object point focusing of the zoom lens according to the fifteenth embodiment of the present invention, where, FIG. 29A shows a state at a wide angle end, FIG. 29B shows an intermediate focal length state, and FIG. 29C shows a state at a telephoto end.

FIG. 30A, FIG. 30B, and FIG. 30C are diagrams showing a spherical aberration (SA), an astigmatism (AS), a distortion (DT), and a chromatic aberration of magnification (CC) at the time of infinite object point focusing of the zoom lens according to the fifteenth embodiment, where, FIG. 30A shows a state at the wide angle end, FIG. 30B shows an intermediate focal length state, and FIG. 30C shows a state at the telephoto end.

The zoom lens according to the fifteenth embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a cemented lens of a biconvex positive lens L1 (refractive optical element A), a biconcave negative lens L2 (optical element B), and a positive meniscus lens L3 having a convex surface directed toward the object side, and a positive meniscus lens L4 having a convex surface directed toward the object side, and has a positive refractive power as a whole. Here, a partial dispersion ratio θgF of the refractive optical element A of the cemented lens in the first lens group G1 is 0.668. Moreover, Abbe's number ($vd_A$) for the refractive optical element A is 23.38.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2, after moving toward the object side, moves toward the image side. The third lens group G3 moves toward the object side. The fourth lens group G4, after moving toward the object side, moves toward the image side. The fifth lens group G5 is fixed.

Figure 31A:
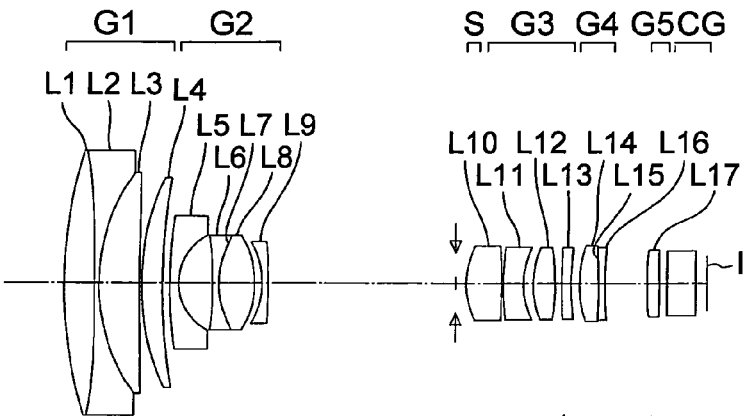
FIG. 31A, FIG. 31B, and FIG. 31C are cross-sectional views along an optical axis showing an optical arrangement at the time of infinite object point focusing of a zoom lens according to a sixteenth embodiment of the present invention, where.
Figure 31B:
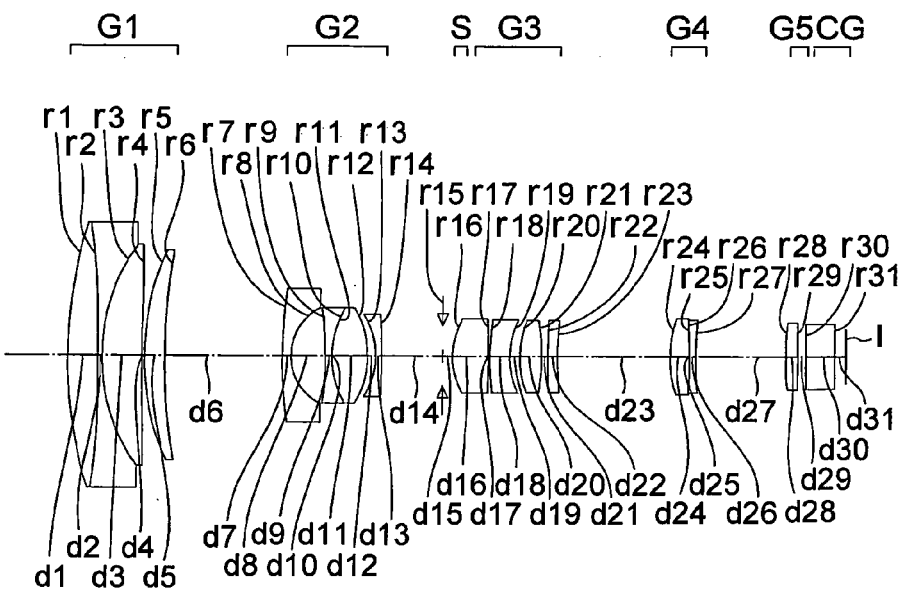
Figure 31C:
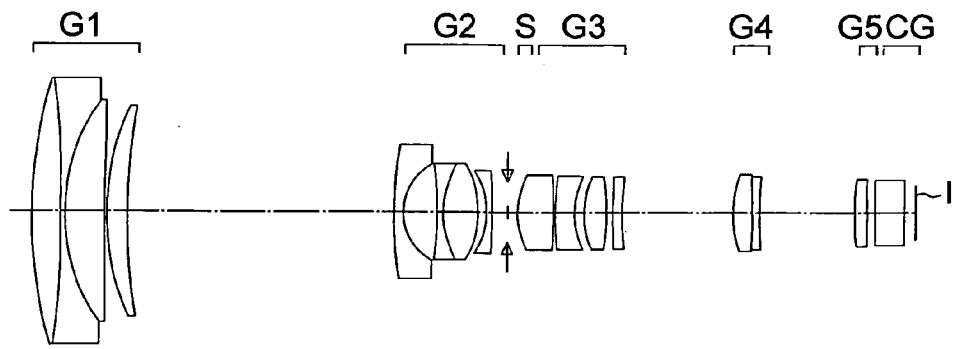

Next, a zoom lens according to a sixteenth embodiment of the present invention will be described below. FIG. 31A, FIG. 31B, and FIG. 31C are cross-sectional views along an optical axis showing an optical arrangement at the time of infinite object point focusing of the zoom lens according to the sixteenth embodiment of the present invention, where, FIG. 31A shows a state at a wide angle end, FIG. 31B shows an intermediate focal length state, and FIG. 31C shows a state at a telephoto end.

Figure 32A:
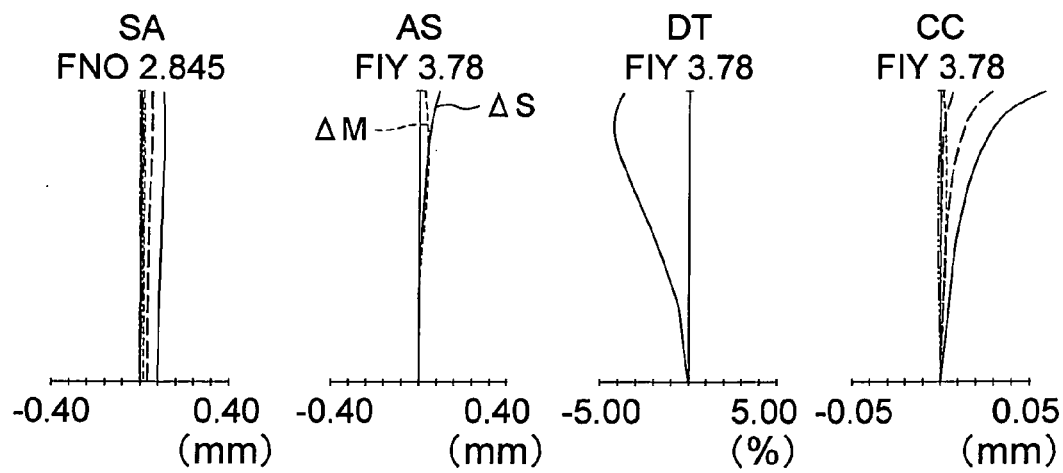
FIG. 32A, FIG. 32B, and FIG. 32C are diagrams showing a spherical aberration, an astigmatism, a distortion, and a chromatic aberration of magnification at the time of infinite object point focusing of the zoom lens according to the sixteenth embodiment, where.
Figure 32B:
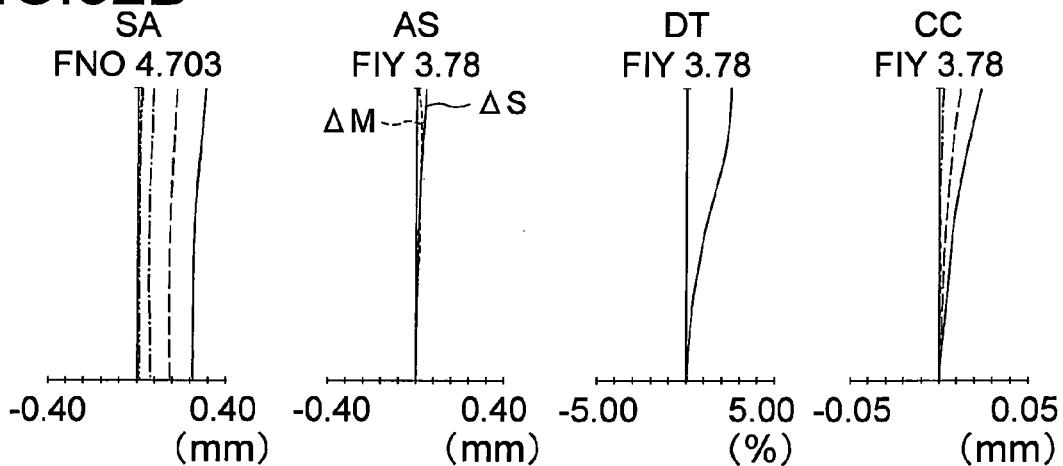
Figure 32C:
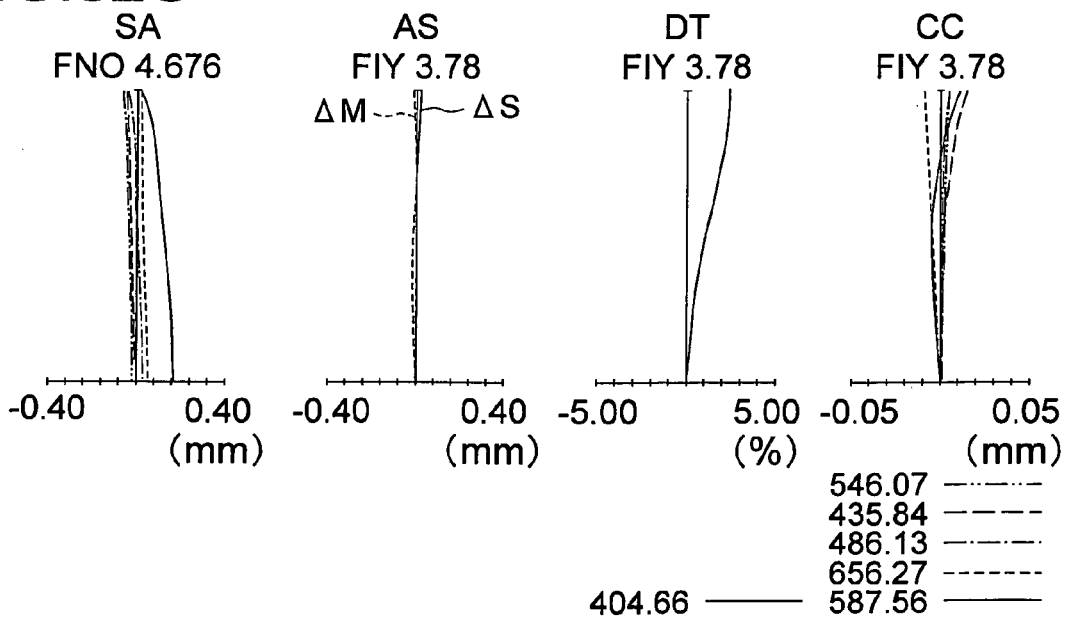

FIG. 32A, FIG. 32B, and FIG. 32C are diagrams showing a spherical aberration (SA), an astigmatism (AS), a distortion (DT), and a chromatic aberration of magnification (CC) at the time of infinite object point focusing of the zoom lens according to the sixteenth embodiment, where, FIG. 32A shows a state at the wide angle end, FIG. 32B shows an intermediate focal length state, and FIG. 32C shows a state at the telephoto end.

The zoom lens according to the sixteenth embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a cemented lens of a positive meniscus lens L1 (refractive optical element A) having a convex surface directed toward the object side, a negative meniscus lens L2 (optical element B) having a convex surface directed toward the object side, and a positive meniscus lens L3 having a convex surface directed toward the object side, and a positive meniscus lens L4 having a convex surface directed toward the object side, and has a positive refractive power as a whole. Here, a partial dispersion ratio θgF of the refractive optical element A of the cemented lens in the first lens group G1 is 0.690. Moreover, Abbe's number ($vd_A$) for the refractive optical element A is 20.00. Due to an aspheric surface effect, the positive meniscus lens L1 becomes a biconvex positive lens off axis, and the negative meniscus lens L2 becomes a biconcave negative lens off axis.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2, after moving toward the object side, moves toward the image side. The third lens group G3, after moving toward the object side, moves slightly and assumes almost a fixed state. The fourth lens group G4, after moving toward the object side, moves slightly and assumes almost a fixed state. The fifth lens group G5 is fixed.

Figure 33A:
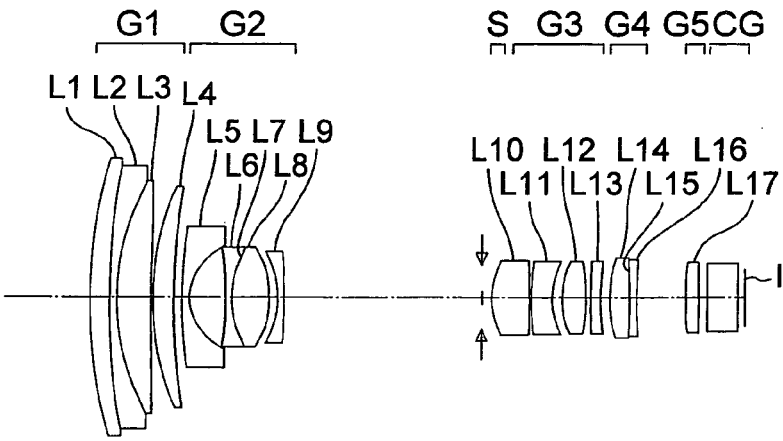
FIG. 33A, FIG. 33B, and FIG. 33C are cross-sectional views along an optical axis showing an optical arrangement at the time of infinite object point focusing of a zoom lens according to a seventeenth embodiment of the present invention, where.
Figure 33B:
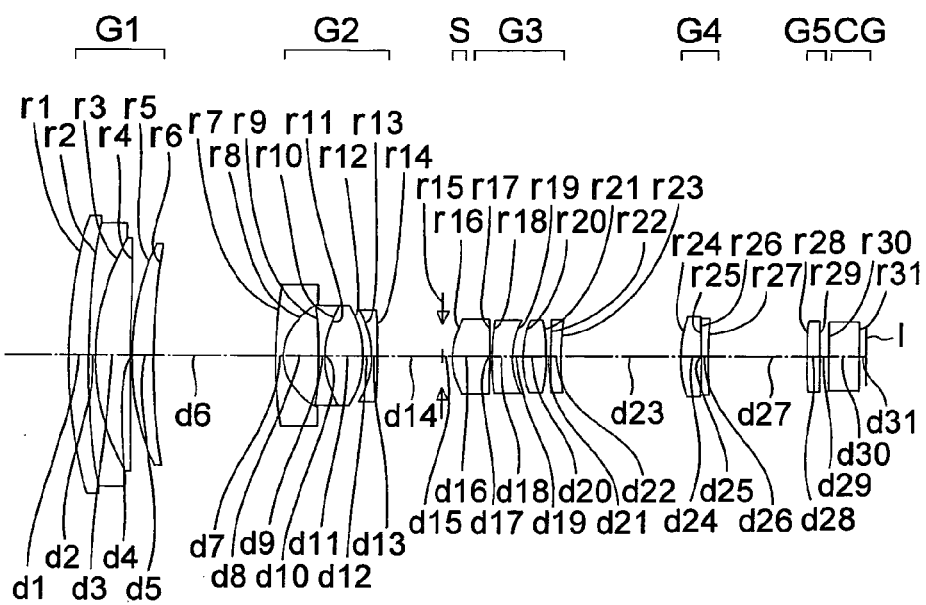
Figure 33C:
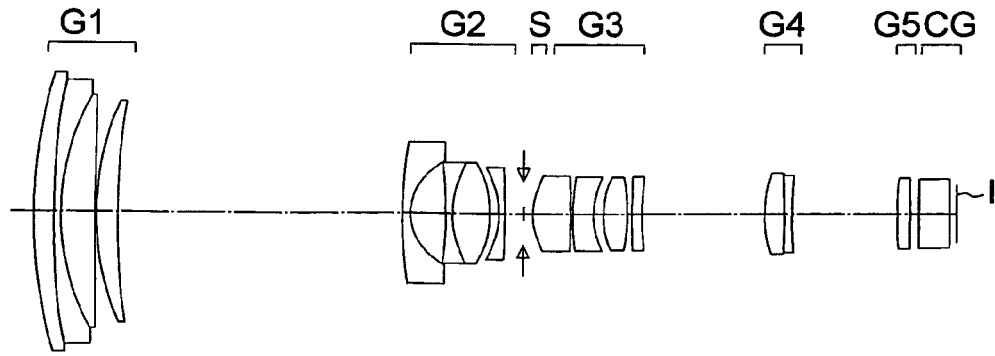

Next, a zoom lens according to a seventeenth embodiment of the present invention will be described below. FIG. 33A, FIG. 33B, and FIG. 33C are cross-sectional views along an optical axis showing an optical arrangement at the time of infinite object point focusing of the zoom lens according to the seventeenth embodiment of the present invention, where, FIG. 33A shows a state at a wide angle end, FIG. 33B shows an intermediate focal length state, and FIG. 33C shows a state at a telephoto end.

Figure 34A:
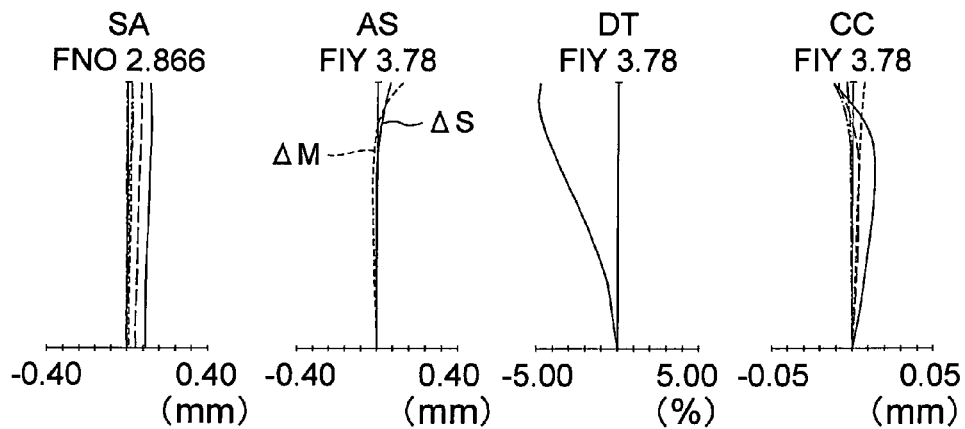
FIG. 34A, FIG. 34B, and FIG. 34C are diagrams showing a spherical aberration, an astigmatism, a distortion, and a chromatic aberration of magnification at the time of infinite object point focusing of the zoom lens according to the seventeenth embodiment, where.
Figure 34B:
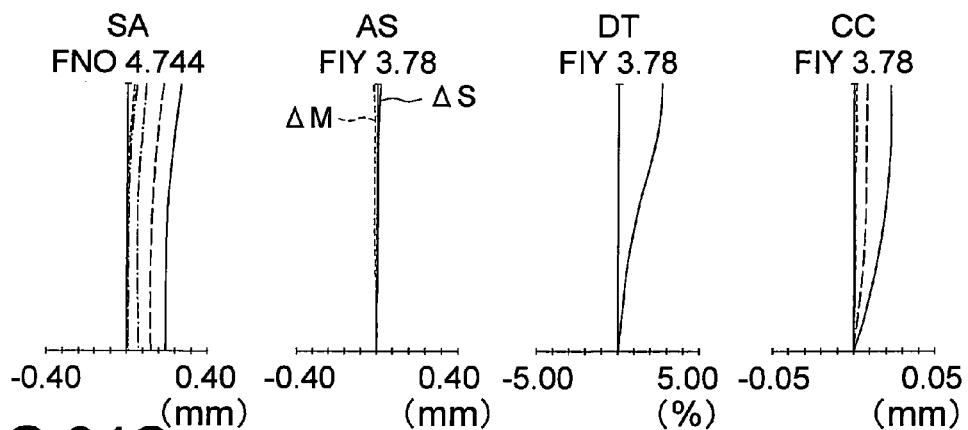
Figure 34C:
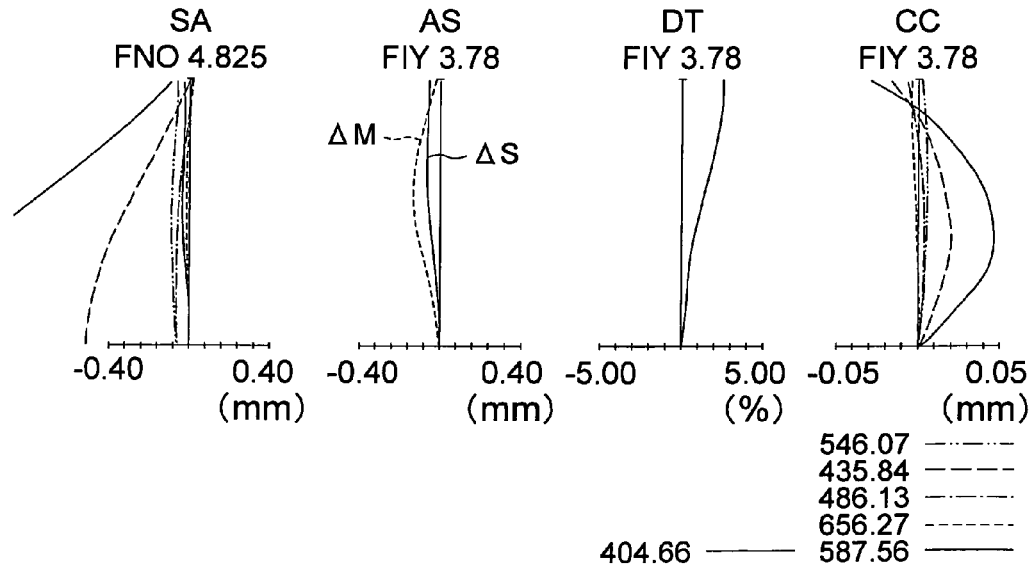

FIG. 34A, FIG. 34B, and FIG. 34C are diagrams showing a spherical aberration (SA), an astigmatism (AS), a distortion (DT), and a chromatic aberration of magnification (CC) at the time of infinite object point focusing of the zoom lens according to the seventeenth embodiment, where, FIG. 34A shows a state at the wide angle end, FIG. 34B shows an intermediate focal length state, and FIG. 34C shows a state at the telephoto end.

The zoom lens according to the seventeenth embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a cemented lens of a positive meniscus lens L1 (refractive optical element A) having a convex surface directed toward the object side, a negative meniscus lens L2 (optical element B) having a convex surface directed toward the object side, and a positive meniscus lens L3 having a convex surface directed toward the object side, and a positive meniscus lens L4 having a convex surface directed toward the object side. Here, a partial dispersion ratio θgF of the refractive optical element A of the cemented lens in the first lens group G1 is 0.817. Moreover, Abbe's number ($vd_A$) for the refractive optical element A is 23.36.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves to the object side. The second lens group G2, after moving toward the object side, moves toward the image side. The third lens group G3 moves toward the object side. The fourth lens group G4 moves toward the object side. The fifth lens group G5 is fixed.

Figure 35A:
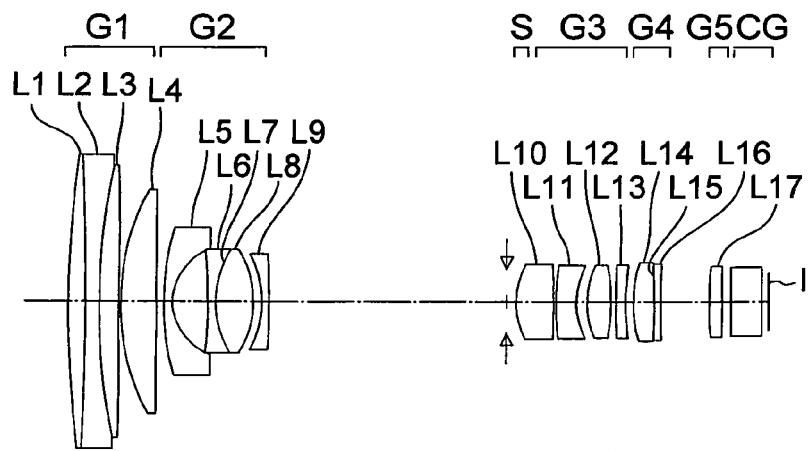
FIG. 35A, FIG. 35B, and FIG. 35C are cross-sectional views along an optical axis showing an optical arrangement at the time of infinite object point focusing of a zoom lens according to an eighteenth embodiment of the present invention, where.
Figure 35B:
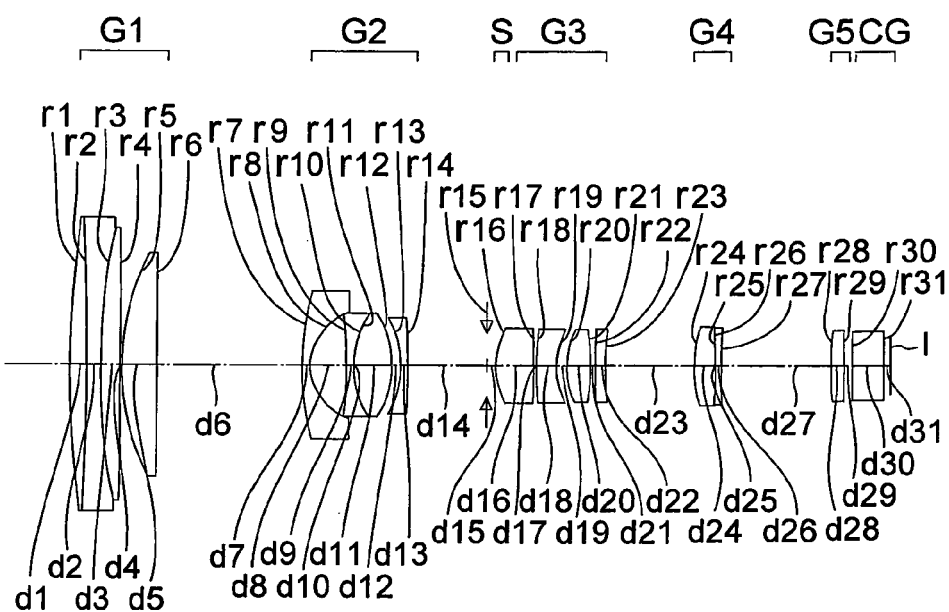
Figure 35C:
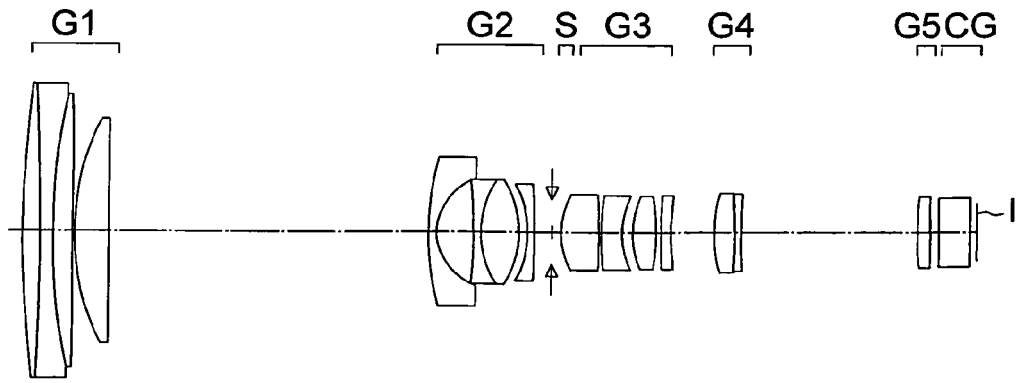

Next, a zoom lens according to the eighteenth embodiment of the present invention will be described below. FIG. 35A, FIG. 35B, and FIG. 35C are cross-sectional views along an optical axis showing an optical arrangement at the time of infinite object point focusing of the zoom lens according to the eighteenth embodiment of the present invention, where, FIG. 35A shows a state at a wide angle end, FIG. 35B shows an intermediate focal length state, and FIG. 35C shows a state at a telephoto end.

Figure 36A:
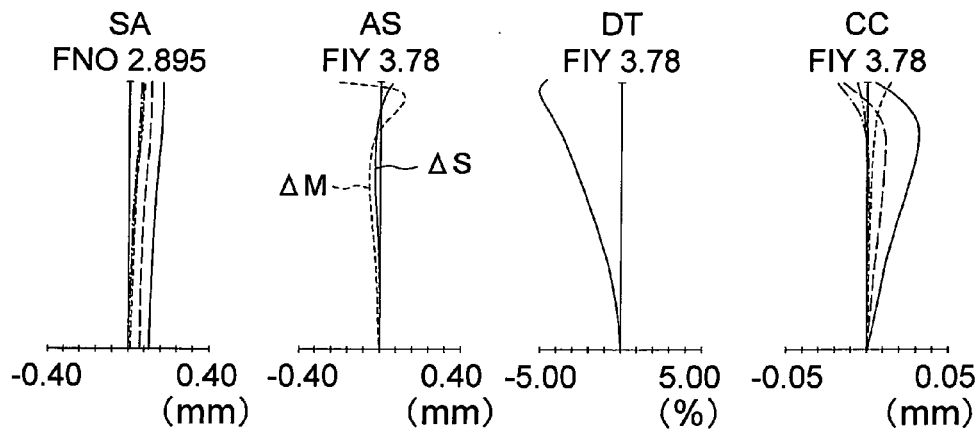
FIG. 36A, FIG. 36B, and FIG. 36C are diagrams showing a spherical aberration, an astigmatism, a distortion, and a chromatic aberration of magnification at the time of infinite object point focusing of the zoom lens according to the eighteenth embodiment, where.
Figure 36B:
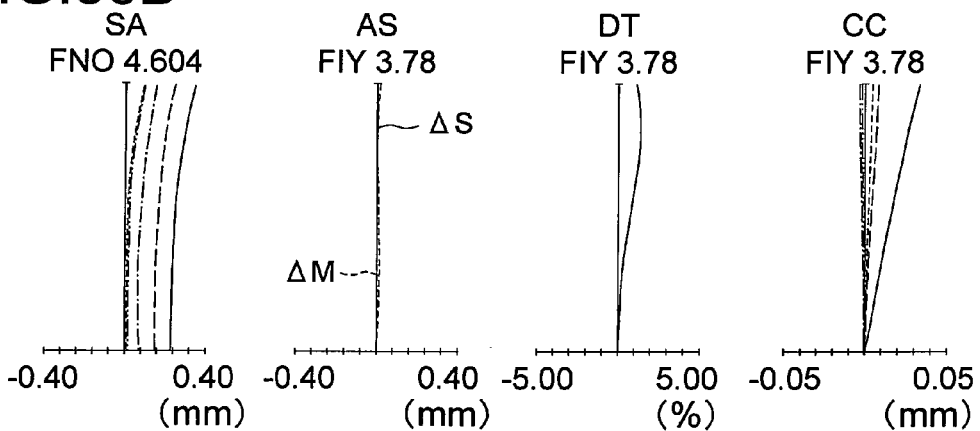
Figure 36C:
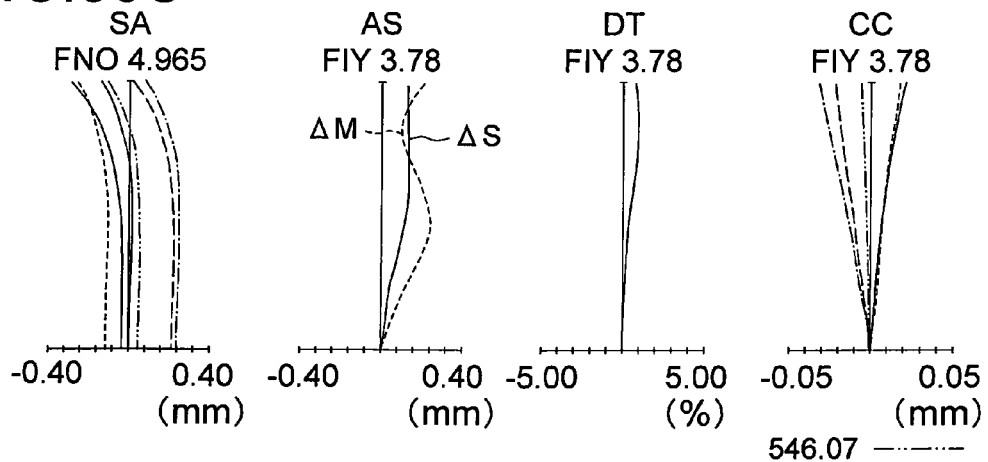

FIG. 36A, FIG. 36B, and FIG. 36C are diagrams showing a spherical aberration (SA), an astigmatism (AS), a distortion (DT), and a chromatic aberration of magnification (CC) at the time of infinite object point focusing of the zoom lens according to the eighteenth embodiment, where, FIG. 36A shows a state at the wide angle end, FIG. 36B shows an intermediate focal length state, and FIG. 36C shows a state at the telephoto end.

The zoom lens according to the eighteenth embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a cemented lens of a positive meniscus lens L1 (refractive optical element A) having a convex surface directed toward the object side, a negative meniscus lens L2 (optical element B) having a convex surface directed toward the object side, and a positive meniscus lens L3 having a convex surface directed toward the object side, and a positive meniscus lens L4 having a convex surface directed toward the object side, and has a positive refractive power as a whole. Here, a partial dispersion ratio θgF of the refractive optical element A of the cemented lens in the first lens group G1 is 0.817. Moreover, Abbe's number ($vd_A$) for the refractive optical element A is 16.99. Due to an aspheric surface effect, the positive meniscus lens L1 becomes a biconvex positive lens off axis, and the negative meniscus lens L2 becomes a biconcave negative lens off axis.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2 moves toward the image side. The third lens group G3 moves toward the object side. The fourth lens group G4 moves toward the object side. The fifth lens group G5 is fixed.

Next, embodiments from a nineteenth embodiment to a twenty second embodiment will be described below. In the embodiments from the nineteenth embodiment to the twenty second embodiment, the following arrangement and action are same. A zoom lens according to the nineteenth embodiment includes in order from an object side, a first lens group having a positive refractive power, a second lens group having a negative refractive power, an aperture stop, a third lens group having a positive refractive power, a fourth lens group having a positive refractive power, and a fifth lens group having a positive refractive power. The first lens group G1 has a negative lens (optical element B), the abovementioned refractive optical element A having a positive refractive power, and one positive lens. Correction of chromatic aberration at the telephoto end is carried out effectively by an arrangement of the refractive optical element A and the first lens group.

The second lens group includes a negative lens, a negative lens, a positive lens, and a negative lens. A high zoom ratio is achieved by an arrangement of the second lens group.

Moreover, in the zoom lens, zooming is carried out by changing distances between the adjacent lens groups such that, at the telephoto end, a distance between the first lens group G1 and the second lens group G2 becomes longer, a distance between the second lens group G2 and the third lens group G3 becomes shorter, and a distance between the third lens group G3 and the fourth lens group G4 becomes longer, as compared to the distances at the wide angle end.

Moreover, the fourth lens group G4 corrects a fluctuation of an image plane due to zooming, and at this time, a distance between the fourth lens group G4 and the fifth lens group G5 satisfies conditional expression (20).

Figure 37A:
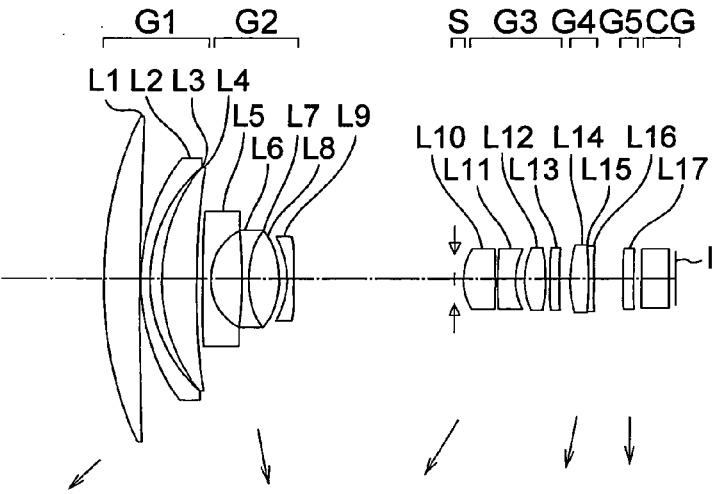
FIG. 37A, FIG. 37B, and FIG. 37C are cross-sectional views along an optical axis showing an optical arrangement at the time of infinite object point focusing of a zoom lens according to a nineteenth embodiment of the present invention, where.
Figure 37B:
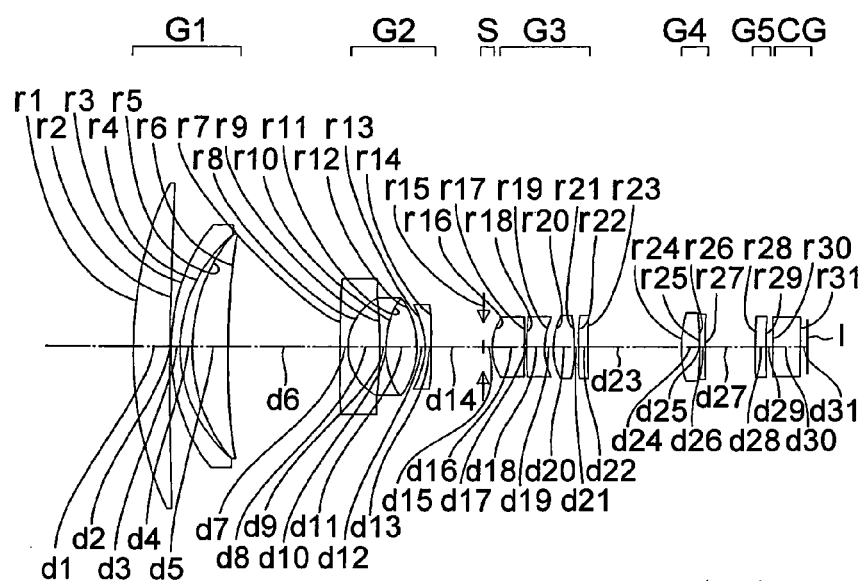
Figure 37C:
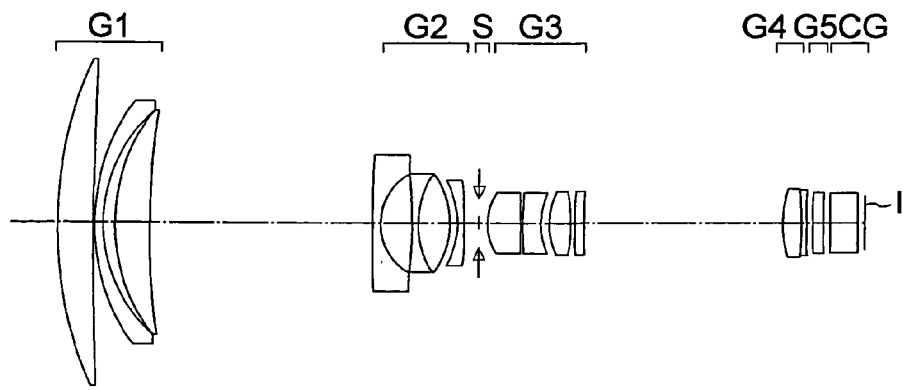

Firstly the zoom lens according to the nineteenth embodiment of the present invention will be described below. FIG. 37A, FIG. 37B, and FIG. 37C are cross-sectional views along an optical axis showing an optical arrangement at the time of infinite object point focusing of the zoom lens according to the nineteenth embodiment of the present invention, where, FIG. 37A shows a state at a wide angle end, FIG. 37B shows an intermediate focal length state, and FIG. 37C shows a state at a telephoto end.

Figure 38A:
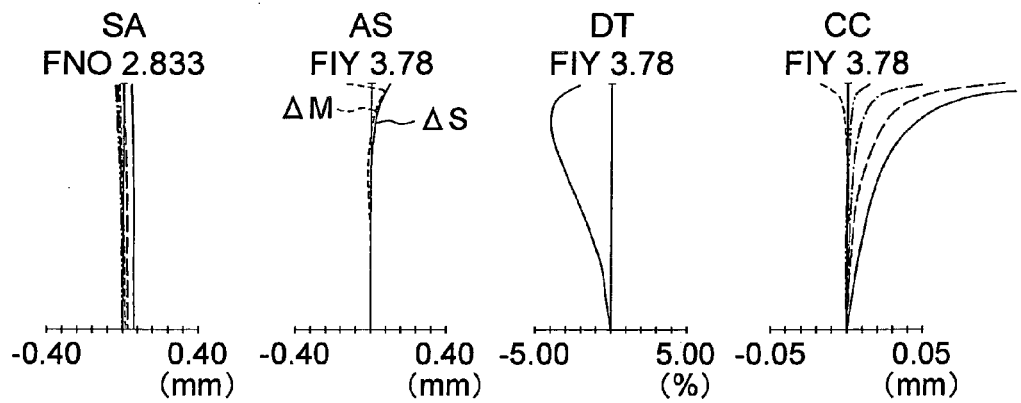
FIG. 38A, FIG. 38B, and FIG. 38C are diagrams showing a spherical aberration, an astigmatism, a distortion, and a chromatic aberration of magnification at the time of infinite object point focusing of the zoom lens according to the nineteenth embodiment, where.
Figure 38B:
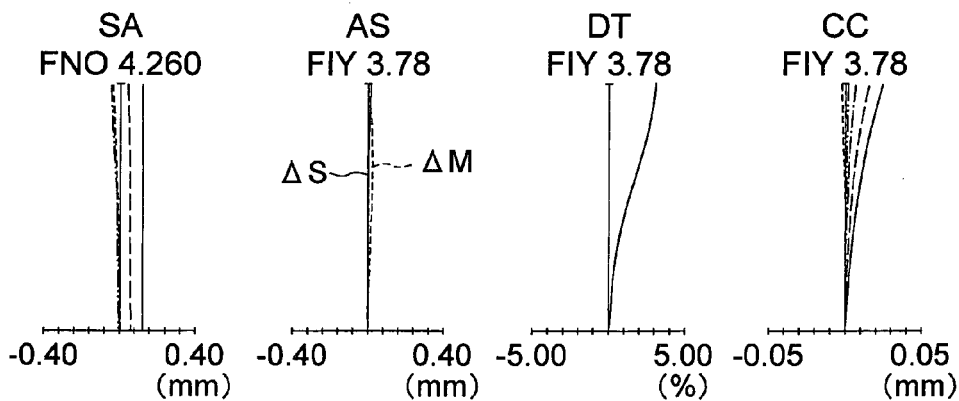
Figure 38C:
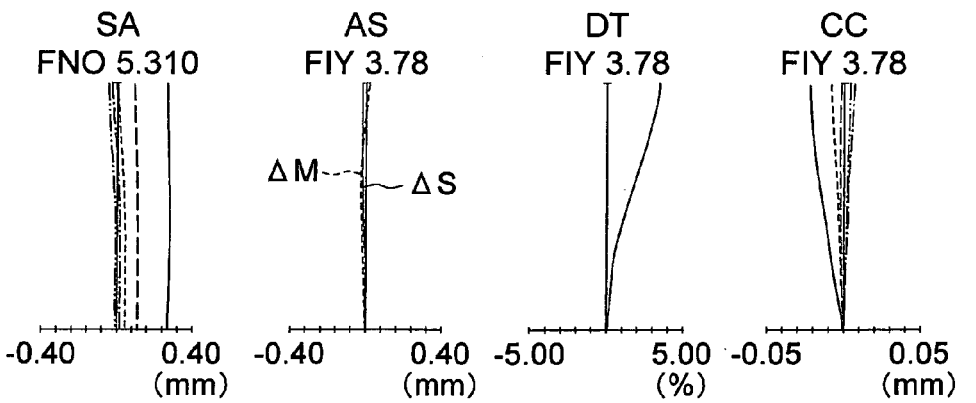

FIG. 38A, FIG. 38B, and FIG. 38C are diagrams showing a spherical aberration (SA), an astigmatism (AS), a distortion (DT), and a chromatic aberration of magnification (CC) at the time of infinite object point focusing of the zoom lens according to the nineteenth embodiment, where, FIG. 38A shows a state at the wide angle end, FIG. 38B shows an intermediate focal length state, and FIG. 38C shows a state at the telephoto end.

The zoom lens according to the nineteenth embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a positive meniscus lens L1 having a convex surface directed toward the object side, and a cemented lens of a negative meniscus lens L2 (optical element B) having a convex surface directed toward the object side, a positive meniscus lens L3 (refractive optical element A) having a convex surface directed toward the object side, and a positive meniscus lens L4 having a convex surface directed toward the object side, and has a positive refractive power as a whole. Here, a partial dispersion ratio θgF of the refractive optical element A of the cemented lens in the first lens group G1 is 0.668. Moreover, Abbe's number ($vd_A$) for the refractive optical element A is 23.38.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2, after moving toward the image side, moves toward the object side. The third lens group G3 moves toward the object side. The fourth lens group G4, after moving toward the object side, moves toward the image side. The fifth lens group G5 is fixed.

Figure 39A:
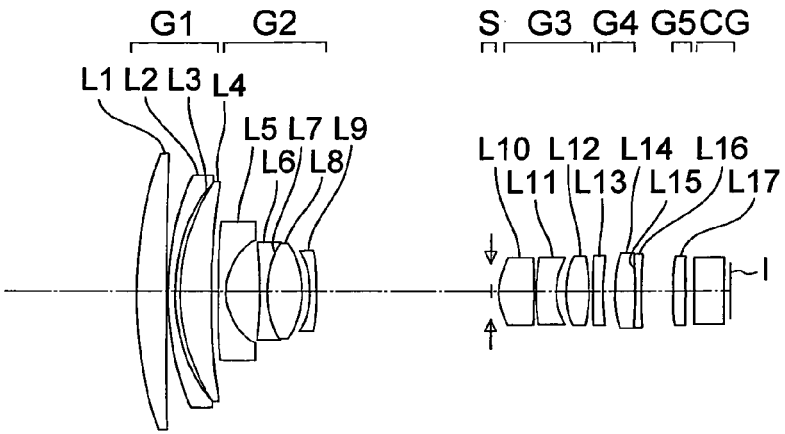
FIG. 39A, FIG. 39B, and FIG. 39C are cross-sectional views along an optical axis showing an optical arrangement at the time of infinite object point focusing of a zoom lens according to a twentieth embodiment of the present invention, where.
Figure 39B:
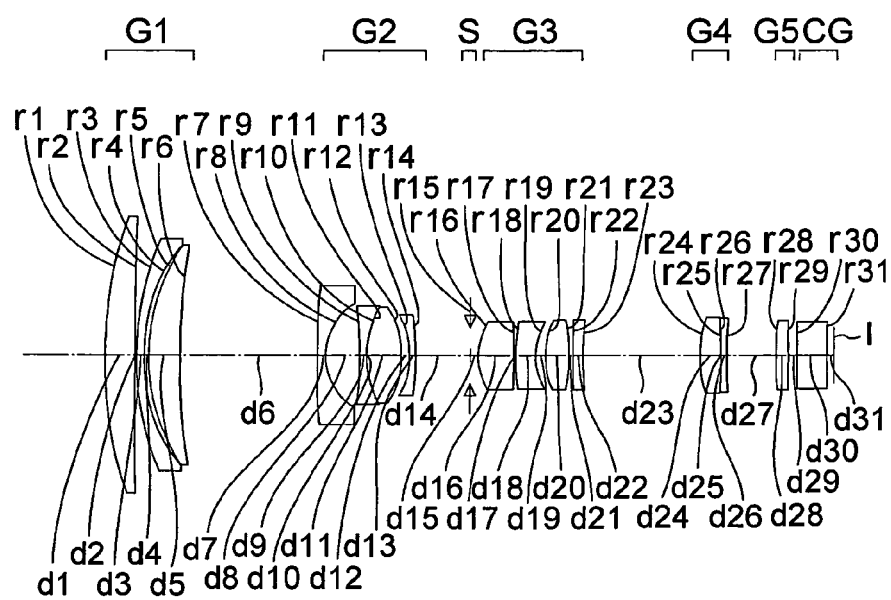
Figure 39C:
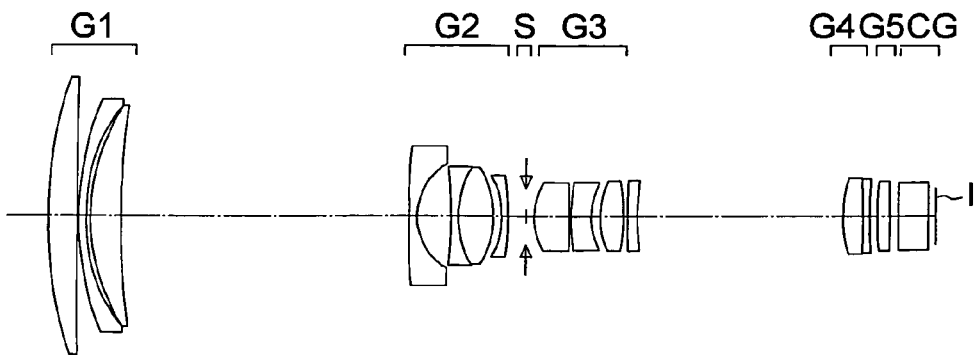

Next, a zoom lens according to a twentieth embodiment of the present invention will be described below. FIG. 39A, FIG. 39B, and FIG. 39C are cross-sectional views along an optical axis showing an optical arrangement at the time of infinite object point focusing of the zoom lens according to the twentieth embodiment of the present invention, where, FIG. 39A shows a state at a wide angle end, FIG. 39B shows an intermediate focal length state, and FIG. 39C shows a state at a telephoto end.

Figure 40A:
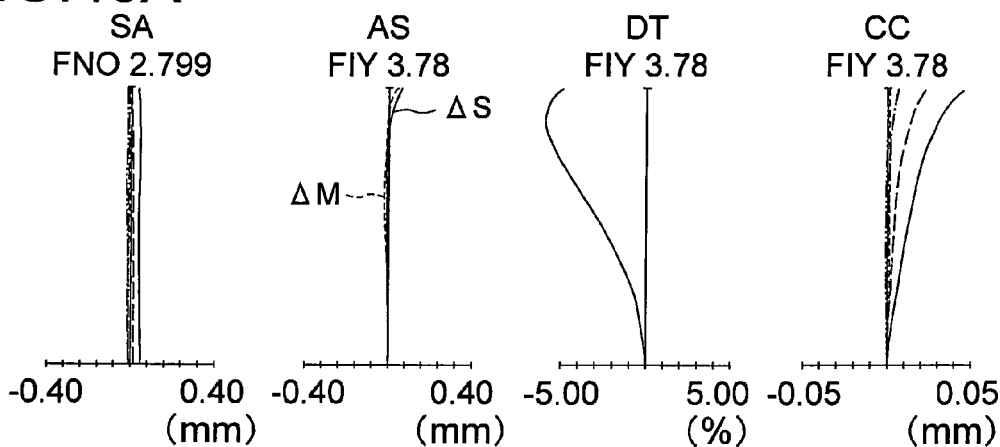
FIG. 40A, FIG. 40B, and FIG. 40C are diagrams showing a spherical aberration, an astigmatism, a distortion, and a chromatic aberration of magnification at the time of infinite object point focusing of the zoom lens according to the twentieth embodiment, where.
Figure 40B:
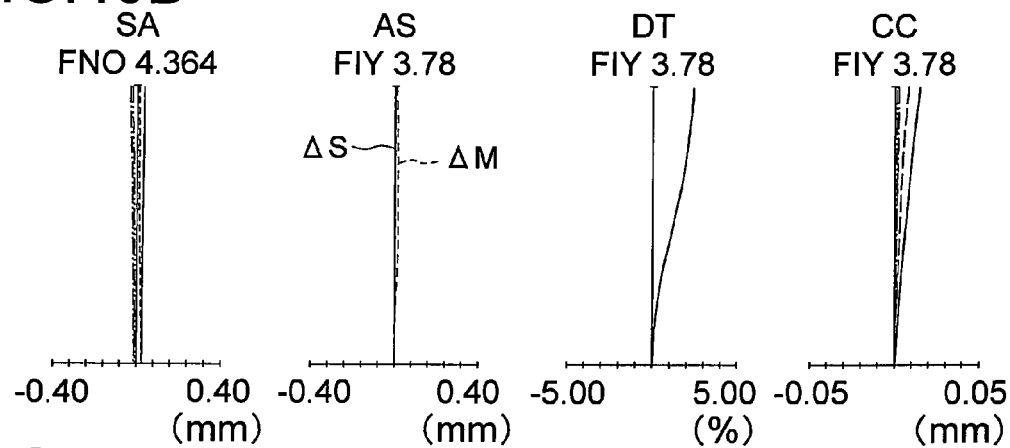
Figure 40C:
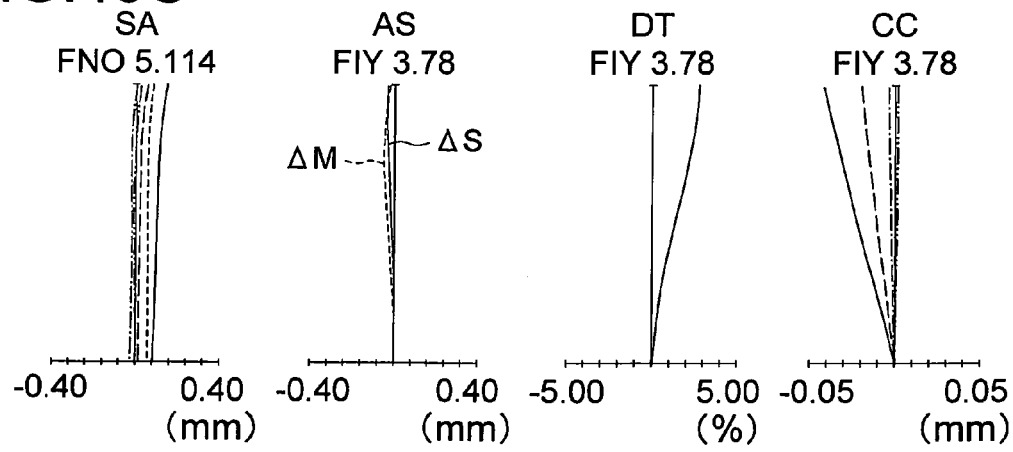

FIG. 40A, FIG. 40B, and FIG. 40C are diagrams showing a spherical aberration (SA), an astigmatism (AS), a distortion (DT), and a chromatic aberration of magnification (CC) at the time of infinite object point focusing of the zoom lens according to the twentieth embodiment, where, FIG. 40A shows a state at the wide angle end, FIG. 40B shows an intermediate focal length state, and FIG. 40C shows a state at the telephoto end.

The zoom lens according to the twentieth embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order form the object side, a positive meniscus lens L1 having a convex surface directed toward the object side, and a cemented lens of a negative meniscus lens L2 (optical element B) having a convex surface directed toward the object side, a positive meniscus lens L3 (refractive optical element A) having a convex surface directed toward the object side, and a positive meniscus lens L4 having a convex surface directed toward the object side, and has a positive refractive power as a whole. Here, a partial dispersion ratio θgF of the refractive optical element A of the cemented lens in the first lens group G1 is 0.668. Moreover, Abbe's number $(vd_A)$ for the refractive optical element A is 23.38.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2 moves toward the object side. The third lens group G3 moves toward the object side. The fourth lens group G4, after moving toward the object side, moves toward the image side. Fifth lens group G5 is fixed.

Figure 41A:
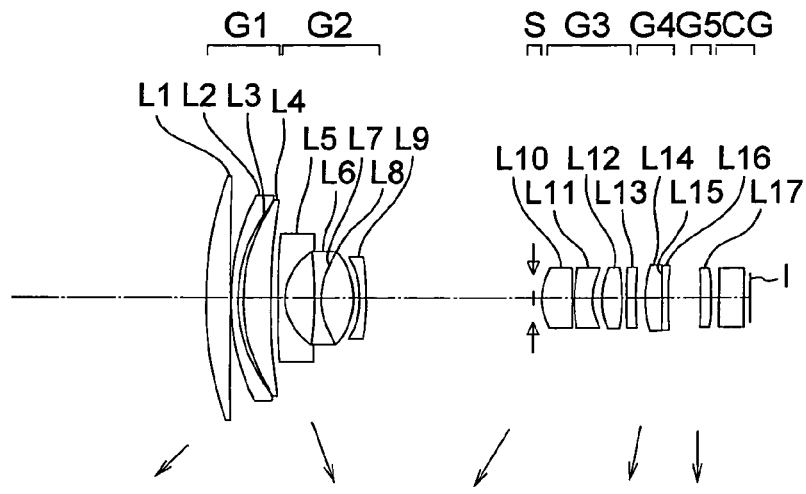
FIG. 41A, FIG. 41B, and FIG. 41C are cross-sectional views along an optical axis showing an optical arrangement at the time of infinite object point focusing of a zoom lens according to a twenty first embodiment of the present invention, where.
Figure 41B:
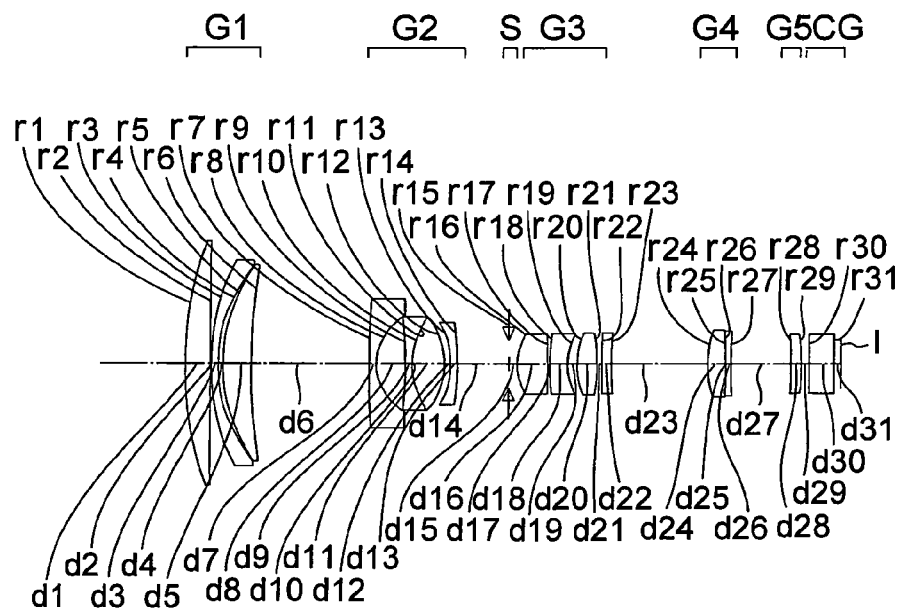
Figure 41C:
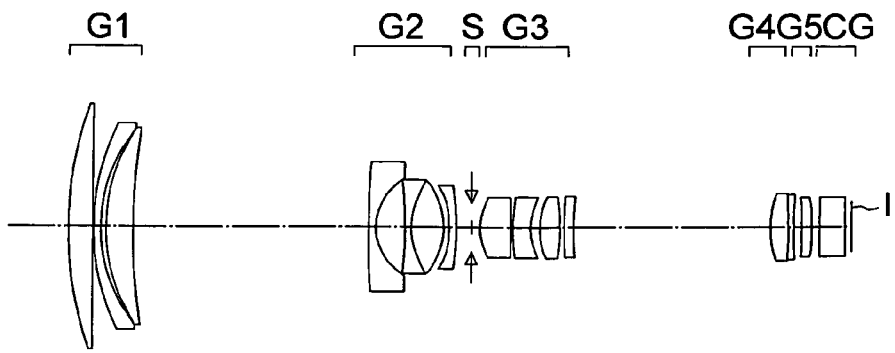

Next, a zoom lens according to a twenty first embodiment of the present invention will be described below. FIG. 41A, FIG. 41B, and FIG. 41C are cross-sectional views along an optical axis showing an optical arrangement at the time of infinite object point focusing of the zoom lens according to the twenty first embodiment of the present invention, where, FIG. 41A shows a state at a wide angle end, FIG. 41B shows an intermediate focal length state, and FIG. 41C shows a state at a telephoto end.

Figure 42A:
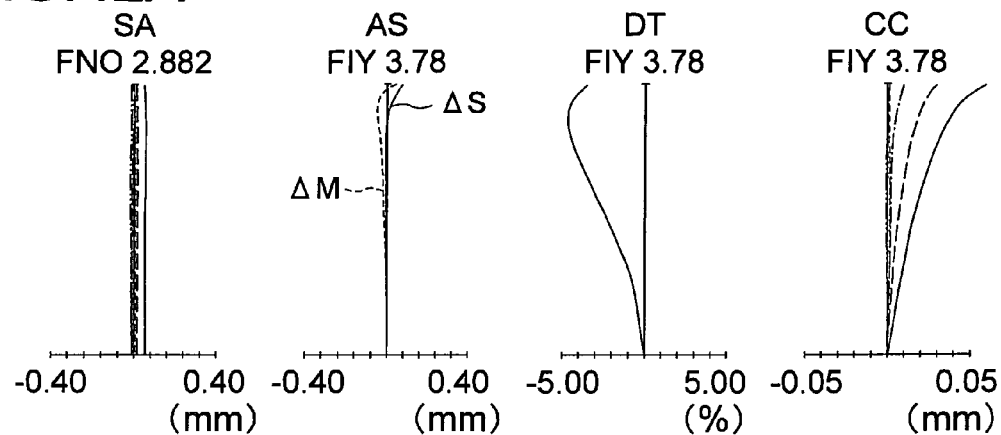
FIG. 42A, FIG. 42B, and FIG. 42C are diagrams showing a spherical aberration, an astigmatism, a distortion, and a chromatic aberration of magnification at the time of infinite object point focusing of the zoom lens according to the twenty first embodiment, where.
Figure 42B:
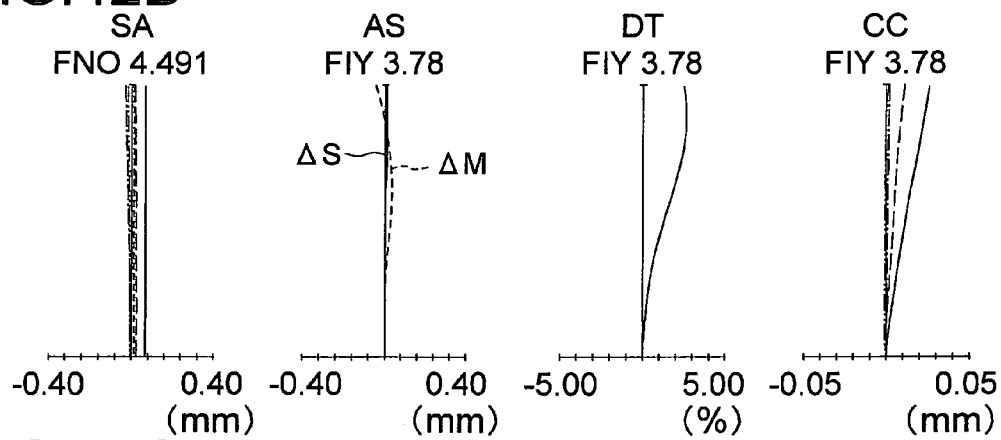
Figure 42C:
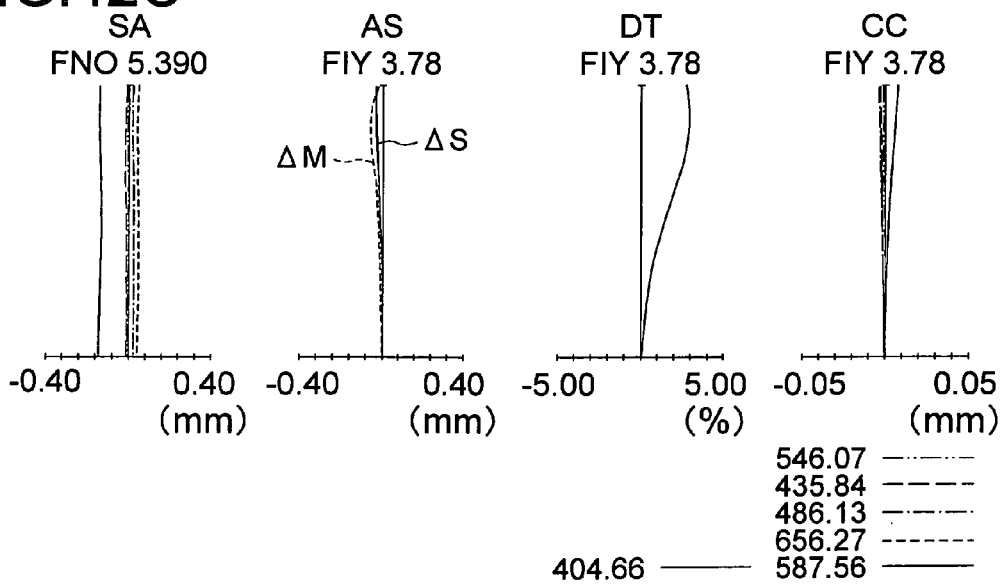

FIG. 42A, FIG. 42B, and FIG. 42C are diagrams showing a spherical aberration (SA), an astigmatism (AS), a distortion (DT), and a chromatic aberration of magnification (CC) at the time of infinite object point focusing of the zoom lens according to the twenty first embodiment, where, FIG. 42A shows a state at the wide angle end, FIG. 42B shows an intermediate focal length state, and FIG. 42C shows a state at the telephoto end.

The zoom lens according to the twenty first embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a positive meniscus lens L1 having a convex surface directed toward the object side, and a cemented lens of a negative meniscus lens L2 (optical element B) having a convex surface directed toward the object side, a positive meniscus lens L3 (refractive optical element A) having a convex surface directed toward the object side, and a positive meniscus lens L4 having a convex surface directed toward the object side, and has a positive refractive power as a whole. Here, a partial dispersion ratio θgF of the refractive optical element A of the cemented lens in the first lens group G1 is 0.761. Moreover, Abbe's number $(vd_A)$ for the refractive optical element A is 17.01.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2, after moving toward the image side, moves toward the object side. The third lens group G3 moves toward the object side. The fourth lens group G4, after moving toward the object side, moves toward the image side. The fifth lens group G5 is fixed.

Figure 43A:
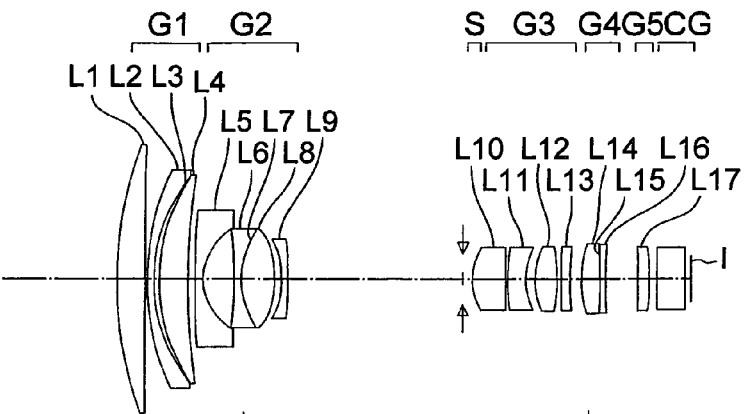
FIG. 43A, FIG. 43B, and FIG. 43C are cross-sectional views along an optical axis showing an optical arrangement at the time of infinite object point focusing of a zoom lens according to a twenty second embodiment of the present invention, where.
Figure 43B:
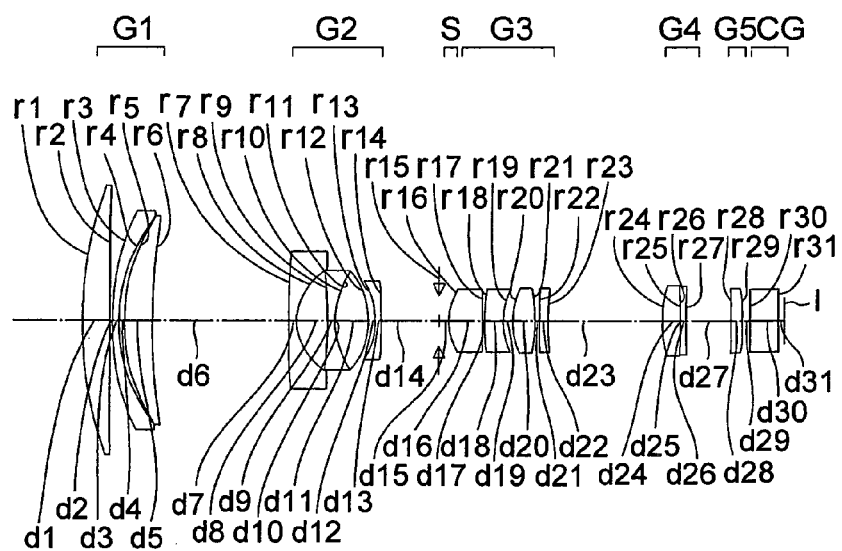
Figure 43C:
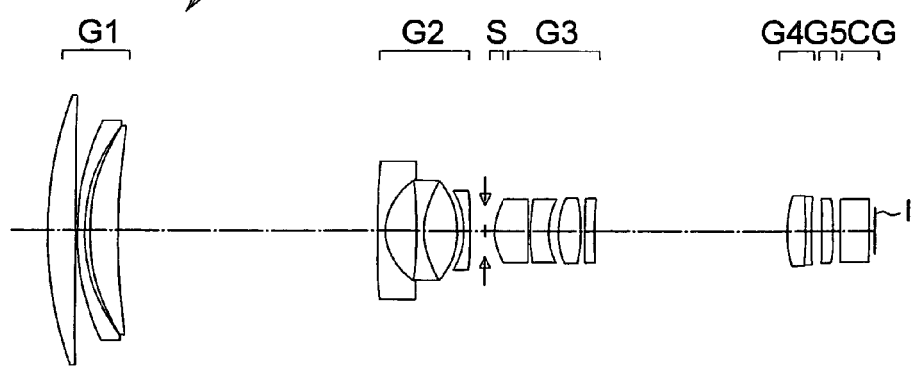

Next, a zoom lens according to the twenty second embodiment of the present invention will be described below. FIG. 43A, FIG. 43B, and FIG. 43C are cross-sectional views along an optical axis showing an optical arrangement at the time of infinite object point focusing of the zoom lens according to the twenty second embodiment of the present invention, where, FIG. 43A shows a state at a wide angle end, FIG. 43B shows an intermediate focal length state, and FIG. 43C shows a state at a telephoto end.

Figure 44A:
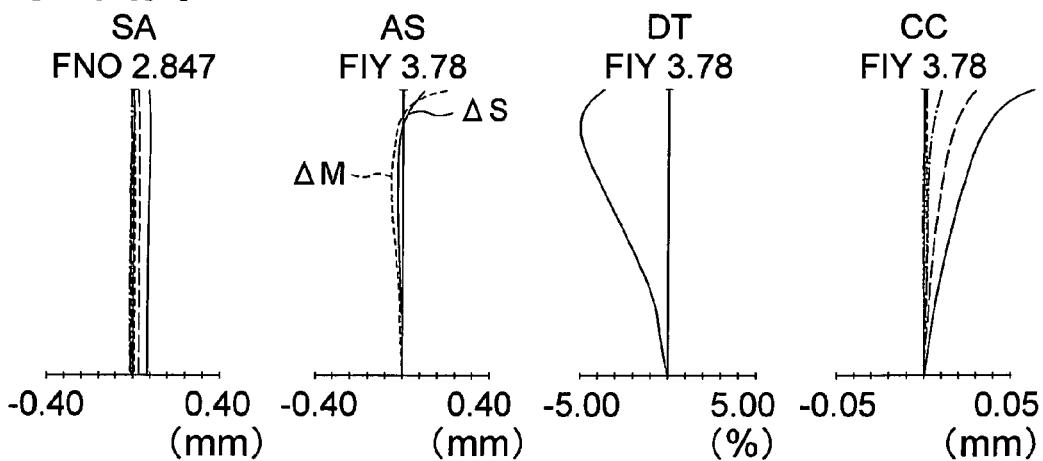
FIG. 44A, FIG. 44B, and FIG. 44C are diagrams showing a spherical aberration, an astigmatism, a distortion, and a chromatic aberration of magnification at the time of infinite object point focusing of the zoom lens according to the twenty second embodiment, where.
Figure 44B:
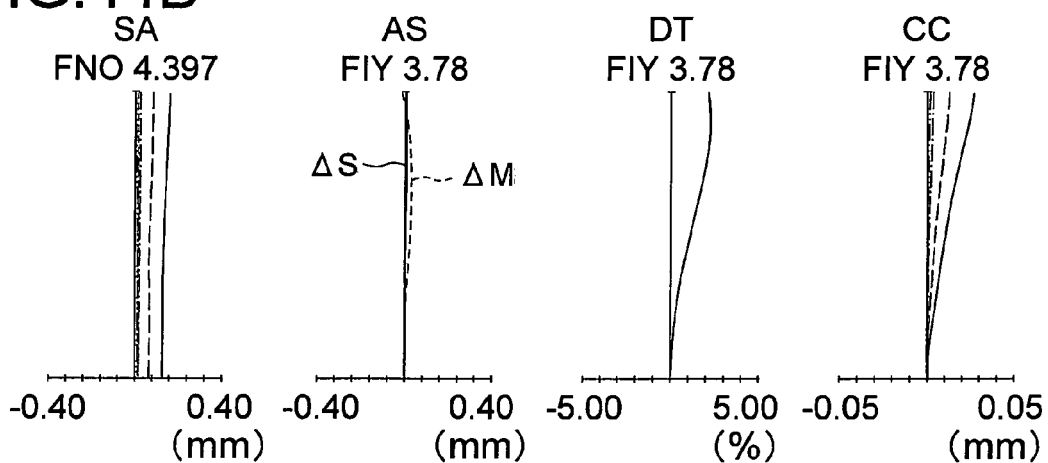
Figure 44C:
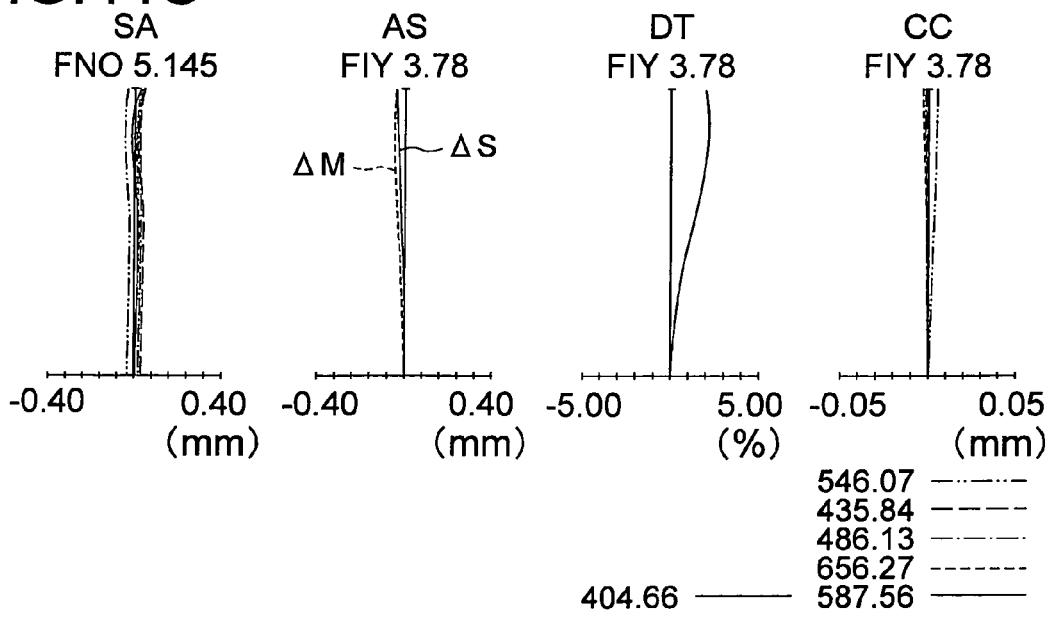

FIG. 44A, FIG. 44B, and FIG. 44C are diagrams showing a spherical aberration (SA), an astigmatism (AS), a distortion (DT), and a chromatic aberration of magnification (CC) at the time of infinite object point focusing of the zoom lens according to the twenty second embodiment, where, FIG. 44A shows a state at the wide angle end, FIG. 44B shows an intermediate focal length state, and FIG. 44C shows a state at the telephoto end.

The zoom lens according to the twenty second embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes in order from the object side, a positive meniscus lens L1 having a convex surface directed toward the object side, and a cemented lens of a negative meniscus lens L2 (optical element B) having a convex surface directed toward the object side, a positive meniscus lens L3 (refractive optical element A) having a convex surface directed toward the object side, and a positive meniscus lens L4 having a convex surface directed toward the object side, and has a positive refractive power as a whole. Here, a partial dispersion ratio θgF of the refractive optical element A of the cemented lens in the first lens group G1 is 0.817. Moreover, Abbe's number ($vd_A$) for the refractive optical element A is 16.99.

The second lens group G2 includes a negative meniscus lens L5 having a convex surface directed toward the object side, a cemented lens of a biconcave negative lens L6, a cemented layer L7, and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14, a cemented layer L15, and a biconcave negative lens L16, and has a positive refractive power as a whole.

The fifth lens group G5 includes a biconvex positive lens L17, and has a positive refractive power as a whole.

At the time of zooming from the wide angle end to the telephoto end, the first lens group G1 moves toward the object side. The second lens group G2, after moving toward the image side, moves slightly and assumes almost a fixed state. The third lens group G3 moves toward the object side. The fourth lens group G4, after moving toward the object side, moves toward the image side. The fifth lens group G5 is fixed.

Figure 45A:
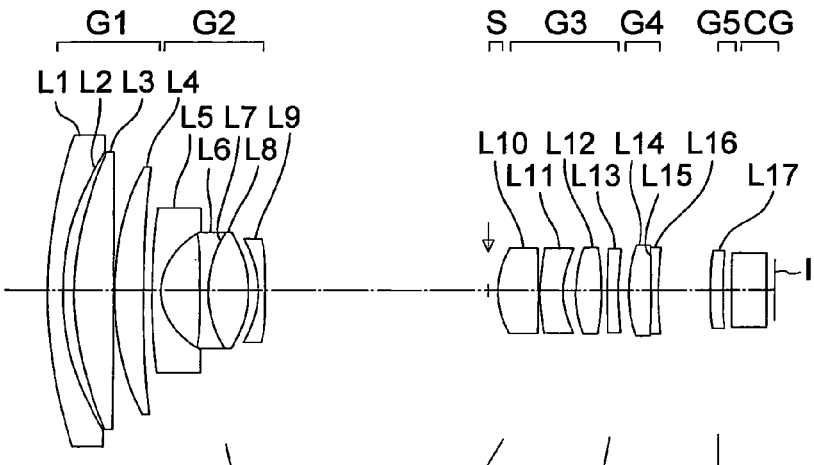
FIG. 45A, FIG. 45B, and FIG. 45C are cross-sectional views along an optical axis showing an optical arrangement at the time of infinite object point focusing of a zoom lens according to a twenty third embodiment of the present invention, where.
Figure 45B:
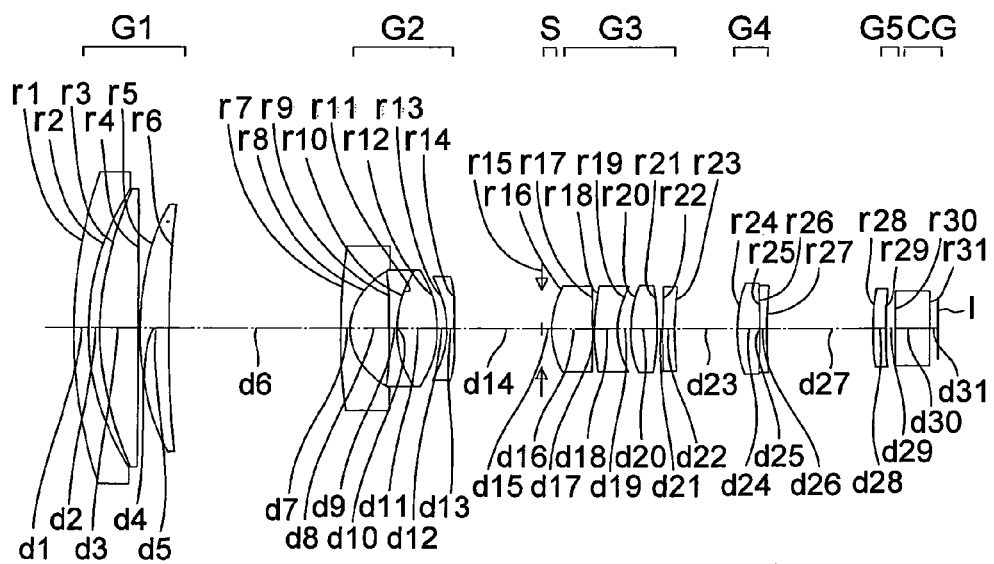
Figure 45C:
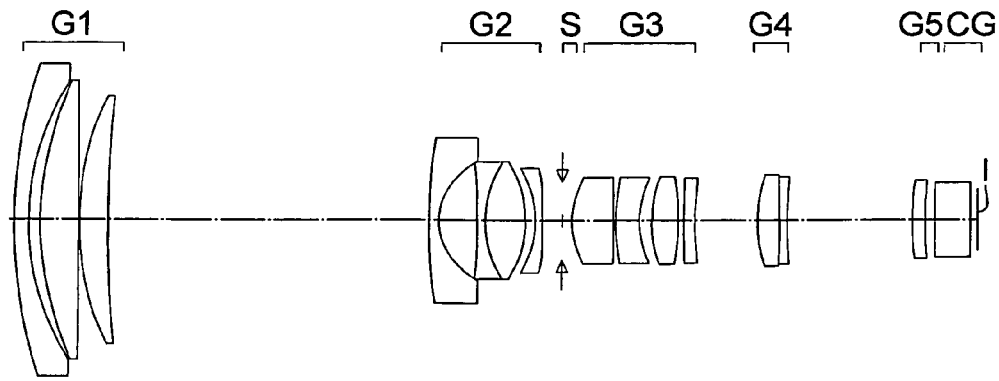

Next, a zoom lens according to a twenty third embodiment of the present invention will be described below. FIG. 45A, FIG. 45B, and FIG. 45C are cross-sectional views along an optical axis showing an optical arrangement at the time of infinite object point focusing of the zoom lens according to the twenty third embodiment of the present invention, where, FIG. 45A shows a state at a wide angle end, FIG. 45B shows an intermediate focal length state, and FIG. 45C shows a state at a telephoto end.

Figure 46A:
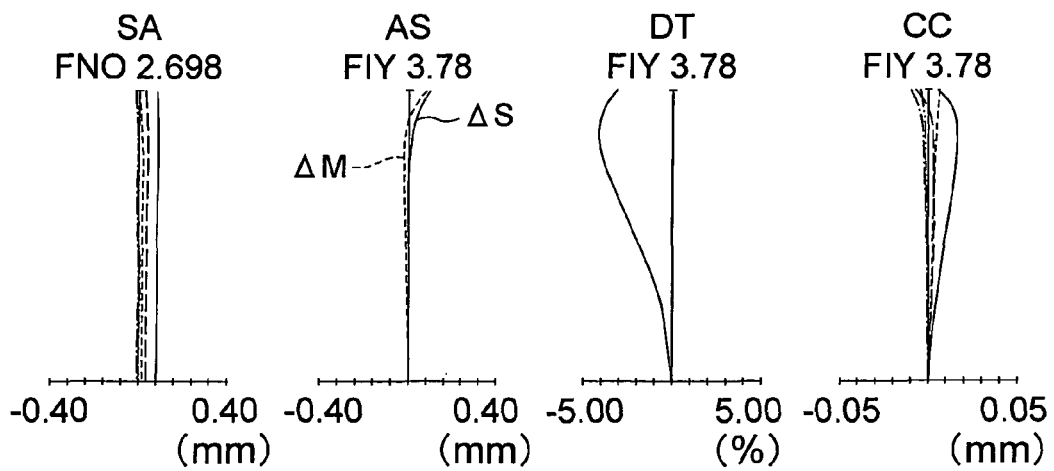
FIG. 46A, FIG. 46B, and FIG. 46C are diagrams showing a spherical aberration, an astigmatism, a distortion, and a chromatic aberration of magnification at the time of infinite object point focusing of the zoom lens according to the twenty third embodiment, where.
Figure 46B:
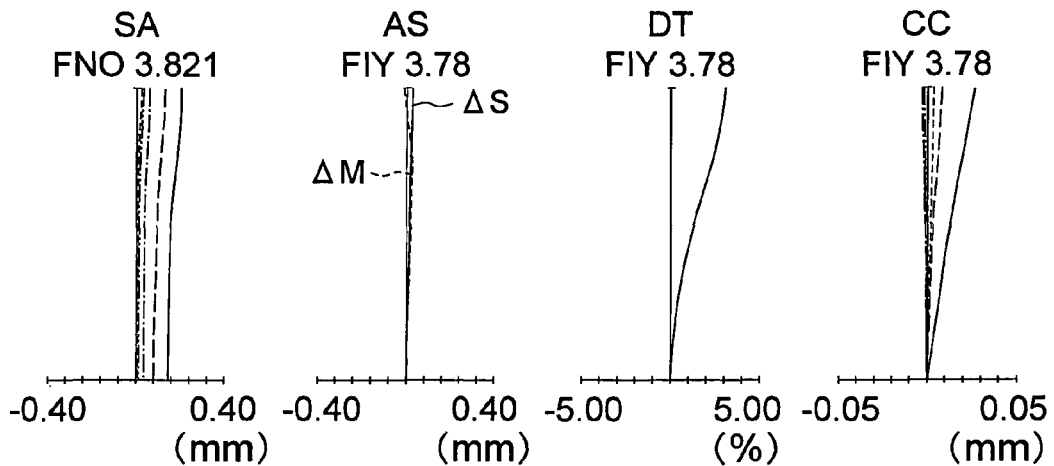
Figure 46C:
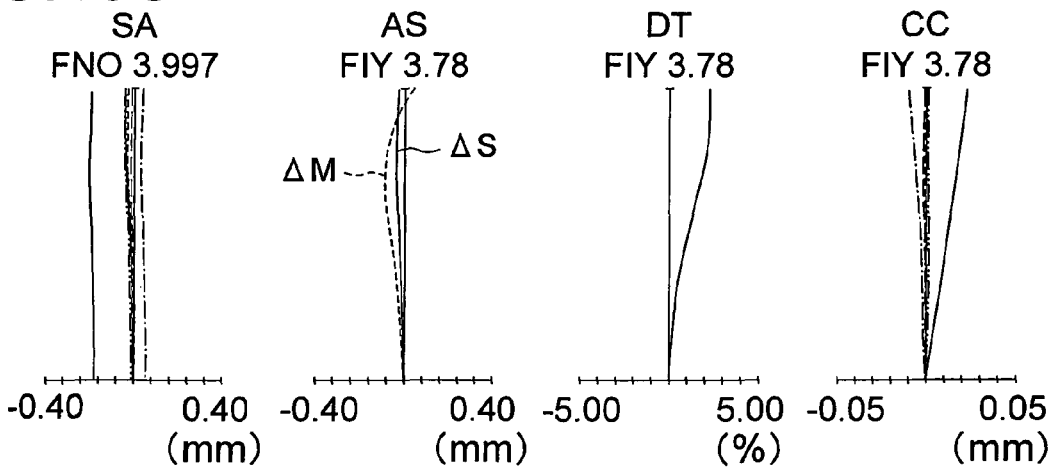

FIG. 46A, FIG. 46B, and FIG. 46C are diagrams showing a spherical aberration (SA), an astigmatism (AS), a distortion (DT), and a chromatic aberration of magnification (CC) at the time of infinite object point focusing of the zoom lens according to the twenty third embodiment, where, FIG. 46A shows a state at the wide angle end, FIG. 46B shows an intermediate focal length state, and FIG. 46C shows a state at the telephoto end.

The zoom lens according to the twenty third embodiment, as shown in Fig. FIG. 45A, FIG. 45B, and FIG. 45C, includes in order from an object side, a first lens group G1, a second lens group G2, an aperture stop S, a third lens group G3, a fourth lens group G4, and a fifth lens group G5.

The first lens group G1 includes in order from the object side, a cemented lens of a negative meniscus lens L1 (optical element B) having a convex surface directed toward the object side, a positive meniscus lens L2 (refractive optical element A) having a convex surface directed toward the object side, and a positive meniscus lens L3 (optical element C) having a convex surface directed toward the object side, and a positive meniscus lens L4 having a convex surface directed toward the object side, and has a positive refractive power as a whole. Here, a partial dispersion ratio ($θgF_A$) of the refractive optical element A of the cemented lens in the first lens group G1 is 0.817. Moreover, Abbe's number ($vd_A$) for the refractive optical element A is 23.36.

The second lens group G2 includes in order from the object side, a negative meniscus lens L5 having a convex surface directed toward the object side, a cemented lens of a biconcave negative lens L6 and a biconvex positive lens L8, and a negative meniscus lens L9 having a convex surface directed toward an image side, and has a negative refractive power as a whole. L7 is a cemented surface.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14 and a biconcave negative lens L16 in order from the object side, and has a positive refractive power as a whole. L15 is a cemented surface.

The fifth lens group G5 includes in order from the object side, a biconvex positive lens L17, and has a positive refractive power as a whole.

At the time of zooming from the wide angle end to the telephoto end, the first lens group G1 moves toward the object side. The second lens group G2 moves toward the image side. The third lens group G3 moves toward the object side. The fourth lens group G4 moves toward the object side. The fifth lens group G5 is fixed. The aperture stop S moves together with the third lens group G3.

An aspheric surface is provided to six surfaces namely, a surface on the image side of the negative meniscus lens L9 on the image side in the second lens group G1, a surface on the object side of the biconvex positive lens L10 on the object side and both surfaces of the negative meniscus lens L13 on the image side in the third lens group G3, and both surfaces of the biconvex positive lens L17 in the fifth lens group G5.

A zoom lens in each of embodiments from a twenty fourth embodiment to a twenty ninth embodiment includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power. The first lens group G1 has one positive lens, a negative lens (optical element B), the abovementioned refractive optical element A having a positive refractive power, and a positive lens (optical element C) having a positive refractive power. Correction of chromatic aberration at the telephoto end is carried out effectively by an arrangement of the refractive optical element A and the first lens group G1.

The second lens group G2 includes a negative lens, a negative lens, a positive lens, and a negative lens. A high zoom ratio is achieved by an arrangement of the second lens group G2.

Zooming is carried out by changing distances between the adjacent lens groups such that, at the telephoto end, a distance between the first lens group G1 and the second lens group G2 becomes longer, a distance between the second lens group G2 and the third lens group G3 becomes shorter, and a distance between the third lens group G3 and the fourth lens group G4 becomes longer, as compared to the distances at the wide angle end.

Moreover, the fourth lens group G4 corrects an image-plane fluctuation due to zooming, and at this time, a distance between the fourth lens group G4 and the fifth lens group G5 satisfies conditional expression (20).

Figure 47A:
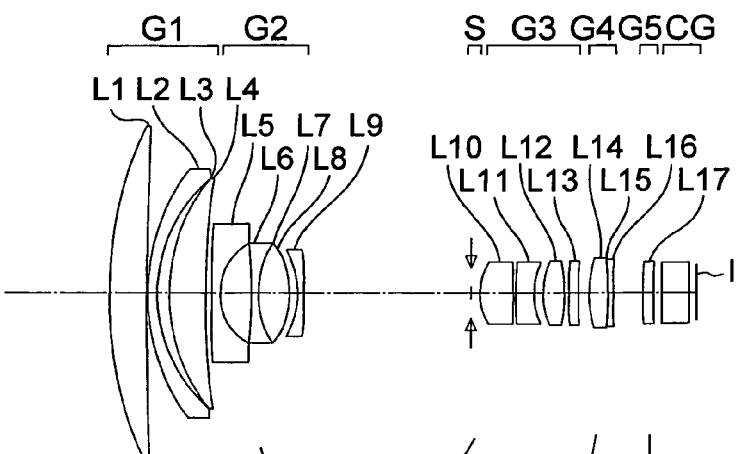
FIG. 47A, FIG. 47B, and FIG. 47C are cross-sectional views along an optical axis showing an optical arrangement at the time of infinite object point focusing of a zoom lens according to a twenty fourth embodiment of the present invention, where.
Figure 47B:
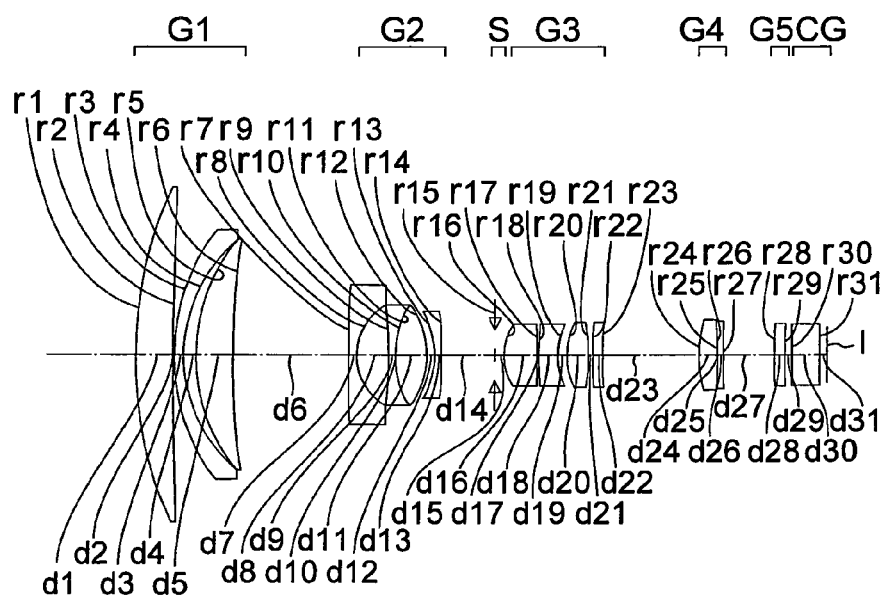
Figure 47C:
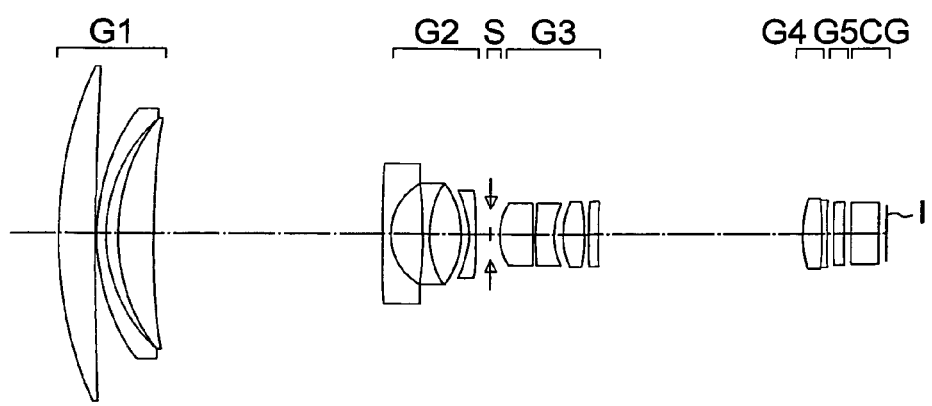

Next, a zoom lens according to the twenty fourth embodiment of the present invention will be described below. FIG. 47A, FIG. 47B, and FIG. 47C are cross-sectional views along an optical axis showing an optical arrangement at the time of infinite object point focusing of the zoom lens according to the twenty fourth embodiment of the present invention, where, FIG. 47A shows a state at a wide angle end, FIG. 47B shows an intermediate focal length state, and FIG. 47C shows a state at a telephoto end.

Figure 48A:
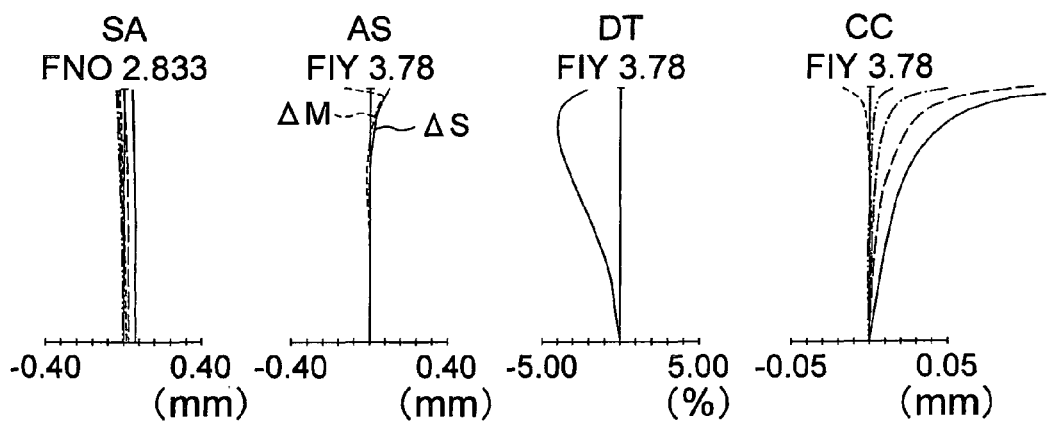
FIG. 48A, FIG. 48B, and FIG. 48C are diagrams showing a spherical aberration, an astigmatism, a distortion, and a chromatic aberration of magnification at the time of infinite object point focusing of the zoom lens according to the twenty fourth embodiment, where.
Figure 48B:
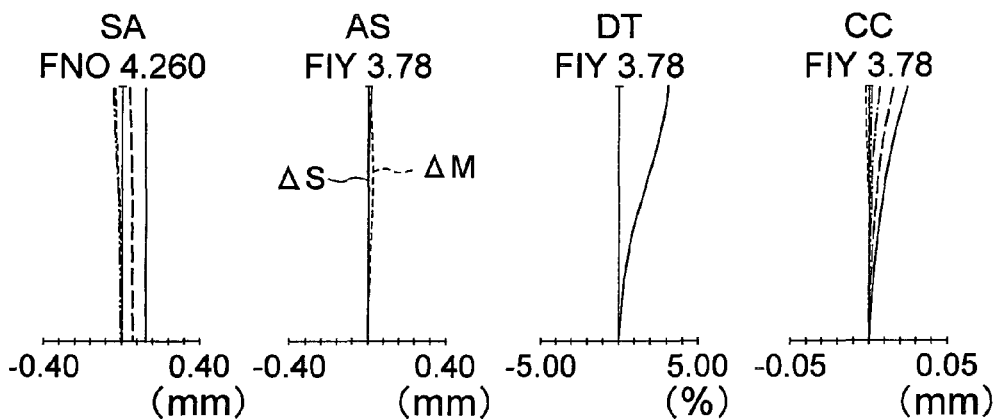
Figure 48C:
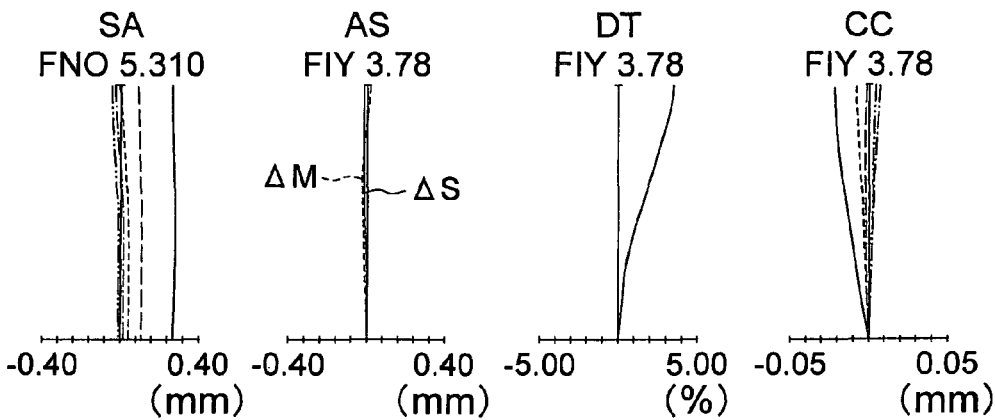

FIG. 48A, FIG. 48B, and FIG. 48C are diagrams showing a spherical aberration, an astigmatism, a distortion, and a chromatic aberration of magnification, at the time of infinite object point focusing of the zoom lens according to the twenty fourth embodiment, where, FIG. 48A shows a state at the wide angle end, FIG. 48B shows an intermediate focal length state, and FIG. 48C shows a state at the telephoto end.

The zoom lens according to the twenty fourth embodiment, as shown in FIG. 47A, FIG. 47B, and FIG. 47C, includes in order from an object side, a first lens group G1, a second lens group G2, an aperture stop S, a third lens group G3, a fourth lens group G4, and a fifth lens group G5.

The first lens group G1 includes in order from the object side, a positive meniscus lens L1 having a convex surface directed toward the object side, and a cemented lens of a negative meniscus lens L2 (optical element B) having a convex surface directed toward the object side, a positive meniscus lens L3 (refractive optical element A) having a convex surface directed toward the object side, and a positive meniscus lens L4 (optical element C) having a convex surface directed toward the object side, and has a positive refractive power as a whole. Here, a partial dispersion ratio ($\theta gF_A$) of the refractive optical element A of the cemented lens in the first lens group G1 is 0.668. Moreover, Abbe's number ($vd_A$) for the refractive optical element A is 23.38.

The second lens group G2 includes in order from the object side, a negative meniscus lens L5 having a convex surface directed toward the object side, a cemented lens of a biconcave negative lens L6 and a biconvex positive lens L8, and a negative meniscus lens L9 having a convex surface directed toward an image side, and has a negative refractive power as a whole. L7 is a cemented surface.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14 and a biconcave negative lens L16 in order from the object side, and has a positive refractive power. L15 is a cemented surface.

The fifth lens group G5 includes in order from the object side, a biconvex positive lens L17, and has a positive refractive power as a whole.

At the time of zooming from the wide angle end to the telephoto end, the first lens group G1 moves toward the object side. The second lens group G2, after moving toward the image side, moves toward the object side. The third lens group G3 moves toward the object side. The fourth lens group G4, after moving toward the object side, moves toward the image side. The fifth lens group G5 is fixed. The aperture stop S moves together with the third lens group G3.

An aspheric surface is provided to six surfaces namely, a surface on the image side of the negative meniscus lens L9 on the image side in the second lens group G2, a surface on the object side of the biconvex positive lens L10 on the object side and both surfaces of the negative meniscus lens L13 on the image side in the third lens group G3, and both surfaces of the biconvex positive lens L17 in the fifth lens group G5.

Figure 49A:
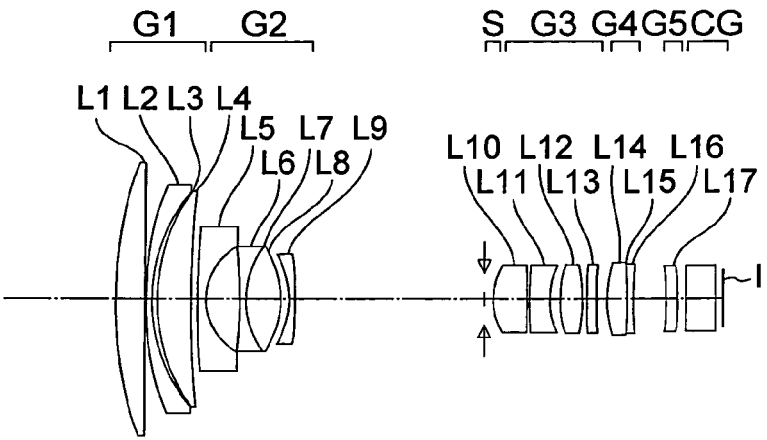
FIG. 49A, FIG. 49B, and FIG. 49C are cross-sectional views along an optical axis showing an optical arrangement at the time of infinite object point focusing of a zoom lens according to a twenty fifth embodiment of the present invention, where.
Figure 49B:
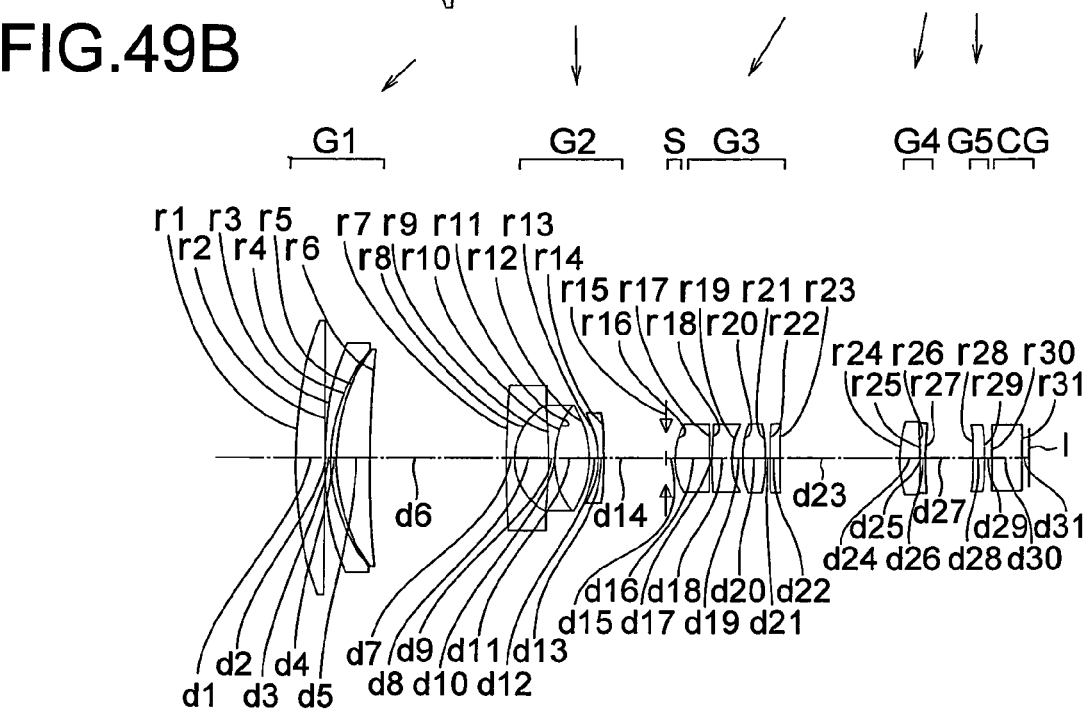
Figure 49C:
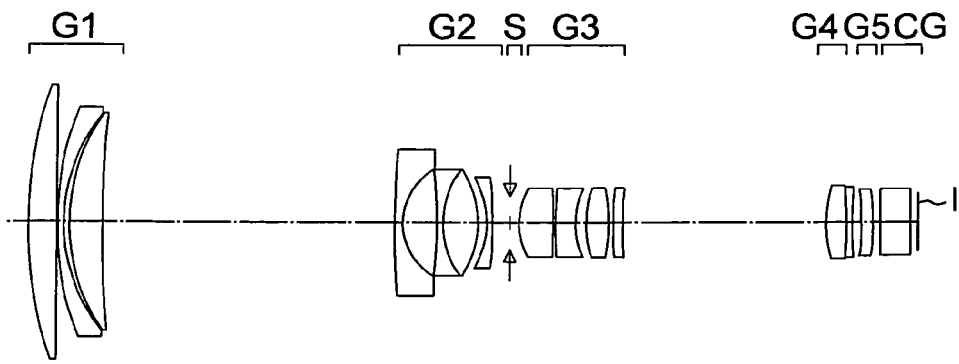

Next, a zoom lens according to a twenty fifth embodiment of the present invention will be described below. FIG. 49A, FIG. 49B, and FIG. 49C are cross-sectional views along an optical axis showing an optical arrangement at the time of infinite object point focusing of the zoom lens according to the twenty fifth embodiment of the present invention, where, FIG. 49A shows a state at a wide angle end, FIG. 49B shows an intermediate focal length state, and FIG. 49C shows a state at a telephoto end.

Figure 50A:
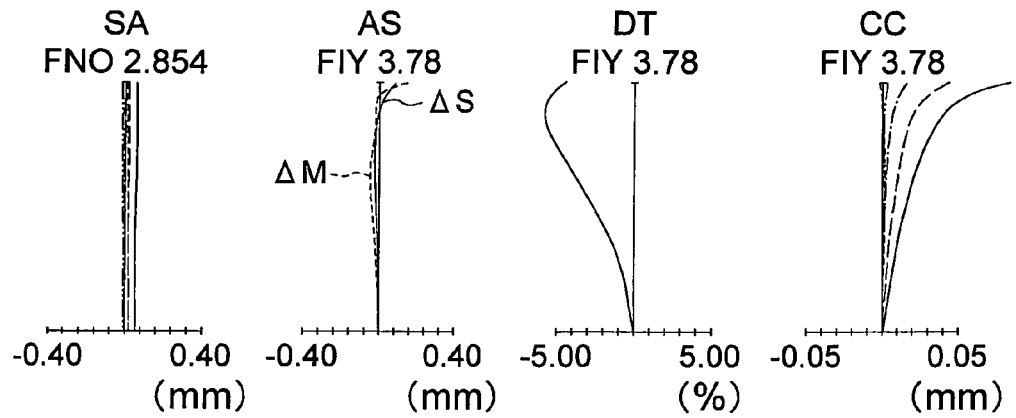
FIG. 50A, FIG. 50B, and FIG. 50C are diagrams showing a spherical aberration, an astigmatism, a distortion, and a chromatic aberration of magnification at the time of infinite object point focusing of the zoom lens according to the twenty fifth embodiment, where.
Figure 50B:
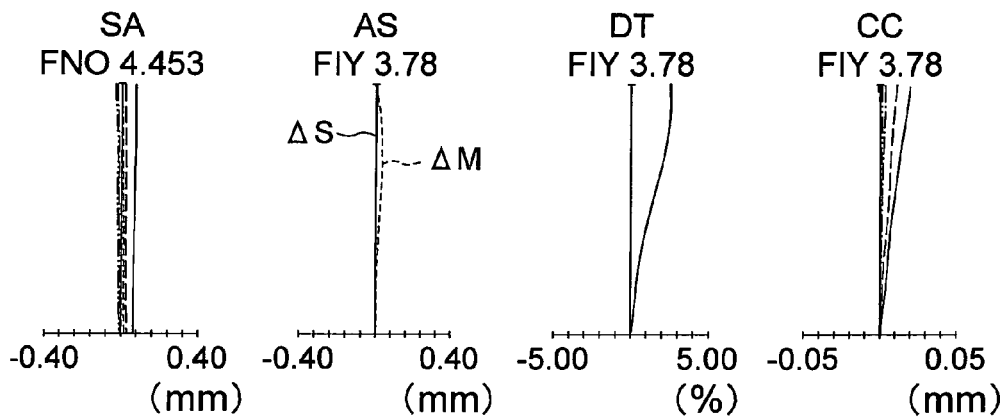
Figure 50C:
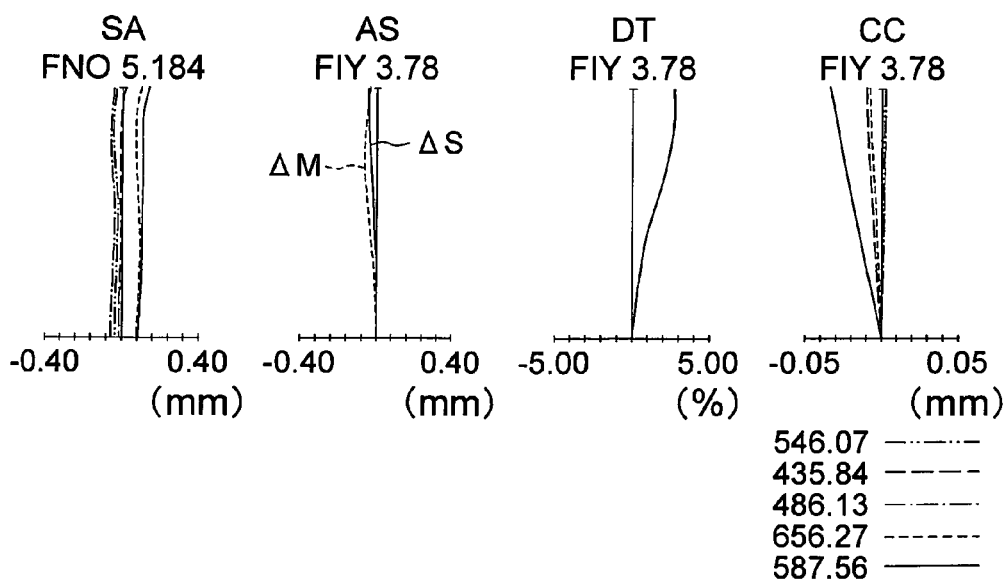

FIG. 50A, FIG. 50B, and FIG. 50C are diagrams showing a spherical aberration, an astigmatism, a distortion, and a chromatic aberration of magnification at the time of infinite object point focusing of the zoom lens according to the twenty fifth embodiment, where, FIG. 50A shows a state at the wide angle end, FIG. 50B shows an intermediate focal length state, and FIG. 50C shows a state at the telephoto end.

The zoom lens according to the twenty fifth embodiment, as shown in FIG. 49A, FIG. 49B, and FIG. 49C, includes in order from an object side, a first lens group G1, a second lens group G2, an aperture stop S, a third lens group G3, a fourth lens group G4, and a fifth lens group G5.

The first lens group G1 includes in order from the object side, a positive meniscus lens L1 having a convex surface directed toward the object side, and a cemented lens of a negative meniscus lens L2 (optical element B) having a convex surface directed toward the object side, a positive meniscus lens L3 (refractive optical element A) having a convex surface directed toward the object side, and a positive meniscus lens L4 (optical element C) having a convex surface directed toward the object side, and has a positive refractive power as a whole. Here, a partial dispersion ratio ($\theta gF_A$) of the refractive optical element A of the cemented lens in the first lens group G1 is 0.690. Moreover, Abbe's number ($vd_A$) for the refractive optical element A is 20.00.

The second lens group G2 includes in order from the object side, a negative meniscus lens L5 having a convex surface directed toward the object side, a cemented lens of a biconcave negative lens L6 and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14 and a biconcave negative lens L16 in order from the object side, and has a positive refractive power as a whole. L15 is a cemented surface.

The fifth lens group G5 includes in order from the object side, a biconvex positive lens L17, and has a positive refractive power as a whole.

At the time of zooming from the wide angle end to the telephoto end, the first lens group G1 moves toward the object side. The second lens group G2 moves toward the image side. The third lens group G3 moves toward the object side. The fourth lens group G4, after moving toward the object side, moves toward the image side. The fifth lens group G5 is fixed. The aperture stop S moves together with the third lens group G3.

An aspheric surface is provided to six surfaces namely, a surface on the image side of the negative meniscus lens L9 on the image side in the second lens group G2, a surface on the object side of the biconvex positive lens L10 on the object side and both surfaces of the negative meniscus lens L13 on the image side in the third lens group G3, and both surfaces of the biconvex positive lens L17 in the fifth lens group G5.

Figure 51A:
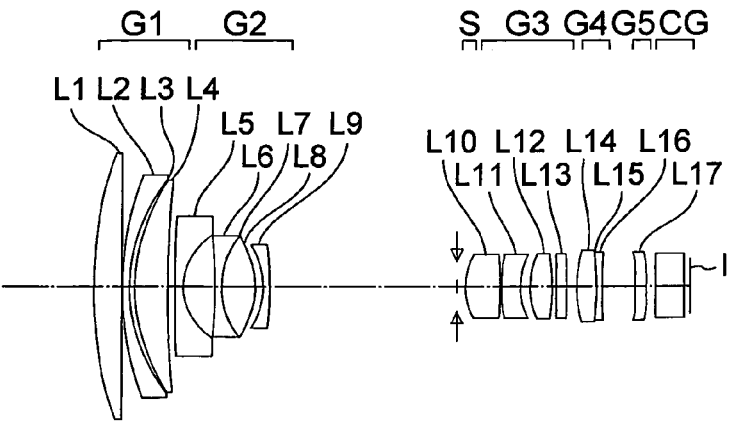
FIG. 51A, FIG. 51B, and FIG. 51C are cross-sectional views along an optical axis showing an optical arrangement at the time of infinite object point focusing of a zoom lens according to a twenty sixth embodiment of the present invention, where.
Figure 51B:
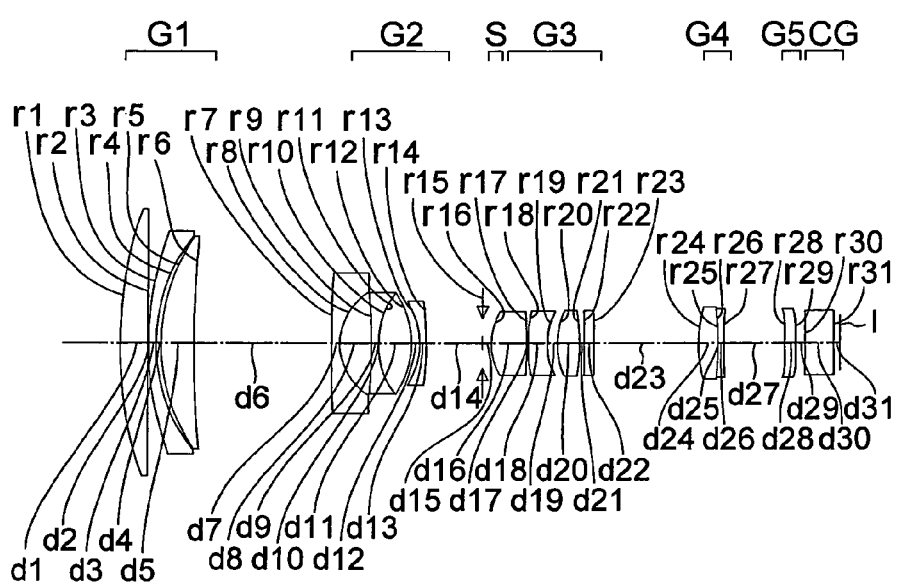
Figure 51C:
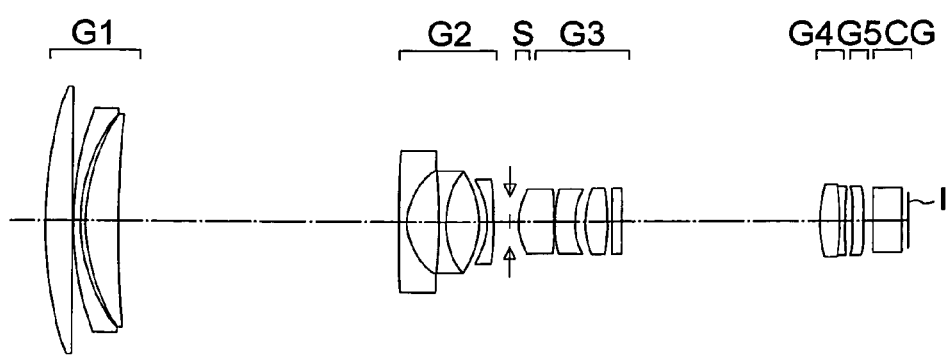

Next, a zoom lens according to a twenty sixth embodiment of the present invention will be described below. FIG. 51A, FIG. 51B, and FIG. 51C are cross-sectional views along an optical axis showing an optical arrangement at the time of infinite object point focusing of the zoom lens according to the twenty sixth embodiment of the present invention, where, FIG. 51A shows a state at a wide angle end, FIG. 51B shows an intermediate focal length state, and FIG. 51C shows a state at a telephoto end.

Figure 52A:
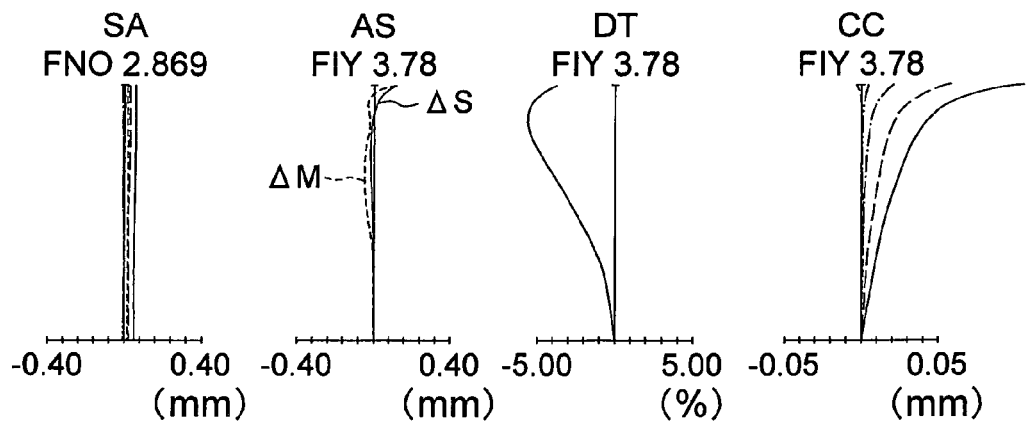
FIG. 52A, FIG. 52B, and FIG. 52C are diagrams showing a spherical aberration, an astigmatism, a distortion, and a chromatic aberration of magnification at the time of infinite object point focusing of the zoom lens according to the twenty sixth embodiment, where.
Figure 52B:
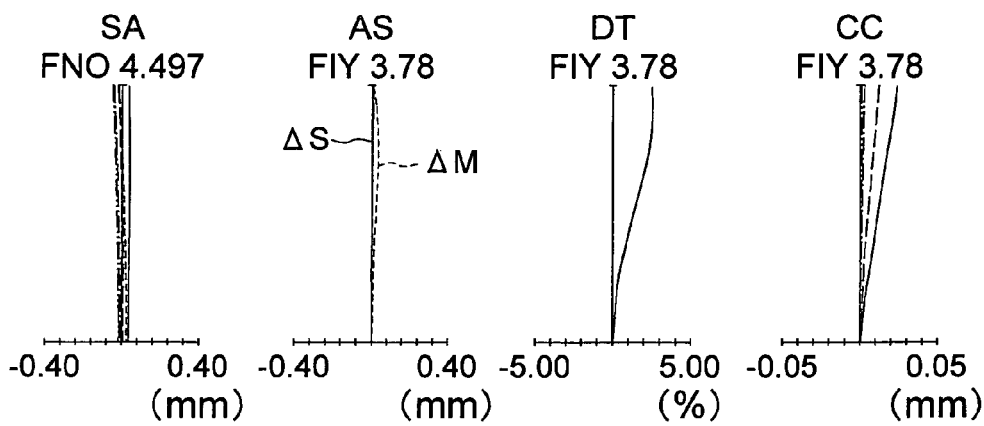
Figure 52C:
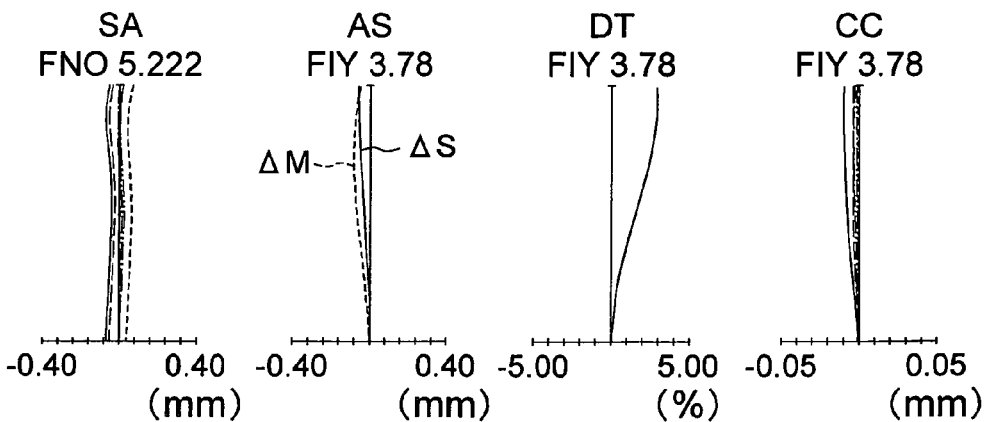

FIG. 52A, FIG. 52B, and FIG. 52C are diagrams showing a spherical aberration, an astigmatism, a distortion, and a chromatic aberration of magnification at the time of infinite object point focusing of the zoom lens according to the twenty sixth embodiment, where, FIG. 52A shows a state at the wide angle end, FIG. 52B shows an intermediate focal length state, and FIG. 52C shows a state at the telephoto end.

The zoom lens according to the twenty sixth embodiment, as shown in FIG. 51A, FIG. 51B, and FIG. 51C, includes in order from an object side, a first lens group G1, a second lens group G2, an aperture stop S, a third lens group G3, a fourth lens group G4, and a fifth lens group G5.

The first lens group G1 includes in order from the object side, a positive meniscus lens L1 having a convex surface directed toward the object side, and a cemented lens of a negative meniscus lens L2 (optical element B) having a convex surface directed toward the object side, a positive meniscus lens L3 (refractive optical element A) having a convex surface directed toward the object side, and a positive meniscus lens L4 (optical element C) having a convex surface directed toward the object side, and has a positive refractive power as a whole. Here, a partial dispersion ratio ($\theta gF_A$) of the refractive optical element A of the cemented lens in the first lens group G1 is 0.738. Moreover, Abbe's number ($vd_A$) for the refractive optical element A is 15.00.

The second lens group G2 includes in order from the object side, a negative meniscus lens L5 having a convex surface directed toward the object side, a cemented lens of a biconcave negative lens L6 and a biconvex positive lens L8, and a negative meniscus lens L9 having a convex surface directed toward an image side, and has a negative refractive power as a whole.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14 and a biconcave negative lens L16, in order from the object side, and has a positive refractive power as a whole. L15 is a cemented surface.

The fifth lens group G5 includes in order from the object side, a biconvex positive lens L17, and has a positive refractive power as a whole.

At the time of zooming from the wide angle end to the telephoto end, the first lens group G1 moves toward the object side. The second lens group G2, after moving toward the image side, moves slightly and assumes almost a fixed state. The third lens group G3 moves toward the object side. The fourth lens group G4, after moving toward the object side, moves toward the image side. The fifth lens group G5 is fixed. The aperture stop S moves together with the third lens group G3.

An aspheric surface is provided to six surfaces namely a surface on the image side of the negative meniscus lens L9 on the image side in the second lens group G2, a surface on the object side of the biconvex positive lens L10 on the object side and a both surfaces of the negative meniscus lens L13 on the image side in the third lens group G3, and both surfaces of the biconvex positive lens L17 in the fifth lens group G5.

Figure 53A:
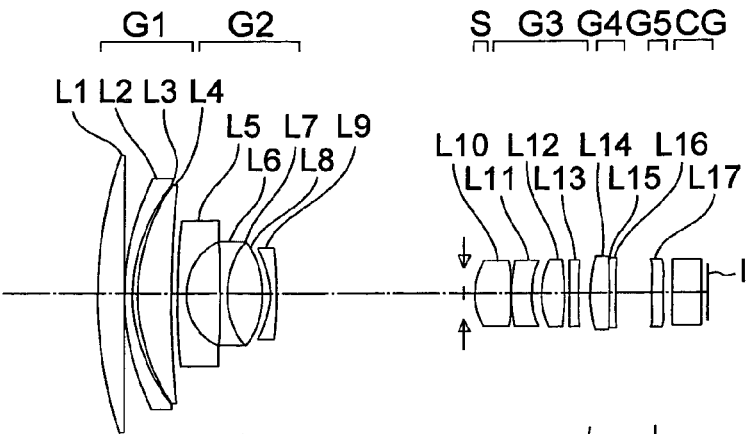
FIG. 53A, FIG. 53B, and FIG. 53C are cross-sectional views along an optical axis showing an optical arrangement at the time of infinite object point focusing of a zoom lens according to a twenty seventh embodiment of the present invention, where.
Figure 53B:
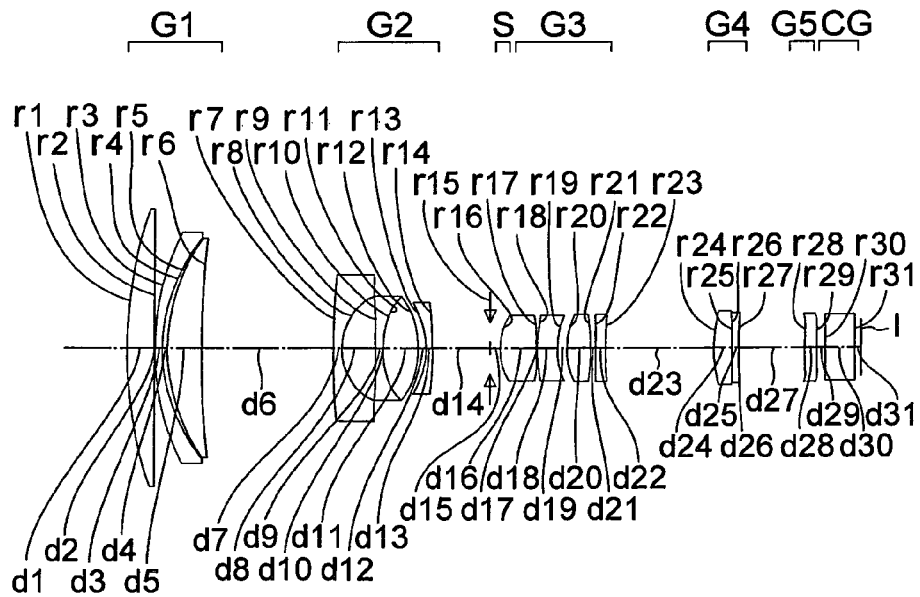
Figure 53C:
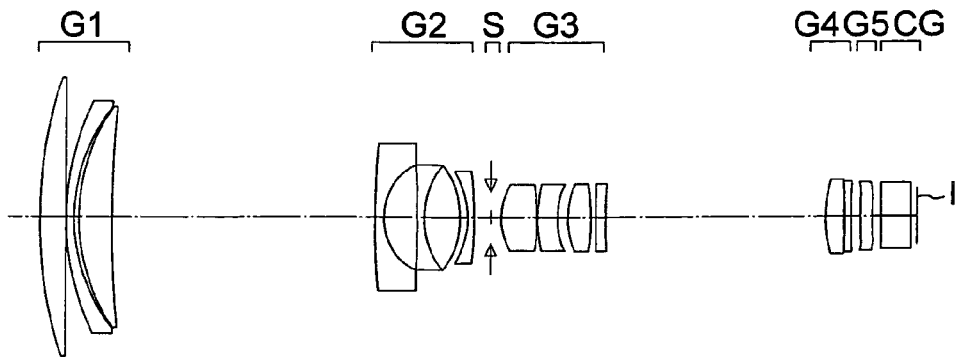

Next, a zoom lens according to a twenty seventh embodiment of the present invention will be described below. FIG. 53A, FIG. 53B, and FIG. 53C are cross-sectional views along an optical axis showing an optical arrangement at the time of infinite object point focusing of the zoom lens according to the twenty seventh embodiment of the present invention, where, FIG. 53A shows a state at a wide angle end, FIG. 53B shows an intermediate focal length state, and FIG. 53C shows a state at a telephoto end.

Figure 54A:
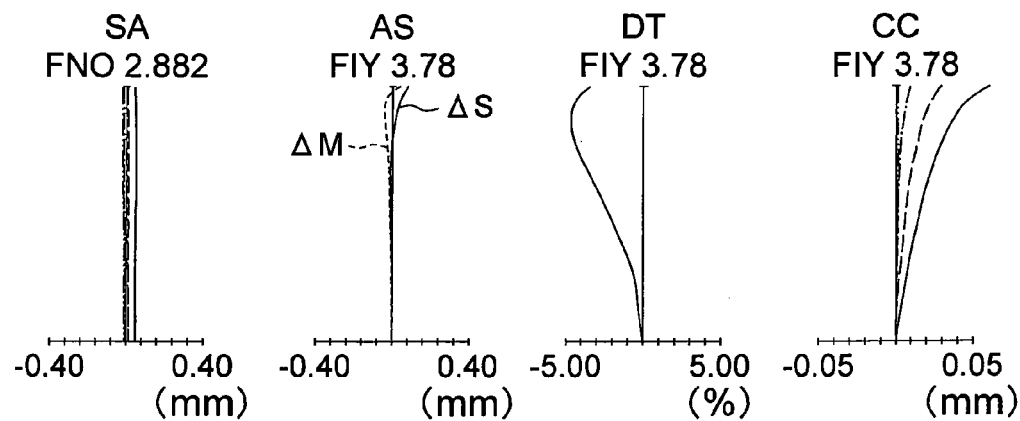
FIG. 54A, FIG. 54B, and FIG. 54C are diagrams showing a spherical aberration, an astigmatism, a distortion, and a chromatic aberration of magnification at the time of infinite object point focusing of the zoom lens according to the twenty seventh embodiment, where.
Figure 54B:
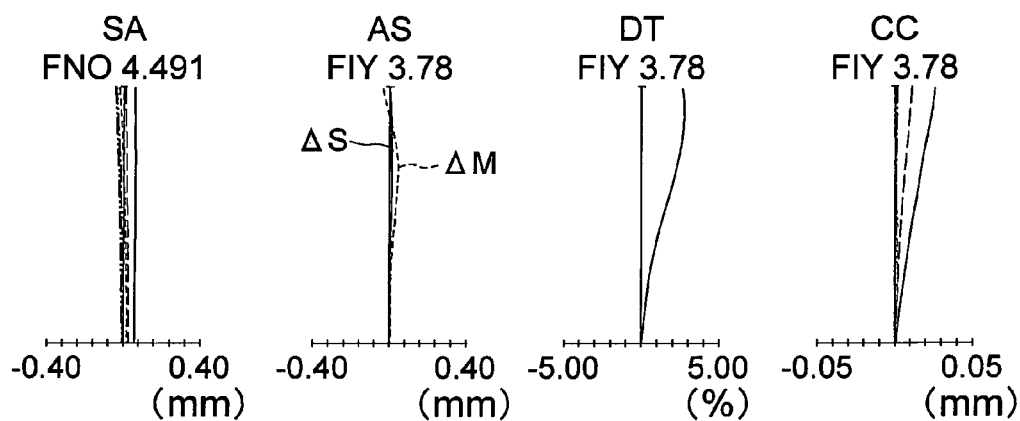
Figure 54C:
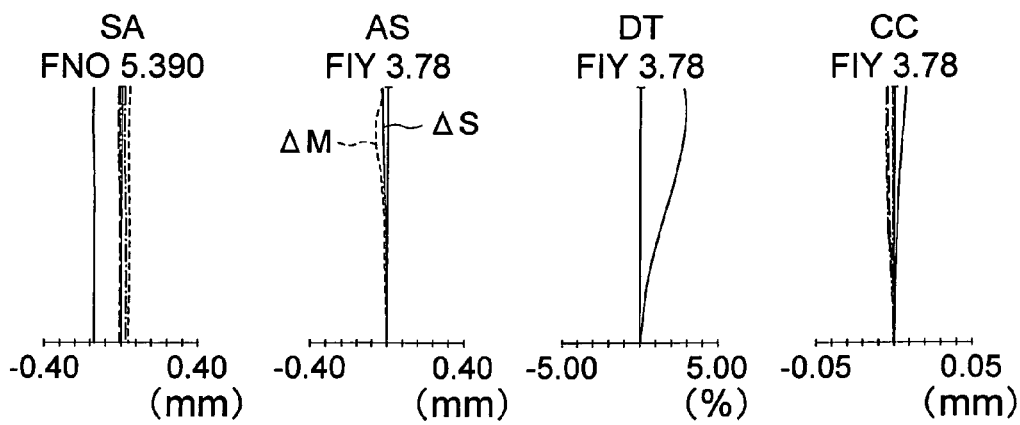

FIG. 54A, FIG. 54B, and FIG. 54C are diagrams showing a spherical aberration, an astigmatism, a distortion, and a chromatic aberration of magnification at the time of infinite object point focusing of the zoom lens according to the twenty seventh embodiment, where, FIG. 54A shows a state at the wide angle end, FIG. 54B shows an intermediate focal length state, and FIG. 54C shows a state at the telephoto end.

The zoom lens according to the twenty seventh embodiment, as shown in FIG. 53A, FIG. 53B, and FIG. 53C, includes in order from an object side, a first lens group G1, a second lens group G2, an aperture stop S, a third lens group G3, a fourth lens group G4, and a fifth lens group G5.

The first lens group G1 includes in order from the object side, a positive meniscus lens L1 having a convex surface directed toward the object side, and a cemented lens of a negative meniscus lens L2 (optical element B) having a convex surface directed toward the object side, a positive meniscus lens L3 (refractive optical element A) having a convex surface directed toward the object side, and a positive meniscus lens L4 (optical element C) having a convex surface directed toward the object side, and has a positive refractive power as a whole. Here, a partial dispersion ratio ($\theta gF_A$) of the refractive optical element A of the cemented lens in the first lens group G1 is 0.761. Moreover, Abbe's number ($vd_A$) for the refractive optical element A is 17.01.

The second lens group G2 includes in order from the object side, a negative meniscus lens L5 having a convex surface directed toward the object side, a cemented lens of a biconcave negative lens L6 and a biconvex positive lens L8, and a negative meniscus lens L9 having a convex surface directed toward an image side, and has a negative refractive power as a whole. L7 is a cemented surface.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14 and a biconcave negative lens L16 in order from the object side, and has a positive refractive power as a whole. L15 is a cemented surface.

The fifth lens group G5 includes in order from the object side, a biconvex positive lens L17, and has a positive refractive power.

At the time of zooming from the wide angle end to the telephoto end, the first lens group G1 moves toward the object side. The second lens group G2, after moving toward the image side, moves toward the object side. The third lens group G3 moves toward the object side. The fourth lens group G4, after moving toward the object side, moves toward the image side. The fifth lens group G5 is fixed. The aperture stop S moves together with the third lens group G3.

An aspheric surface is provided to six surfaces namely, a surface on the image side of the negative meniscus lens L9 on the image side in the second lens group G2, a surface on the object side of the biconvex positive lens L10 on the object side and both surfaces of the negative meniscus lens L13 on the image side in the third lens group G3, and both surfaces of the biconvex positive lens L17 in the fifth lens group G5.

Figure 55A:
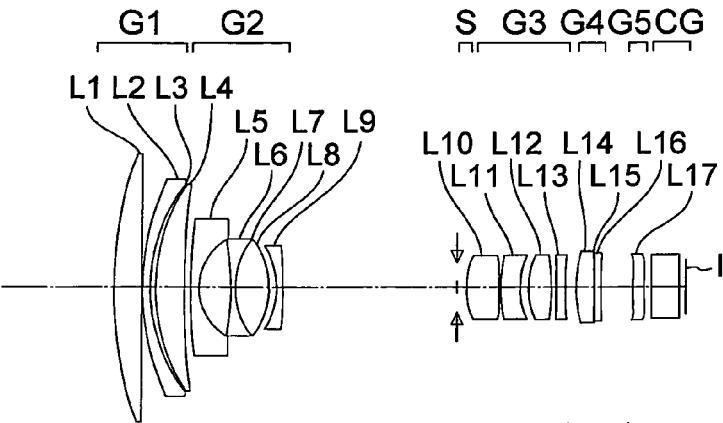
FIG. 55A, FIG. 55B, and FIG. 55C are cross-sectional views along an optical axis showing an optical arrangement at the time of infinite object point focusing of a zoom lens according to a twenty eighth embodiment of the present invention, where.
Figure 55B:
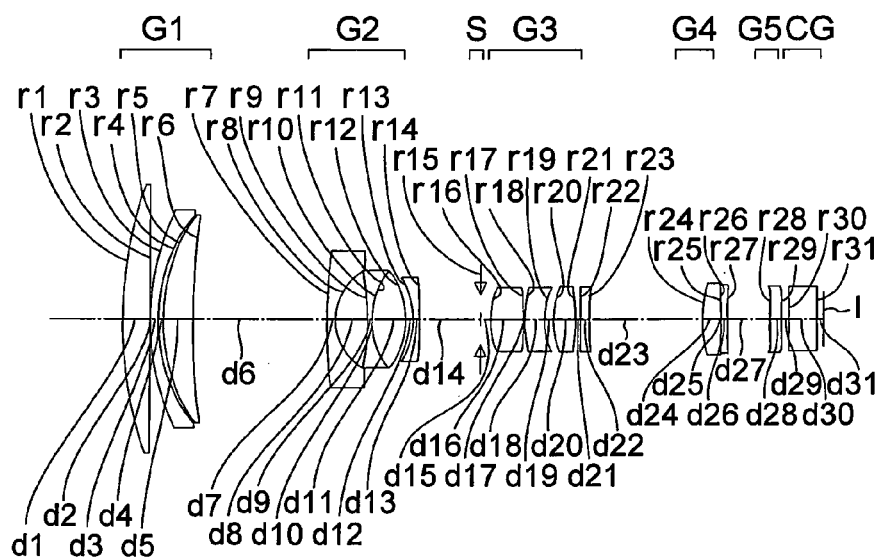
Figure 55C:
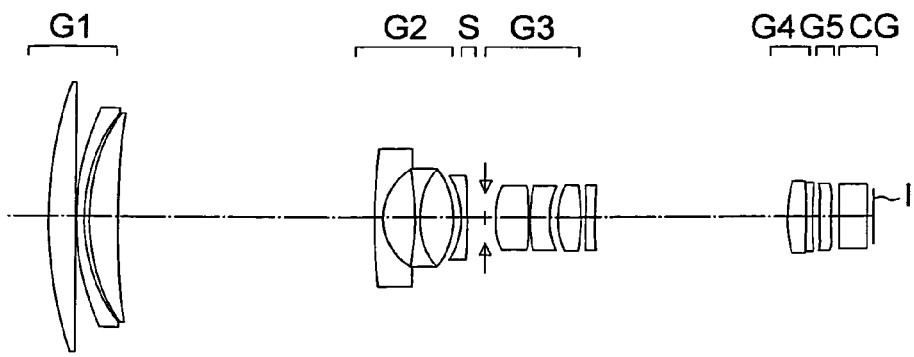

Next, a zoom lens according to a twenty eighth embodiment of the present invention will be described below. FIG. 55A, FIG. 55B, and FIG. 55C are cross-sectional views along an optical axis showing an optical arrangement at the time of infinite object point focusing of the zoom lens according to the twenty eighth embodiment of the present invention, where, FIG. 55A shows a state at a wide angle end, FIG. 55B shows an intermediate focal length state, and FIG. 55C shows a state at a telephoto end.

Figure 56A:
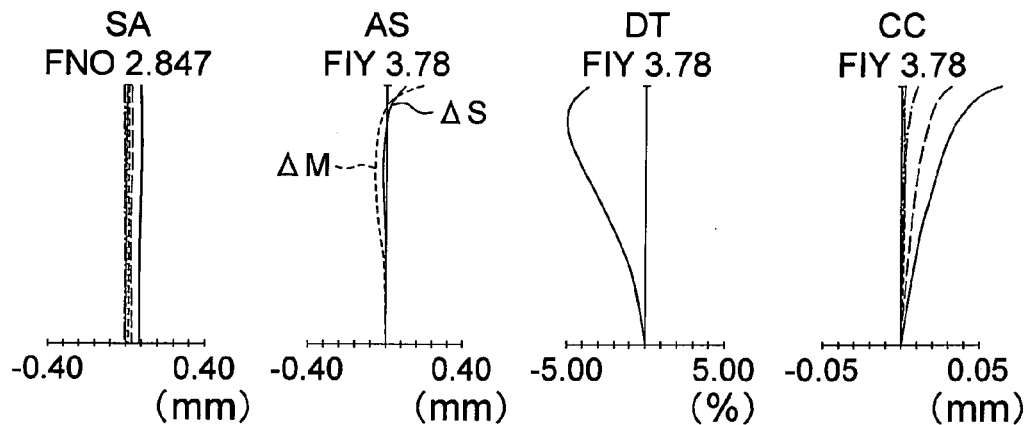
FIG. 56A, FIG. 56B, and FIG. 56C are diagrams showing a spherical aberration, an astigmatism, a distortion, and a chromatic aberration of magnification at the time of infinite object point focusing of the zoom lens according to the twenty eighth embodiment, where.
Figure 56B:
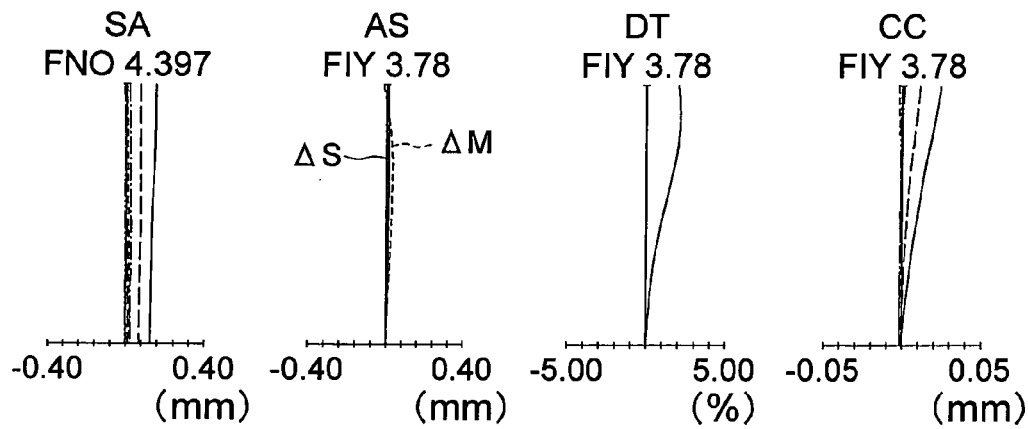
Figure 56C:
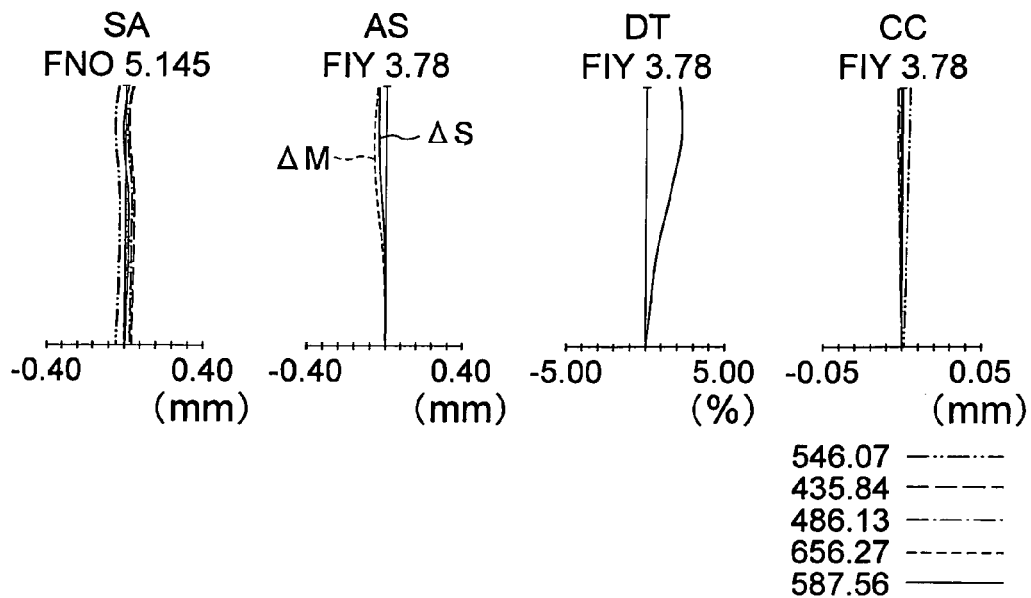

FIG. 56A, FIG. 56B, and FIG. 56C are diagrams showing a spherical aberration, an astigmatism, a distortion, and a chromatic aberration of magnification at the time of infinite object point focusing of the zoom lens according to the twenty eighth embodiment, where, FIG. 56A shows a state at the wide angle end, FIG. 56B shows an intermediate focal length state, and FIG. 56C shows a state at the telephoto end.

The zoom lens according to the twenty eighth embodiment, as shown in FIG. 55A, FIG. 55B, and FIG. 55C, includes in order from an object side, a first lens group G1, a second lens group G2, an aperture stop S, a third lens group G3, a fourth lens group G4, and a fifth lens group G5.

The first lens group G1 includes in order from the object side, a positive meniscus lens L1 having a convex surface directed toward the object side, and a cemented lens of a negative meniscus lens L2 (optical element B) having a convex surface directed toward the object side, a positive meniscus lens L3 (refractive optical element A) having a convex surface directed toward the object side, and a positive meniscus lens L4 (optical element C) having a convex surface directed toward the object side, and has a positive refractive power as a whole. Here, a partial dispersion ratio ($\theta gF_A$) of the refractive optical element A of the cemented lens in the first lens group G1 is 0.817. Moreover, Abbe's number ($vd_A$) for the refractive optical element A is 16.99.

The second lens group G2 includes in order from the object side, a negative meniscus lens L5 having a convex surface directed toward the object side, a cemented lens of a biconcave negative lens L6 and a biconvex positive lens L8, and a negative meniscus lens L9 having a convex surface directed toward an image side, and has a negative refractive power as a whole. L7 is a cemented surface.

The third lens group G3 includes in order from the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14 and a biconcave negative lens L6 in order from the object side, and has a positive refractive power as a whole. L15 is a cemented surface.

The fifth lens group G5 includes in order from the object side, a biconvex positive lens L17, and has a positive refractive power as a whole.

At the time of zooming from the wide angle end to the telephoto end, the first lens group G1 moves toward the object side. The second lens group G2, after moving toward the image side, moves slightly and assumes almost a fixed state. The third lens group G3 moves toward the object side. The fourth lens group G4, after moving toward the object side, moves toward the image side. The fifth lens group G5 is fixed. The aperture stop S moves together with the third lens group G3.

An aspheric surface is provided to six surfaces namely, a surface on the image side of the negative meniscus lens L9 on the image side in the second lens group G2, a surface on the object side of the biconvex positive lens L10 on the object side and both surfaces of the negative meniscus lens L13 on the image side in the third lens group G3, and both surfaces of the biconvex positive lens L17 in the fifth lens group G5.

Figure 57A:
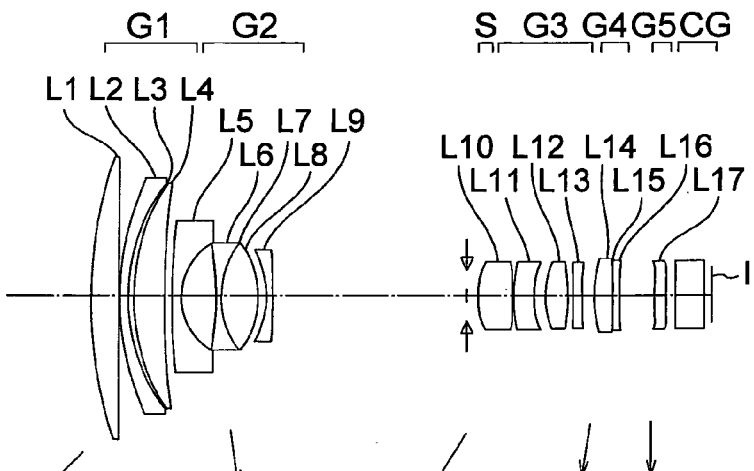
FIG. 57A, FIG. 57B, and FIG. 57C are cross-sectional views along an optical axis showing an optical arrangement at the time of infinite object point focusing of a zoom lens according to a twenty ninth embodiment of the present invention, where.
Figure 57B:
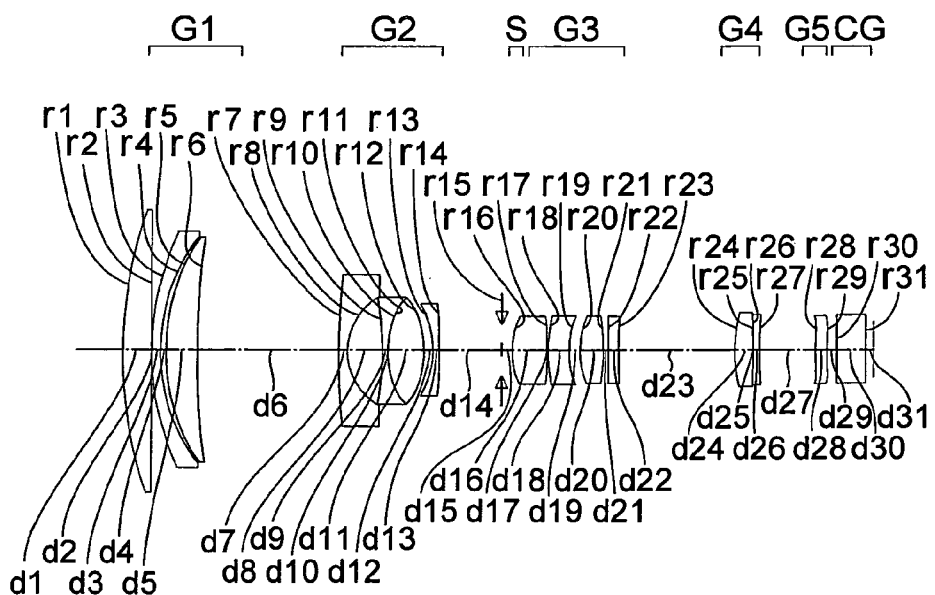
Figure 57C:
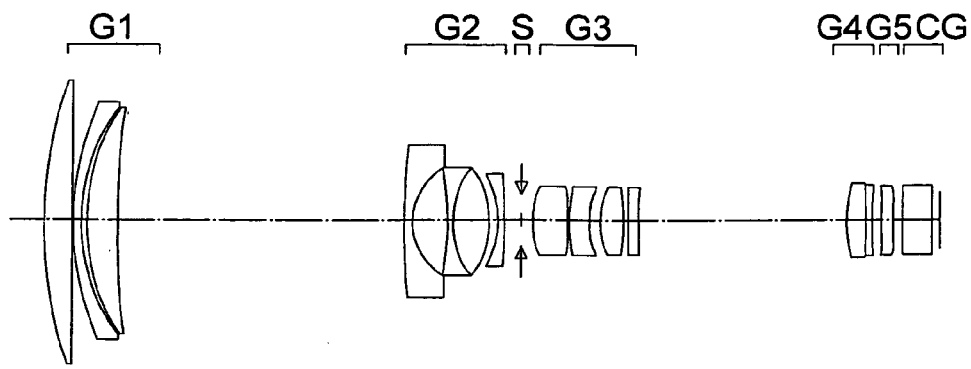

Next, a zoom lens according to a twenty ninth embodiment of the present invention will be described below. FIG. 57A, FIG. 57B, and FIG. 57C are cross-sectional views along an optical axis showing an optical arrangement at the time of infinite object point focusing of the zoom lens according to the twenty ninth embodiment of the present invention, where, FIG. 57A shows a state at a wide angle end, FIG. 57B shows an intermediate focal length state, and FIG. 57C shows a state at a telephoto end.

Figure 58A:
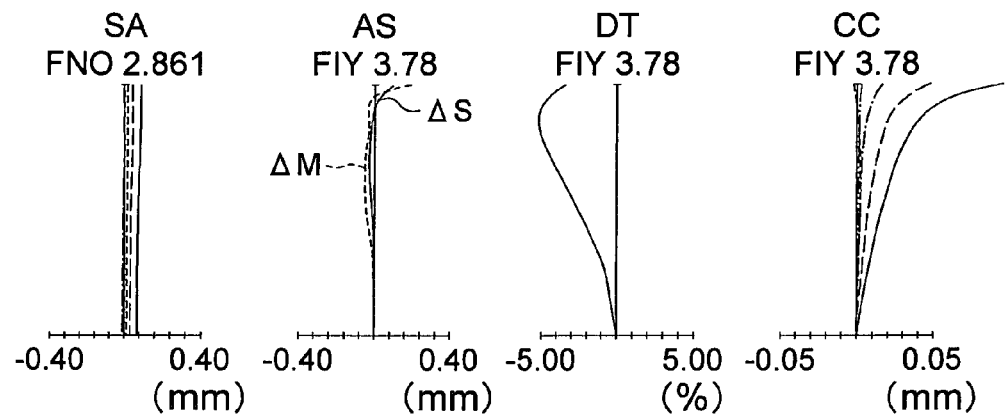
FIG. 58A, FIG. 58B, and FIG. 58C are diagrams showing a spherical aberration, an astigmatism, a distortion, and a chromatic aberration of magnification at the time of infinite object point focusing of the zoom lens according to the twenty ninth embodiment, where.
Figure 58B:
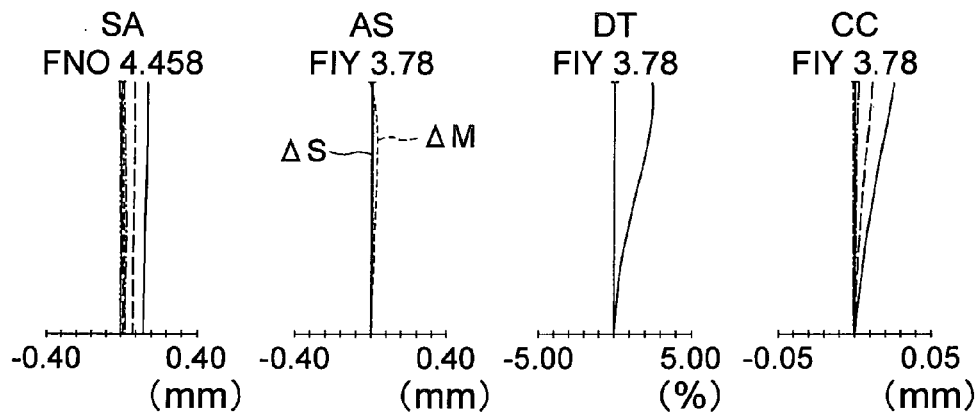
Figure 58C:
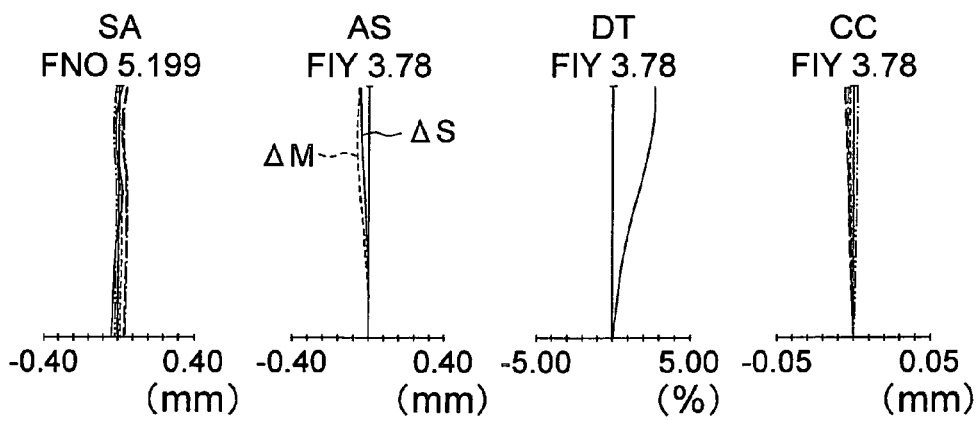

FIG. 58A, FIG. 58B, and FIG. 58C are diagrams showing a spherical aberration, an astigmatism, a distortion, and a chromatic aberration of magnification at the time of infinite object point focusing of the zoom lens according to the twenty ninth embodiment, where, FIG. 58A shows a state at the wide angle end, FIG. 58B shows an intermediate focal length state, and FIG. 58C shows a state at the telephoto end.

The zoom lens according to the twenty ninth embodiment, as shown in FIG. 57A, FIG. 57B, and FIG. 57C, includes in order form an object side, a first lens group G1, a second lens group G2, an aperture stop S, a third lens group G3, a fourth lens group G4, and a fifth lens group G5.

The first lens group G1 includes in order from the object side, a positive meniscus lens L1 having a convex surface directed toward the object side, and a cemented lens of a negative meniscus lens L2 (optical element B) having a convex surface directed toward the object side, a positive meniscus lens L3 (refractive optical element A) having a convex surface directed toward the object side, and a positive meniscus lens L4 (optical element C) having a convex surface directed toward the object side, and has a positive refractive power as a whole. Here, a partial dispersion ratio ($\theta gF_A$) of the refractive optical element A of the cemented lens in the first lens group G1 is 0.817. Moreover, Abbe's number ($vd_A$) for the refractive optical element A is 23.36.

The second lens group G2 includes in order from the object side, a negative meniscus lens L5 having a convex surface directed toward the object side, a cemented lens of the biconcave lens L6 and a biconvex lens L8, and a negative meniscus lens L9 having a convex surface directed toward an image side, and has a negative refractive power as a whole. L7 is a cemented surface.

The third lens group G3 includes in order form the object side, a biconvex positive lens L10, a negative meniscus lens L11 having a convex surface directed toward the object side, a biconvex positive lens L12, and a negative meniscus lens L13 having a convex surface directed toward the object side, and has a positive refractive power as a whole.

The fourth lens group G4 includes a cemented lens of a biconvex positive lens L14 and a biconcave negative lens L16 in order from the object side, and has a positive refractive power as a whole. L15 is a cemented surface.

The fifth lens group G5 includes in order from the object side, a biconvex positive lens L17, and has a positive refractive power as a whole.

At the time of zooming from the wide angle end to the telephoto end, the first lens group G1 moves toward the object side. The second lens group G2, after moving toward the image side, moves slightly and assumes almost a fixed state. The third lens group G3 moves toward the object side. The fourth lens group G4, after moving toward the object side, moves toward the image side. The fifth lens group G5 is fixed. The aperture stop S moves together with the third lens group G3.

An aspheric surface is provided to six surfaces namely, a surface on the image side of the negative meniscus lens L9 on the image side in the second lens group G2, a surface on the object side of the biconvex positive lens L10 on the object side and both surfaces of the negative meniscus lens L13 on the image side in the third lens group G3, and both surfaces of the biconvex positive lens L17 in the fifth lens group G5.

Numerical data of each embodiment described above is shown below. Each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe constant for each lens. $F_{NO}$ denotes an F number, f denotes a focal length of the entire zoom lens system, D0 denotes a distance from an object to a first surface. Further, * denotes an aspheric data.

When z is let to be an optical axis with a direction of traveling of light as a positive (direction), and y is let to be in a direction orthogonal to the optical axis, a shape of the aspheric surface is described by the following expression.

$$z=(y^2/r)/[1+\{1-(K+1)(y/r)^2\}^{1/2}]+A_4y^4+A_6y^6+A_8y^8+A_{10}y^{10}$$

where, r denotes a paraxial radius of curvature, K denotes a conical coefficient, A4, A6, A8, and A10 denote aspherical surface coefficients of a fourth order, a sixth order, an eight order, a tenth order respectively. Moreover, in the aspherical surface coefficients, 'e-n' (where, n is an integral number) indicates '$10^{-n}$'.

These symbols are common in the numerical data of the following embodiments.

EXAMPLE 1

| Unit mm | | | | | |
|---|---|---|---|---|---|
| Surface data | | | | | |
| Surface no. | r | d | nd | vd | effective radius |
| Object plane | ∞ | ∞ | | | |
| 1 | 57.000 | 1.00 | 1.80810 | 22.76 | 17.50 |
| 2 | 31.922 | 1.00 | 1.63387 | 23.38 | 16.05 |
| 3 | 39.229 | 4.40 | 1.49700 | 81.54 | 16.00 |
| 4 | 1466.041 | 0.10 | | | 15.50 |
| 5 | 36.008 | 3.76 | 1.65160 | 58.55 | 14.42 |
| 6 | 121.871 | Variable | | | 14.00 |
| 7 | 73.573 | 1.10 | 1.88300 | 40.76 | 9.19 |
| 8 | 7.653 | 4.79 | | | 6.47 |
| 9 | −46.254 | 0.80 | 1.88300 | 40.76 | 6.37 |
| 10 | 12.396 | 0.01 | 1.51400 | 42.83 | 6.35 |
| 11 | 12.396 | 4.87 | 1.78472 | 25.68 | 6.36 |
| 12 | −12.684 | 1.15 | | | 6.40 |
| 13 | −11.499 | 0.80 | 1.77250 | 49.60 | 5.63 |
| 14* | −175.425 | Variable | | | 5.66 |
| 15 (stop) | ∞ | 1.30 | | | 3.94 |
| 16* | 10.743 | 4.93 | 1.58913 | 61.14 | 4.60 |
| 17 | −78.051 | 0.10 | | | 4.61 |
| 18 | 28.041 | 2.77 | 1.84666 | 23.78 | 4.59 |
| 19 | 10.632 | 1.42 | | | 4.29 |
| 20 | 14.230 | 3.12 | 1.49700 | 81.54 | 4.56 |
| 21 | −36.985 | 0.64 | | | 4.60 |
| 22* | 69.435 | 1.36 | 1.53071 | 55.69 | 4.58 |
| 23* | 34.607 | Variable | | | 4.58 |
| 24 | 19.130 | 2.68 | 1.49700 | 81.54 | 4.85 |
| 25 | −119.090 | 0.01 | 1.51400 | 42.83 | 4.72 |
| 26 | −119.090 | 0.82 | 1.80400 | 46.57 | 4.72 |
| 27 | 76.031 | Variable | | | 4.67 |
| 28* | 147.374 | 1.63 | 1.53071 | 55.69 | 4.16 |
| 29* | −67.939 | 1.09 | | | 4.07 |
| 30 | ∞ | 4.00 | 1.51680 | 64.20 | 4.01 |
| 31 | ∞ | Variable | | | 3.85 |
| Image plane | ∞ | | | | |

Aspherical surface data

14th surface

K = 0.000, A2 = 0.0000E+00, A4 = −9.19823e−05, A6 = −8.80923e−07, A8 = 4.39702e−08, A10 = −1.24247e−09

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 8.15873e−04, A6 = 4.82675e−06, A8 = −2.20386e−06, A10 = 4.10510e−08

-continued

Unit mm

29th surface

K = 0.000, A2 = 0.0000E+00, A4 = 1.26016e−03, A6 = 1.60282e−05,
A8 = −3.90922e−06, A10 = 7.56282e−08

Various data
Zoom ratio 17.94

|  | Wide angle | Intermediate | Telephoto |
|---|---|---|---|
| Focal length | 4.68 | 19.73 | 83.85 |
| Fno. | 2.66 | 4.04 | 4.20 |
| Angle of field 2ω | 78.04 | 20.13 | 4.80 |
| Image height | 3.6 | 3.6 | 3.6 |
| Lens total length | 83.15 | 99.31 | 113.64 |
| BF | 4.78 | 4.68 | 4.78 |
| d6 | 1.00 | 18.10 | 36.91 |
| d14 | 25.86 | 8.76 | 2.30 |
| d23 | 1.28 | 9.91 | 9.55 |
| d27 | 5.68 | 13.31 | 15.55 |
| Entrance pupil position | 19.02 | 62.76 | 288.40 |
| Exit pupil position A | −31.23 | −88.71 | −95.31 |
| Exit pupil position B | −36.01 | −93.39 | −100.10 |
| Front side principal point position | 23.09 | 78.33 | 302.00 |
| Back side principal point position | −3.62 | −18.78 | −82.80 |

Single lens data

| Lens | Initial surface | focal length |
|---|---|---|
| L1 | 1 | −91.42 |
| L2 | 2 | 256.77 |
| L3 | 3 | 81.02 |
| L4 | 5 | 77.10 |
| L5 | 7 | −9.75 |
| L6 | 9 | −11.00 |
| L7 | 10 | 8.81E+04 |
| L8 | 11 | 8.73 |
| L9 | 13 | −15.96 |
| L10 | 16 | 16.37 |
| L11 | 18 | −21.82 |
| L12 | 20 | 21.10 |
| L13 | 22 | −131.79 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 56.6886 | 10.2644 | 1.9306 | −4.5773 |
| 2 | 7 | −6.8387 | 13.5160 | 1.8939 | −7.0311 |
| 3 | 15 | 17.3424 | 15.6380 | 1.5104 | −9.6395 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1614 | −0.2705 | −1.0566 |
| 3 | 15 | −0.6938 | −2.0059 | −2.2929 |
| 4 | 24 | 0.7821 | 0.6803 | 0.6483 |
| 5 | 28 | 0.9418 | 0.9429 | 0.9418 |

EXAMPLE 2

Unit mm

Surface data

| Surface no. | r | d | nd | vd | effective radius |
|---|---|---|---|---|---|
| Object plane | ∞ | ∞ |  |  |  |
| 1 | 62.000 | 1.00 | 1.79925 | 24.62 | 17.10 |
| 2 | 32.285 | 0.97 | 1.63387 | 23.38 | 15.66 |
| 3 | 37.493 | 4.42 | 1.49700 | 81.54 | 15.51 |
| 4 | 5089.283 | 0.10 |  |  | 15.50 |
| 5 | 35.495 | 3.22 | 1.65160 | 58.55 | 14.25 |
| 6 | 139.627 | Variable |  |  | 14.00 |
| 7 | 72.020 | 1.10 | 1.88300 | 40.76 | 9.21 |
| 8 | 7.692 | 4.79 |  |  | 6.51 |
| 9 | −46.254 | 0.80 | 1.88300 | 40.76 | 6.41 |
| 10 | 12.396 | 0.01 | 1.51400 | 42.83 | 6.42 |
| 11 | 12.396 | 4.87 | 1.78472 | 25.68 | 6.42 |
| 12 | −12.684 | 1.15 |  |  | 6.47 |
| 13 | −11.499 | 0.80 | 1.77250 | 49.60 | 5.73 |
| 14* | −100.567 | Variable |  |  | 5.78 |
| 15(stop) | ∞ | 1.30 |  |  | 3.94 |
| 16* | 10.743 | 4.93 | 1.58913 | 61.14 | 4.59 |
| 17 | −78.051 | 0.10 |  |  | 4.59 |
| 18 | 28.041 | 2.77 | 1.84666 | 23.78 | 4.57 |
| 19 | 10.504 | 1.42 |  |  | 4.26 |
| 20 | 13.924 | 3.12 | 1.49700 | 81.54 | 4.53 |
| 21 | −36.985 | 0.64 |  |  | 4.57 |
| 22* | 73.125 | 1.36 | 1.53071 | 55.69 | 4.54 |
| 23* | 35.555 | Variable |  |  | 4.55 |
| 24 | 19.130 | 2.68 | 1.49700 | 81.54 | 4.84 |
| 25 | −119.090 | 0.01 | 1.51400 | 42.83 | 4.71 |
| 26 | −119.090 | 0.82 | 1.80400 | 46.57 | 4.71 |
| 27 | 76.031 | Variable |  |  | 4.66 |
| 28* | 147.374 | 1.63 | 1.53071 | 55.69 | 4.17 |
| 29* | −67.939 | 1.09 |  |  | 4.09 |
| 30 | ∞ | 4.00 | 1.51680 | 64.20 | 4.02 |
| 31 | ∞ | 1.05 |  |  | 3.86 |
| Image plane | ∞ |  |  |  |  |

Aspherical surface data

14th surface

K = 0.000, A2 = 0.0000E+00, A4 = −9.19823e−05, A6 = −8.80923e−07,
A8 = 4.39702e−08, A10 = −1.24247e−09

16th surface

K = 0.000, A2 = 0.0000E+00, A4 = −8.77784e−05, A6 = −1.01116e−06,
A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06,
A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06,
A8 = −5.09130e−07, A10 = 8.38419e−09, A12 = −4.36735e−11

28th surface

K = 0.000, A2 = 0.0000E+00, A4 = 8.15873e−04, A6 = 4.82675e−06,
A8 = −2.20386e−06, A10 = 4.10510e−08

29th surface

K = 0.000, A2 = 0.0000E+00, A4=1.26016e−03, A6 = 1.60282e−05,
A8 = −3.90922e−06, A10 = 7.56282e−08

Various data
Zoom ratio 17.94

|  | Wide angle | Intermediate | Telephoto |
|---|---|---|---|
| Focal length | 4.67 | 19.66 | 83.74 |
| Fno. | 2.63 | 4.04 | 4.18 |
| Angle of field 2ω | 78.21 | 20.19 | 4.79 |

-continued

Unit mm

| | | | |
|---|---|---|---|
| Image height | 3.6 | 3.6 | 3.6 |
| Lens total length | 82.81 | 97.59 | 113.67 |
| BF | 4.78 | 4.67 | 4.78 |
| d6 | 1.00 | 17.41 | 37.50 |
| d14 | 26.37 | 8.20 | 2.30 |
| d23 | 1.29 | 10.69 | 15.74 |
| d27 | 5.38 | 12.61 | 9.35 |
| Entrance pupil position | 18.42 | 57.36 | 285.45 |
| Exit pupil position A | −30.74 | −91.92 | −127.85 |
| Exit pupil position B | −35.52 | −96.60 | −132.63 |
| Front side principal point position | 22.48 | 73.02 | 316.32 |
| Back side principal point position | −3.62 | −18.71 | −82.69 |

Single lens data

| Lens | Initial surface | focal length |
|---|---|---|
| L1 | 1 | −85.56 |
| L2 | 2 | 341.89 |
| L3 | 3 | 75.98 |
| L4 | 5 | 72.16 |
| L5 | 7 | −9.83 |
| L6 | 9 | −11.00 |
| L7 | 10 | 8.81E+04 |
| L8 | 11 | 8.73 |
| L9 | 13 | −16.87 |
| L10 | 16 | 16.37 |
| L11 | 18 | −21.39 |
| L12 | 20 | 20.78 |
| L13 | 22 | −132.06 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 56.6370 | 9.7109 | 2.3763 | −3.8229 |
| 2 | 7 | −7.2149 | 13.5160 | 1.7381 | −7.3581 |
| 3 | 15 | 17.3869 | 15.6380 | 1.5315 | −9.6365 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1683 | −0.2728 | −1.1349 |
| 3 | 15 | −0.6611 | −1.9566 | −1.8888 |
| 4 | 24 | 0.7863 | 0.6898 | 0.7324 |
| 5 | 28 | 0.9418 | 0.9430 | 0.9418 |

EXAMPLE 3

Unit mm

Surface data

| Surface no. | r | d | nd | vd | effective radius |
|---|---|---|---|---|---|
| Object plane | ∞ | ∞ | | | |
| 1 | 63.000 | 1.80 | 1.84666 | 23.78 | 17.50 |
| 2 | 32.204 | 1.20 | 1.63387 | 23.38 | 15.68 |
| 3 | 40.265 | 4.14 | 1.49700 | 81.54 | 15.55 |
| 4 | 27463.875 | 0.10 | | | 15.50 |
| 5 | 37.567 | 3.28 | 1.65160 | 58.55 | 14.24 |
| 6 | 200.415 | Variable | | | 14.00 |
| 7 | 74.158 | 1.10 | 1.88300 | 40.76 | 9.19 |
| 8 | 7.718 | 4.79 | | | 6.50 |
| 9 | −46.254 | 0.80 | 1.88300 | 40.76 | 6.40 |
| 10 | 12.396 | 0.01 | 1.51400 | 42.83 | 6.39 |
| 11 | 12.396 | 4.87 | 1.78472 | 25.68 | 6.39 |
| 12 | −12.684 | 1.15 | | | 6.43 |
| 13 | −11.499 | 0.80 | 1.77250 | 49.60 | 5.67 |
| 14* | −109.547 | Variable | | | 5.70 |
| 15(stop) | ∞ | 1.30 | | | 3.71 |
| 16* | 10.743 | 4.93 | 1.58913 | 61.14 | 4.30 |
| 17 | −78.051 | 0.10 | | | 4.32 |
| 18 | 28.041 | 2.77 | 1.84666 | 23.78 | 4.31 |
| 19 | 10.557 | 1.42 | | | 4.04 |
| 20 | 14.095 | 3.12 | 1.49700 | 81.54 | 4.31 |
| 21 | −36.985 | 0.64 | | | 4.37 |
| 22* | 55.696 | 1.36 | 1.53071 | 55.69 | 4.34 |
| 23* | 41.000 | Variable | | | 4.33 |
| 24 | 19.130 | 2.68 | 1.49700 | 81.54 | 4.57 |
| 25 | −119.090 | 0.01 | 1.51400 | 42.83 | 4.43 |
| 26 | −119.090 | 0.82 | 1.80400 | 46.57 | 4.43 |
| 27 | 76.031 | Variable | | | 4.37 |
| 28* | 10184.593 | 1.63 | 1.53071 | 55.69 | 4.00 |
| 29* | −6651.678 | 1.09 | | | 3.90 |
| 30 | ∞ | 4.00 | 1.51680 | 64.20 | 3.88 |
| 31 | ∞ | 0.97 | | | 3.82 |
| Image plane | ∞ | | | | |

Aspherical surface data

14th surface

K = 0.000, A2 = 0.0000E+00, A4 = −9.19823e−05, A6 = −8.80923e−07, A8 = 6.14733e−08, A10 = −1.47363e−09

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 8.15873e−04, A6 = 4.82675e−06, A8 = −2.20386e−06, A10 = 4.10510e−08

29th surface

K = 0.000, A2 = 0.0000E+00, A4 = 1.26016e−03, A6 = 1.60282e−05, A8 = −3.90922e−06, A10 = 7.56282e−08

Various data
Zoom ratio 17.67

| | Wide angle | Intermediate | Telephoto |
|---|---|---|---|
| Focal length | 4.69 | 18.54 | 82.94 |
| Fno. | 2.80 | 4.35 | 4.48 |
| Angle of field 2ω | 77.51 | 21.36 | 4.83 |
| Image height | 3.6 | 3.6 | 3.6 |
| Lens total length | 82.66 | 96.73 | 113.93 |
| BF | 4.70 | 4.68 | 4.77 |
| d6 | 1.00 | 15.92 | 37.92 |
| d14 | 25.89 | 8.47 | 2.30 |
| d23 | 1.33 | 16.32 | 18.37 |
| d27 | 4.95 | 6.53 | 5.77 |
| Entrance pupil position | 18.85 | 52.10 | 283.92 |
| Exit pupil position A | −23.33 | −52.47 | −56.89 |
| Exit pupil position B | −28.02 | −57.15 | −61.66 |
| Front side principal point position | 22.76 | 64.62 | 255.30 |
| Back side principal point position | −3.72 | −17.58 | −81.89 |

-continued

Unit mm

Single lens data

| Lens | Initial surface | focal length |
|---|---|---|
| L1 | 1 | −79.96 |
| L2 | 2 | 239.90 |
| L3 | 3 | 81.13 |
| L4 | 5 | 70.39 |
| L5 | 7 | −9.83 |
| L6 | 9 | −11.00 |
| L7 | 10 | 8.81E+04 |
| L8 | 11 | 8.73 |
| L9 | 13 | −16.69 |
| L10 | 16 | 16.37 |
| L11 | 18 | −21.56 |
| L12 | 20 | 20.96 |
| L13 | 22 | −302.49 |
| L14 | 24 | 33.38 |
| L15 | 25 | 8.13E+06 |
| L16 | 26 | −57.61 |
| L17 | 28 | 7582.04 |

Zoom lens group data

| Unit | Initial surface | Focal length | Lens structure length | Front side principal point position | Back side principal point position |
|---|---|---|---|---|---|
| 1 | 1 | 57.5126 | 10.5191 | 2.6843 | −3.9664 |
| 2 | 7 | −7.1497 | 13.5160 | 1.7695 | −7.2924 |
| 3 | 15 | 16.7976 | 15.6380 | 2.1778 | −9.3324 |
| 4 | 24 | 73.7783 | 3.5080 | −2.0985 | −4.2304 |
| 5 | 28 | 7582.0431 | 6.7160 | 0.6430 | −4.1461 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1639 | −0.2491 | −1.0654 |
| 3 | 15 | −0.6249 | −1.6678 | −1.7247 |
| 4 | 24 | 0.7975 | 0.7764 | 0.7854 |
| 5 | 28 | 0.9993 | 0.9993 | 0.9993 |

EXAMPLE 4

Unit mm

Surface data

| Surface no. | r | d | nd | vd | effective radius |
|---|---|---|---|---|---|
| Object plane | ∞ | ∞ | | | |
| 1 | 62.850 | 1.80 | 1.84666 | 23.78 | 17.50 |
| 2 | 32.458 | 0.96 | 1.63387 | 23.38 | 15.81 |
| 3 | 39.959 | 4.46 | 1.49700 | 81.54 | 15.76 |
| 4 | 64797.253 | 0.10 | | | 15.50 |
| 5 | 36.389 | 3.26 | 1.65160 | 58.55 | 14.24 |
| 6 | 168.319 | Variable | | | 14.00 |
| 7 | 79.899 | 1.10 | 1.88300 | 40.76 | 9.21 |
| 8 | 8.096 | 4.79 | | | 6.60 |
| 9 | −46.254 | 0.80 | 1.88300 | 40.76 | 6.42 |
| 10 | 12.396 | 0.01 | 1.51400 | 42.83 | 6.32 |
| 11 | 12.396 | 4.87 | 1.78472 | 25.68 | 6.32 |
| 12 | −12.684 | 1.15 | | | 6.32 |
| 13 | −11.367 | 0.80 | 1.77250 | 49.60 | 5.34 |
| 14* | −74.335 | Variable | | | 5.30 |
| 15(stop) | ∞ | 1.30 | | | 3.71 |
| 16* | 10.473 | 4.93 | 1.58913 | 61.14 | 4.30 |
| 17 | −77.941 | 0.10 | | | 4.30 |
| 18 | 28.041 | 2.77 | 1.84666 | 23.78 | 4.29 |
| 19 | 10.091 | 1.42 | | | 4.00 |
| 20 | 13.652 | 3.12 | 1.49700 | 81.54 | 4.28 |
| 21 | −36.985 | 0.64 | | | 4.34 |
| 22* | 42.769 | 1.36 | 1.53071 | 55.69 | 4.32 |
| 23* | 30.853 | Variable | | | 4.27 |
| 24 | 19.130 | 2.68 | 1.49700 | 81.54 | 4.50 |
| 25 | −119.090 | 0.01 | 1.51400 | 42.83 | 4.37 |
| 26 | −119.090 | 0.82 | 1.80400 | 46.57 | 4.37 |
| 27 | 76.031 | Variable | | | 4.32 |
| 28* | 49643.204 | 1.63 | 1.53071 | 55.69 | 3.97 |
| 29* | −13944.453 | 1.09 | | | 3.88 |
| 30 | ∞ | 4.00 | 1.51680 | 64.20 | 3.86 |
| 31 | ∞ | Variable | | | 3.81 |
| Image plane | ∞ | | | | |

Aspherical surface data

14th surface

K = 0.000, A2 = 0.0000E+00, A4 = −9.19823e−05, A6 = 9.42847e−07, A8 = −3.71864e−08, A10 = 9.09734e−11

16th surface

K = 0.000, A2 = 0.0000E+00, A4 = −8.77784e−05, A6 = −1.52073e−06, A8 = 1.18883e−07, A10 = −6.93748e−09, A12 = 1.46452e−10

22nd surface

K = 0.000, A2 = 0.0000E+00, A4 = −3.13848e−04, A6 = 8.15347e−06, A8 = −8.59408e−08, A10 = −1.12593e−08, A12 = 5.16580e−10

23rd surface

K = 0.000, A2 = 0.0000E+00, A4 = −2.06308e−04, A6 = 8.95087e−06, A8 = −7.33310e−08, A10 = −1.52174e−08, A12 = 7.32559e−10

28th surface

K = 0.000, A2 = 0.0000E+00, A4 = 8.15873e−04, A6 = 4.82675e−06, A8 = −3.85528e−06, A10 = 1.27474e−07

29th surface

K = 0.000, A2 = 0.0000E+00, A4 = 1.26016e−03, A6 = 1.60282e−05, A8 = −5.99523e−06, A10 = 1.80459e−07

Various data
Zoom ratio 17.43

| | Wide angle | Intermediate | Telephoto |
|---|---|---|---|
| Focal length | 4.78 | 19.52 | 83.30 |
| Fno. | 2.79 | 3.95 | 4.02 |
| Angle of field 2ω | 76.54 | 20.31 | 4.82 |
| Image height | 3.6 | 3.6 | 3.6 |
| Lens total length | 84.07 | 96.08 | 108.53 |
| BF | 4.70 | 4.69 | 4.77 |
| d6 | 1.00 | 19.57 | 38.43 |
| d14 | 27.80 | 9.25 | 2.30 |
| d23 | 0.83 | 8.81 | 13.76 |
| d27 | 4.87 | 8.89 | 4.41 |
| Entrance pupil position | 19.51 | 67.92 | 312.80 |
| Exit pupil position A | −22.11 | −38.51 | −43.63 |
| Exit pupil position B | −26.81 | −43.20 | −48.39 |
| Front side principal point position | 23.43 | 78.62 | 252.71 |
| Back side principal point position | −3.80 | −18.56 | −82.26 |

Single lens data

| Lens | Initial surface | focal length |
|---|---|---|
| L1 | 1 | −81.49 |
| L2 | 2 | 259.86 |
| L3 | 3 | 80.45 |
| L4 | 5 | 70.56 |
| L5 | 7 | −10.28 |
| L6 | 9 | −11.00 |
| L7 | 10 | 8.81E+04 |
| L8 | 11 | 8.73 |

-continued

Unit mm

| | | |
|---|---|---|
| L9 | 13 | −17.47 |
| L10 | 16 | 16.00 |
| L11 | 18 | −20.03 |
| L12 | 20 | 20.48 |
| L13 | 22 | −217.26 |
| L14 | 24 | 33.38 |
| L15 | 25 | 8.13E+06 |
| L16 | 26 | −57.61 |
| L17 | 28 | 2.05E+04 |

Zoom lens group data

| Unit | Initial surface | Focal length | Lens structure length | Front side principal point position | Back side principal point position |
|---|---|---|---|---|---|
| 1 | 1 | 57.3912 | 10.5821 | 2.6900 | −4.0128 |
| 2 | 7 | −7.7120 | 13.5160 | 1.6628 | −7.5497 |
| 3 | 15 | 16.9982 | 15.6380 | 1.7886 | −9.5387 |
| 4 | 24 | 73.7783 | 3.5080 | −2.0985 | −4.2304 |
| 5 | 28 | 2.05E+04 | 6.7160 | 0.8298 | −3.9592 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1793 | −0.3156 | −1.3830 |
| 3 | 15 | −0.5815 | −1.4483 | −1.3058 |
| 4 | 24 | 0.7985 | 0.7442 | 0.8039 |
| 5 | 28 | 0.9998 | 0.9998 | 0.9998 |

EXAMPLE 5

Unit mm

Surface data

| Surface no. | r | d | nd | vd | effective radius |
|---|---|---|---|---|---|
| Object plane | ∞ | ∞ | | | |
| 1 | 64.000 | 1.36 | 1.84666 | 23.78 | 17.50 |
| 2 | 31.380 | 1.19 | 1.67000 | 20.00 | 15.79 |
| 3 | 39.271 | 4.40 | 1.49700 | 81.54 | 15.69 |
| 4 | 48375.329 | 0.10 | | | 15.50 |
| 5 | 35.333 | 3.51 | 1.64000 | 60.08 | 14.34 |
| 6 | 157.375 | Variable | | | 14.00 |
| 7 | 55.064 | 1.10 | 1.88300 | 40.76 | 9.08 |
| 8 | 7.466 | 4.79 | | | 6.40 |
| 9 | −46.254 | 0.80 | 1.88300 | 40.76 | 6.32 |
| 10 | 12.396 | 0.01 | 1.51400 | 42.83 | 6.34 |
| 11 | 12.396 | 4.87 | 1.78472 | 25.68 | 6.34 |
| 12 | −12.684 | 1.15 | | | 6.39 |
| 13 | −11.499 | 0.80 | 1.77250 | 49.60 | 5.71 |
| 14* | −133.565 | Variable | | | 5.77 |
| 15(stop) | ∞ | 1.30 | | | 3.94 |
| 16* | 10.743 | 4.93 | 1.58913 | 61.14 | 4.60 |
| 17 | −78.051 | 0.10 | | | 4.61 |
| 18 | 28.041 | 2.77 | 1.84666 | 23.78 | 4.59 |
| 19 | 10.632 | 1.42 | | | 4.28 |
| 20 | 14.230 | 3.12 | 1.49700 | 81.54 | 4.55 |
| 21 | −36.985 | 0.64 | | | 4.59 |
| 22* | 66.332 | 1.36 | 1.53071 | 55.69 | 4.56 |
| 23* | 34.607 | Variable | | | 4.57 |
| 24 | 19.130 | 2.68 | 1.49700 | 81.54 | 4.83 |
| 25 | −119.090 | 0.01 | 1.51400 | 42.83 | 4.70 |
| 26 | −119.090 | 0.82 | 1.80400 | 46.57 | 4.69 |
| 27 | 76.031 | Variable | | | 4.64 |
| 28* | 147.374 | 1.63 | 1.53071 | 55.69 | 4.16 |
| 29* | −67.939 | 1.09 | | | 4.07 |
| 30 | ∞ | 4.00 | 1.51680 | 64.20 | 4.01 |
| 31 | ∞ | 1.03 | | | 3.84 |
| Image plane | ∞ | | | | |

Aspherical surface data

14th surface

K = 0.000, A2 = 0.0000E+00, A4 = −9.19823e−05, A6 = −8.80923e−07, A8 = 4.39702e−08, A10 = −1.24247e−09

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 8.15873e−04, A6 = 4.82675e−06, A8 = −2.20386e−06, A10 = 4.10510e−08

29th surface

K = 0.000, A2 = 0.0000E+00, A4 = 1.26016e−03, A6 = 1.60282e−05, A8 = −3.90922e−06, A10 = 7.56282e−08

Various data
Zoom ratio 19.45

| | Wide angle | Intermediate | Telephoto |
|---|---|---|---|
| Focal length | 4.77 | 20.74 | 92.76 |
| Fno. | 2.65 | 3.81 | 3.96 |
| Angle of field 2ω | 76.04 | 19.08 | 4.32 |
| Image height | 3.6 | 3.6 | 3.6 |
| Lens total length | 82.79 | 99.75 | 114.37 |
| BF | 4.76 | 4.68 | 4.76 |
| d6 | 1.00 | 21.51 | 39.90 |
| d14 | 25.22 | 8.53 | 2.30 |
| d23 | 1.28 | 6.01 | 14.35 |
| d27 | 5.70 | 14.17 | 8.22 |
| Entrance pupil position | 18.91 | 75.26 | 351.00 |
| Exit pupil position A | −31.34 | −68.42 | −105.46 |
| Exit pupil position B | −36.10 | −73.10 | −110.22 |
| Front side principal | 23.05 | 90.11 | 365.70 |
| Back side principal | −3.74 | −19.79 | −91.73 |

Single lens data

| Lens | Initial surface | focal length |
|---|---|---|
| L1 | 1 | −74.13 |
| L2 | 2 | 219.82 |
| L3 | 3 | 79.08 |
| L4 | 5 | 70.40 |
| L5 | 7 | −9.89 |
| L6 | 9 | −11.00 |
| L7 | 10 | 8.81E+04 |
| L8 | 11 | 8.73 |
| L9 | 13 | −16.33 |
| L10 | 16 | 16.37 |
| L11 | 18 | −21.82 |
| L12 | 20 | 21.10 |
| L13 | 22 | −138.40 |
| L14 | 24 | 33.38 |
| L15 | 25 | 8.13E+06 |
| L16 | 26 | −57.61 |
| L17 | 28 | 87.85 |

Zoom lens group data

Unit mm

| Unit | Initial surface | Focal length | Lens structure length | Front side principal point | Back side principal point |
|---|---|---|---|---|---|
| 1 | 1 | 58.2076 | 10.5527 | 2.6117 | −4.0781 |
| 2 | 7 | −7.0581 | 13.5160 | 1.8626 | −7.1411 |
| 3 | 15 | 17.2879 | 15.6380 | 1.5661 | −9.6119 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1597 | −0.2978 | −1.3283 |
| 3 | 15 | −0.6965 | −1.8984 | −1.7028 |
| 4 | 24 | 0.7822 | 0.6685 | 0.7480 |
| 5 | 28 | 0.9420 | 0.9429 | 0.9420 |

EXAMPLE 6

Unit mm

Surface data

| Surface no. | r | d | nd | vd | effective radius |
|---|---|---|---|---|---|
| Object plane | ∞ | ∞ | | | |
| 1 | 69.000 | 1.35 | 1.80810 | 22.76 | 17.50 |
| 2 | 31.176 | 1.25 | 1.70000 | 17.00 | 15.72 |
| 3 | 39.287 | 4.19 | 1.49700 | 81.54 | 15.59 |
| 4 | 52816.323 | 0.10 | | | 15.50 |
| 5 | 36.779 | 3.51 | 1.63246 | 63.76 | 15.21 |
| 6 | 159.280 | Variable | | | 15.00 |
| 7 | 55.190 | 1.10 | 1.88300 | 40.76 | 8.97 |
| 8 | 7.565 | 4.79 | | | 6.40 |
| 9 | −46.254 | 0.80 | 1.88300 | 40.76 | 6.30 |
| 10 | 12.396 | 0.01 | 1.51400 | 42.83 | 6.30 |
| 11 | 12.396 | 4.87 | 1.78472 | 25.68 | 6.31 |
| 12 | −12.684 | 1.15 | | | 6.36 |
| 13 | −11.499 | 0.80 | 1.77250 | 49.60 | 5.65 |
| 14* | −163.454 | Variable | | | 5.70 |
| 15(stop) | ∞ | 1.30 | | | 3.94 |
| 16* | 10.743 | 4.93 | 1.58913 | 61.14 | 4.60 |
| 17 | −78.051 | 0.10 | | | 4.61 |
| 18 | 28.041 | 2.77 | 1.84666 | 23.78 | 4.59 |
| 19 | 10.632 | 1.42 | | | 4.28 |
| 20 | 14.230 | 3.12 | 1.49700 | 81.54 | 4.55 |
| 21 | −36.985 | 0.64 | | | 4.59 |
| 22* | 64.763 | 1.36 | 1.53071 | 55.69 | 4.57 |
| 23* | 34.607 | Variable | | | 4.57 |
| 24 | 19.130 | 2.68 | 1.49700 | 81.54 | 4.85 |
| 25 | −119.090 | 0.01 | 1.51400 | 42.83 | 4.72 |
| 26 | −119.090 | 0.82 | 1.80400 | 46.57 | 4.72 |
| 27 | 76.031 | Variable | | | 4.67 |
| 28* | 147.374 | 1.63 | 1.53071 | 55.69 | 4.16 |
| 29* | −67.939 | 1.09 | | | 4.07 |
| 30 | ∞ | 4.00 | 1.51680 | 64.20 | 4.01 |
| 31 | ∞ | 1.06 | | | 3.85 |
| Image plane | ∞ | | | | |

Aspherical surface data

14th surface

K = 0.000, A2 = 0.0000E+00, A4 = −9.19823e−05, A6 = −8.80923e−07, A8 = 4.39702e−08, A10 = −1.24247e−09

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 8.15873e−04, A6 = 4.82675e−06, A8 = −2.20386e−06, A10 = 4.10510e−08

29th surface

K = 0.000, A2 = 0.0000E+00, A4 = 1.26016e−03, A6 = 1.60282e−05, A8 = −3.90922e−06, A10 = 7.56282e−08

Various data
Zoom ratio 19.30

| | Wide angle | Intermediate | Telephoto |
|---|---|---|---|
| Focal length | 4.77 | 20.88 | 92.05 |
| Fno. | 2.66 | 4.01 | 3.84 |
| Angle of field 2ω | 76.38 | 19.00 | 4.36 |
| Image height | 3.6 | 3.6 | 3.6 |
| Lens total length | 82.40 | 102.94 | 115.75 |
| BF | 4.78 | 4.75 | 4.82 |
| d6 | 1.00 | 21.82 | 42.81 |
| d14 | 24.85 | 8.49 | 2.30 |
| d23 | 1.28 | 10.67 | 9.38 |
| d27 | 5.80 | 12.51 | 11.73 |
| Entrance pupil position | 18.66 | 72.34 | 378.60 |
| Exit pupil position A | −31.58 | −91.68 | −79.49 |
| Exit pupil position B | −36.37 | −96.43 | −84.31 |
| Front side principal point position | 22.81 | 88.70 | 370.15 |
| Back side principal point position | −3.71 | −19.86 | −90.96 |

Single lens data

| Lens | Initial surface | focal length |
|---|---|---|
| L1 | 1 | −71.52 |
| L2 | 2 | 202.83 |
| L3 | 3 | 79.10 |
| L4 | 5 | 74.78 |
| L5 | 7 | −10.04 |
| L6 | 9 | −11.00 |
| L7 | 10 | 8.81E+04 |
| L8 | 11 | 8.73 |
| L9 | 13 | −16.05 |
| L10 | 16 | 16.37 |
| L11 | 18 | −21.82 |
| L12 | 20 | 21.10 |
| L13 | 22 | −142.27 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 61.5289 | 10.4082 | 2.4688 | −4.1231 |
| 2 | 7 | −7.0390 | 13.5160 | 1.9312 | −7.0219 |
| 3 | 15 | 17.2585 | 15.6380 | 1.5961 | −9.5971 |
| 4 | 24 | 73.7783 | 3.5080 | −2.0985 | −4.2304 |
| 5 | 28 | 87.8520 | 6.7160 | 0.7294 | −4.0624 |

-continued

Unit mm

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1484 | −0.2645 | −1.2521 |
| 3 | 15 | −0.7105 | −1.9732 | −1.8144 |
| 4 | 24 | 0.7806 | 0.6900 | 0.6995 |
| 5 | 28 | 0.9417 | 0.9422 | 0.9414 |

EXAMPLE 7

Unit mm

Surface data

| Surface no. | r | d | nd | vd | effective radius |
|---|---|---|---|---|---|
| Object plane | ∞ | ∞ | | | |
| 1 | 69.500 | 1.25 | 1.80810 | 22.76 | 17.50 |
| 2 | 30.782 | 1.24 | 1.70000 | 17.00 | 15.72 |
| 3 | 39.414 | 4.22 | 1.49700 | 81.54 | 15.65 |
| 4 | 54830.052 | 0.10 | | | 15.50 |
| 5 | 36.565 | 3.57 | 1.63246 | 63.76 | 15.21 |
| 6 | 160.922 | Variable | | | 15.00 |
| 7 | 53.792 | 1.10 | 1.88300 | 40.76 | 9.09 |
| 8 | 7.556 | 4.79 | | | 6.45 |
| 9 | −46.254 | 0.80 | 1.88300 | 40.76 | 6.36 |
| 10 | 12.396 | 0.01 | 1.51400 | 42.83 | 6.37 |
| 11 | 12.396 | 4.87 | 1.78472 | 25.68 | 6.37 |
| 12 | −12.684 | 1.15 | | | 6.42 |
| 13 | −11.499 | 0.80 | 1.77250 | 49.60 | 5.71 |
| 14* | −163.375 | Variable | | | 5.76 |
| 15(stop) | ∞ | 1.30 | | | 3.94 |
| 16* | 10.743 | 4.93 | 1.58913 | 61.14 | 4.60 |
| 17 | −78.051 | 0.10 | | | 4.61 |
| 18 | 28.041 | 2.77 | 1.84666 | 23.78 | 4.59 |
| 19 | 10.632 | 1.42 | | | 4.28 |
| 20 | 14.230 | 3.12 | 1.49700 | 81.54 | 4.55 |
| 21 | −36.985 | 0.64 | | | 4.60 |
| 22* | 65.138 | 1.36 | 1.53071 | 55.69 | 4.57 |
| 23* | 34.607 | Variable | | | 4.57 |
| 24 | 19.130 | 2.68 | 1.49700 | 81.54 | 4.84 |
| 25 | −119.090 | 0.01 | 1.51400 | 42.83 | 4.71 |
| 26 | −119.090 | 0.82 | 1.80400 | 46.57 | 4.71 |
| 27 | 76.031 | Variable | | | 4.66 |
| 28* | 147.374 | 1.63 | 1.53071 | 55.69 | 4.16 |
| 29* | −67.939 | 1.09 | | | 4.07 |
| 30 | ∞ | 4.00 | 1.51680 | 64.20 | 4.01 |
| 31 | ∞ | 1.06 | | | 3.84 |
| Image plane | ∞ | | | | |

Aspherical surface data

14th surface

K = 0.000, A2 = 0.0000E+00, A4 = −9.19823e−05, A6 = −8.80923e−07, A8 = 4.39702e−08, A10 = −1.24247e−09

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 8.15873e−04, A6 = 4.82675e−06, A8 = −2.20386e−06, A10 = 4.10510e−08

29th surface

K = 0.000, A2 = 0.0000E+00, A4 = 1.26016e−03, A6 = 1.60282e−05, A8 = −3.90922e−06, A10 = 7.56282e−08

Various data
Zoom ratio 19.35

| | Wide angle | Intermediate | Telephoto |
|---|---|---|---|
| Focal length | 4.73 | 19.71 | 91.55 |
| Fno. | 2.65 | 3.86 | 3.92 |
| Angle of field 2ω | 76.67 | 20.09 | 4.39 |
| Image height | 3.6 | 3.6 | 3.6 |
| Lens total length | 82.59 | 101.51 | 116.35 |
| BF | 4.78 | 4.67 | 4.64 |
| d6 | 1.00 | 21.88 | 42.48 |
| d14 | 25.16 | 9.09 | 2.30 |
| d23 | 1.29 | 8.78 | 10.30 |
| d27 | 5.70 | 12.42 | 11.96 |
| Entrance pupil position | 18.68 | 72.96 | 365.56 |
| Exit pupil position A | −31.42 | −78.06 | −86.62 |
| Exit pupil position B | −36.20 | −82.73 | −91.26 |
| Front side principal point position | 22.79 | 87.98 | 365.26 |
| Back side principal point position | −3.68 | −18.76 | −90.64 |

Single lens data

| Lens | Initial surface | focal length |
|---|---|---|
| L1 | 1 | −69.38 |
| L2 | 2 | 189.59 |
| L3 | 3 | 79.36 |
| L4 | 5 | 73.99 |
| L5 | 7 | −10.07 |
| L6 | 9 | −11.00 |
| L7 | 10 | 8.81E+04 |
| L8 | 11 | 8.73 |
| L9 | 13 | −16.05 |
| L10 | 16 | 16.37 |
| L11 | 18 | −21.82 |
| L12 | 20 | 21.10 |
| L13 | 22 | −141.31 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 61.3953 | 10.3740 | 2.4935 | −4.0821 |
| 2 | 7 | −7.0582 | 13.5160 | 1.9369 | −7.0177 |
| 3 | 15 | 17.2656 | 15.6380 | 1.5888 | −9.6007 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1492 | −0.2670 | −1.2089 |
| 3 | 15 | −0.7016 | −1.8410 | −1.8702 |
| 4 | 24 | 0.7818 | 0.6924 | 0.6991 |
| 5 | 28 | 0.9417 | 0.9430 | 0.9434 |

EXAMPLE 8

Unit mm

Surface data

| Surface no. | r | d | nd | νd | effective radius |
|---|---|---|---|---|---|
| Object plane | ∞ | ∞ | | | |
| 1 | 63.000 | 1.41 | 1.90680 | 21.15 | 17.50 |
| 2 | 30.257 | 1.53 | 1.70000 | 17.00 | 15.74 |
| 3 | 40.127 | 4.38 | 1.48749 | 70.23 | 15.68 |
| 4 | 369345.602 | 0.10 | | | 15.50 |
| 5 | 34.447 | 3.84 | 1.63246 | 63.76 | 15.21 |
| 6 | 184.902 | Variable | | | 15.00 |
| 7 | 59.337 | 1.10 | 1.88300 | 40.76 | 8.85 |
| 8 | 7.463 | 4.79 | | | 6.29 |
| 9 | −46.254 | 0.80 | 1.88300 | 40.76 | 6.18 |
| 10 | 12.396 | 0.01 | 1.51400 | 42.83 | 6.18 |
| 11 | 12.396 | 4.87 | 1.78472 | 25.68 | 6.18 |
| 12 | −12.684 | 1.15 | | | 6.23 |
| 13 | −11.499 | 0.80 | 1.77250 | 49.60 | 5.55 |
| 14* | −160.733 | Variable | | | 5.60 |
| 15(stop) | ∞ | 1.30 | | | 3.94 |
| 16* | 10.743 | 4.93 | 1.58913 | 61.14 | 4.60 |
| 17 | −78.051 | 0.10 | | | 4.61 |
| 18 | 28.041 | 2.77 | 1.84666 | 23.78 | 4.59 |
| 19 | 10.632 | 1.42 | | | 4.29 |
| 20 | 14.230 | 3.12 | 1.49700 | 81.54 | 4.56 |
| 21 | −36.985 | 0.64 | | | 4.61 |
| 22* | 67.579 | 1.36 | 1.53071 | 55.69 | 4.58 |
| 23* | 34.607 | Variable | | | 4.58 |
| 24 | 19.130 | 2.68 | 1.49700 | 81.54 | 4.85 |
| 25 | −119.090 | 0.01 | 1.51400 | 42.83 | 4.73 |
| 26 | −119.090 | 0.82 | 1.80400 | 46.57 | 4.73 |
| 27 | 76.031 | Variable | | | 4.68 |
| 28* | 147.374 | 1.63 | 1.53071 | 55.69 | 4.14 |
| 29* | −67.939 | 1.09 | | | 4.06 |
| 30 | ∞ | 4.00 | 1.51680 | 64.20 | 4.00 |
| 31 | ∞ | 1.03 | | | 3.84 |
| Image plane | ∞ | | | | |

Aspherical surface data

14th surface $\kappa = 0.000, A2 = 0.0000E+00, A4 = -9.19823e-05, A6 = -8.80923e-07, A8 = 4.39702e-08, A10 = -1.24247e-09$ 16th surface $\kappa = 0.000, A2 = 0.0000E+00, A4 = -8.77784e-05, A6 = -1.01116e-06, A8 = 5.64180e-08, A10 = -2.23368e-09, A12 = 3.59187e-11$ 22nd surface $\kappa = 0.000, A2 = 0.0000E+00, A4 = -2.17277e-04, A6 = 5.36299e-06, A8 = -5.28517e-07, A10 = 1.10330e-08, A12 = -1.37250e-10$ 23rd surface $\kappa = 0.000, A2 = 0.0000E+00, A4 = -1.09771e-04, A6 = 5.91402e-06, A8 = -5.09130e-07, A10 = 8.38419e-09, A12 = -4.36735e-11$ 28th surface $\kappa = 0.000, A2 = 0.0000E+00, A4 = 8.15873e-04, A6 = 4.82675e-06, A8 = -2.20386e-06, A10 = 4.10510e-08$ 29th surface $\kappa = 0.000, A2 = 0.0000E+00, A4 = 1.26016e-03, A6 = 1.60282e-05, A8 = -3.90922e-06, A10 = 7.56282e-08$

Various data
Zoom ratio 19.17

| | Wide angle | Intermediate | Telephoto |
|---|---|---|---|
| Focal length | 4.82 | 19.29 | 92.34 |
| Fno. | 2.68 | 3.82 | 3.99 |
| Angle of field 2ω | 75.70 | 20.49 | 4.35 |
| Image height | 3.6 | 3.6 | 3.6 |
| Lens total length | 83.26 | 100.70 | 115.42 |
| BF | 4.76 | 4.72 | 4.76 |
| d6 | 1.00 | 20.68 | 39.81 |
| d14 | 24.65 | 9.34 | 2.30 |
| d23 | 1.33 | 7.43 | 11.68 |
| d27 | 5.98 | 12.98 | 11.32 |
| Entrance pupil position | 19.27 | 72.20 | 350.55 |
| Exit pupil position A | −31.94 | −71.93 | −94.43 |
| Exit pupil position B | −36.70 | −76.65 | −99.19 |
| Front side principal point position | 23.45 | 86.64 | 356.93 |
| Back side principal point position | −3.79 | −18.29 | −91.30 |

Single lens data

| Lens | Initial surface | focal length |
|---|---|---|
| L1 | 1 | −65.54 |
| L2 | 2 | 165.20 |
| L3 | 3 | 82.32 |
| L4 | 5 | 66.28 |
| L5 | 7 | −9.76 |
| L6 | 9 | −11.00 |
| L7 | 10 | 8.81E+04 |
| L8 | 11 | 8.73 |
| L9 | 13 | −16.07 |
| L10 | 16 | 16.37 |
| L11 | 18 | −21.82 |
| L12 | 20 | 21.10 |
| L13 | 22 | −135.59 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 58.2790 | 11.2600 | 2.8807 | −4.2397 |
| 2 | 7 | −6.8875 | 13.5160 | 1.8912 | −7.0591 |
| 3 | 15 | 17.3103 | 15.6380 | 1.5431 | −9.6233 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1556 | −0.2802 | −1.2645 |
| 3 | 15 | −0.7243 | −1.8324 | −1.8839 |
| 4 | 24 | 0.7785 | 0.6841 | 0.7060 |
| 5 | 28 | 0.9420 | 0.9424 | 0.9420 |

EXAMPLE 9

Unit mm

Surface data

| Surface no. | r | d | nd | νd | effective radius |
|---|---|---|---|---|---|
| Object plane | ∞ | ∞ | | | |
| 1 | 62.800 | 2.48 | 1.92286 | 18.90 | 18.30 |
| 2 | 30.887 | 1.51 | 1.73000 | 15.00 | 17.25 |
| 3 | 39.169 | 5.31 | 1.51823 | 58.90 | 17.14 |
| 4 | −627.430 | 0.10 | | | 15.50 |
| 5 | 32.048 | 3.93 | 1.64000 | 60.08 | 15.19 |
| 6 | 122.361 | Variable | | | 15.00 |
| 7 | 86.349 | 1.10 | 1.88300 | 40.76 | 8.93 |

-continued

Unit mm

| | | | | | |
|---|---|---|---|---|---|
| 8 | 7.578 | 4.79 | 1.88300 | 40.76 | 6.23 |
| 9 | −46.254 | 0.80 | | | 5.96 |
| 10 | 12.396 | 0.01 | 1.51400 | 42.83 | 5.86 |
| 11 | 12.396 | 4.87 | 1.78472 | 25.68 | 5.86 |
| 12 | −12.684 | 1.15 | | | 5.90 |
| 13 | −11.499 | 0.80 | 1.77250 | 49.60 | 5.29 |
| 14* | −223.647 | Variable | | | 5.32 |
| 15(stop) | ∞ | 1.30 | | | 3.94 |
| 16* | 10.743 | 4.93 | 1.58913 | 61.14 | 4.60 |
| 17 | −78.051 | 0.10 | | | 4.61 |
| 18 | 28.041 | 2.77 | 1.84666 | 23.78 | 4.59 |
| 19 | 10.632 | 1.42 | | | 4.28 |
| 20 | 14.230 | 3.12 | 1.49700 | 81.54 | 4.55 |
| 21 | −36.985 | 0.64 | | | 4.60 |
| 22* | 75.399 | 1.36 | 1.53071 | 55.69 | 4.57 |
| 23* | 34.607 | Variable | | | 4.58 |
| 24 | 19.130 | 2.68 | 1.49700 | 81.54 | 4.80 |
| 25 | −119.090 | 0.01 | 1.51400 | 42.83 | 4.68 |
| 26 | −119.090 | 0.82 | 1.80400 | 46.57 | 4.68 |
| 27 | 76.031 | Variable | | | 4.64 |
| 28* | 147.374 | 1.63 | 1.53071 | 55.69 | 4.14 |
| 29* | −67.939 | 1.09 | | | 4.06 |
| 30 | ∞ | 4.00 | 1.51680 | 64.20 | 4.00 |
| 31 | ∞ | 0.97 | | | 3.84 |
| Image plane | ∞ | | | | |

Aspherical surface data

14th surface

κ = 0.000, A2 = 0.0000E+00, A4 = −9.19823e−05, A6 = −8.80923e−07, A8 = 4.39702e−08, A10 = −1.24247e−09

16th surface

κ = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

κ = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

κ = 0.000, A2 = 0.0000E+00, A4 = −1.09771e−04, A6 = 5.91402e−06, A8 = −5.09130e−07, A10 = 8.38419e−09, A12 = −4.36735e−11

28th surface

κ = 0.000, A2 = 0.0000E+00, A4 = 8.15873e−04, A6 = 4.82675e−06, A8 = −2.20386e−06, A10 = 4.10510e−08

29th surface

κ = 0.000, A2 = 0.0000E+00, A4 = 1.26016e−03, A6 = 1.60282e−05, A8 = −3.90922e−06, A10 = 7.56282e−08

Various data
Zoom ratio 19.87

| | Wide angle | Intermediate | Telephoto |
|---|---|---|---|
| Focal length | 4.68 | 19.29 | 92.93 |
| Fno. | 2.69 | 3.82 | 3.97 |
| Angle of field 2ω | 77.36 | 20.54 | 4.33 |
| Image height | 3.6 | 3.6 | 3.6 |
| Lens total length | 86.66 | 101.23 | 112.35 |
| BF | 4.70 | 4.69 | 4.70 |
| d6 | 1.00 | 18.85 | 35.56 |
| d14 | 26.09 | 9.99 | 2.30 |
| d23 | 1.29 | 6.60 | 8.83 |
| d27 | 5.95 | 13.47 | 13.35 |
| Entrance pupil position | 21.18 | 73.90 | 337.46 |
| Exit pupil position A | −31.58 | −68.65 | −80.95 |
| Exit pupil position B | −36.28 | −73.34 | −85.64 |
| Front side principal point position | 25.25 | 88.12 | 329.55 |
| Back side principal point position | −3.71 | −18.32 | −91.96 |

-continued

Unit mm

Single lens data

| Lens | Initial surface | focal length |
|---|---|---|
| L1 | 1 | −68.41 |
| L2 | 2 | 185.77 |
| L3 | 3 | 71.34 |
| L4 | 5 | 66.71 |
| L5 | 7 | −9.47 |
| L6 | 9 | −11.00 |
| L7 | 10 | 8.81E+04 |
| L8 | 11 | 8.73 |
| L9 | 13 | −15.72 |
| L10 | 16 | 16.37 |
| L11 | 18 | −21.82 |
| L12 | 20 | 21.10 |
| L13 | 22 | −121.94 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 53.8598 | 13.3306 | 3.2158 | −5.0784 |
| 2 | 7 | −6.5877 | 13.5160 | 1.8976 | −6.9725 |
| 3 | 15 | 17.4353 | 15.6380 | 1.4155 | −9.6864 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1676 | −0.3071 | −1.3903 |
| 3 | 15 | −0.7048 | −1.8250 | −1.9374 |
| 4 | 24 | 0.7797 | 0.6779 | 0.6795 |
| 5 | 28 | 0.9427 | 0.9427 | 0.9427 |

EXAMPLE 10

Unit mm

Surface data

| Surface no. | r | d | nd | νd | effective radius |
|---|---|---|---|---|---|
| Object plane | ∞ | ∞ | | | |
| 1 | 65.000 | 1.24 | 1.90680 | 21.15 | 17.50 |
| 2 | 30.035 | 1.51 | 1.70010 | 17.01 | 15.79 |
| 3 | 40.312 | 4.21 | 1.49700 | 81.54 | 15.69 |
| 4 | 906535.175 | 0.10 | | | 15.50 |
| 5 | 34.058 | 3.95 | 1.64000 | 60.08 | 15.23 |
| 6 | 177.217 | Variable | | | 15.00 |
| 7 | 56.111 | 1.10 | 1.88300 | 40.76 | 9.02 |
| 8 | 7.464 | 4.79 | | | 6.37 |
| 9 | −46.254 | 0.80 | 1.88300 | 40.76 | 6.28 |
| 10 | 12.396 | 0.01 | 1.51400 | 42.83 | 6.28 |
| 11 | 12.396 | 4.87 | 1.78472 | 25.68 | 6.28 |
| 12 | −12.684 | 1.15 | | | 6.33 |
| 13 | −11.499 | 0.80 | 1.77250 | 49.60 | 5.64 |
| 14* | −167.135 | Variable | | | 5.69 |
| 15(stop) | ∞ | 1.30 | | | 3.94 |
| 16* | 10.743 | 4.93 | 1.58913 | 61.14 | 4.60 |
| 17 | −78.051 | 0.10 | | | 4.60 |
| 18 | 28.041 | 2.77 | 1.84666 | 23.78 | 4.58 |
| 19 | 10.632 | 1.42 | | | 4.27 |
| 20 | 14.230 | 3.12 | 1.49700 | 81.54 | 4.54 |

-continued

Unit mm

| | | | | | |
|---|---|---|---|---|---|
| 21 | −36.985 | 0.64 | | | 4.59 |
| 22* | 75.391 | 1.36 | 1.53071 | 55.69 | 4.56 |
| 23* | 34.607 | Variable | | | 4.56 |
| 24 | 19.130 | 2.68 | 1.49700 | 81.54 | 4.82 |
| 25 | −119.090 | 0.01 | 1.51400 | 42.83 | 4.70 |
| 26 | −119.090 | 0.82 | 1.80400 | 46.57 | 4.70 |
| 27 | 76.031 | Variable | | | 4.65 |
| 28* | 147.374 | 1.63 | 1.53071 | 55.69 | 4.14 |
| 29* | −67.939 | 1.09 | | | 4.05 |
| 30 | ∞ | 4.00 | 1.51680 | 64.20 | 3.99 |
| 31 | ∞ | 1.03 | | | 3.84 |
| Image plane | ∞ | | | | |

Aspherical surface data

14th surface

κ = 0.000, A2 = 0.0000E+00, A4 = −9.19823e−05, A6 = −8.80923e−07, A8 = 4.39702e−08, A10 = −1.24247e−09

16th surface

κ = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

κ = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

κ = 0.000, A2 = 0.0000E+00, A4 = −1.09771e−04, A6 = 5.91402e−06, A8 = −5.09130e−07, A10 = 8.38419e−09, A12 = −4.36735e−11

28th surface

κ = 0.000, A2 = 0.0000E+00, A4 = 8.15873e−04, A6 = 4.82675e−06, A8 = −2.20386e−06, A10 = 4.10510e−08

29th surface

κ = 0.000, A2 = 0.0000E+00, A4 = 1.26016e−03, A6 = 1.60282e−05, A8 = −3.90922e−06, A10 = 7.56282e−08

Various data
Zoom ratio 19.38

| | Wide angle | Intermediate | Telephoto |
|---|---|---|---|
| Focal length | 4.77 | 19.30 | 92.38 |
| Fno. | 2.70 | 3.84 | 4.00 |
| Angle of field 2ω | 76.06 | 20.50 | 4.35 |
| Image height | 3.6 | 3.6 | 3.6 |
| Lens total length | 83.78 | 100.95 | 114.80 |
| BF | 4.76 | 4.70 | 4.76 |
| d6 | 1.00 | 20.75 | 39.70 |
| d14 | 25.44 | 9.73 | 2.30 |
| d23 | 1.33 | 7.55 | 10.06 |
| d27 | 5.95 | 12.92 | 12.68 |
| Entrance pupil position | 19.14 | 72.54 | 346.58 |
| Exit pupil position A | −31.66 | −71.85 | −86.80 |
| Exit pupil position B | −36.42 | −76.55 | −91.56 |
| Front side principal point position | 23.29 | 86.98 | 345.75 |
| Back side principal point position | −3.74 | −18.32 | −91.35 |

Single lens data

| Lens | Initial surface | focal length |
|---|---|---|
| L1 | 1 | −62.63 |
| L2 | 2 | 158.66 |
| L3 | 3 | 81.11 |
| L4 | 5 | 65.17 |
| L5 | 7 | −9.86 |
| L6 | 9 | −11.00 |
| L7 | 10 | 8.81E+04 |
| L8 | 11 | 8.73 |
| L9 | 13 | −16.02 |
| L10 | 16 | 16.37 |
| L11 | 18 | −21.82 |
| L12 | 20 | 21.10 |
| L13 | 22 | −121.95 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 58.1432 | 11.0180 | 2.7809 | −4.1469 |
| 2 | 7 | −6.9234 | 13.5160 | 1.9148 | −7.0295 |
| 3 | 15 | 17.4352 | 15.6380 | 1.4156 | −9.6863 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1568 | −0.2837 | −1.2677 |
| 3 | 15 | −0.7128 | −1.8119 | −1.9351 |
| 4 | 24 | 0.7789 | 0.6852 | 0.6876 |
| 5 | 28 | 0.9420 | 0.9426 | 0.9420 |

EXAMPLE 11

Unit mm

Surface data

| Surface no. | r | d | nd | νd | effective radius |
|---|---|---|---|---|---|
| Object plane | ∞ | ∞ | | | |
| 1 | 58.500 | 2.40 | 1.92286 | 20.88 | 18.00 |
| 2 | 31.247 | 1.49 | 1.70010 | 17.01 | 17.33 |
| 3 | 39.455 | 5.22 | 1.49700 | 81.54 | 17.22 |
| 4 | −963.692 | 0.10 | | | 15.50 |
| 5 | 32.658 | 3.81 | 1.63246 | 63.76 | 15.19 |
| 6 | 123.526 | Variable | | | 15.00 |
| 7 | 80.785 | 1.10 | 1.88300 | 40.76 | 9.11 |
| 8 | 7.591 | 4.79 | | | 6.33 |
| 9 | −46.254 | 0.80 | 1.88300 | 40.76 | 6.11 |
| 10 | 12.396 | 0.01 | 1.51400 | 42.83 | 5.97 |
| 11 | 12.396 | 4.87 | 1.78472 | 25.68 | 5.97 |
| 12 | −12.684 | 1.15 | | | 5.93 |
| 13 | −11.499 | 0.80 | 1.77250 | 49.60 | 5.29 |
| 14* | −235.968 | Variable | | | 5.32 |
| 15(stop) | ∞ | 1.30 | | | 3.94 |
| 16* | 10.743 | 4.93 | 1.58913 | 61.14 | 4.60 |
| 17 | −78.051 | 0.10 | | | 4.60 |
| 18 | 28.041 | 2.77 | 1.84666 | 23.78 | 4.58 |
| 19 | 10.632 | 1.42 | | | 4.28 |
| 20 | 14.230 | 3.12 | 1.49700 | 81.54 | 4.55 |
| 21 | −36.985 | 0.64 | | | 4.59 |
| 22* | 75.823 | 1.36 | 1.53071 | 55.69 | 4.56 |
| 23* | 34.607 | Variable | | | 4.57 |
| 24 | 19.130 | 2.68 | 1.49700 | 81.54 | 4.82 |
| 25 | −119.090 | 0.01 | 1.51400 | 42.83 | 4.70 |
| 26 | −119.090 | 0.82 | 1.80400 | 46.57 | 4.70 |
| 27 | 76.031 | Variable | | | 4.65 |
| 28* | 147.374 | 1.63 | 1.53071 | 55.69 | 4.14 |
| 29* | −67.939 | 1.09 | | | 4.06 |
| 30 | ∞ | 4.00 | 1.51680 | 64.20 | 4.00 |
| 31 | ∞ | 1.01 | | | 3.84 |
| Image plane | ∞ | | | | |

-continued

Unit mm

Aspherical surface data

14th surface

κ = 0.000, A2 = 0.0000E+00, A4 = −9.19823e−05, A6 = −8.80923e−07,
A8 = 4.39702e−08, A10 = −1.24247e−09
16th surface κ = 0.000, A2 = 0.0000E+00, A4 = −8.77784e−05, A6 = −1.01116e−06,
A8 = 5.64180e−08, A10 = −2.23368e−09, A12 = 3.59187e−11
22nd surface κ = 0.000, A2 = 0.0000E+00, A4 = −2.17277e−04, A6 = 5.36299e−06,
A8 = −5.28517e−07, A10 = 1.10330e−08, A12 = −1.37250e−10
23rd surface κ = 0.000, A2 = 0.0000E+00, A4 = −1.09771e−04, A6 = 5.91402e−06,
A8 = −5.09130e−07, A10 = 8.38419e−09, A12 = −4.36735e−11
28th surface κ = 0.000, A2 = 0.0000E+00, A4 = 8.15873e−04, A6 = 4.82675e−06,
A8 = −2.20386e−06, A10 = 4.10510e−08
29th surface κ = 0.000, A2 = 0.0000E+00, A4 = 1.26016e−03, A6 = 1.60282e−05,
A8 = −3.90922e−06, A10 = 7.56282e−08

Various data
Zoom ratio 19.83

| | Wide angle | Intermediate | Telephoto |
|---|---|---|---|
| Focal length | 4.68 | 19.29 | 92.91 |
| Fno. | 2.69 | 3.81 | 4.06 |
| Angle of field 2ω | 77.24 | 20.54 | 4.33 |
| Image height | 3.6 | 3.6 | 3.6 |
| Lens total length | 86.39 | 101.63 | 113.69 |
| BF | 4.74 | 4.72 | 4.73 |
| d6 | 1.00 | 19.45 | 36.13 |
| d14 | 26.13 | 10.19 | 2.30 |
| d23 | 1.31 | 6.96 | 9.11 |
| d27 | 5.90 | 13.00 | 14.11 |
| Entrance pupil position | 21.11 | 75.92 | 333.28 |
| Exit pupil position A | −31.52 | −68.98 | −85.70 |
| Exit pupil position B | −36.26 | −73.70 | −90.43 |
| Front side principal point position | 25.19 | 90.16 | 330.73 |
| Back side principal point position | −3.67 | −18.30 | −91.91 |

Single lens data

| Lens | Initial surface | focal length |
|---|---|---|
| L1 | 1 | −75.89 |
| L2 | 2 | 199.64 |
| L3 | 3 | 76.40 |
| L4 | 5 | 69.07 |
| L5 | 7 | −9.56 |
| L6 | 9 | −11.00 |
| L7 | 10 | 8.81E+04 |
| L8 | 11 | 8.73 |
| L9 | 13 | −15.67 |
| L10 | 16 | 16.37 |
| L11 | 18 | −21.82 |
| L12 | 20 | 21.10 |
| L13 | 22 | −121.35 |
| L14 | 24 | 33.38 |
| L15 | 25 | 8.13E+06 |
| L16 | 26 | −57.61 |
| L17 | 28 | 87.85 |

-continued

Unit mm

Zoom lens group data

| Unit | Initial surface | Focal length | Lens structure length | Front side principal point position | Back side principal point position |
|---|---|---|---|---|---|
| 1 | 1 | 54.9139 | 13.0201 | 3.0049 | −5.1808 |
| 2 | 7 | −6.6219 | 13.5160 | 1.9195 | −6.9448 |
| 3 | 15 | 17.4414 | 15.6380 | 1.4093 | −9.6895 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1648 | −0.3045 | −1.3073 |
| 3 | 15 | −0.7046 | −1.7905 | −2.0539 |
| 4 | 24 | 0.7799 | 0.6838 | 0.6687 |
| 5 | 28 | 0.9423 | 0.9424 | 0.9423 |

EXAMPLE 12

Unit mm

Surface data

| Surface no. | r | d | nd | νd | effective radius |
|---|---|---|---|---|---|
| Object plane | ∞ | ∞ | | | |
| 1 | 51.000 | 2.82 | 1.92286 | 18.90 | 19.00 |
| 2 | 31.584 | 1.39 | 1.69952 | 16.99 | 18.35 |
| 3 | 37.866 | 6.13 | 1.48563 | 85.20 | 18.23 |
| 4 | −590.327 | 0.10 | | | 15.50 |
| 5 | 32.508 | 3.44 | 1.63246 | 63.76 | 15.02 |
| 6 | 92.463 | Variable | | | 15.00 |
| 7 | 107.902 | 1.10 | 1.88300 | 40.76 | 9.32 |
| 8 | 7.686 | 4.79 | | | 6.42 |
| 9 | −46.254 | 0.80 | 1.88300 | 40.76 | 6.21 |
| 10 | 12.396 | 0.01 | 1.51400 | 42.83 | 6.06 |
| 11 | 12.396 | 4.87 | 1.78472 | 25.68 | 6.06 |
| 12 | −12.684 | 1.15 | | | 6.02 |
| 13 | −11.499 | 0.80 | 1.77250 | 49.60 | 5.33 |
| 14* | −320.898 | Variable | | | 5.36 |
| 15(stop) | ∞ | 1.30 | | | 3.94 |
| 16* | 10.743 | 4.93 | 1.58913 | 61.14 | 4.60 |
| 17 | −78.051 | 0.10 | | | 4.62 |
| 18 | 28.041 | 2.77 | 1.84666 | 23.78 | 4.60 |
| 19 | 10.632 | 1.42 | | | 4.29 |
| 20 | 14.230 | 3.12 | 1.49700 | 81.54 | 4.56 |
| 21 | −36.985 | 0.64 | | | 4.61 |
| 22* | 70.067 | 1.36 | 1.53071 | 55.69 | 4.58 |
| 23* | 34.607 | Variable | | | 4.59 |
| 24 | 19.130 | 2.68 | 1.49700 | 81.54 | 4.83 |
| 25 | −119.090 | 0.01 | 1.51400 | 42.83 | 4.71 |
| 26 | −119.090 | 0.82 | 1.80400 | 46.57 | 4.71 |
| 27 | 76.031 | Variable | | | 4.66 |
| 28* | 147.374 | 1.63 | 1.53071 | 55.69 | 4.15 |
| 29* | −67.939 | 1.09 | | | 4.07 |
| 30 | ∞ | 4.00 | 1.51680 | 64.20 | 4.01 |
| 31 | ∞ | 0.97 | | | 3.85 |
| Image plane | ∞ | | | | |

Aspherical surface data

14th surface

κ = 0.000, A2 = 0.0000E+00, A4 = −9.19823e−05, A6 = −8.80923e−07,
A8 = 4.39702e−08, A10 = −1.24247e−09

-continued

Unit mm

16th surface $\kappa$ = 0.000, A2 = 0.0000E+00, A4 = −8.77784e−05, A6 = −1.01116e−06, A8 = 5.64180e−08, A10 = −2.23368e−09, A12 = 3.59187e−11

22nd surface $\kappa$ = 0.000, A2 = 0.0000E+00, A4 = −2.17277e−04, A6 = 5.36299e−06, A8 = −5.28517e−07, A10 = 1.10330e−08, A12 = −1.37250e−10

23rd surface $\kappa$ = 0.000, A2 = 0.0000E+00, A4 = −1.09771e−04, A6 = 5.91402e−06, A8 = −5.09130e−07, A10 = 8.38419e−09, A12 = −4.36735e−11

28th surface $\kappa$ = 0.000, A2 = 0.0000E+00, A4 = 8.15873e−04, A6 = 4.82675e−06, A8 = −2.20386e−06, A10 = 4.10510e−08

29th surface $\kappa$ = 0.000, A2 = 0.0000E+00, A4 = 1.26016e−03, A6 = 1.60282e−05, A8 = −3.90922e−06, A10 = 7.56282e−08

Various data
Zoom ratio 19.85

| | Wide angle | Intermediate | Telephoto |
|---|---|---|---|
| Focal length | 4.68 | 19.29 | 92.90 |
| Fno. | 2.67 | 3.73 | 3.95 |
| Angle of field 2ω | 77.46 | 20.55 | 4.32 |
| Image height | 3.6 | 3.6 | 3.6 |
| Lens total length | 87.20 | 100.94 | 111.62 |
| BF | 4.70 | 4.69 | 4.69 |
| d6 | 1.00 | 18.66 | 34.27 |
| d14 | 26.21 | 10.26 | 2.30 |
| d23 | 1.27 | 5.94 | 8.37 |
| d27 | 5.85 | 13.22 | 13.81 |
| Entrance pupil position | 22.41 | 78.44 | 337.00 |
| Exit pupil position A | −31.48 | −64.89 | −80.12 |
| Exit pupil position B | −36.18 | −69.59 | −84.82 |
| Front side principal point position | 26.49 | 92.39 | 328.15 |
| Back side principal point position | −3.71 | −18.32 | −91.93 |

Single lens data

| Lens | Initial surface | focal length |
|---|---|---|
| L1 | 1 | −96.64 |
| L2 | 2 | 249.46 |
| L3 | 3 | 73.51 |
| L4 | 5 | 77.55 |
| L5 | 7 | −9.42 |
| L6 | 9 | −11.00 |
| L7 | 10 | 8.81E+04 |
| L8 | 11 | 8.73 |
| L9 | 13 | −15.46 |
| L10 | 16 | 16.37 |
| L11 | 18 | −21.82 |
| L12 | 20 | 21.10 |
| L13 | 22 | −130.59 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 53.3270 | 13.8792 | 2.8120 | −5.9948 |
| 2 | 7 | −6.4665 | 13.5160 | 1.9289 | −6.8863 |
| 3 | 15 | 17.3529 | 15.6380 | 1.4997 | −9.6448 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1705 | −0.3188 | −1.3855 |
| 3 | 15 | −0.6992 | −1.7663 | −1.9811 |
| 4 | 24 | 0.7812 | 0.6813 | 0.6732 |
| 5 | 28 | 0.9427 | 0.9427 | 0.9427 |

EXAMPLE 13

Unit mm
Surface data

| Surface no. | r | d | nd | νd | effective radius |
|---|---|---|---|---|---|
| Object plane | ∞ | ∞ | | | |
| 1 | 47.800 | 2.83 | 1.94595 | 17.98 | 19.00 |
| 2 | 31.497 | 1.26 | 1.69952 | 16.99 | 18.20 |
| 3 | 37.076 | 6.21 | 1.48563 | 85.20 | 18.08 |
| 4 | −523.317 | 0.10 | | | 15.50 |
| 5 | 33.221 | 3.17 | 1.63246 | 63.76 | 14.96 |
| 6 | 82.844 | Variable | | | 15.00 |
| 7 | 121.292 | 1.10 | 1.88300 | 40.76 | 9.24 |
| 8 | 7.694 | 4.79 | | | 6.37 |
| 9 | −46.254 | 0.80 | 1.88300 | 40.76 | 6.15 |
| 10 | 12.396 | 0.01 | 1.51400 | 42.83 | 6.00 |
| 11 | 12.396 | 4.87 | 1.78472 | 25.68 | 6.00 |
| 12 | −12.684 | 1.15 | | | 5.95 |
| 13 | −11.499 | 0.80 | 1.77250 | 49.60 | 5.30 |
| 14* | −300.876 | Variable | | | 5.33 |
| 15(stop) | ∞ | 1.30 | | | 3.94 |
| 16* | 10.743 | 4.93 | 1.58913 | 61.14 | 4.61 |
| 17 | −78.051 | 0.10 | | | 4.63 |
| 18 | 28.041 | 2.77 | 1.84666 | 23.78 | 4.61 |
| 19 | 10.632 | 1.42 | | | 4.31 |
| 20 | 14.230 | 3.12 | 1.49700 | 81.54 | 4.59 |
| 21 | −36.985 | 0.64 | | | 4.64 |
| 22* | 64.157 | 1.36 | 1.53071 | 55.69 | 4.61 |
| 23* | 34.607 | Variable | | | 4.62 |
| 24 | 19.130 | 2.68 | 1.49700 | 81.54 | 4.85 |
| 25 | −119.090 | 0.01 | 1.51400 | 42.83 | 4.73 |
| 26 | −119.090 | 0.82 | 1.80400 | 46.57 | 4.73 |
| 27 | 76.031 | Variable | | | 4.68 |
| 28* | 147.374 | 1.63 | 1.53071 | 55.69 | 4.15 |
| 29* | −67.939 | 1.09 | | | 4.07 |
| 30 | ∞ | 4.00 | 1.51680 | 64.20 | 4.01 |
| 31 | ∞ | 0.97 | | | 3.85 |
| Image plane | ∞ | | | | |

Aspherical Surface data

14th surface $\kappa$ = 0.000, A2 = 0.0000E+00, A4 = −9.19823e−05, A6 = −8.80923e−07, A8 = 4.39702e−08, A10 = −1.24247e−09

16th surface $\kappa$ = 0.000, A2 = 0.0000E+00, A4 = −8.77784e−05, A6 = −1.01116e−06, A8 = 5.64180e−08, A10 = −2.23368e−09, A12 = 3.59187e−11

22nd surface $\kappa$ = 0.000, A2 = 0.0000E+00, A4 = −2.17277e−04, A6 = 5.36299e−06, A8 = −5.28517e−07, A10 = 1.10330e−08, A12 = −1.37250e−10

23rd surface $\kappa$ = 0.000, A2 = 0.0000E+00, A4 = −1.09771e−04, A6 = 5.91402e−06, A8 = −5.09130e−07, A10 = 8.38419e−09, A12 = −4.36735e−11

-continued

Unit mm

28th surface $\kappa = 0.000$, A2 = 0.0000E+00, A4 = 8.15873e−04, A6 = 4.82675e−06, A8 = −2.20386e−06, 10 = 4.10510e−08

29th surface $\kappa = 0.000$, A2 = 0.0000E+00, A4 = 1.26016e−03, A6 = 1.60282e−05, A8 = −3.90922e−06, A10 = 7.56282e−08

Various data
Zoom ratio 19.83

| | Wide angle | Intermediate | Telephoto |
|---|---|---|---|
| Focal length | 4.68 | 19.28 | 92.89 |
| Fno. | 2.65 | 3.68 | 3.93 |
| Angle of field 2ω | 77.87 | 20.54 | 4.32 |
| Image height | 3.6 | 3.6 | 3.6 |
| Lens total length | 86.39 | 100.35 | 111.73 |
| BF | 4.70 | 4.69 | 4.70 |
| d6 | 1.00 | 18.99 | 34.70 |
| d14 | 25.76 | 10.02 | 2.30 |
| d23 | 1.27 | 5.45 | 9.04 |
| d27 | 5.81 | 13.34 | 13.14 |
| Entrance pupil position | 22.22 | 79.73 | 345.16 |
| Exit pupil position A | −31.59 | −63.34 | −82.46 |
| Exit pupil position B | −36.29 | −68.03 | −87.16 |
| Front side principal point position | 26.30 | 93.55 | 339.05 |
| Back side principal point position | −3.71 | −18.31 | −91.92 |

Single lens data

| Lens | Initial surface | focal length |
|---|---|---|
| L1 | 1 | −106.61 |
| L2 | 2 | 273.84 |
| L3 | 3 | 71.55 |
| L4 | 5 | 85.57 |
| L5 | 7 | −9.35 |
| L6 | 9 | −11.00 |
| L7 | 10 | 8.81E+04 |
| L8 | 11 | 8.73 |
| L9 | 13 | −15.50 |
| L10 | 16 | 16.37 |
| L11 | 18 | −21.82 |
| L12 | 20 | 21.10 |
| L13 | 22 | −143.87 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 53.9659 | 13.5660 | 2.3608 | −6.2293 |
| 2 | 7 | −6.4373 | 13.5160 | 1.9084 | −6.9113 |
| 3 | 15 | 17.2468 | 15.6380 | 1.6081 | −9.5911 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1677 | −0.3155 | −1.3719 |
| 3 | 15 | −0.7025 | −1.7675 | −1.9507 |
| 4 | 24 | 0.7817 | 0.6796 | 0.6823 |
| 5 | 28 | 0.9427 | 0.9427 | 0.9427 |

EXAMPLE 14

Unit mm
Surface data

| Surface no. | r | d | nd | vd | effective radius |
|---|---|---|---|---|---|
| Object plane | ∞ | ∞ | | | |
| 1 | 56.000 | 2.82 | 1.90680 | 21.15 | 18.20 |
| 2 | 30.840 | 1.49 | 1.63336 | 23.36 | 17.08 |
| 3 | 39.111 | 4.97 | 1.51633 | 64.14 | 16.97 |
| 4 | 434092.777 | 0.10 | | | 15.50 |
| 5 | 32.480 | 3.52 | 1.64000 | 60.08 | 14.28 |
| 6 | 130.730 | Variable | | | 14.00 |
| 7 | 86.549 | 1.10 | 1.88300 | 40.76 | 9.14 |
| 8 | 7.559 | 4.79 | | | 6.32 |
| 9 | −46.254 | 0.80 | 1.88300 | 40.76 | 6.11 |
| 10 | 12.396 | 0.01 | 1.51400 | 42.83 | 5.98 |
| 11 | 12.396 | 4.87 | 1.78472 | 25.68 | 5.98 |
| 12 | −12.684 | 1.15 | | | 5.94 |
| 13 | −11.499 | 0.80 | 1.77250 | 49.60 | 5.27 |
| 14* | −204.595 | Variable | | | 5.30 |
| 15(stop) | ∞ | 1.30 | | | 3.94 |
| 16* | 10.743 | 4.93 | 1.58913 | 61.14 | 4.60 |
| 17 | −78.051 | 0.10 | | | 4.61 |
| 18 | 28.041 | 2.77 | 1.84666 | 23.78 | 4.59 |
| 19 | 10.632 | 1.42 | | | 4.29 |
| 20 | 14.230 | 3.12 | 1.49700 | 81.54 | 4.56 |
| 21 | −36.985 | 0.64 | | | 4.61 |
| 22* | 69.022 | 1.36 | 1.53071 | 55.69 | 4.58 |
| 23* | 34.607 | Variable | | | 4.59 |
| 24 | 19.130 | 2.68 | 1.49700 | 81.54 | 4.84 |
| 25 | −119.090 | 0.01 | 1.51400 | 42.83 | 4.71 |
| 26 | −119.090 | 0.82 | 1.80400 | 46.57 | 4.71 |
| 27 | 76.031 | Variable | | | 4.66 |
| 28* | 147.374 | 1.63 | 1.53071 | 55.69 | 4.14 |
| 29* | −67.939 | 1.09 | | | 4.06 |
| 30 | ∞ | 4.00 | 1.51680 | 64.20 | 4.00 |
| 31 | ∞ | 0.98 | | | 3.84 |
| Image plane | ∞ | | | | |

Aspherical Surface data

14th surface $\kappa = 0.000$, A2 = 0.0000E+00, A4 = −9.19823e−05, A6 = −8.80923e−07, A8 = 4.39702e−08, A10 = −1.24247e−09

16th surface $\kappa = 0.000$, A2 = 0.0000E+00, A4 = −8.77784e−05, A6 = −1.01116e−06, A8 = 5.64180e−08, A10 = −2.23368e−09, A12 = 3.59187e−11

22nd surface $\kappa = 0.000$, A2 = 0.0000E+00, A4 = −2.17277e−04, A6 = 5.36299e−06, A8 = −5.28517e−07, A10 = 1.10330e−08, A12 = −1.37250e−10

23rd surface $\kappa = 0.000$, A2 = 0.0000E+00, A4 = −1.09771e−04, A6 = 5.91402e−06, A8 = −5.09130e−07, A10 = 8.38419e−09, A12 = −4.36735e−11

28th surface $\kappa = 0.000$, A2 = 0.0000E+00, A4 = 8.15873e−04, A6 = 4.82675e−06, A8 = −2.20386e−06, A10 = 4.10510e−08

29th surface $\kappa = 0.000$, A2 = 0.0000E+00, A4 = 1.26016e−03, A6 = 1.60282e−05, A8 = −3.90922e−06, A10 = 7.56282e−08

Various data
Zoom ratio 19.67

| | Wide angle | Intermediate | Telephoto |
|---|---|---|---|
| Focal length | 4.72 | 19.24 | 92.91 |
| Fno. | 2.67 | 3.78 | 3.93 |
| Angle of field 2ω | 76.87 | 20.56 | 4.32 |

-continued

| Unit mm | | | |
|---|---|---|---|
| Image height | 3.6 | 3.6 | 3.6 |
| Lens total length | 85.69 | 99.20 | 110.90 |
| BF | 4.70 | 4.69 | 4.70 |
| d6 | 1.00 | 17.99 | 34.56 |
| d14 | 25.69 | 9.59 | 2.30 |
| d23 | 1.20 | 6.07 | 11.79 |
| d27 | 5.92 | 13.68 | 10.38 |
| Entrance pupil position | 21.06 | 71.03 | 333.07 |
| Exit pupil position A | −31.47 | −67.01 | −91.27 |
| Exit pupil position B | −36.18 | −71.71 | −95.97 |
| Front side principal point position | 25.17 | 85.10 | 336.03 |
| Back side principal point position | −3.75 | −18.28 | −91.94 |

Single lens data

| Lens | Initial surface | focal length |
|---|---|---|
| L1 | 1 | −79.95 |
| L2 | 2 | 215.26 |
| L3 | 3 | 75.75 |
| L4 | 5 | 66.60 |
| L5 | 7 | −9.44 |
| L6 | 9 | −11.00 |
| L7 | 10 | 8.81E+04 |
| L8 | 11 | 8.73 |
| L9 | 13 | −15.80 |
| L10 | 16 | 16.37 |
| L11 | 18 | −21.82 |
| L12 | 20 | 21.10 |
| L13 | 22 | −132.60 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 52.6191 | 12.8823 | 2.9851 | −5.0850 |
| 2 | 7 | −6.6001 | 13.5160 | 1.8794 | −7.0058 |
| 3 | 15 | 17.3354 | 15.6380 | 1.5176 | −9.6359 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1734 | −0.3133 | −1.4680 |
| 3 | 15 | −0.7039 | −1.8346 | −1.7731 |
| 4 | 24 | 0.7801 | 0.6750 | 0.7196 |
| 5 | 28 | 0.9426 | 0.9427 | 0.9427 |

EXAMPLE 15

| Unit mm | | | | | |
|---|---|---|---|---|---|
| Surface data | | | | | |
| Surface no. | r | d | nd | vd | effective radius |
| Object plane | ∞ | ∞ | | | |
| 1 | 64.222 | 3.74 | 1.63387 | 23.38 | 18.00 |
| 2* | −5535.874 | 0.78 | 1.63493 | 23.90 | 17.30 |
| 3 | 32.530 | 4.68 | 1.48749 | 70.23 | 14.83 |
| 4 | 69846.338 | 0.10 | | | 14.70 |
| 5 | 39.496 | 2.73 | 1.72916 | 54.68 | 14.23 |
| 6 | 121.015 | Variable | | | 14.00 |
| 7 | 69.616 | 1.10 | 1.88300 | 40.76 | 8.84 |
| 8 | 7.214 | 4.79 | | | 6.17 |
| 9 | −46.254 | 0.80 | 1.88300 | 40.76 | 6.08 |
| 10 | 12.396 | 0.01 | 1.51400 | 42.83 | 6.11 |
| 11 | 12.396 | 4.87 | 1.78472 | 25.68 | 6.11 |
| 12 | −13.411 | 1.15 | | | 6.18 |
| 13 | −13.602 | 0.80 | 1.77250 | 49.60 | 5.61 |
| 14* | −679.809 | Variable | | | 5.62 |
| 15(stop) | ∞ | 1.30 | | | 3.78 |
| 16* | 10.743 | 4.93 | 1.58913 | 61.14 | 4.37 |
| 17 | −78.051 | 0.10 | | | 4.38 |
| 18 | 28.041 | 2.77 | 1.84666 | 23.78 | 4.37 |
| 19 | 10.632 | 1.42 | | | 4.08 |
| 20 | 14.230 | 3.12 | 1.49700 | 81.54 | 4.33 |
| 21 | −36.985 | 0.64 | | | 4.38 |
| 22* | 84.991 | 1.36 | 1.53071 | 55.69 | 4.35 |
| 23* | 34.607 | Variable | | | 4.35 |
| 24 | 19.130 | 2.68 | 1.49700 | 81.54 | 4.78 |
| 25 | −119.090 | 0.01 | 1.51400 | 42.83 | 4.65 |
| 26 | −119.090 | 0.82 | 1.80400 | 46.57 | 4.65 |
| 27 | 76.031 | Variable | | | 4.60 |
| 28* | 147.374 | 1.63 | 1.53071 | 55.69 | 4.12 |
| 29* | −67.939 | 1.09 | | | 4.04 |
| 30 | ∞ | 4.00 | 1.51680 | 64.20 | 3.99 |
| 31 | ∞ | 1.08 | | | 3.84 |
| Image plane | ∞ | | | | |

Aspherical Surface data

2nd surface $\kappa = 0.000$, $A2 = 0.0000E+00$, $A4 = 1.71539e-05$, $A6 = -1.44664e-07$, $A8 = 3.88441e-10$, $A10 = -2.90297e-13$ 14th surface $\kappa = 0.000$, $A2 = 0.0000E+00$, $A4 = -9.39251e-05$, $A6 = -3.55374e-07$, $A8 = 3.55597e-09$, $A10 = -5.33578e-10$ 16th surface $\kappa = 0.000$, $A2 = 0.0000E+00$, $A4 = -8.77784e-05$, $A6 = -1.01116e-06$, $A8 = 5.64180e-08$, $A10 = -2.23368e-09$, $A12 = 3.59187e-11$ 22nd surface $\kappa = 0.000$, $A2 = 0.0000E+00$, $A4 = -2.17277e-04$, $A6 = 5.36299e-06$, $A8 = -5.28517e-07$, $A10 = 1.10330e-08$, $A12 = -1.37250e-10$ 23rd surface $\kappa = 0.000$, $A2 = 0.0000E+00$, $A4 = -1.09771e-04$, $A6 = 5.91402e-06$, $A8 = -5.09130e-07$, $A10 = 8.38419e-09$, $A12 = -4.36735e-11$ 28th surface $\kappa = 0.000$, $A2 = 0.0000E+00$, $A4 = 8.15873e-04$, $A6 = 4.82675e-06$, $A8 = -2.20386e-06$, $A10 = 4.10510e-08$ 29th surface $\kappa = 0.000$, $A2 = 0.0000E+00$, $A4 = 1.26016e-03$, $A6 = 1.60282e-05$, $A8 = -3.90922e-06$, $A10 = 7.56282e-08$ Various data
Zoom ratio 19.84

| | Wide angle | Intermediate | Telephoto |
|---|---|---|---|
| Focal length | 4.69 | 20.70 | 92.99 |
| Fno. | 2.82 | 4.67 | 4.73 |
| Angle of field 2ω | 77.97 | 19.19 | 4.31 |
| Image height | 3.6 | 3.6 | 3.6 |
| Lens total length | 85.01 | 104.03 | 120.31 |
| BF | 4.80 | 4.64 | 4.78 |
| d6 | 1.00 | 16.57 | 37.69 |
| d14 | 25.76 | 8.10 | 2.30 |
| d23 | 1.01 | 15.25 | 17.36 |
| d27 | 6.12 | 13.16 | 11.85 |
| Entrance pupil position | 19.87 | 56.67 | 308.19 |
| Exit pupil position A | −30.98 | −142.81 | −170.36 |

-continued

Unit mm

| | | | |
|---|---|---|---|
| Exit pupil position B | −35.78 | −147.44 | −175.15 |
| Front side principal point position | 23.95 | 74.46 | 351.81 |
| Back side principal point position | −3.61 | −19.79 | −91.93 |

Single lens data

| Lens | Initial surface | focal length |
|---|---|---|
| L1 | 1 | 100.18 |
| L2 | 2 | −50.93 |
| L3 | 3 | 66.76 |
| L4 | 5 | 79.29 |
| L5 | 7 | −9.19 |
| L6 | 9 | −11.00 |
| L7 | 10 | 8.81E+04 |
| L8 | 11 | 8.95 |
| L9 | 13 | −17.98 |
| L10 | 16 | 16.37 |
| L11 | 18 | −21.82 |
| L12 | 20 | 21.10 |
| L13 | 22 | −111.04 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 56.9801 | 12.0287 | 3.0855 | −4.6406 |
| 2 | 7 | −6.8221 | 13.5160 | 1.6684 | −7.4301 |
| 3 | 15 | 17.5589 | 15.6380 | 1.2893 | −9.7489 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1592 | −0.2501 | −1.1084 |
| 3 | 15 | −0.7071 | −2.2550 | −2.2385 |
| 4 | 24 | 0.7759 | 0.6830 | 0.6984 |
| 5 | 28 | 0.9415 | 0.9434 | 0.9417 |

EXAMPLE 16

Unit mm
Surface data

| Surface no. | r | d | nd | vd | effective radius |
|---|---|---|---|---|---|
| Object plane | ∞ | ∞ | | | |
| 1 | 63.000 | 4.05 | 1.67000 | 20.00 | 18.00 |
| 2* | 5631.149 | 0.51 | 1.63493 | 23.90 | 18.00 |
| 3 | 26.252 | 5.76 | 1.48749 | 70.23 | 14.83 |
| 4 | 116851.672 | 0.10 | | | 14.70 |
| 5 | 33.144 | 2.85 | 1.72916 | 54.68 | 14.22 |
| 6 | 82.679 | Variable | | | 14.00 |
| 7 | 72.007 | 1.10 | 1.88300 | 40.76 | 8.49 |
| 8 | 7.228 | 4.79 | | | 6.02 |
| 9 | −46.254 | 0.80 | 1.88300 | 40.76 | 5.85 |
| 10 | 12.396 | 0.01 | 1.51400 | 42.83 | 5.82 |
| 11 | 12.396 | 4.87 | 1.78472 | 25.68 | 5.82 |
| 12 | −13.411 | 1.15 | | | 5.86 |
| 13 | −13.602 | 0.80 | 1.77250 | 49.60 | 5.25 |
| 14* | −679.809 | Variable | | | 5.21 |
| 15(stop) | ∞ | 1.30 | | | 3.78 |
| 16* | 10.743 | 4.93 | 1.58913 | 61.14 | 4.56 |
| 17 | −78.051 | 0.10 | | | 4.55 |
| 18 | 28.041 | 2.77 | 1.84666 | 23.78 | 4.52 |
| 19 | 10.632 | 1.42 | | | 4.20 |
| 20 | 14.230 | 3.12 | 1.49700 | 81.54 | 4.45 |
| 21 | −36.985 | 0.64 | | | 4.48 |
| 22* | 99.753 | 1.36 | 1.53071 | 55.69 | 4.44 |
| 23* | 34.607 | Variable | | | 4.44 |
| 24 | 19.130 | 2.68 | 1.49700 | 81.54 | 4.75 |
| 25 | −119.090 | 0.01 | 1.51400 | 42.83 | 4.62 |
| 26 | −119.090 | 0.82 | 1.80400 | 46.57 | 4.62 |
| 27 | 76.031 | Variable | | | 4.58 |
| 28* | 147.374 | 1.63 | 1.53071 | 55.69 | 4.11 |
| 29* | −67.939 | 1.09 | | | 4.04 |
| 30 | ∞ | 4.00 | 1.51680 | 64.20 | 3.99 |
| 31 | ∞ | 1.55 | | | 3.86 |
| Image plane | ∞ | | | | |

Aspherical Surface data

2nd surface

κ = 0.000, A2 = 0.0000E+00, A4 = −6.83931e−06, A6 = −3.93410e−10, A8 = −1.85984e−11, A10 = 3.49310e−14

14th surface

κ = 0.000, A2 = 0.0000E+00, A4 = −9.39251e−05, A6 = −3.55374e−07, A8 = 3.55597e−09, A10 = −5.33578e−10

16th surface

κ = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

κ = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

κ = 0.000, A2 = 0.0000E+00, A4 = −1.09771e−04, A6 = 5.91402e−06, A8 = −5.09130e−07, A10 = 8.38419e−09, A12 = −4.36735e−11

28th surface

κ = 0.000, A2 = 0.0000E+00, A4 = 8.15873e−04, A6 = 4.82675e−06, A8 = −2.20386e−06, A10 = 4.10510e−08

29th surface

κ = 0.000, A2 = 0.0000E+00, A4 = 1.26016e−03, A6 = 1.60282e−05, A8 = −3.90922e−06, A10 = 7.56282e−08

Various data
Zoom ratio 19.32

| | Wide angle | Intermediate | Telephoto |
|---|---|---|---|
| Focal length | 4.81 | 20.70 | 93.03 |
| Fno. | 2.84 | 4.70 | 4.68 |
| Angle of field 2ω | 75.93 | 19.26 | 4.33 |
| Image height | 3.6 | 3.6 | 3.6 |
| Lens total length | 86.54 | 104.76 | 118.62 |
| BF | 5.27 | 4.61 | 4.67 |
| d6 | 1.00 | 15.61 | 35.93 |
| d14 | 25.84 | 8.55 | 2.30 |
| d23 | 1.15 | 15.54 | 15.12 |
| d27 | 5.73 | 12.89 | 13.04 |
| Entrance pupil position | 21.15 | 56.79 | 304.35 |
| Exit pupil position A | −30.36 | −143.87 | −138.53 |
| Exit pupil position B | −35.63 | −148.49 | −143.20 |
| Front side principal point position | 25.31 | 74.60 | 336.94 |
| Back side principal point position | −3.27 | −19.81 | −92.08 |

-continued

Unit mm

Single lens data

| Lens | Initial surface | focal length |
|---|---|---|
| L1 | 1 | 95.07 |
| L2 | 2 | -41.54 |
| L3 | 3 | 53.86 |
| L4 | 5 | 74.07 |
| L5 | 7 | -9.17 |
| L6 | 9 | -11.00 |
| L7 | 10 | 8.81E+04 |
| L8 | 11 | 8.95 |
| L9 | 13 | -17.98 |
| L10 | 16 | 16.37 |
| L11 | 18 | -21.82 |
| L12 | 20 | 21.10 |
| L13 | 22 | -100.58 |
| L14 | 24 | 33.38 |
| L15 | 25 | 8.13E+06 |
| L16 | 26 | -57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 55.3191 | 13.2710 | 3.3877 | -5.1255 |
| 2 | 7 | -6.8103 | 13.5160 | 1.6645 | -7.4331 |
| 3 | 15 | 17.7050 | 15.6380 | 1.1401 | -9.8226 |
| 4 | 24 | 73.7783 | 3.5080 | -2.0985 | -4.2304 |
| 5 | 28 | 87.8520 | 6.7160 | 0.7294 | -4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | -0.1673 | -0.2608 | -1.1771 |
| 3 | 15 | -0.7181 | -2.2131 | -2.2145 |
| 4 | 24 | 0.7740 | 0.6870 | 0.6841 |
| 5 | 28 | 0.9362 | 0.9436 | 0.9430 |

EXAMPLE 17

Unit mm

Surface data

| Surface no. | r | d | nd | νd | effective radius |
|---|---|---|---|---|---|
| Object plane | ∞ | ∞ | | | |
| 1 | 64.493 | 2.67 | 1.63336 | 23.36 | 18.00 |
| 2* | 7553.573 | 0.89 | 1.63493 | 23.90 | 17.04 |
| 3 | 32.095 | 4.70 | 1.48749 | 70.23 | 15.18 |
| 4 | 88340.187 | 0.10 | | | 14.70 |
| 5 | 36.513 | 2.71 | 1.72916 | 54.68 | 14.22 |
| 6 | 98.569 | Variable | | | 14.00 |
| 7 | 56.969 | 1.10 | 1.88300 | 40.76 | 8.92 |
| 8 | 7.154 | 4.79 | | | 6.16 |
| 9 | -46.254 | 0.80 | 1.88300 | 40.76 | 6.07 |
| 10 | 12.396 | 0.01 | 1.51400 | 42.83 | 6.10 |
| 11 | 12.396 | 4.87 | 1.78472 | 25.68 | 6.10 |
| 12 | -13.411 | 1.15 | | | 6.18 |
| 13 | -13.602 | 0.80 | 1.77250 | 49.60 | 5.61 |
| 14* | -679.809 | Variable | | | 5.63 |
| 15(stop) | ∞ | 1.30 | | | 3.78 |
| 16* | 10.743 | 4.93 | 1.58913 | 61.14 | 4.36 |
| 17 | -78.051 | 0.10 | | | 4.37 |
| 18 | 28.041 | 2.77 | 1.84666 | 23.78 | 4.35 |
| 19 | 10.632 | 1.42 | | | 4.06 |
| 20 | 14.230 | 3.12 | 1.49700 | 81.54 | 4.31 |
| 21 | -36.985 | 0.64 | | | 4.35 |
| 22* | 108.705 | 1.36 | 1.53071 | 55.69 | 4.32 |
| 23* | 34.607 | Variable | | | 4.32 |
| 24 | 19.130 | 2.68 | 1.49700 | 81.54 | 4.76 |
| 25 | -119.090 | 0.01 | 1.51400 | 42.83 | 4.64 |
| 26 | -119.090 | 0.82 | 1.80400 | 46.57 | 4.63 |
| 27 | 76.031 | Variable | | | 4.59 |
| 28* | 147.374 | 1.63 | 1.53071 | 55.69 | 4.11 |
| 29* | -67.939 | 1.09 | | | 4.03 |
| 30 | ∞ | 4.00 | 1.51680 | 64.20 | 3.97 |
| 31 | ∞ | 0.97 | | | 3.83 |
| Image plane | ∞ | | | | |

Aspherical Surface data

2nd surface $\kappa = 0.000$, $A2 = 0.0000E+00$, $A4 = 5.27314e-05$, $A6 = -3.41835e-07$, $A8 = 1.42488e-09$, $A10 = -2.27996e-12$ 14th surface $\kappa = 0.000$, $A2 = 0.0000E+00$, $A4 = -9.39251e-05$, $A6 = -3.55374e-07$, $A8 = 3.55597e-09$, $A10 = -5.33578e-10$ 16th surface $\kappa = 0.000$, $A2 = 0.0000E+00$, $A4 = -8.77784e-05$, $A6 = -1.01116e-06$, $A8 = 5.64180e-08$, $A10 = -2.23368e-09$, $A12 = 3.59187e-11$ 22nd surface $\kappa = 0.000$, $A2 = 0.0000E+00$, $A4 = -2.17277e-04$, $A6 = 5.36299e-06$, $A8 = -5.28517e-07$, $A10 = 1.10330e-08$, $A12 = -1.37250e-10$ 23rd surface $\kappa = 0.000$, $A2 = 0.0000E+00$, $A4 = -1.09771e-04$, $A6 = 5.91402e-06$, $A8 = -5.09130e-07$, $A10 = 8.38419e-09$, $A12 = -4.36735e-11$ 28th surface $\kappa = 0.000$, $A2 = 0.0000E+00$, $A4 = 8.15873e-04$, $A6 = 4.82675e-06$, $A8 = -2.20386e-06$, $A10 = 4.10510e-08$ 29th surface $\kappa = 0.000$, $A2 = 0.0000E+00$, $A4 = 1.26016e-03$, $A6 = 1.60282e-05$, $A8 = -3.90922e-06$, $A10 = 7.56282e-08$ Various data
Zoom ratio 19.48

| | Wide angle | Intermediate | Telephoto |
|---|---|---|---|
| Focal length | 4.76 | 20.52 | 92.80 |
| Fno. | 2.87 | 4.74 | 4.83 |
| Angle of field 2ω | 76.91 | 19.40 | 4.33 |
| Image height | 3.6 | 3.6 | 3.6 |
| Lens total length | 84.81 | 103.38 | 119.48 |
| BF | 4.69 | 4.55 | 4.68 |
| d6 | 1.00 | 16.08 | 37.21 |
| d14 | 26.32 | 8.64 | 2.30 |
| d23 | 1.03 | 15.79 | 16.06 |
| d27 | 6.41 | 12.96 | 13.86 |
| Entrance pupil position | 19.31 | 54.37 | 293.31 |
| Exit pupil position A | -31.18 | -147.53 | -158.87 |
| Exit pupil position B | -35.88 | -152.08 | -163.55 |
| Front side principal point position | 23.44 | 72.13 | 333.45 |
| Back side principal point position | -3.80 | -19.70 | -91.85 |

Single lens data

| Lens | Initial surface | focal length |
|---|---|---|
| L1 | 1 | 102.69 |
| L2 | 2 | -50.77 |
| L3 | 3 | 65.86 |
| L4 | 5 | 78.10 |
| L5 | 7 | -9.36 |

-continued

Unit mm

| | | |
|---|---|---|
| L6 | 9 | −11.00 |
| L7 | 10 | 8.81E+04 |
| L8 | 11 | 8.95 |
| L9 | 13 | −17.98 |
| L10 | 16 | 16.37 |
| L11 | 18 | −21.82 |
| L12 | 20 | 21.10 |
| L13 | 22 | −96.28 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 56.5316 | 11.0783 | 2.7317 | −4.3672 |
| 2 | 7 | −6.9326 | 13.5160 | 1.7002 | −7.4050 |
| 3 | 15 | 17.7750 | 15.6380 | 1.0686 | −9.8581 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1630 | −0.2525 | −1.0972 |
| 3 | 15 | −0.7087 | −2.2160 | −2.3581 |
| 4 | 24 | 0.7736 | 0.6870 | 0.6728 |
| 5 | 28 | 0.9428 | 0.9444 | 0.9429 |

EXAMPLE 18

Unit mm

Surface data

| Surface no. | r | d | nd | νd | effective radius |
|---|---|---|---|---|---|
| Object plane | ∞ | ∞ | | | |
| 1 | 130.000 | 2.30 | 1.69952 | 16.99 | 18.00 |
| 2* | 354526.768 | 1.67 | 1.94595 | 17.98 | 18.87 |
| 3 | 87.187 | 2.68 | 1.49700 | 81.54 | 17.28 |
| 4 | 49777.504 | 0.10 | | | 15.50 |
| 5 | 31.463 | 4.50 | 1.49700 | 81.54 | 14.24 |
| 6 | 3317.228 | Variable | | | 14.00 |
| 7 | 34.377 | 1.10 | 1.88300 | 40.76 | 9.29 |
| 8 | 7.351 | 4.79 | | | 6.47 |
| 9 | −46.254 | 0.80 | 1.88300 | 40.76 | 6.39 |
| 10 | 12.396 | 0.01 | 1.51400 | 42.83 | 6.32 |
| 11 | 12.396 | 4.87 | 1.78472 | 25.68 | 6.32 |
| 12 | −13.411 | 1.15 | | | 6.33 |
| 13 | −13.602 | 0.80 | 1.77250 | 49.60 | 5.74 |
| 14* | −679.809 | Variable | | | 5.78 |
| 15(stop) | ∞ | 1.30 | | | 3.78 |
| 16* | 10.743 | 4.93 | 1.58913 | 61.14 | 4.35 |
| 17 | −78.051 | 0.10 | | | 4.34 |
| 18 | 28.041 | 2.77 | 1.84666 | 23.78 | 4.32 |
| 19 | 10.632 | 1.42 | | | 4.03 |
| 20 | 14.230 | 3.12 | 1.49700 | 81.54 | 4.27 |
| 21 | −36.985 | 0.64 | | | 4.30 |
| 22* | 494.568 | 1.36 | 1.53071 | 55.69 | 4.27 |
| 23* | 34.607 | Variable | | | 4.28 |
| 24 | 19.130 | 2.68 | 1.49700 | 81.54 | 4.60 |
| 25 | −119.090 | 0.01 | 1.51400 | 42.83 | 4.48 |
| 26 | −119.090 | 0.82 | 1.80400 | 46.57 | 4.48 |
| 27 | 76.031 | Variable | | | 4.44 |
| 28* | 147.374 | 1.63 | 1.53071 | 55.69 | 4.08 |
| 29* | −67.939 | 1.09 | | | 4.01 |
| 30 | ∞ | 4.00 | 1.51680 | 64.20 | 3.95 |
| 31 | ∞ | Variable | | | 3.82 |
| Image plane | ∞ | | | | |

Aspherical surface data

2nd surface

κ = 0.000, A2 = 0.0000E+00, A4 = −4.50349e−06, A6 = 7.08700e−09, A8 = −4.13522e−11, A10 = 6.88703e−14

14th surface

κ = 0.000, A2 = 0.0000E+00, A4 = −9.39251e−05, A6 = −3.55374e−07, A8 = 3.55597e−09, A10 = −5.33578e−10

16th surface

κ = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

κ = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

κ = 0.000, A2 = 0.0000E+00, A4 = −1.09771e−04, A6 = 5.91402e−06, A8 = −5.09130e−07, A10 = 8.38419e−09, A12 = −4.36735e−11

28th surface

κ = 0.000, A2 = 0.0000E+00, A4 = 8.15873e−04, A6 = 4.82675e−06, A8 = −2.20386e−06, A10 = 4.10510e−08

29th surface

κ = 0.000, A2 = 0.0000E+00, A4 = 1.26016e−03, A6 = 1.60282e−05, A8 = −3.90922e−06, A10 = 7.56282e−08

Various data
Zoom ratio 18.28

| | Wide angle | Intermediate | Telephoto |
|---|---|---|---|
| Focal length | 4.70 | 20.22 | 86.02 |
| Fno. | 2.89 | 4.60 | 4.96 |
| Angle of field 2ω | 77.76 | 19.95 | 4.75 |
| Image height | 3.6 | 3.6 | 3.6 |
| Lens total length | 89.00 | 104.27 | 121.44 |
| BF | 4.65 | 4.63 | 4.75 |
| d6 | 1.00 | 18.69 | 41.10 |
| d14 | 30.79 | 10.15 | 2.30 |
| d23 | 0.85 | 11.33 | 5.33 |
| d27 | 6.17 | 13.93 | 22.43 |
| Entrance pupil position | 20.03 | 59.54 | 265.35 |
| Exit pupil position A | −29.43 | −97.04 | −90.20 |
| Exit pupil position B | −34.08 | −101.67 | −94.95 |
| Front side principal point position | 24.09 | 75.73 | 273.44 |
| Back side principal point position | −3.78 | −19.31 | −85.00 |

Single lens data

| Lens | Initial surface | focal length |
|---|---|---|
| L1 | 1 | 185.91 |
| L2 | 2 | −92.19 |
| L3 | 3 | 175.73 |
| L4 | 5 | 63.88 |
| L5 | 7 | −10.79 |
| L6 | 9 | −11.00 |
| L7 | 10 | 8.81E+04 |
| L8 | 11 | 8.95 |
| L9 | 13 | −17.98 |
| L10 | 16 | 16.37 |
| L11 | 18 | −21.82 |
| L12 | 20 | 21.10 |
| L13 | 22 | −70.19 |
| L14 | 24 | 33.38 |

-continued

Unit mm

| | | |
|---|---|---|
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 63.5207 | 11.2511 | 3.3463 | −3.8243 |
| 2 | 7 | −7.8227 | 13.5160 | 1.9012 | −7.2416 |
| 3 | 15 | 18.4086 | 15.6380 | 0.4215 | −10.1782 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1597 | −0.2501 | −0.8818 |
| 3 | 15 | −0.6323 | −2.0051 | −2.9333 |
| 4 | 24 | 0.7775 | 0.6726 | 0.5557 |
| 5 | 28 | 0.9432 | 0.9435 | 0.9422 |

EXAMPLE 19

Unit mm

Surface data

| Surface no. | r | d | nd | vd | effective radius |
|---|---|---|---|---|---|
| Object plane | ∞ | ∞ | | | |
| 1 | 60.982 | 5.35 | 1.64850 | 53.02 | 24.00 |
| 2 | 495.744 | 0.19 | | | 23.38 |
| 3 | 31.172 | 1.28 | 1.92286 | 18.90 | 17.70 |
| 4 | 22.227 | 1.77 | 1.63387 | 23.38 | 16.35 |
| 5 | 26.877 | 5.23 | 1.49700 | 81.54 | 16.31 |
| 6 | 101.913 | Variable | | | 16.00 |
| 7 | 303.814 | 1.10 | 1.88300 | 40.76 | 9.68 |
| 8 | 8.312 | 4.79 | | | 6.82 |
| 9 | −46.254 | 0.80 | 1.88300 | 40.76 | 6.71 |
| 10 | 12.396 | 0.01 | 1.51400 | 42.83 | 6.69 |
| 11 | 12.396 | 4.87 | 1.78472 | 25.68 | 6.69 |
| 12 | −12.684 | 1.15 | | | 6.72 |
| 13 | −11.499 | 0.80 | 1.77250 | 49.60 | 5.72 |
| 14* | −230.432 | Variable | | | 5.72 |
| 15(stop) | ∞ | 1.30 | | | 3.39 |
| 16* | 10.743 | 4.93 | 1.58913 | 61.14 | 3.96 |
| 17 | −78.051 | 0.10 | | | 4.06 |
| 18 | 28.041 | 2.77 | 1.84666 | 23.78 | 4.07 |
| 19 | 10.295 | 1.42 | | | 3.87 |
| 20 | 12.826 | 3.12 | 1.49700 | 81.54 | 4.21 |
| 21 | −36.985 | 0.64 | | | 4.29 |
| 22* | 39.207 | 1.36 | 1.53071 | 55.69 | 4.29 |
| 23* | 33.196 | Variable | | | 4.28 |
| 24 | 19.130 | 2.68 | 1.49700 | 81.54 | 4.60 |
| 25 | −119.090 | 0.01 | 1.51400 | 42.83 | 4.47 |
| 26 | −119.090 | 0.82 | 1.80400 | 46.57 | 4.47 |
| 27 | 76.031 | Variable | | | 4.41 |
| 28* | 147.374 | 1.63 | 1.53071 | 55.69 | 4.17 |
| 29* | −67.939 | 1.09 | | | 4.09 |
| 30 | ∞ | 4.00 | 1.51680 | 64.20 | 4.02 |
| 31 | ∞ | 1.05 | | | 3.85 |
| Image plane | ∞ | | | | |

Aspherical surface data

14th surface

κ = 0.000, A2 = 0.0000E+00, A4 = −7.99095e−05, A6 = −9.37486e−07, A8 = 4.32991e−08, A10 = −1.00218e−09

16th surface

κ = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

κ = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

κ = 0.000, A2 = 0.0000E+00, A4 = −1.09771e−04, A6 = 5.91402e−06, A8 = −5.09130e−07, A10 = 8.38419e−09, A12 = −4.36735e−11

28th surface

κ = 0.000, A2 = 0.0000E+00, A4 = 8.15873e−04, A6 = 4.82675e−06, A8 = −2.20386e−06, A10 = 4.10510e−08

29th surface

κ = 0.000, A2 = 0.0000E+00, A4 = 1.26016e−03, A6 = 1.60282e−05, A8 = −3.90922e−06, A10 = 7.56282e−08

Various data
Zoom ratio 17.36

| | Wide angle | Intermediate | Telephoto |
|---|---|---|---|
| Focal length | 4.86 | 20.12 | 84.44 |
| Fno. | 2.83 | 4.26 | 5.31 |
| Angle of field 2ω | 75.01 | 19.69 | 4.72 |
| Image height | 3.6 | 3.6 | 3.6 |
| Lens total length | 84.06 | 98.77 | 118.56 |
| BF | 4.78 | 4.67 | 4.67 |
| d6 | 1.00 | 16.79 | 33.06 |
| d14 | 24.28 | 7.94 | 2.30 |
| d23 | 1.62 | 13.90 | 29.38 |
| d27 | 4.26 | 7.36 | 1.04 |
| Entrance pupil position | 24.63 | 73.25 | 271.77 |
| Exit pupil position A | −31.43 | −104.20 | 3257.46 |
| Exit pupil position B | −36.21 | −108.87 | 3252.79 |
| Front side principal point position | 28.84 | 89.66 | 358.40 |
| Back side principal point position | −3.81 | −19.17 | −83.49 |

Single lens data

| Lens | Initial surface | focal length |
|---|---|---|
| L1 | 1 | 106.71 |
| L2 | 3 | −90.15 |
| L3 | 4 | 176.57 |
| L4 | 5 | 71.79 |
| L5 | 7 | −9.69 |
| L6 | 9 | −11.00 |
| L7 | 10 | 8.81E+04 |
| L8 | 11 | 8.73 |
| L9 | 13 | −15.69 |
| L10 | 16 | 16.37 |
| L11 | 18 | −20.69 |
| L12 | 20 | 19.57 |
| L13 | 22 | −442.74 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 58.8815 | 13.8227 | −1.3148 | −9.6007 |
| 2 | 7 | −6.7026 | 13.5160 | 1.8901 | −6.9662 |

-continued

Unit mm

| | | | | | |
|---|---|---|---|---|---|
| 3 | 15 | 16.3471 | 15.6380 | 2.4850 | −9.1335 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1689 | −0.2804 | −0.8784 |
| 3 | 15 | −0.6482 | −1.6981 | −2.0449 |
| 4 | 24 | 0.8014 | 0.7610 | 0.8466 |
| 5 | 28 | 0.9418 | 0.9430 | 0.9430 |

EXAMPLE 20

Unit mm

Surface data

| Surface no. | r | d | nd | vd | effective radius |
|---|---|---|---|---|---|
| Object plane | ∞ | ∞ | | | |
| 1 | 59.963 | 4.20 | 1.49700 | 81.54 | 18.60 |
| 2 | 2486.142 | 0.10 | | | 17.76 |
| 3 | 41.700 | 0.99 | 1.84666 | 23.78 | 15.50 |
| 4 | 25.367 | 0.72 | 1.63387 | 23.38 | 14.76 |
| 5 | 28.640 | 4.19 | 1.67790 | 55.34 | 14.74 |
| 6 | 111.334 | Variable | | | 14.50 |
| 7 | 110.422 | 1.10 | 1.88300 | 40.76 | 9.11 |
| 8 | 8.083 | 4.79 | | | 6.49 |
| 9 | −46.254 | 0.80 | 1.88300 | 40.76 | 6.24 |
| 10 | 12.396 | 0.01 | 1.51400 | 42.83 | 6.10 |
| 11 | 12.396 | 4.87 | 1.78472 | 25.68 | 6.11 |
| 12 | −12.684 | 1.15 | | | 6.07 |
| 13 | −11.499 | 0.80 | 1.77250 | 49.60 | 5.08 |
| 14* | −125.405 | Variable | | | 5.00 |
| 15(stop) | ∞ | 1.30 | | | 3.48 |
| 16* | 10.743 | 4.93 | 1.58913 | 61.14 | 4.07 |
| 17 | −78.051 | 0.10 | | | 4.16 |
| 18 | 28.041 | 2.77 | 1.84666 | 23.78 | 4.16 |
| 19 | 10.469 | 1.42 | | | 3.94 |
| 20 | 13.611 | 3.12 | 1.49700 | 81.54 | 4.25 |
| 21 | −36.985 | 0.64 | | | 4.33 |
| 22* | 63.868 | 1.36 | 1.53071 | 55.69 | 4.33 |
| 23* | 48.855 | Variable | | | 4.34 |
| 24 | 19.130 | 2.68 | 1.49700 | 81.54 | 4.65 |
| 25 | −119.090 | 0.01 | 1.51400 | 42.83 | 4.51 |
| 26 | −119.090 | 0.82 | 1.80400 | 46.57 | 4.51 |
| 27 | 76.031 | Variable | | | 4.46 |
| 28* | 147.374 | 1.63 | 1.53071 | 55.69 | 4.21 |
| 29* | −67.939 | 1.09 | | | 4.18 |
| 30 | ∞ | 4.00 | 1.51680 | 64.20 | 4.09 |
| 31 | ∞ | 1.05 | | | 3.86 |
| Image plane | ∞ | | | | |

Aspherical surface data

14th surface

κ = 0.000, A2 = 0.0000E+00, A4 = −8.14579e−05, A6 = −1.15665e−06, A8 = 6.76342e−08, A10 = −1.49231e−09
16th surface κ = 0.000, A2 = 0.0000E+00, A4 = −8.77784e−05, A6 = −1.01116e−06, A8 = 5.64180e−08, A10 = −2.23368e−09, A12 = 3.59187e−11
22nd surface κ = 0.000, A2 = 0.0000E+00, A4 = −2.17277e−04, A6 = 5.36299e−06, A8 = −5.28517e−07, A10 = 1.10330e−08, A12 = −1.37250e−10
23rd surface κ = 0.000, A2 = 0.0000E+00, A4 = −1.09771e−04, A6 = 5.91402e−06, A8 = −5.09130e−07, 10 = 8.38419e−09, A12 = −4.36735e−11

28th surface

κ = 0.000, A2 = 0.0000E+00, A4 = 6.47771e−04, A6 = −1.69732e−05, A8 = −9.26628e−07, A10 = 1.17663e−08
29th surface κ = 0.000, A2 = 0.0000E+00, A4 = 1.08506e−03, A6 = −2.70703e−05, A8 = −1.53201e−06, A10 = 3.10909e−08

Various data
Zoom ratio 17.81

| | Wide angle | Intermediate | Telephoto |
|---|---|---|---|
| Focal length | 4.69 | 19.67 | 83.55 |
| Fno. | 2.80 | 4.36 | 5.11 |
| Angle of field 2ω | 78.31 | 20.25 | 4.80 |
| Image height | 3.6 | 3.6 | 3.6 |
| Lens total length | 80.70 | 98.74 | 120.58 |
| BF | 4.78 | 4.68 | 4.76 |
| d6 | 1.00 | 18.72 | 39.47 |
| d14 | 24.31 | 7.57 | 2.30 |
| d23 | 1.61 | 16.43 | 28.30 |
| d27 | 4.52 | 6.85 | 1.26 |
| Entrance pupil position | 19.50 | 63.53 | 285.65 |
| Exit pupil position A | −31.80 | −132.93 | −3328.09 |
| Exit pupil position B | −36.58 | −137.61 | −3332.85 |
| Front side principal point position | 23.59 | 80.39 | 367.10 |
| Back side principal point position | −3.64 | −18.72 | −82.51 |

Single lens data

| Lens | Initial surface | focal length |
|---|---|---|
| L1 | 1 | 123.56 |
| L2 | 3 | −78.69 |
| L3 | 4 | 322.68 |
| L4 | 5 | 55.74 |
| L5 | 7 | −9.93 |
| L6 | 9 | −11.00 |
| L7 | 10 | 8.81E+04 |
| L8 | 11 | 8.73 |
| L9 | 13 | −16.44 |
| L10 | 16 | 16.37 |
| L11 | 18 | −21.27 |
| L12 | 20 | 20.44 |
| L13 | 22 | −404.32 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 63.1420 | 10.1987 | −0.1462 | −6.3764 |
| 2 | 7 | −7.1131 | 13.5160 | 1.8043 | −7.2056 |
| 3 | 15 | 16.6070 | 15.6380 | 2.4030 | −9.2287 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1518 | −0.2442 | −0.8487 |
| 3 | 15 | −0.6511 | −1.7625 | −1.9650 |
| 4 | 24 | 0.7980 | 0.7677 | 0.8423 |
| 5 | 28 | 0.9418 | 0.9429 | 0.9420 |

EXAMPLE 21

Unit mm

Surface data

| Surface no. | r | d | nd | vd | effective radius |
|---|---|---|---|---|---|
| Object plane | ∞ | ∞ | | | |
| 1 | 59.200 | 3.83 | 1.49700 | 81.54 | 18.70 |
| 2 | 2576.346 | 0.10 | | | 18.48 |
| 3 | 38.400 | 0.96 | 1.90680 | 21.15 | 15.50 |
| 4 | 23.902 | 0.77 | 1.70010 | 17.01 | 14.69 |
| 5 | 27.142 | 4.40 | 1.69400 | 56.30 | 14.68 |
| 6 | 112.392 | Variable | | | 14.44 |
| 7 | 124.140 | 1.10 | 1.88300 | 40.76 | 9.63 |
| 8 | 8.143 | 4.79 | | | 6.79 |
| 9 | −46.254 | 0.80 | 1.88300 | 40.76 | 6.71 |
| 10 | 12.396 | 0.01 | 1.51400 | 42.83 | 6.70 |
| 11 | 12.396 | 4.87 | 1.78472 | 25.68 | 6.70 |
| 12 | −12.684 | 1.15 | | | 6.74 |
| 13 | −11.499 | 0.80 | 1.77250 | 49.60 | 5.81 |
| 14* | −141.904 | Variable | | | 5.83 |
| 15(stop) | ∞ | 1.30 | | | 3.48 |
| 16* | 10.743 | 4.93 | 1.58913 | 61.14 | 4.03 |
| 17 | −78.051 | 0.10 | | | 4.09 |
| 18 | 28.041 | 2.77 | 1.84666 | 23.78 | 4.09 |
| 19 | 10.545 | 1.42 | | | 3.85 |
| 20 | 13.731 | 3.12 | 1.49700 | 81.54 | 4.14 |
| 21 | −36.985 | 0.64 | | | 4.20 |
| 22* | 81.603 | 1.36 | 1.53071 | 55.69 | 4.19 |
| 23* | 44.028 | Variable | | | 4.19 |
| 24 | 19.130 | 2.68 | 1.49700 | 81.54 | 4.62 |
| 25 | −119.090 | 0.01 | 1.51400 | 42.83 | 4.50 |
| 26 | −119.090 | 0.82 | 1.80400 | 46.57 | 4.50 |
| 27 | 76.031 | Variable | | | 4.45 |
| 28* | 147.374 | 1.63 | 1.53071 | 55.69 | 4.18 |
| 29* | −67.939 | 1.09 | | | 4.22 |
| 30 | ∞ | 4.00 | 1.51680 | 64.20 | 4.11 |
| 31 | ∞ | 1.00 | | | 3.87 |
| Image plane | ∞ | | | | |

Aspherical surface data

14th surface

κ = 0.000, A2 = 0.0000E+00, A4 = −8.03282e−05, A6 = −9.82748e−07, A8 = 4.48510e−08, A10 = −9.57444e−10

16th surface

κ = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

κ = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

κ = 0.000, A2 = 0.0000E+00, A4 = −1.09771e−04, A6 = 5.91402e−06, A8 = −5.09130e−07, A10 = 8.38419e−09, A12 = −4.36735e−11

28th surface

κ = 0.000, A2 = 0.0000E+00, A4 = 1.07507e−03, A6 = −8.98397e−05, A8 = 3.30252e−06, A10 = −1.03838e−07

29th surface

κ = 0.000, A2 = 0.0000E+00, A4 = 1.64800e−03, A6 = −1.03700e−04, A8 = 1.95605e−06, A10 = −5.18968e−08

Various data
Zoom ratio 19.40

| | Wide angle | Intermediate | Telephoto |
|---|---|---|---|
| Focal length | 4.75 | 21.05 | 92.07 |
| Fno. | 2.88 | 4.49 | 5.39 |
| Angle of field 2ω | 76.84 | 18.92 | 4.35 |
| Image height | 3.6 | 3.6 | 3.6 |
| Lens total length | 82.20 | 98.86 | 118.20 |
| BF | 4.72 | 4.70 | 4.70 |
| d6 | 1.00 | 18.05 | 35.85 |
| d14 | 25.71 | 8.05 | 2.30 |
| d23 | 1.57 | 14.67 | 29.76 |
| d27 | 4.85 | 9.04 | 1.25 |
| Entrance pupil position | 19.80 | 66.10 | 277.19 |
| Exit pupil position A | −31.32 | −116.75 | 3184.27 |
| Exit pupil position B | −36.05 | −121.45 | 3179.56 |
| Front side principal point position | 23.92 | 83.50 | 371.92 |
| Back side principal point position | −3.75 | −20.07 | −91.09 |

Single lens data

| Lens | Initial surface | focal length |
|---|---|---|
| L1 | 1 | 121.85 |
| L2 | 3 | −72.08 |
| L3 | 4 | 260.52 |
| L4 | 5 | 50.49 |
| L5 | 7 | −9.91 |
| L6 | 9 | −11.00 |
| L7 | 10 | 8.81E+04 |
| L8 | 11 | 8.73 |
| L9 | 13 | −16.24 |
| L10 | 16 | 16.37 |
| L11 | 18 | −21.52 |
| L12 | 20 | 20.57 |
| L13 | 22 | −182.46 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 57.9678 | 10.0525 | −0.1804 | −6.2322 |
| 2 | 7 | −7.0320 | 13.5160 | 1.8345 | −7.1369 |
| 3 | 15 | 16.9660 | 15.6380 | 1.9601 | −9.4347 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1680 | −0.2833 | −1.0020 |
| 3 | 15 | −0.6511 | −1.8427 | −1.9939 |
| 4 | 24 | 0.7943 | 0.7378 | 0.8434 |
| 5 | 28 | 0.9424 | 0.9427 | 0.9426 |

EXAMPLE 22

Unit mm

Surface data

| Surface no. | r | d | nd | vd | effective radius |
|---|---|---|---|---|---|
| Object plane | ∞ | ∞ | | | |
| 1 | 60.430 | 4.03 | 1.49700 | 81.54 | 18.70 |
| 2 | 3560.059 | 0.10 | | | 19.11 |
| 3 | 37.900 | 1.14 | 1.94595 | 17.98 | 15.50 |

-continued

Unit mm

| | | | | | |
|---|---|---|---|---|---|
| 4 | 24.736 | 0.73 | 1.69952 | 16.99 | 14.71 |
| 5 | 27.816 | 4.15 | 1.72000 | 43.69 | 14.69 |
| 6 | 93.987 | Variable | | | 14.43 |
| 7 | 96.799 | 1.10 | 1.88300 | 40.76 | 9.61 |
| 8 | 8.027 | 4.79 | | | 6.69 |
| 9 | −46.254 | 0.80 | 1.88300 | 40.76 | 6.54 |
| 10 | 12.396 | 0.01 | 1.51400 | 42.83 | 6.47 |
| 11 | 12.396 | 4.87 | 1.78472 | 25.68 | 6.47 |
| 12 | −12.684 | 1.15 | | | 6.48 |
| 13 | −11.499 | 0.80 | 1.77250 | 49.60 | 5.45 |
| 14* | −173.275 | Variable | | | 5.40 |
| 15(stop) | ∞ | 1.30 | | | 3.48 |
| 16* | 10.743 | 4.93 | 1.58913 | 61.14 | 4.04 |
| 17 | −78.051 | 0.10 | | | 4.10 |
| 18 | 28.041 | 2.77 | 1.84666 | 23.78 | 4.10 |
| 19 | 10.392 | 1.42 | | | 3.87 |
| 20 | 13.283 | 3.12 | 1.49700 | 81.54 | 4.16 |
| 21 | −36.985 | 0.64 | | | 4.23 |
| 22* | 77.099 | 1.36 | 1.53071 | 55.69 | 4.22 |
| 23* | 46.336 | Variable | | | 4.22 |
| 24 | 19.130 | 2.68 | 1.49700 | 81.54 | 4.67 |
| 25 | −119.090 | 0.01 | 1.51400 | 42.83 | 4.54 |
| 26 | −119.090 | 0.82 | 1.80400 | 46.57 | 4.54 |
| 27 | 76.031 | Variable | | | 4.49 |
| 28* | 147.374 | 1.63 | 1.53071 | 55.69 | 4.23 |
| 29* | −67.939 | 1.09 | | | 4.23 |
| 30 | ∞ | 4.00 | 1.51680 | 64.20 | 4.12 |
| 31 | ∞ | 1.03 | | | 3.88 |
| Image plane | ∞ | | | | |

Aspherical surface data

14th surface

κ = 0.000, A2 = 0.0000E+00, A4 = −8.03513e−05, A6 = −1.67633e−06, A8 = 9.30749e−08, A10 = −1.83760e−09
16th surface κ = 0.000, A2 = 0.0000E+00, A4 = −8.77784e−05, A6 = −1.01116e−06, A8 = 5.64180e−08, A10 = −2.23368e−09, A12 = 3.59187e−11
22nd surface κ = 0.000, A2 = 0.0000E+00, A4 = −2.17277e−04, A6 = 5.36299e−06, A8 = −5.28517e−07, A10 = 1.10330e−08, A12 = −1.37250e−10
23rd surface κ = 0.000, A2 = 0.0000E+00, A4 = −1.09771e−04, A6 = 5.91402e−06, A8 = −5.09130e−07, A10 = 8.38419e−09, A12 = −4.36735e−11
28th surface κ = 0.000, A2 = 0.0000E+00, A4 = 6.78553e−04, A6 = −1.66161e−05, A8 = −1.54939e−06, A10 = 2.20507e−08
29th surface κ = 0.000, A2 = 0.0000E+00, A4 = 1.05976e−03, A6 = −1.53037e−05, A8 = −3.28541e−06, A10 = 7.26883e−08

Various data
Zoom ratio 19.92

| | Wide angle | Intermediate | Telephoto |
|---|---|---|---|
| Focal length | 4.67 | 20.84 | 93.13 |
| Fno. | 2.85 | 4.40 | 5.15 |
| Angle of field 2ω | 77.78 | 19.19 | 4.33 |
| Image height | 3.6 | 3.6 | 3.6 |
| Lens total length | 81.99 | 100.29 | 118.08 |
| BF | 4.76 | 4.75 | 4.75 |
| d6 | 1.00 | 19.61 | 37.43 |
| d14 | 25.51 | 8.65 | 2.30 |
| d23 | 1.67 | 16.59 | 27.97 |
| d27 | 4.63 | 6.26 | 1.20 |
| Entrance pupil position | 19.80 | 72.63 | 304.09 |
| Exit pupil position A | −31.58 | −128.41 | −1571.95 |
| Exit pupil position B | −36.34 | −133.16 | −1576.70 |
| Front side principal point position | 23.87 | 90.21 | 391.72 |

-continued

Unit mm

| | | | |
|---|---|---|---|
| Back side principal point position | −3.64 | −19.82 | −92.11 |

Single lens data

| Lens | Initial surface | focal length |
|---|---|---|
| L1 | 1 | 123.64 |
| L2 | 3 | −78.59 |
| L3 | 4 | 291.02 |
| L4 | 5 | 53.47 |
| L5 | 7 | −9.97 |
| L6 | 9 | −11.00 |
| L7 | 10 | 8.81E+04 |
| L8 | 11 | 8.73 |
| L9 | 13 | −15.98 |
| L10 | 16 | 16.37 |
| L11 | 18 | −21.01 |
| L12 | 20 | 20.08 |
| L13 | 22 | −222.23 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 59.5217 | 10.1420 | −0.4561 | −6.4724 |
| 2 | 7 | −6.9701 | 13.5160 | 1.9002 | −7.0261 |
| 3 | 15 | 16.8268 | 15.6380 | 2.1560 | −9.3421 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1614 | −0.2837 | −1.0326 |
| 3 | 15 | −0.6482 | −1.6910 | −1.9072 |
| 4 | 24 | 0.7967 | 0.7748 | 0.8434 |
| 5 | 28 | 0.9420 | 0.9421 | 0.9421 |

EXAMPLE 23

Unit mm

Surface data

| Surface no. | r | d | nd | vd | effective radius |
|---|---|---|---|---|---|
| Object plane | ∞ | ∞ | | | |
| 1 | 59.000 | 1.79 | 1.80810 | 22.76 | 18.20 |
| 2 | 31.331 | 1.28 | 1.63336 | 23.36 | 16.26 |
| 3 | 39.158 | 4.66 | 1.49700 | 81.54 | 16.14 |
| 4 | 101891.855 | 0.10 | | | 15.50 |
| 5 | 34.060 | 3.31 | 1.64000 | 60.08 | 14.35 |
| 6 | 114.503 | Variable | | | 14.00 |
| 7 | 63.862 | 1.10 | 1.88300 | 40.76 | 9.33 |
| 8 | 7.573 | 4.79 | | | 6.51 |
| 9 | −46.254 | 0.80 | 1.88300 | 40.76 | 6.42 |
| 10 | 12.396 | 0.01 | 1.51400 | 42.83 | 6.42 |
| 11 | 12.396 | 4.87 | 1.78472 | 25.68 | 6.43 |
| 12 | −12.684 | 1.15 | | | 6.47 |
| 13 | −11.499 | 0.80 | 1.77250 | 49.60 | 5.70 |
| 14* | −239.828 | Variable | | | 5.74 |
| 15(stop) | ∞ | 1.30 | | | 3.94 |

-continued

Unit mm

| | | | | | |
|---|---|---|---|---|---|
| 16* | 10.743 | 4.93 | 1.58913 | 61.14 | 4.59 |
| 17 | −78.051 | 0.10 | | | 4.60 |
| 18 | 28.041 | 2.77 | 1.84666 | 23.78 | 4.57 |
| 19 | 10.632 | 1.42 | | | 4.27 |
| 20 | 14.230 | 3.12 | 1.49700 | 81.54 | 4.53 |
| 21 | −36.985 | 0.64 | | | 4.58 |
| 22* | 80.887 | 1.36 | 1.53071 | 55.69 | 4.55 |
| 23* | 34.607 | Variable | | | 4.55 |
| 24 | 19.130 | 2.68 | 1.49700 | 81.54 | 4.80 |
| 25 | −119.090 | 0.01 | 1.51400 | 42.83 | 4.68 |
| 26 | −119.090 | 0.82 | 1.80400 | 46.57 | 4.68 |
| 27 | 76.031 | Variable | | | 4.63 |
| 28* | 147.374 | 1.63 | 1.53071 | 55.69 | 4.13 |
| 29* | −67.939 | 1.09 | | | 4.05 |
| 30 | ∞ | 4.00 | 1.51680 | 64.20 | 3.99 |
| 31 | ∞ | 0.97 | | | 3.84 |
| Image plane | ∞ | | | | |

Aspherical surface data

14th surface $\kappa = 0.000$
$A2 = 0.0000E+00, A4 = -9.19823e-05, A6 = -8.80923e-07,$
$A8 = 4.39702e-08, A10 = -1.24247e-09$ 16th surface $\kappa = 0.000$
$A2 = 0.0000E+00, A4 = -8.77784e-05, A6 = -1.01116e-06,$
$A8 = 5.64180e-08, A10 = -2.23368e-09, A12 = 3.59187e-11$ 22nd surface $\kappa = 0.000$
$A2 = 0.0000E+00, A4 = -2.17277e-04, A6 = 5.36299e-06,$
$A8 = -5.28517e-07, A10 = 1.10330e-08, A12 = -1.37250e-10$ 23rd surface $\kappa = 0.000$
$A2 = 0.0000E+00, A4 = -1.09771e-04, A6 = 5.91402e-06,$
$A8 = -5.09130e-07, A10 = 8.38419e-09, A12 = -4.36735e-11$ 28th surface $\kappa = 0.000$
$A2 = 0.0000E+00, A4 = 8.15873e-04, A6 = 4.82675e-06,$
$A8 = -2.20386e-06, A10 = 4.10510e-08$ 29th surface $\kappa = 0.000$
$A2 = 0.0000E+00, A4 = 1.26016e-03, A6 = 1.60282e-05,$
$A8 = -3.90922e-06, A10 = 7.56282e-08$ Various data
Zoom ratio 19.87

| | Wide angle | Intermediate | Telephoto |
|---|---|---|---|
| Focal length | 4.68 | 19.29 | 92.90 |
| Fno. | 2.70 | 3.82 | 4.00 |
| Angle of field 2ω | 77.39 | 20.56 | 4.33 |
| Image height | 3.6 | 3.6 | 3.6 |
| Lens total length | 84.77 | 101.03 | 112.41 |
| BF | 4.70 | 4.69 | 4.70 |
| d6 | 1.00 | 20.41 | 37.78 |
| d14 | 26.39 | 10.44 | 2.30 |
| d23 | 1.27 | 7.49 | 7.58 |
| d27 | 5.98 | 12.56 | 14.63 |
| Entrance pupil position | 19.71 | 75.82 | 340.35 |
| Exit pupil position A | −31.43 | −70.07 | −77.54 |
| Exit pupil position B | −36.13 | −74.76 | −82.24 |
| Front side principal point position | 23.78 | 90.13 | 328.31 |
| Back side principal point position | −3.70 | −18.33 | −91.92 |

-continued

Unit mm

Single lens data

| Lens | Initial surface | focal length |
|---|---|---|
| L1 | 1 | −85.13 |
| L2 | 2 | 232.73 |
| L3 | 3 | 78.82 |
| L4 | 5 | 74.56 |
| L5 | 7 | −9.82 |
| L6 | 9 | −11.00 |
| L7 | 10 | 8.81E+04 |
| L8 | 11 | 8.73 |
| L9 | 13 | −15.66 |
| L10 | 16 | 16.37 |
| L11 | 18 | −21.82 |
| L12 | 20 | 21.10 |
| L13 | 22 | −115.14 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 56.2753 | 11.1418 | 2.4952 | −4.5895 |
| 2 | 7 | −6.7699 | 13.5160 | 1.9676 | −6.9046 |
| 3 | 15 | 17.5094 | 15.6380 | 1.3398 | −9.7238 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1614 | −0.3004 | −1.3104 |
| 3 | 15 | −0.7007 | −1.7540 | −2.0181 |
| 4 | 24 | 0.7794 | 0.6902 | 0.6621 |
| 5 | 28 | 0.9427 | 0.9427 | 0.9427 |

EXAMPLE 24

Unit mm

Surface data

| Surface no. | r | d | nd | νd | effective radius |
|---|---|---|---|---|---|
| Object plane | ∞ | ∞ | | | |
| 1 | 60.982 | 5.35 | 1.64850 | 53.02 | 24.00 |
| 2 | 495.744 | 0.19 | | | 23.38 |
| 3 | 31.172 | 1.28 | 1.92286 | 18.90 | 17.70 |
| 4 | 22.227 | 1.77 | 1.63387 | 23.38 | 16.35 |
| 5 | 26.877 | 5.23 | 1.49700 | 81.54 | 16.31 |
| 6 | 101.913 | Variable | | | 16.00 |
| 7 | 303.814 | 1.10 | 1.88300 | 40.76 | 9.68 |
| 8 | 8.312 | 4.79 | | | 6.82 |
| 9 | −46.254 | 0.80 | 1.88300 | 40.76 | 6.71 |
| 10 | 12.396 | 0.01 | 1.51400 | 42.83 | 6.69 |
| 11 | 12.396 | 4.87 | 1.78472 | 25.68 | 6.69 |
| 12 | −12.684 | 1.15 | | | 6.72 |
| 13 | −11.499 | 0.80 | 1.77250 | 49.60 | 5.72 |
| 14* | −230.432 | Variable | | | 5.72 |
| 15(stop) | ∞ | 1.30 | | | 3.39 |
| 16* | 10.743 | 4.93 | 1.58913 | 61.14 | 3.96 |
| 17 | −78.051 | 0.10 | | | 4.06 |
| 18 | 28.041 | 2.77 | 1.84666 | 23.78 | 4.07 |

-continued

Unit mm

| | | | | | |
|---|---|---|---|---|---|
| 19 | 10.295 | 1.42 | | | 3.87 |
| 20 | 12.826 | 3.12 | 1.49700 | 81.54 | 4.21 |
| 21 | −36.985 | 0.64 | | | 4.29 |
| 22* | 39.207 | 1.36 | 1.53071 | 55.69 | 4.29 |
| 23* | 33.196 | Variable | | | 4.28 |
| 24 | 19.130 | 2.68 | 1.49700 | 81.54 | 4.60 |
| 25 | −119.090 | 0.01 | 1.51400 | 42.83 | 4.47 |
| 26 | −119.090 | 0.82 | 1.80400 | 46.57 | 4.47 |
| 27 | 76.031 | Variable | | | 4.41 |
| 28* | 147.374 | 1.63 | 1.53071 | 55.69 | 4.17 |
| 29* | −67.939 | 1.09 | | | 4.09 |
| 30 | ∞ | 4.00 | 1.51680 | 64.20 | 4.02 |
| 31 | ∞ | 1.05 | | | 3.85 |
| Image plane | ∞ | | | | |

Aspherical surface data

14th surface $\kappa = 0.000$
A2 = 0.0000E+00, A4 = −7.99095e−05, A6 = −9.37486e−07,
A8 = 4.32991e−08, A10 = −1.00218e−09

16th surface $\kappa = 0.000$
A2 = 0.0000E+00, A4 = −8.77784e−05, A6 = −1.01116e−06,
A8 = 5.64180e−08, A10 = −2.23368e−09, A12 = 3.59187e−11

22nd surface $\kappa = 0.000$
A2 = 0.0000E+00, A4 = −2.17277e−04, A6 = 5.36299e−06,
A8 = −5.28517e−07, A10 = 1.10330e−08, A12 = −1.37250e−10

23rd surface $\kappa = 0.000$
A2 = 0.0000E+00, A4 = −1.09771e−04, A6 = 5.91402e−06,
A8 = −5.09130e−07, A10 = 8.38419e−09, A12 = −4.36735e−11

28th surface $\kappa = 0.000$
A2 = 0.0000E+00, A4 = 8.15873e−04, A6 = 4.82675e−06,
A8 = −2.20386e−06, A10 = 4.10510e−08

29th surface $\kappa = 0.000$
A2 = 0.0000E+00, A4 = 1.26016e−03, A6 = 1.60282e−05,
A8 = −3.90922e−06, A10 = 7.56282e−08

Various data
Zoom ratio 17.36

| | Wide angle | Intermediate | Telephoto |
|---|---|---|---|
| Focal length | 4.86 | 20.12 | 84.44 |
| Fno. | 2.83 | 4.26 | 5.31 |
| Angle of field 2ω | 75.01 | 19.69 | 4.72 |
| Image height | 3.6 | 3.6 | 3.6 |
| Lens total length | 84.06 | 98.77 | 118.56 |
| BF | 4.78 | 4.67 | 4.67 |
| d6 | 1.00 | 16.79 | 33.06 |
| d14 | 24.28 | 7.94 | 2.30 |
| d23 | 1.62 | 13.90 | 29.38 |
| d27 | 4.26 | 7.36 | 1.04 |
| Entrance pupil position | 24.63 | 73.25 | 271.77 |
| Exit pupil position A | −31.43 | −104.20 | 3257.46 |
| Exit pupil position B | −36.21 | −108.87 | 3252.79 |
| Front side principal point position | 28.84 | 89.66 | 358.40 |
| Back side principal point position | −3.81 | −19.17 | −83.49 |

Single lens data

| Lens | Initial surface | focal length |
|---|---|---|
| L1 | 1 | 106.71 |
| L2 | 3 | −90.15 |
| L3 | 4 | 176.57 |
| L4 | 5 | 71.79 |
| L5 | 7 | −9.69 |
| L6 | 9 | −11.00 |
| L7 | 10 | 8.81E+04 |
| L8 | 11 | 8.73 |
| L9 | 13 | −15.69 |
| L10 | 16 | 16.37 |
| L11 | 18 | −20.69 |
| L12 | 20 | 19.57 |
| L13 | 22 | −442.74 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 58.8815 | 13.8227 | −1.3148 | −9.6007 |
| 2 | 7 | −6.7026 | 13.5160 | 1.8901 | −6.9662 |
| 3 | 15 | 16.3471 | 15.6380 | 2.4850 | −9.1335 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1689 | −0.2804 | −0.8784 |
| 3 | 15 | −0.6482 | −1.6981 | −2.0449 |
| 4 | 24 | 0.8014 | 0.7610 | 0.8466 |
| 5 | 28 | 0.9418 | 0.9430 | 0.9430 |

EXAMPLE 25

Unit mm

Surface data

| Surface no. | r | d | nd | vd | effective radius |
|---|---|---|---|---|---|
| Object plane | ∞ | ∞ | | | |
| 1 | 60.578 | 3.83 | 1.49700 | 81.54 | 18.70 |
| 2 | 1959.863 | 0.10 | | | 18.64 |
| 3 | 44.600 | 1.01 | 1.82114 | 24.06 | 15.50 |
| 4 | 24.534 | 0.78 | 1.67000 | 20.00 | 14.71 |
| 5 | 27.767 | 4.49 | 1.69350 | 53.21 | 14.69 |
| 6 | 126.235 | Variable | | | 14.45 |
| 7 | 139.991 | 1.10 | 1.88300 | 40.76 | 9.75 |
| 8 | 8.467 | 4.79 | | | 6.96 |
| 9 | −46.254 | 0.80 | 1.88300 | 40.76 | 6.87 |
| 10 | 12.396 | 0.01 | 1.51400 | 42.83 | 6.85 |
| 11 | 12.396 | 4.87 | 1.78472 | 25.68 | 6.86 |
| 12 | −12.684 | 1.15 | | | 6.88 |
| 13 | −11.499 | 0.80 | 1.77250 | 49.60 | 5.80 |
| 14* | −133.624 | Variable | | | 5.79 |
| 15(stop) | ∞ | 1.30 | | | 3.48 |
| 16* | 10.743 | 4.93 | 1.58913 | 61.14 | 4.03 |
| 17 | −78.051 | 0.10 | | | 4.09 |
| 18 | 28.041 | 2.77 | 1.84666 | 23.78 | 4.08 |
| 19 | 10.494 | 1.42 | | | 3.85 |
| 20 | 13.584 | 3.12 | 1.49700 | 81.54 | 4.13 |
| 21 | −36.985 | 0.64 | | | 4.19 |
| 22* | 90.159 | 1.36 | 1.53071 | 55.69 | 4.18 |
| 23* | 47.692 | Variable | | | 4.19 |
| 24 | 19.130 | 2.68 | 1.49700 | 81.54 | 4.65 |
| 25 | −119.090 | 0.01 | 1.51400 | 42.83 | 4.52 |

-continued

Unit mm

| | | | | | |
|---|---|---|---|---|---|
| 26 | −119.090 | 0.82 | 1.80400 | 46.57 | 4.52 |
| 27 | 76.031 | Variable | | | 4.47 |
| 28* | 147.374 | 1.63 | 1.53071 | 55.69 | 4.20 |
| 29* | −67.939 | 1.09 | | | 4.22 |
| 30 | ∞ | 4.00 | 1.51680 | 64.20 | 4.11 |
| 31 | ∞ | 0.97 | | | 3.87 |
| Image plane | ∞ | | | | |

Aspherical surface data

14th surface $\kappa = 0.000$
A2 = 0.0000E+00, A4 = −7.27292e−05, A6 = −1.76848e−06,
A8 = 1.00411e−07, A10 = −1.83590e−09

16th surface $\kappa = 0.000$
A2 = 0.0000E+00, A4 = −8.77784e−05, A6 = −1.01116e−06,
A8 = 5.64180e−08, A10 = −2.23368e−09, A12 = 3.59187e−11

22nd surface $\kappa = 0.000$
A2 = 0.0000E+00, A4 = −2.17277e−04, A6 = 5.36299e−06,
A8 = −5.28517e−07, A10 = 1.10330e−08, A12 = −1.37250e−10

23rd surface $\kappa = 0.000$
A2 = 0.0000E+00, A4 = −1.09771e−04, A6 = 5.91402e−06,
A8 = −5.09130e−07, A10 = 8.38419e−09, A12 = −4.36735e−11

28th surface $\kappa = 0.000$
A2 = 0.0000E+00, A4 = 7.47669e−04, A6 = −3.76060e−05,
A8 = −7.34892e−07, A10 = 1.04035e−08

29th surface $\kappa = 0.000$
A2 = 0.0000E+00, A4 = 1.22156e−03, A6 = −4.89870e−05,
A8 = −1.82037e−06, A10 = 5.14864e−08

Various data
Zoom ratio 19.90

| | Wide angle | Intermediate | Telephoto |
|---|---|---|---|
| Focal length | 4.68 | 19.85 | 93.09 |
| Fno. | 2.85 | 4.45 | 5.18 |
| Angle of field 2ω | 78.27 | 20.06 | 4.31 |
| Image height | 3.6 | 3.6 | 3.6 |
| Lens total length | 82.56 | 99.88 | 120.82 |
| BF | 4.70 | 4.74 | 4.73 |
| d6 | 1.00 | 18.90 | 40.08 |
| d14 | 26.12 | 8.56 | 2.30 |
| d23 | 1.59 | 16.58 | 27.97 |
| d27 | 4.66 | 6.60 | 1.25 |
| Entrance pupil position | 19.80 | 65.20 | 312.38 |
| Exit pupil position A | −31.19 | −128.84 | −1443.88 |
| Exit pupil position B | −35.88 | −133.58 | −1448.62 |
| Front side principal point position | 23.87 | 82.10 | 399.49 |
| Back side principal point position | −3.71 | −18.83 | −92.08 |

Single lens data

| Lens | Initial surface | focal length |
|---|---|---|
| L1 | 1 | 125.69 |
| L2 | 3 | −67.96 |
| L3 | 4 | 286.94 |
| L4 | 5 | 50.39 |
| L5 | 7 | −10.25 |
| L6 | 9 | −11.00 |
| L7 | 10 | 8.81E+04 |
| L8 | 11 | 8.73 |
| L9 | 13 | −16.33 |
| L10 | 16 | 16.37 |

-continued

Unit mm

| Lens | Initial surface | focal length |
|---|---|---|
| L11 | 18 | −21.35 |
| L12 | 20 | 20.41 |
| L13 | 22 | −192.93 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 62.9060 | 10.2044 | −0.1488 | −6.3375 |
| 2 | 7 | −7.2621 | 13.5160 | 1.8474 | −7.1449 |
| 3 | 15 | 16.9381 | 15.6380 | 2.0302 | −9.4078 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1563 | −0.2543 | −0.9836 |
| 3 | 15 | −0.6330 | −1.7097 | −1.8942 |
| 4 | 24 | 0.7973 | 0.7702 | 0.8429 |
| 5 | 28 | 0.9427 | 0.9422 | 0.9423 |

EXAMPLE 26

Unit mm

Surface data

| Surface no. | r | d | nd | vd | effective radius |
|---|---|---|---|---|---|
| Object plane | ∞ | ∞ | | | |
| 1 | 62.273 | 3.78 | 1.49700 | 81.54 | 18.70 |
| 2 | 2204.309 | 0.10 | | | 18.81 |
| 3 | 43.400 | 1.00 | 1.90680 | 21.15 | 15.50 |
| 4 | 24.822 | 0.83 | 1.73000 | 15.00 | 14.72 |
| 5 | 28.504 | 4.49 | 1.69100 | 54.82 | 14.71 |
| 6 | 158.244 | Variable | | | 14.48 |
| 7 | 179.385 | 1.10 | 1.88300 | 40.76 | 9.76 |
| 8 | 8.634 | 4.79 | | | 7.01 |
| 9 | −46.254 | 0.80 | 1.88300 | 40.76 | 6.91 |
| 10 | 12.396 | 0.01 | 1.51400 | 42.83 | 6.89 |
| 11 | 12.396 | 4.87 | 1.78472 | 25.68 | 6.89 |
| 12 | −12.684 | 1.15 | | | 6.91 |
| 13 | −11.499 | 0.80 | 1.77250 | 49.60 | 5.76 |
| 14* | −124.597 | Variable | | | 5.74 |
| 15(stop) | ∞ | 1.30 | | | 3.48 |
| 16* | 10.743 | 4.93 | 1.58913 | 61.14 | 4.03 |
| 17 | −78.051 | 0.10 | | | 4.08 |
| 18 | 28.041 | 2.77 | 1.84666 | 23.78 | 4.08 |
| 19 | 10.545 | 1.42 | | | 3.85 |
| 20 | 13.646 | 3.12 | 1.49700 | 81.54 | 4.12 |
| 21 | −36.985 | 0.64 | | | 4.18 |
| 22* | 84.725 | 1.36 | 1.53071 | 55.69 | 4.17 |
| 23* | 42.613 | Variable | | | 4.17 |
| 24 | 19.130 | 2.68 | 1.49700 | 81.54 | 4.61 |
| 25 | −119.090 | 0.01 | 1.51400 | 42.83 | 4.48 |
| 26 | −119.090 | 0.82 | 1.80400 | 46.57 | 4.48 |
| 27 | 76.031 | Variable | | | 4.43 |
| 28* | 147.374 | 1.63 | 1.53071 | 55.69 | 4.18 |
| 29* | −67.939 | 1.09 | | | 4.26 |
| 30 | ∞ | 4.00 | 1.51680 | 64.20 | 4.13 |
| 31 | ∞ | 0.97 | | | 3.88 |
| Image plane | ∞ | | | | |

-continued

Unit mm

Aspherical surface data

14th surface

κ = 0.000
A2 = 0.0000E+00, A4 = −6.87584e−05, A6 = −1.78351e−06,
A8 = 9.24419e−08, A10 = −1.58208e−09
16th surface κ = 0.000
A2 = 0.0000E+00, A4 = −8.77784e−05, A6 = −1.01116e−06,
A8 = 5.64180e−08, A10 = −2.23368e−09, A12 = 3.59187e−11
22nd surface κ = 0.000
A2 = 0.0000E+00, A4 = −2.17277e−04, A6 = 5.36299e−06,
A8 = −5.28517e−07, A10 = 1.10330e−08, A12 = −1.37250e−10
23rd surface κ = 0.000
A2 = 0.0000E+00, A4 = −1.09771e−04, A6 = 5.91402e−06,
A8 = −5.09130e−07, A10 = 8.38419e−09, A12 = −4.36735e−11
28th surface κ = 0.000
A2 = 0.0000E+00, A4 = 6.11134e−04, A6 = −4.92865e−05,
A8 = −5.05949e−07, A10 = 2.19323e−09
29th surface κ = 0.000, A2 = 0.0000E+00, A4 = 1.09149e−03, A6 = −6.84436e−05,
A8 = −1.26590e−06, A10 = 4.63882e−08

Various data
Zoom ratio 19.80

|  | Wide angle | Intermediate | Telephoto |
|---|---|---|---|
| Focal length | 4.70 | 21.07 | 92.95 |
| Fno. | 2.87 | 4.50 | 5.22 |
| Angle of field 2ω | 77.84 | 18.91 | 4.31 |
| Image height | 3.6 | 3.6 | 3.6 |
| Lens total length | 82.94 | 100.13 | 120.10 |
| BF | 4.69 | 4.70 | 4.70 |
| d6 | 1.00 | 19.36 | 39.43 |
| d14 | 26.54 | 8.04 | 2.30 |
| d23 | 1.58 | 14.90 | 27.96 |
| d27 | 4.65 | 8.67 | 1.22 |
| Entrance pupil position | 19.80 | 67.28 | 303.89 |
| Exit pupil position A | −30.80 | −116.62 | −1286.31 |
| Exit pupil position B | −35.49 | −121.32 | −1291.01 |
| Front side principal point position | 23.87 | 84.69 | 390.16 |
| Back side principal point position | −3.73 | −20.10 | −91.98 |

Single lens data

| Lens | Initial surface | focal length |
|---|---|---|
| L1 | 1 | 128.87 |
| L2 | 3 | −65.62 |
| L3 | 4 | 240.41 |
| L4 | 5 | 49.61 |
| L5 | 7 | −10.30 |
| L6 | 9 | −11.00 |
| L7 | 10 | 8.81E+04 |
| L8 | 11 | 8.73 |
| L9 | 13 | −16.45 |
| L10 | 16 | 16.37 |
| L11 | 18 | −21.52 |
| L12 | 20 | 20.48 |
| L13 | 22 | −163.38 |
| L14 | 24 | 33.38 |
| L15 | 25 | 8.13E+06 |
| L16 | 26 | −57.61 |
| L17 | 28 | 87.85 |

-continued

Unit mm

Zoom lens group data

| Unit | Initial surface | Focal length | Lens structure length | Front side principal point position | Back side principal point position |
|---|---|---|---|---|---|
| 1 | 1 | 62.0750 | 10.1939 | 0.0124 | −6.1538 |
| 2 | 7 | −7.3388 | 13.5160 | 1.8236 | −7.1887 |
| 3 | 15 | 17.0107 | 15.6380 | 1.8824 | −9.4664 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1604 | −0.2678 | −1.0014 |
| 3 | 15 | −0.6274 | −1.8095 | −1.8801 |
| 4 | 24 | 0.7975 | 0.7430 | 0.8438 |
| 5 | 28 | 0.9427 | 0.9427 | 0.9427 |

EXAMPLE 27

Unit mm

Surface data

| Surface no. | r | d | nd | vd | effective radius |
|---|---|---|---|---|---|
| Object plane | ∞ | ∞ | | | |
| 1 | 59.200 | 3.83 | 1.49700 | 81.54 | 18.70 |
| 2 | 2576.346 | 0.10 | | | 18.48 |
| 3 | 38.400 | 0.96 | 1.90680 | 21.15 | 15.50 |
| 4 | 23.902 | 0.77 | 1.70010 | 17.01 | 14.69 |
| 5 | 27.142 | 4.40 | 1.69400 | 56.30 | 14.68 |
| 6 | 112.392 | Variable | | | 14.44 |
| 7 | 124.140 | 1.10 | 1.88300 | 40.76 | 9.63 |
| 8 | 8.143 | 4.79 | | | 6.79 |
| 9 | −46.254 | 0.80 | 1.88300 | 40.76 | 6.71 |
| 10 | 12.396 | 0.01 | 1.51400 | 42.83 | 6.70 |
| 11 | 12.396 | 4.87 | 1.78472 | 25.68 | 6.70 |
| 12 | −12.684 | 1.15 | | | 6.74 |
| 13 | −11.499 | 0.80 | 1.77250 | 49.60 | 5.81 |
| 14* | −141.904 | Variable | | | 5.83 |
| 15(stop) | ∞ | 1.30 | | | 3.48 |
| 16* | 10.743 | 4.93 | 1.58913 | 61.14 | 4.03 |
| 17 | −78.051 | 0.10 | | | 4.09 |
| 18 | 28.041 | 2.77 | 1.84666 | 23.78 | 4.09 |
| 19 | 10.545 | 1.42 | | | 3.85 |
| 20 | 13.731 | 3.12 | 1.49700 | 81.54 | 4.14 |
| 21 | −36.985 | 0.64 | | | 4.20 |
| 22* | 81.603 | 1.36 | 1.53071 | 55.69 | 4.19 |
| 23* | 44.028 | Variable | | | 4.19 |
| 24 | 19.130 | 2.68 | 1.49700 | 81.54 | 4.62 |
| 25 | −119.090 | 0.01 | 1.51400 | 42.83 | 4.50 |
| 26 | −119.090 | 0.82 | 1.80400 | 46.57 | 4.50 |
| 27 | 76.031 | Variable | | | 4.45 |
| 28* | 147.374 | 1.63 | 1.53071 | 55.69 | 4.18 |
| 29* | −67.939 | 1.09 | | | 4.22 |
| 30 | ∞ | 4.00 | 1.51680 | 64.20 | 4.11 |
| 31 | ∞ | 1.00 | | | 3.87 |
| Image plane | ∞ | | | | |

Aspherical surface data

14th surface

κ = 0.000
A2 = 0.0000E+00, A4 = −8.03282e−05, A6 = −9.82748e−07,
A8 = 4.48510e−08, A10 = −9.57444e−10

-continued

Unit mm

16th surface

κ = 0.000
A2 = 0.0000E+00, A4 = −8.77784e−05, A6 = −1.01116e−06,
A8 = 5.64180e−08, A10 = −2.23368e−09, A12 = 3.59187e−11
22nd surface κ = 0.000
A2 = 0.0000E+00, A4 = −2.17277e−04, A6 = 5.36299e−06,
A8 = −5.28517e−07, A10 = 1.10330e−08, A12 = −1.37250e−10
23rd surface κ = 0.000
A2 = 0.0000E+00, A4 = −1.09771e−04, A6 = 5.91402e−06,
A8 = −5.09130e−07, A10 = 8.38419e−09, A12 = −4.36735e−11
28th surface κ = 0.000
A2 = 0.0000E+00, A4 = 1.07507e−03, A6 = −8.98397e−05,
A8 = 3.30252e−06, A10 = −1.03838e−07
29th surface κ = 0.000
A2 = 0.0000E+00, A4 = 1.64800e−03, A6 = −1.03700e−04,
A8 = 1.95605e−06, A10 = −5.18968e−08

Various data
Zoom ratio 19.40

|  | Wide angle | Intermediate | Telephoto |
|---|---|---|---|
| Focal length | 4.75 | 21.05 | 92.07 |
| Fno. | 2.88 | 4.49 | 5.39 |
| Angle of field 2ω | 76.84 | 18.92 | 4.35 |
| Image height | 3.6 | 3.6 | 3.6 |
| Lens total length | 82.20 | 98.86 | 118.20 |
| BF | 4.72 | 4.70 | 4.70 |
| d6 | 1.00 | 18.05 | 35.85 |
| d14 | 25.71 | 8.05 | 2.30 |
| d23 | 1.57 | 14.67 | 29.76 |
| d27 | 4.85 | 9.04 | 1.25 |
| Entrance pupil position | 19.80 | 66.10 | 277.19 |
| Exit pupil position A | −31.32 | −116.75 | 3184.27 |
| Exit pupil position B | −36.05 | −121.45 | 3179.56 |
| Front side principal point position | 23.92 | 83.50 | 371.92 |
| Back side principal point position | −3.75 | −20.07 | −91.09 |

Single lens data

| Lens | Initial surface | focal length |
|---|---|---|
| L1 | 1 | 121.85 |
| L2 | 3 | −72.08 |
| L3 | 4 | 260.52 |
| L4 | 5 | 50.49 |
| L5 | 7 | −9.91 |
| L6 | 9 | −11.00 |
| L7 | 10 | 8.81E+04 |
| L8 | 11 | 8.73 |
| L9 | 13 | −16.24 |
| L10 | 16 | 16.37 |
| L11 | 18 | −21.52 |
| L12 | 20 | 20.57 |
| L13 | 22 | −182.46 |
| L14 | 24 | 33.38 |
| L15 | 25 | 8.13E+06 |
| L16 | 26 | −57.61 |
| L17 | 28 | 87.85 |

-continued

Unit mm

Zoom lens group data

| Unit | Initial surface | Focal length | Lens structure length | Front side principal point position | Back side principal point position |
|---|---|---|---|---|---|
| 1 | 1 | 57.9678 | 10.0525 | −0.1804 | −6.2322 |
| 2 | 7 | −7.0320 | 13.5160 | 1.8345 | −7.1369 |
| 3 | 15 | 16.9660 | 15.6380 | 1.9601 | −9.4347 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1680 | −0.2833 | −1.0020 |
| 3 | 15 | −0.6511 | −1.8427 | −1.9939 |
| 4 | 24 | 0.7943 | 0.7378 | 0.8434 |
| 5 | 28 | 0.9424 | 0.9427 | 0.9426 |

EXAMPLE 28

Unit mm

Surface data

| Surface no. | r | d | nd | νd | effective radius |
|---|---|---|---|---|---|
| Object plane | ∞ | ∞ |  |  |  |
| 1 | 60.430 | 4.03 | 1.49700 | 81.54 | 18.70 |
| 2 | 3560.059 | 0.10 |  |  | 19.11 |
| 3 | 37.900 | 1.14 | 1.94595 | 17.98 | 15.50 |
| 4 | 24.736 | 0.73 | 1.69952 | 16.99 | 14.71 |
| 5 | 27.816 | 4.15 | 1.72000 | 43.69 | 14.69 |
| 6 | 93.987 | Variable |  |  | 14.43 |
| 7 | 96.799 | 1.10 | 1.88300 | 40.76 | 9.61 |
| 8 | 8.027 | 4.79 |  |  | 6.69 |
| 9 | −46.254 | 0.80 | 1.88300 | 40.76 | 6.54 |
| 10 | 12.396 | 0.01 | 1.51400 | 42.83 | 6.47 |
| 11 | 12.396 | 4.87 | 1.78472 | 25.68 | 6.47 |
| 12 | −12.684 | 1.15 |  |  | 6.48 |
| 13 | −11.499 | 0.80 | 1.77250 | 49.60 | 5.45 |
| 14* | −173.275 | Variable |  |  | 5.40 |
| 15(stop) | ∞ | 1.30 |  |  | 3.48 |
| 16* | 10.743 | 4.93 | 1.58913 | 61.14 | 4.04 |
| 17 | −78.051 | 0.10 |  |  | 4.10 |
| 18 | 28.041 | 2.77 | 1.84666 | 23.78 | 4.10 |
| 19 | 10.392 | 1.42 |  |  | 3.87 |
| 20 | 13.283 | 3.12 | 1.49700 | 81.54 | 4.16 |
| 21 | −36.985 | 0.64 |  |  | 4.23 |
| 22* | 77.099 | 1.36 | 1.53071 | 55.69 | 4.22 |
| 23* | 46.336 | Variable |  |  | 4.22 |
| 24 | 19.130 | 2.68 | 1.49700 | 81.54 | 4.67 |
| 25 | −119.090 | 0.01 | 1.51400 | 42.83 | 4.54 |
| 26 | −119.090 | 0.82 | 1.80400 | 46.57 | 4.54 |
| 27 | 76.031 | Variable |  |  | 4.49 |
| 28* | 147.374 | 1.63 | 1.53071 | 55.69 | 4.23 |
| 29* | −67.939 | 1.09 |  |  | 4.23 |
| 30 | ∞ | 4.00 | 1.51680 | 64.20 | 4.12 |
| 31 | ∞ | 1.03 |  |  | 3.88 |
| Image plane | ∞ |  |  |  |  |

Aspherical surface data

14th surface

κ = 0.000
A2 = 0.0000E+00, A4 = −8.03513e−05, A6 = −1.67633e−06,
A8 = 9.30749e−08, A10 = −1.83760e−09

-continued

| Unit mm |
|---|
| 16th surface |

$\kappa = 0.000$
A2 = 0.0000E+00, A4 = −8.77784e−05, A6 = −1.01116e−06,
A8 = 5.64180e−08, A10 = −2.23368e−09, A12 = 3.59187e−11
22nd surface $\kappa = 0.000$
A2 = 0.0000E+00, A4 = −2.17277e−04, A6 = 5.36299e−06,
A8 = −5.28517e−07, A10 = 1.10330e−08, A12 = −1.37250e−10
23rd surface $\kappa = 0.000$
A2 = 0.0000E+00, A4 = −1.09771e−04, A6 = 5.91402e−06,
A8 = −5.09130e−07, A10 = 8.38419e−09, A12 = −4.36735e−11
28th surface $\kappa = 0.000$
A2 = 0.0000E+00, A4 = 6.78553e−04, A6 = −1.66161e−05,
A8 = −1.54939e−06, A10 = 2.20507e−08
29th surface $\kappa = 0.000$
A2 = 0.0000E+00, A4 = 1.05976e−03, A6 = −1.53037e−05,
A8 = −3.28541e−06, A10 = 7.26883e−08

Various data
Zoom ratio 19.92

| | Wide angle | Intermediate | Telephoto |
|---|---|---|---|
| Focal length | 4.67 | 20.84 | 93.13 |
| Fno. | 2.85 | 4.40 | 5.15 |
| Angle of field 2ω | 77.78 | 19.19 | 4.33 |
| Image height | 3.6 | 3.6 | 3.6 |
| Lens total length | 81.99 | 100.29 | 118.08 |
| BF | 4.76 | 4.75 | 4.75 |
| d6 | 1.00 | 19.61 | 37.43 |
| d14 | 25.51 | 8.65 | 2.30 |
| d23 | 1.67 | 16.59 | 27.97 |
| d27 | 4.63 | 6.26 | 1.20 |
| Entrance pupil position | 19.80 | 72.63 | 304.09 |
| Exit pupil position A | −31.58 | −128.41 | −1571.95 |
| Exit pupil position B | −36.34 | −133.16 | −1576.70 |
| Front side principal point position | 23.87 | 90.21 | 391.72 |
| Back side principal point position | −3.64 | −19.82 | −92.11 |

Single lens data

| Lens | Initial surface | focal length |
|---|---|---|
| L1 | 1 | 123.64 |
| L2 | 3 | −78.59 |
| L3 | 4 | 291.02 |
| L4 | 5 | 53.47 |
| L5 | 7 | −9.97 |
| L6 | 9 | −11.00 |
| L7 | 10 | 8.81E+04 |
| L8 | 11 | 8.73 |
| L9 | 13 | −15.98 |
| L10 | 16 | 16.37 |
| L11 | 18 | −21.01 |
| L12 | 20 | 20.08 |
| L13 | 22 | −222.23 |
| L14 | 24 | 33.38 |
| L15 | 25 | 8.13E+06 |
| L16 | 26 | −57.61 |
| L17 | 28 | 87.85 |

-continued

| Unit mm |
|---|
| Zoom lens group data |

| Unit | Initial surface | Focal length | Lens structure length | Front side principal point position | Back side principal point position |
|---|---|---|---|---|---|
| 1 | 1 | 59.5217 | 10.1420 | −0.4561 | −6.4724 |
| 2 | 7 | −6.9701 | 13.5160 | 1.9002 | −7.0261 |
| 3 | 15 | 16.8268 | 15.6380 | 2.1560 | −9.3421 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1614 | −0.2837 | −1.0326 |
| 3 | 15 | −0.6482 | −1.6910 | −1.9072 |
| 4 | 24 | 0.7967 | 0.7748 | 0.8434 |
| 5 | 28 | 0.9420 | 0.9421 | 0.9421 |

EXAMPLE 29

| Unit mm |
|---|
| Surface data |

| Surface no. | r | d | nd | vd | effective radius |
|---|---|---|---|---|---|
| Object plane | ∞ | ∞ | | | |
| 1 | 59.751 | 3.90 | 1.49700 | 81.54 | 18.70 |
| 2 | 2203.377 | 0.10 | | | 18.75 |
| 3 | 41.900 | 1.11 | 1.90680 | 21.15 | 15.50 |
| 4 | 25.678 | 0.80 | 1.63336 | 23.36 | 14.74 |
| 5 | 29.121 | 4.20 | 1.72000 | 46.02 | 14.71 |
| 6 | 119.744 | Variable | | | 14.47 |
| 7 | 129.746 | 1.10 | 1.88300 | 40.76 | 9.78 |
| 8 | 8.421 | 4.79 | | | 6.95 |
| 9 | −46.254 | 0.80 | 1.88300 | 40.76 | 6.86 |
| 10 | 12.396 | 0.01 | 1.51400 | 42.83 | 6.84 |
| 11 | 12.396 | 4.87 | 1.78472 | 25.68 | 6.84 |
| 12 | −12.684 | 1.15 | | | 6.86 |
| 13 | −11.499 | 0.80 | 1.77250 | 49.60 | 5.75 |
| 14* | −149.795 | Variable | | | 5.72 |
| 15(stop) | ∞ | 1.30 | | | 3.48 |
| 16* | 10.743 | 4.93 | 1.58913 | 61.14 | 4.03 |
| 17 | −78.051 | 0.10 | | | 4.08 |
| 18 | 28.041 | 2.77 | 1.84666 | 23.78 | 4.08 |
| 19 | 10.386 | 1.42 | | | 3.85 |
| 20 | 13.158 | 3.12 | 1.49700 | 81.54 | 4.14 |
| 21 | −36.985 | 0.64 | | | 4.20 |
| 22* | 87.274 | 1.36 | 1.53071 | 55.69 | 4.18 |
| 23* | 44.424 | Variable | | | 4.18 |
| 24 | 19.130 | 2.68 | 1.49700 | 81.54 | 4.63 |
| 25 | −119.090 | 0.01 | 1.51400 | 42.83 | 4.49 |
| 26 | −119.090 | 0.82 | 1.80400 | 46.57 | 4.49 |
| 27 | 76.031 | Variable | | | 4.44 |
| 28* | 147.374 | 1.63 | 1.53071 | 55.69 | 4.19 |
| 29* | −67.939 | 1.09 | | | 4.25 |
| 30 | ∞ | 4.00 | 1.51680 | 64.20 | 4.12 |
| 31 | ∞ | 0.97 | | | 3.88 |
| Image plane | ∞ | | | | |

Aspherical surface data

14th surface $\kappa = 0.000$
A2 = 0.0000E+00, A4 = −7.22699e−05, A6 = −1.91912e−06,
A8 = 1.03329e−07, A10 = −1.85098e−09

-continued

Unit mm

16th surface $\kappa = 0.000$
A2 = 0.0000E+00, A4 = −8.77784e−05, A6 = −1.01116e−06,
A8 = 5.64180e−08, A10 = −2.23368e−09, A12 = 3.59187e−11
22nd surface $\kappa = 0.000$
A2 = 0.0000E+00, A4 = −2.17277e−04, A6 = 5.36299e−06,
A8 = −5.28517e−07, A10 = 1.10330e−08, A12 = −1.37250e−10
23rd surface $\kappa = 0.000$
A2 = 0.0000E+00, A4 = −1.09771e−04, A6 = 5.91402e−06,
A8 = −5.09130e−07, A10 = 8.38419e−09, A12 = −4.36735e−11
28th surface $\kappa = 0.000$
A2 = 0.0000E+00, A4 = 3.76463e−04, A6 = −9.67102e−06,
A8 = −2.04606e−06, A10 = 2.89575e−08
29th surface $\kappa = 0.000$
A2 = 0.0000E+00, A4 = 7.08578e−04, A6 = −8.97430e−06,
A8 = −3.63292e−06, A10 = 8.09720e−08

Various data
Zoom ratio 19.87

| | Wide angle | Intermediate | Telephoto |
|---|---|---|---|
| Focal length | 4.69 | 20.78 | 93.18 |
| Fno. | 2.86 | 4.46 | 5.20 |
| Angle of field 2ω | 77.60 | 19.19 | 4.31 |
| Image height | 3.6 | 3.6 | 3.6 |
| Lens total length | 82.58 | 99.94 | 119.10 |
| BF | 4.70 | 4.69 | 4.70 |
| d6 | 1.00 | 19.14 | 38.41 |
| d14 | 26.21 | 8.39 | 2.30 |
| d23 | 1.59 | 15.72 | 28.02 |
| d27 | 4.68 | 7.59 | 1.26 |
| Entrance pupil position | 19.80 | 68.12 | 301.49 |
| Exit pupil position A | −31.13 | −122.17 | −1463.63 |
| Exit pupil position B | −35.83 | −126.86 | −1468.33 |
| Front side principal | 23.88 | 85.50 | 388.75 |
| Back side principal | −3.72 | −19.81 | −92.20 |

Single lens data

| Lens | Initial surface | focal length |
|---|---|---|
| L1 | 1 | 123.50 |
| L2 | 3 | −75.60 |
| L3 | 4 | 314.63 |
| L4 | 5 | 52.42 |
| L5 | 7 | −10.24 |
| L6 | 9 | −11.00 |
| L7 | 10 | 8.81E+04 |
| L8 | 11 | 8.73 |
| L9 | 13 | −16.16 |
| L10 | 16 | 16.37 |
| L11 | 18 | −20.99 |
| L12 | 20 | 19.94 |
| L13 | 22 | −172.39 |
| L14 | 24 | 33.38 |
| L15 | 25 | 8.13E+06 |
| L16 | 26 | −57.61 |
| L17 | 28 | 87.85 |

Zoom lens group data

| Unit | Initial surface | Focal length | Lens structure length | Front side principal point position | Back side principal point position |
|---|---|---|---|---|---|
| 1 | 1 | 60.7680 | 10.1128 | −0.1334 | −6.2114 |
| 2 | 7 | −7.1956 | 13.5160 | 1.8818 | −7.0797 |
| 3 | 15 | 16.9487 | 15.6380 | 1.9918 | −9.4149 |
| 4 | 24 | 73.7783 | 3.5080 | −2.0985 | −4.2304 |
| 5 | 28 | 87.8520 | 6.7160 | 0.7294 | −4.0624 |

| Unit | Lens surface | Wide angle Magnification | Intermediate Magnification | Telephoto Magnification |
|---|---|---|---|---|
| 1 | 1 | 0.0000 | 0.0000 | 0.0000 |
| 2 | 7 | −0.1618 | −0.2732 | −1.0183 |
| 3 | 15 | −0.6350 | −1.7527 | −1.8946 |
| 4 | 24 | 0.7969 | 0.7575 | 0.8432 |
| 5 | 28 | 0.9427 | 0.9427 | 0.9426 |

Values of each of the embodiments are shown below.

| Expression number | Conditional expression |
|---|---|
| (2) | $|fG1/fG2|$ |
| (3-2), (3-3) | $(Zb(3.3a) − Za(3.3a))/(Zb(2.5a) − Za(2.5a))$ |
| (4-3) | $(Tnglw(0.7) − Tbasw(0.7))/(Tngl(0) − Tbas(0))$ |
| (5) | $\theta hg_A$ |
| (6) | $|f_B/f_A|$ |
| (7) | $\theta gF_B − \theta gF_{BA}$ |
| (8) | $f_A/fG1$ |
| (9) | $(Ra + Rb)/(Ra − Rb)$ |
| (10-1a) | $Tngl(0)/Tbas(0)$ |
| (10-1b) | $Tnglt(0.7)/Tbast(0.7)$ |
| (10-1c) | $Tnglt(0.9)/Tbast(0.9)$ |
| (10-2a) | $(Tnglt(0.7)/Tbast(0.7))/(Tngl(0)/Tbas(0))$ |
| (10-2b) | $(Tnglt(0.9)/Tbast(0.9))/(Tngl(0)/Tbas(0))$ |
| (11a) | $(Tnglw(0.7)/(Tngl(0))$ |
| (11b) | $(Tnglw(0.9)/(Tngl(0))$ |
| (12a) | $(Tnglt(0.7)/(Tngl(0))$ |
| (12b) | $(Tnglt(0.9)/(Tngl(0))$ |
| (13-1a) | $Tngl(0)/Tbas(0)$ |
| (13-1b) | $Tnglw(0.7)/Tbasw(0.7)$ |
| (13-1c) | $Tnglw(0.9)/Tbasw(0.9)$ |
| (13-2) | $(Tnglw(0.9)/Tbasw(0.9))/(Tngl(0)/Tbas(0))$ |
| (20) | $0 < TG_{45}/WG_{45} < 5$ |

| | (2) | (3-2), (3-3) | (4-3) | (5) | (6) |
|---|---|---|---|---|---|
| Example 1 | 8.29 | 0.7574 | 0.393 | 0.647 | 0.3560 |
| Example 2 | 7.85 | 0.8271 | 0.438 | 0.647 | 0.2503 |
| Example 3 | 8.04 | 0.7984 | 0.521 | 0.647 | 0.3333 |
| Example 4 | 7.44 | 0.7708 | 0.480 | 0.647 | 0.3136 |
| Example 5 | 8.25 | 0.7748 | 0.455 | 0.654 | 0.3372 |
| Example 6 | 8.74 | 0.7821 | 0.453 | 0.695 | 0.3526 |
| Example 7 | 8.70 | 0.7511 | 0.413 | 0.695 | 0.3659 |
| Example 8 | 8.46 | 0.7869 | 0.452 | 0.695 | 0.3967 |
| Example 9 | 8.18 | 0.7240 | 0.507 | 0.726 | 0.3683 |
| Example 10 | 8.40 | 0.7629 | 0.407 | 0.812 | 0.3948 |
| Example 11 | 8.29 | 0.8095 | 0.524 | 0.812 | 0.3801 |
| Example 12 | 8.25 | 0.8431 | 0.577 | 0.900 | 0.3874 |
| Example 13 | 8.38 | 0.8426 | 0.599 | 0.900 | 0.3893 |
| Example 14 | 7.97 | 0.8072 | 0.562 | 0.900 | 0.3714 |
| Example 15 | 8.35 | 0.8504 | 0.297 | 0.647 | 0.5084 |
| Example 16 | 8.12 | 0.8722 | 0.164 | 0.654 | 0.4370 |
| Example 17 | 8.15 | 0.7860 | 0.371 | 0.900 | 0.4944 |
| Example 18 | 8.12 | 0.8924 | 0.566 | 0.900 | 0.4959 |
| Example 19 | 8.78 | 0.8273 | 0.511 | 0.647 | 0.5105 |
| Example 20 | 8.88 | 0.7060 | 0.485 | 0.647 | 0.2439 |
| Example 21 | 8.24 | 0.6621 | 0.454 | 0.812 | 0.2767 |
| Example 22 | 8.54 | 0.6675 | 0.512 | 0.900 | 0.2701 |

| | (7) | (8) | (9) |
|---|---|---|---|
| Example 1 | 0.0198 | 4.53 | −9.74 |
| Example 2 | 0.0182 | 6.04 | −13.40 |
| Example 3 | 0.0244 | 4.17 | −8.99 |

-continued

|  |  |  |  |
|---|---|---|---|
| Example 4 | 0.0223 | 4.53 | −9.65 |
| Example 5 | 0.0464 | 3.78 | −8.95 |
| Example 6 | 0.0776 | 3.30 | −8.69 |
| Example 7 | 0.0834 | 3.09 | −8.13 |
| Example 8 | 0.0847 | 2.83 | −7.13 |
| Example 9 | 0.0762 | 3.45 | −8.46 |
| Example 10 | 0.1259 | 2.73 | −6.85 |
| Example 11 | 0.1069 | 3.64 | −8.61 |
| Example 12 | 0.1269 | 4.68 | −11.06 |
| Example 13 | 0.1140 | 5.07 | −12.29 |
| Example 14 | 0.0947 | 4.09 | −8.46 |
| Example 15 | 0.0379 | 1.76 | −0.98 |
| Example 16 | 0.0621 | 1.72 | −1.02 |
| Example 17 | 0.1885 | 1.82 | −1.02 |
| Example 18 | 0.1798 | 2.93 | −1.00 |
| Example 19 | 0.0130 | 3.00 | −10.56 |
| Example 20 | 0.0157 | 5.11 | −16.50 |
| Example 21 | 0.0684 | 4.49 | −15.75 |
| Example 22 | 0.0651 | 4.89 | −17.06 |

|  | (10-1a) | (10-1b) | (10-1c) | (10-2a) | (10-2b) |
|---|---|---|---|---|---|
| Example 1 | 1.00 | 0.52 | 0.35 | 0.520 | 0.346 |
| Example 2 | 0.97 | 0.53 | 0.37 | 0.545 | 0.385 |
| Example 3 | 0.67 | 0.42 | 0.30 | 0.622 | 0.454 |
| Example 4 | 0.53 | 0.29 | 0.18 | 0.540 | 0.346 |
| Example 5 | 0.87 | 0.43 | 0.27 | 0.494 | 0.314 |
| Example 6 | 0.93 | 0.39 | 0.22 | 0.423 | 0.241 |
| Example 7 | 0.99 | 0.41 | 0.23 | 0.411 | 0.230 |
| Example 8 | 1.08 | 0.53 | 0.34 | 0.491 | 0.312 |
| Example 9 | 0.61 | 0.39 | 0.29 | 0.645 | 0.480 |
| Example 10 | 1.22 | 0.56 | 0.35 | 0.461 | 0.285 |
| Example 11 | 0.62 | 0.41 | 0.31 | 0.663 | 0.502 |
| Example 12 | 0.49 | 0.36 | 0.29 | 0.726 | 0.583 |
| Example 13 | 0.44 | 0.32 | 0.26 | 0.726 | 0.579 |
| Example 14 | 0.53 | 0.36 | 0.28 | 0.684 | 0.525 |
| Example 15 | 4.78 | 1.88 | 1.25 | 0.393 | 0.262 |
| Example 16 | 7.98 | 2.06 | 1.24 | 0.258 | 0.156 |
| Example 17 | 2.99 | 1.39 | 1.04 | 0.466 | 0.349 |
| Example 18 | 1.38 | 1.02 | 0.85 | 0.737 | 0.619 |
| Example 19 | 1.38 | 0.94 | 0.74 | 0.682 | 0.537 |
| Example 20 | 0.72 | 0.37 | 0.24 | 0.513 | 0.337 |
| Example 21 | 0.80 | 0.46 | 0.33 | 0.578 | 0.412 |
| Example 22 | 0.64 | 0.38 | 0.26 | 0.585 | 0.412 |

|  | (11a) | (11b) | (12a) | (12b) |
|---|---|---|---|---|
| Example 1 | 0.675 | 0.420 | 0.775 | 0.626 |
| Example 2 | 0.759 | 0.568 | 0.829 | 0.717 |
| Example 3 | 0.804 | 0.675 | 0.804 | 0.675 |
| Example 4 | 0.680 | 0.428 | 0.727 | 0.544 |
| Example 5 | 0.719 | 0.499 | 0.748 | 0.581 |
| Example 6 | 0.733 | 0.528 | 0.706 | 0.509 |
| Example 7 | 0.705 | 0.476 | 0.700 | 0.499 |
| Example 8 | 0.722 | 0.507 | 0.752 | 0.585 |
| Example 9 | 0.705 | 0.469 | 0.808 | 0.681 |
| Example 10 | 0.700 | 0.467 | 0.744 | 0.573 |
| Example 11 | 0.712 | 0.483 | 0.810 | 0.815 |
| Example 12 | 0.724 | 0.503 | 0.837 | 0.730 |
| Example 13 | 0.729 | 0.511 | 0.828 | 0.714 |
| Example 14 | 0.719 | 0.494 | 0.812 | 0.687 |
| Example 15 | 0.820 | 0.636 | 0.869 | 0.785 |
| Example 16 | 0.784 | 0.550 | 0.867 | 0.774 |
| Example 17 | 0.840 | 0.779 | 0.873 | 0.820 |
| Example 18 | 0.810 | 0.583 | 0.897 | 0.827 |
| Example 19 | 0.739 | 0.561 | 0.851 | 0.755 |
| Example 20 | 0.753 | 0.570 | 0.765 | 0.610 |
| Example 21 | 0.727 | 0.527 | 0.811 | 0.686 |
| Example 22 | 0.741 | 0.547 | 0.789 | 0.649 |

|  | (13-1a) | (13-1b) | (13-1c) | (13-2) | (20) |
|---|---|---|---|---|---|
| Example 1 | 1.00 | 0.39 | 0.18 | 0.185 | 2.736 |
| Example 2 | 0.97 | 0.43 | 0.24 | 0.246 | 1.738 |
| Example 3 | 0.67 | 0.35 | 0.20 | 0.301 | 1.165 |
| Example 4 | 0.53 | 0.26 | 0.13 | 0.246 | 0.905 |
| Example 5 | 0.87 | 0.40 | 0.21 | 0.246 | 1.442 |
| Example 6 | 0.93 | 0.42 | 0.23 | 0.253 | 2.025 |
| Example 7 | 0.99 | 0.41 | 0.21 | 0.212 | 2.098 |
| Example 8 | 1.08 | 0.49 | 0.27 | 0.248 | 1.895 |

-continued

|  |  |  |  |  |  |
|---|---|---|---|---|---|
| Example 9 | 0.61 | 0.31 | 0.17 | 0.277 | 2.242 |
| Example 10 | 1.22 | 0.49 | 0.25 | 0.205 | 2.132 |
| Example 11 | 0.62 | 0.33 | 0.18 | 0.296 | 2.392 |
| Example 12 | 0.49 | 0.28 | 0.17 | 0.346 | 2.363 |
| Example 13 | 0.44 | 0.27 | 0.16 | 0.369 | 2.264 |
| Example 14 | 0.53 | 0.30 | 0.17 | 0.330 | 1.755 |
| Example 15 | 4.78 | 1.42 | 0.71 | 0.148 | 1.938 |
| Example 16 | 7.98 | 1.31 | 0.54 | 0.067 | 2.277 |
| Example 17 | 2.99 | 1.11 | 0.77 | 0.257 | 2.164 |
| Example 18 | 1.38 | 0.78 | 0.43 | 0.314 | 3.634 |
| Example 19 | 1.38 | 0.70 | 0.44 | 0.320 | 0.244 |
| Example 20 | 0.72 | 0.35 | 0.21 | 0.290 | 0.280 |
| Example 21 | 0.80 | 0.36 | 0.21 | 0.262 | 0.258 |
| Example 22 | 0.64 | 0.33 | 0.20 | 0.307 | 0.259 |

Values of each of the embodiments are shown below.

$$|fG1/fG2|>6.4 \tag{2}$$

$$0<(Zb(3.3a)-Za(3.3a))/(Zb(2.5a)-Za(2.5a))<0.895 \tag{3-2}$$

$$0.387<(Tnglw(0.7)/Tbasw(0.7))/(Tngl(0)/Tbas(0))<0.525 \tag{4-3}$$

$$0.4<\theta hg_A<1.2 \tag{5}$$

$$|f_B/f_A|>0.15 \tag{6}$$

|  | (2) | (3-2) | (4-3) | (5) | (6) |
|---|---|---|---|---|---|
| Example 23 | 8.31 | 0.7799 | 0.495 | 0.900 | 0.3658 |
| Example 24 | 8.78 | 0.8273 | 0.511 | 0.647 | 0.5105 |
| Example 25 | 8.66 | 0.6693 | 0.434 | 0.654 | 0.2368 |
| Example 26 | 8.46 | 0.6663 | 0.441 | 0.726 | 0.2730 |
| Example 27 | 8.24 | 0.6621 | 0.454 | 0.812 | 0.2767 |
| Example 28 | 8.54 | 0.6675 | 0.512 | 0.900 | 0.2701 |
| Example 29 | 8.45 | 0.7065 | 0.503 | 0.900 | 0.2403 |

$$0<\theta gF_B-\theta gF_{BA}<0.25 \tag{7}$$

$$1.0<f_A/fG1<8.0 \tag{8}$$

$$-25<(Ra+Rb)/(Ra-Rb)<-2 \tag{9'}$$

|  | (7) | (8) | (9') |
|---|---|---|---|
| Example 23 | 0.1033 | 4.14 | −9.01 |
| Example 24 | 0.0130 | 3.00 | −10.56 |
| Example 25 | 0.0264 | 4.56 | −16.18 |
| Example 26 | 0.0600 | 3.87 | −14.48 |
| Example 27 | 0.0684 | 4.49 | −15.75 |
| Example 28 | 0.0651 | 4.89 | −17.06 |
| Example 29 | 0.0519 | 5.18 | −15.92 |

$$0.3<Tngl(0)/Tbas(0)<3 \tag{10-1a'}$$

$$0.2<Tnglt(0.7)/Tbast(0.7)<2.0 \tag{10-1b'}$$

$$0.1<Tnglt(0.9)/Tbast(0.9)<1.4 \tag{10-1c'}$$

$$0.2<(Tnglt(0.7)/Tbast(0.7))/(Tngl(0)/Tbas(0))<0.85 \tag{10-2a'}$$

$$0.10<(Tnglt(0.9)/Tbast(0.9))/(Tngl(0)/Tbas(0))<0.75 \tag{10-2b'}$$

|  | (10-1a') | (10-1b') | (10-1c') | (10-2a') | (10-2b') |
|---|---|---|---|---|---|
| Example 23 | 0.71 | 0.42 | 0.30 | 0.588 | 0.413 |
| Example 24 | 1.38 | 0.94 | 0.74 | 0.682 | 0.537 |
| Example 25 | 0.77 | 0.38 | 0.25 | 0.497 | 0.325 |
| Example 26 | 0.83 | 0.43 | 0.29 | 0.520 | 0.346 |
| Example 27 | 0.80 | 0.46 | 0.33 | 0.578 | 0.412 |
| Example 28 | 0.64 | 0.38 | 0.26 | 0.585 | 0.412 |
| Example 29 | 0.72 | 0.42 | 0.30 | 0.582 | 0.414 |

$$0.5 < (Tnglw(0.7)/(Tngl(0)) < 0.95 \quad (11a)$$

$$0.3 < (Tnglw(0.9)/(Tngl(0)) < 0.85 \quad (11b')$$

$$0.5 < (Tnglt(0.7)/(Tngl(0)) < 0.95 \quad (12a)$$

$$0.3 < (Tnglt(0.9)/(Tngl(0)) < 0.9 \quad (12b)$$

|  | (11a) | (11b') | (12a) | (12b) |
|---|---|---|---|---|
| Example 23 | 0.714 | 0.487 | 0.783 | 0.639 |
| Example 24 | 0.739 | 0.561 | 0.851 | 0.755 |
| Example 25 | 0.736 | 0.541 | 0.776 | 0.627 |
| Example 26 | 0.730 | 0.530 | 0.783 | 0.638 |
| Example 27 | 0.727 | 0.527 | 0.811 | 0.686 |
| Example 28 | 0.741 | 0.547 | 0.789 | 0.649 |
| Example 29 | 0.758 | 0.576 | 0.806 | 0.678 |

$$0.3 < Tngl(0)/Tbas(0) < 2.5 \quad (13\text{-}1a')$$

$$0.15 < Tnglw(0.7)/Tbasw(0.7) < 1.4 \quad (13\text{-}1b')$$

$$0 < Tnglw(0.9)/Tbasw(0.9) < 0.7 \quad (13\text{-}1c')$$

$$0 < (Tnglw(0.9)/Tbasw(0.9))/(Tngl(0)/Tbas(0)) < 0.5 \quad (13\text{-}2)$$

$$0 < TG_{45}/WG_{45} < 5 \quad (20)$$

|  | (13-1a') | (13-1b') | (13-1c') | (13-2) | (20) |
|---|---|---|---|---|---|
| Example 23 | 0.71 | 0.35 | 0.19 | 0.273 | 2.448 |
| Example 24 | 1.38 | 0.70 | 0.44 | 0.320 | 0.244 |
| Example 25 | 0.77 | 0.33 | 0.19 | 0.245 | 0.268 |
| Example 26 | 0.83 | 0.36 | 0.20 | 0.247 | 0.263 |
| Example 27 | 0.80 | 0.36 | 0.21 | 0.262 | 0.258 |
| Example 28 | 0.64 | 0.33 | 0.20 | 0.307 | 0.259 |
| Example 29 | 0.72 | 0.36 | 0.22 | 0.305 | 0.270 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 59:
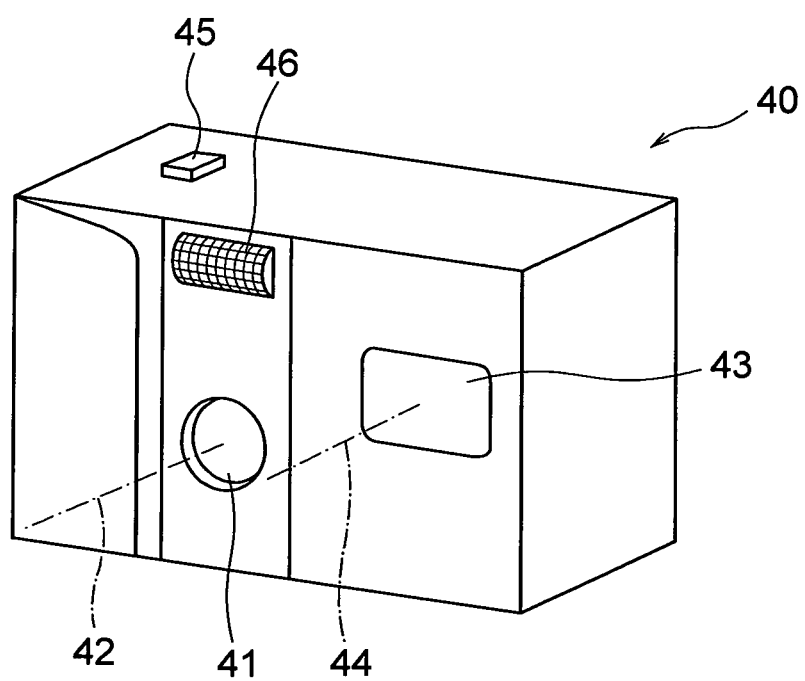
FIG. 59 is a front perspective view showing an appearance of a digital camera 40 in which, zoom optical system according to the present invention is incorporated.
Figure 60:
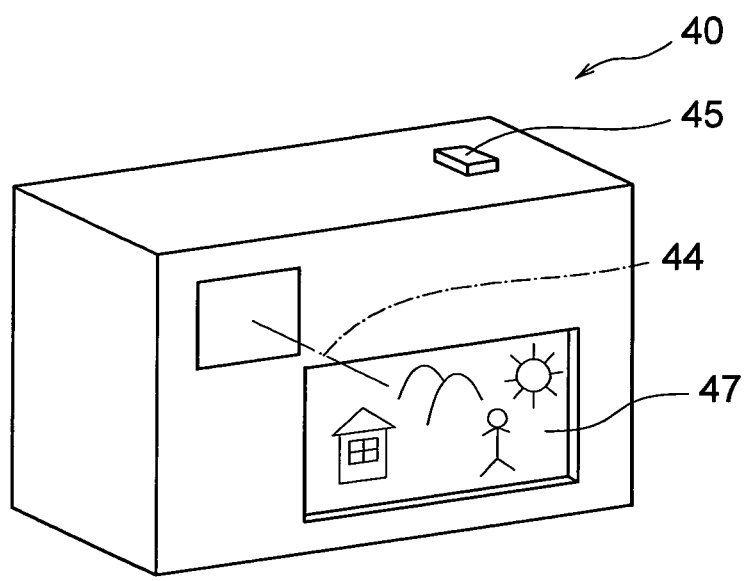
FIG. 60 is a rear perspective view of the digital camera 40.
Figure 61:
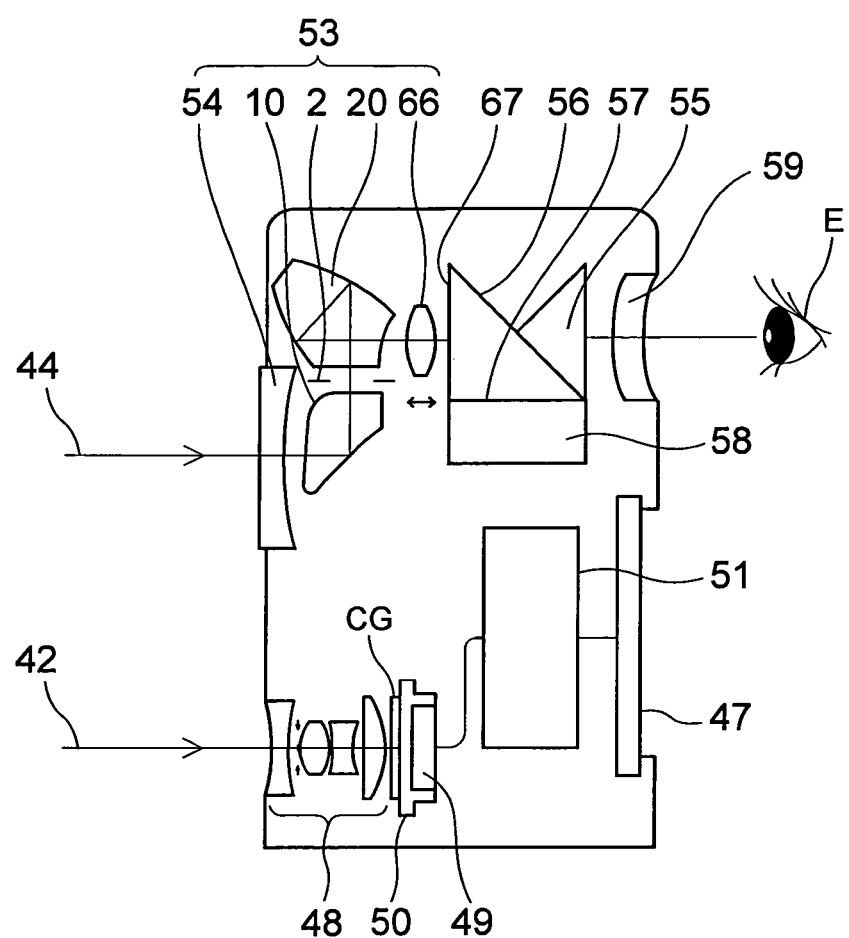
FIG. 61 is a cross-sectional view showing an optical arrangement of the digital camera 40.

In FIG. 59 to FIG. 61 show conceptual diagrams of structures in which the image forming optical system according to the present invention is incorporated in a photographic optical system 41 of a digital camera. FIG. 59 is a frontward perspective view showing an appearance of a digital camera 40, FIG. 60 is a rearward perspective view of the same, and FIG. 61 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced.

Figure 62:
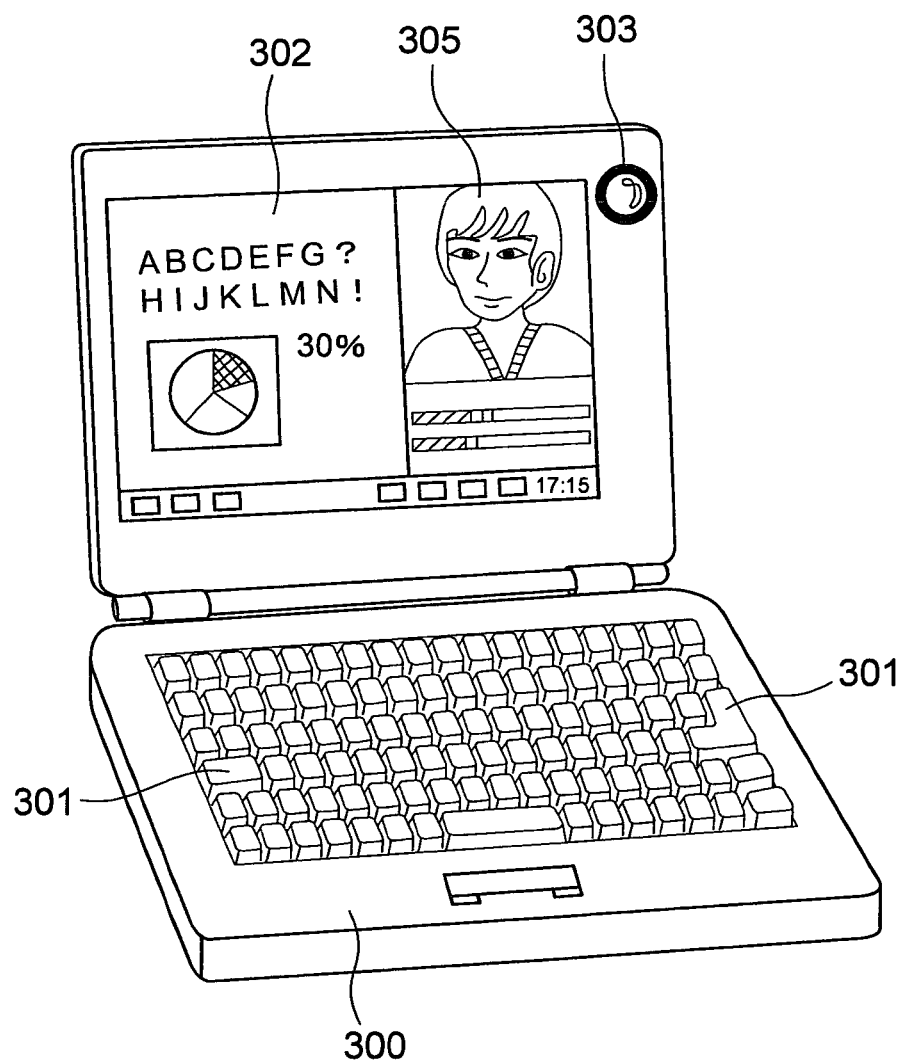
FIG. 62 is a front perspective view of a state in which, a cover of a personal computer 300 which is an example of an information processing apparatus in which, the zoom optical system of the present invention is built-in as an objective optical system, is opened.
Figure 63:
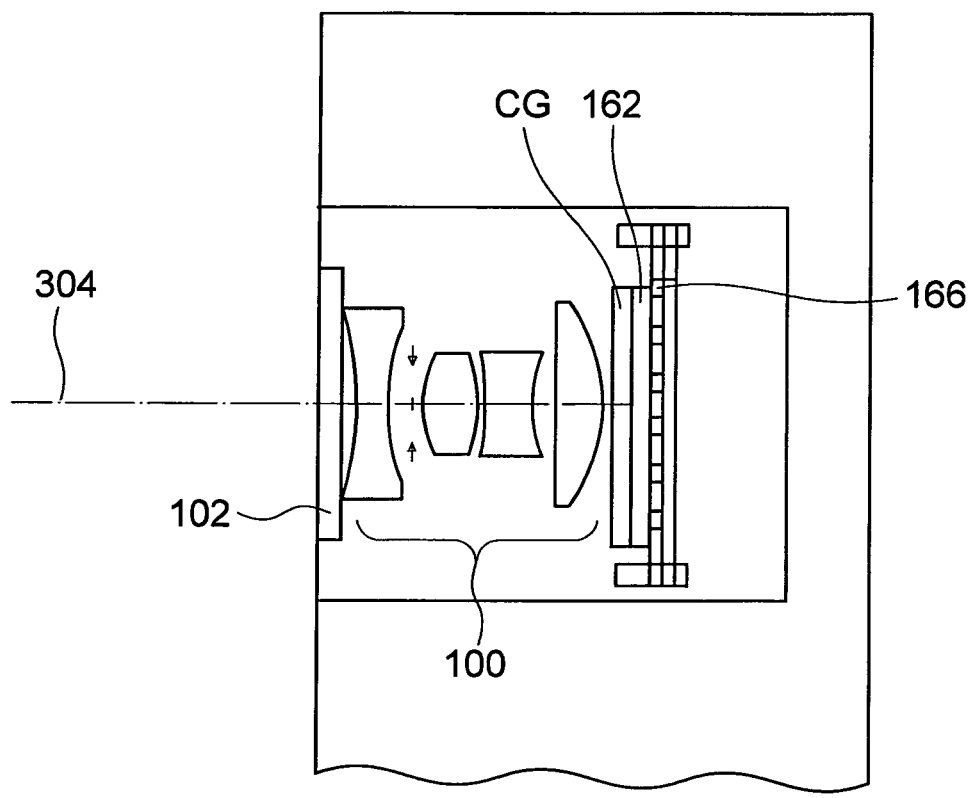
FIG. 63 is a cross-sectional view of a photographic optical system 303 of the personal computer 300.
Figure 64:
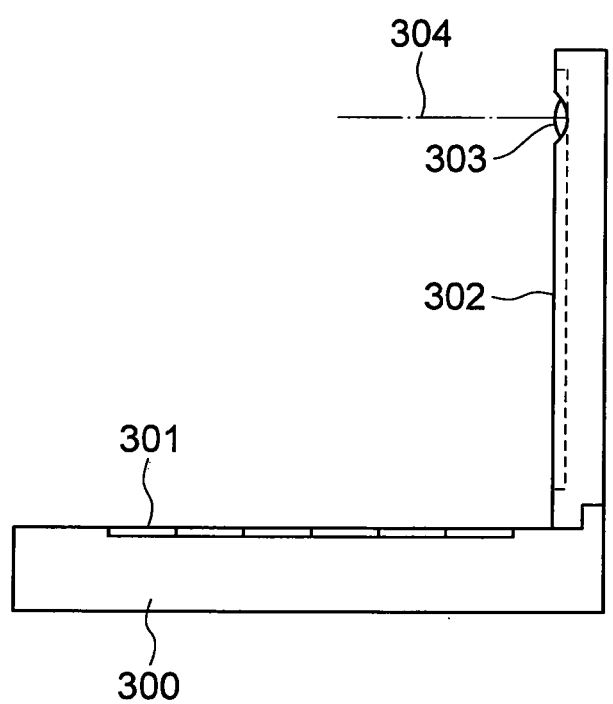
FIG. 64 is a side view of the personal computer 300.

Next, a personal computer which is an example of an information processing apparatus with a built-in image forming system as an objective optical system is shown in FIG. 62 to FIG. 64. FIG. 62 is a frontward perspective view of a personal computer 300 with its cover opened, FIG. 63 is a cross-sectional view of a photographic optical system 303 of the personal computer 300, and FIG. 64 is a side view of FIG. 62. As it is shown in FIG. 62 to FIG. 64, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

Although an image pickup optical system of a personal computer shown in the diagram has a lens cross-sectional arrangement which differs from the lens cross-sectional arrangement in each of the embodiments described above, the image pickup optical system same as in the embodiments described above is installed in the personal computer.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 62, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 65A:
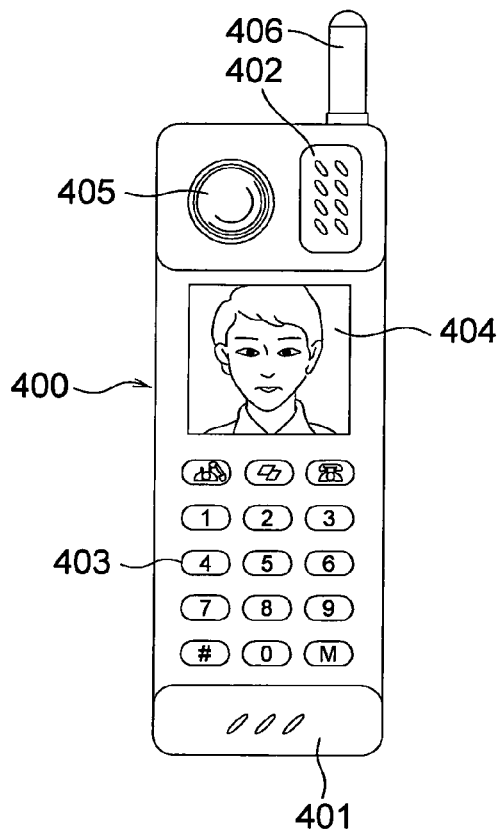
FIG. 65A, FIG. 65B, and FIG. 65C are diagrams showing a mobile telephone which is an example of the information processing apparatus in which, the zoom optical system of the present invention is built-in as a photographic optical system, where.
Figure 65B:
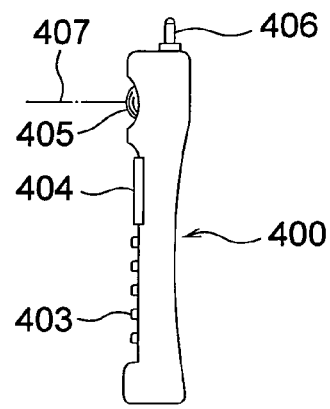
Figure 65C:
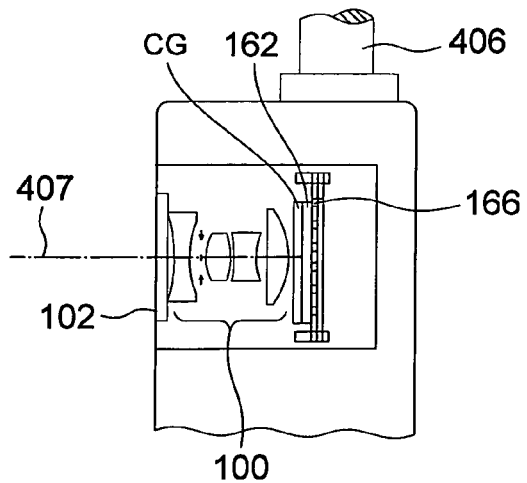

Next, a telephone which is an example of an information processing apparatus in which the image forming optical system of the present invention is built-in as a photographic optical system, particularly a portable telephone which is easy to carry is shown in FIG. 65A, FIG. 65B, and FIG. 65C. FIG. 65A is a front view of a portable telephone 400, FIG. 65B is a side view of the portable telephone 400, and FIG. 65C is a cross-sectional view of a photographic optical system 405. As shown in FIG. 65A to FIG. 65C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its essence.

According to the present invention, an effect is shown that it is possible to provide an image forming optical system in which, the secondary spectrum is reduced over the entire zoom range, and the wide angle end is a wide angle of field, and has a high zoom ratio, and an image pickup apparatus (electronic image pickup apparatus) equipped with the image forming optical system.

What is claimed is:

1. An image forming optical system comprising in order from an object side to an image side:
   a first lens group having a positive refractive power;
   a second lens group having a negative refractive power; and
   an image-side lens group having a positive refractive power,
   wherein
   a distance between the first lens group and the second lens group changes at the time of zooming, and
   a refractive optical element A having a positive refractive power is positioned in the first lens group,
   the first lens group comprises a cemented optical element D which is positioned on a most object-side,
   the cemented optical element D is arranged such that the refractive optical element A is positioned between an optical element B which is positioned on the object side and an optical element C which is positioned on the image side, and
   the image forming optical system satisfies the following conditional expression (1-1), conditional expression (1-2), and conditional expression (2)

$$vd_A < 30 \tag{1-1}$$

$$0.54 < \theta gF_A < 0.9 \tag{1-2}$$

$$|fG1/fG2| > 6.4 \tag{2}$$

where,
   $nd_A$, $nC_A$, $nF_A$, and $ng_A$ denote refractive indices of the refractive optical element A for a d-line, a C-line, an F-line, and a g-line respectively,
   $vd_A$ denotes Abbe's number $(nd_A-1)/(nF_A-nC_A)$ for the refractive optical element A,
   $\theta gF_A$ denotes a partial dispersion ratio $(ng_A-nF_A)/(nF_A-nC_A)$ of the refractive optical element A,
   $fG1$ denotes a focal length of the first lens group, and
   $fG2$ denotes a focal length of the second lens group.

2. The image forming optical system according to claim 1, wherein the image forming optical system satisfies the following conditional expression (5)

$$0.4 < \theta hg_A < 1.2 \tag{5}$$

where,
   $\theta hg_A$ denotes a partial dispersion ratio $(nh_A-ng_A)/(nF_A-nC_A)$ of the refractive optical element A for an h-line, and
   $nh_A$ denotes a refractive index of the refractive optical element A for the h-line.

3. The image forming optical system according to claim 1, further comprising:
   an aperture stop which is positioned between the second lens group and the image-side lens group;
   wherein the image-side lens group comprises in order from the object side to the image side:
   a third lens group having a positive refractive power;

a fourth lens group having a positive refractive power; and
a fifth lens group having a positive refractive power,
wherein
zooming is carried out by changing distances between the adjacent lens groups such that, at a telephoto end, a distance between the first lens group and the second lens group becomes longer, a distance between the second lens group and the third lens group becomes shorter, and a distance between the third lens group and the fourth lens group becomes longer, as compared to at a wide angle end.

4. The image forming optical system according to claim 1, further comprising:
an aperture stop which is positioned between the second lens group and the image-side lens grow;
wherein the image-side lens group comprises in order from the object side to the image side:
a third lens group having a positive refractive power;
a fourth lens group having a positive refractive power; and
a fifth lens group having a positive refractive power,
wherein
zooming is carried out by changing distances between the adjacent lens groups such that, a distance between the first lens group and the second lens group becomes longer, a distance between the second lens group and the third lens group becomes shorter, and a distance between the third lens group and the fourth lens group becomes longer, as compared to at a wide angle end to at a telephoto end, and
a distance between the fourth lens group and the fifth lens group satisfies the following conditional expression (20)

$$0 < TG_{45}/WG_{45} < 5 \tag{20}$$

where,
$WG_{45}$ denotes the distance between the fourth lens group and the fifth lens group at the wide angle end, and
$TG_{45}$ denotes the distance between the fourth lens group and the fifth lens group at the telephoto end.

5. The image forming optical system according to claim 1, comprising:
the optical element B,
wherein
the image forming optical system satisfies the following conditional expression (6)

$$|f_B/f_A| > 0.15 \tag{6}$$

where,
$f_A$ denotes a focal length of the refractive optical element A, and
$f_B$ denotes a focal length of the optical element B.

6. The image forming optical system according to claim 1, comprising:
the optical element B,
wherein
the image forming optical system satisfies the following conditional expression (7)

$$0 < \theta gF_B - \theta gF_{BA} < 0.25 \tag{7}$$

where,
$nd_B$, $nC_B$, $nF_B$, and $ng_B$ denote refractive indices of the optical element B for a d-line, a C-line, an F-line, and a g-line,
$vd_B$ denotes Abbe's number $(nd_B-1)/(nF_B-nC_B)$ for the optical element B,
$\theta gF_B$ denotes a partial dispersion ratio $(ng_B-nF_B)/(nF_B-nC_B)$ of the optical element B, $\theta gF_{BA}$ denotes an effective partial dispersion ratio when the refractive optical element A and the optical element B are considered as one optical element, and is expressed by the following expression $$\theta gF_{BA} = f_{BA} \times v_{BA} \times (\theta gF_A \times \phi_A/vd_A + \theta gF_B \times \phi_B/vd_B)$$

where,
$f_{BA}$ denotes a combined focal length of the optical element B and the refractive optical element A, and is expressed by the following expression $$1/f_{BA} = 1/f_A + 1/f_B,$$

$v_{BA}$ denotes Abbe's number when the refractive optical element A and the optical element B are considered as one optical element, and is expressed by the following expression $$v_{BA} = 1/(f_{BA} \times (\phi_A/vd_A + \phi_B/vd_B))$$

where,
$\phi_A$ denotes a refractive power ($\phi_A = 1/f_A$) of the refractive optical element A,
$\phi_B$ denotes a refractive power ($\phi_B = 1/f_B$) of the optical element B, and
$\phi_{BA}$ denotes a combined refractive power ($\phi_{BA} = 1/f_{BA}$) of the optical element B and the refractive optical element A.

7. The image forming optical system according to claim 1, wherein the image forming optical system satisfies the following conditional expression (8)

$$1.0 < f_A/fG1 < 8.0 \tag{8}$$

where,
$f_A$ denotes the focal length of the refractive optical element A, and
fG1 denotes a focal length of the first lens group.

8. The image forming optical system according to claim 1, wherein the image forming optical system satisfies the following conditional expression (9)

$$-25 < (Ra+Rb)/(Ra-Rb) < -0.5 \tag{9}$$

where,
Ra denotes a radius of curvature on the object side of the refractive optical element A, and
Rb denotes a radius of curvature on the image side of the refractive optical element A.

9. An electronic image pickup apparatus comprising:
an image forming optical system; and
an image pickup element,
wherein
the image forming optical system is the image forming optical system according to claim 1, and
the image forming optical system satisfies the following conditional expression (3-3)

$$0 < (Zb(3.3a) - Za(3.3a))/(Zb(2.5a) - (Za(2.5a)) < 0.990 \tag{3-3}$$

where,
fw denotes a focal length of the image forming optical system, at a wide angle end,
ft denotes a focal length of the image forming optical system, at a telephoto end,
IH denotes the maximum image height on the image pickup element,
Za(h) denotes an optical axial distance between an apex of an object-side surface on an optical axis, of the refractive optical element A and a position at a height h on the object side of the refractive optical element A,
Zb(h) denotes an optical axial distance between the apex of the object-side surface on the optical axis, of the refractive optical element and a position at a height h on the image side of the refractive optical element A, a denotes a value defined by the following expression (3-1)

$$a=\{(IH)^2 \times \log_{10}(ft/fw)\}/fw \qquad (3\text{-}1).$$

10. The image forming optical system according to claim 1, wherein the image forming optical system satisfies the following conditional expression (9')

$$-25<(Ra+Rb)/(Ra-Rb)<-2 \qquad (9')$$

where,

Ra denotes a radius of curvature on the object side of the refractive optical element A, and Rb denotes a radius of curvature on the image side of the refractive optical element A.

11. An electronic image pickup apparatus comprising:
an image forming optical system; and
an image pickup element,
wherein
the image forming optical system is an image forming optical system according to claim 1, and satisfies the following conditional expression (3-2)

$$0<(Zb(3.3a)-Za(3.3a))/(Zb(2.5a)-Za(2.5a))<0.895 \qquad (3\text{-}2)$$

where, fw denotes a focal length of the image forming optical system, at a wide angle end, ft denotes a focal length of the image forming optical system, at a telephoto end, IH denotes the maximum image height on the image pickup element, Za(h) denotes an optical axial distance between an apex of an object-side surface on an optical axis, of the refractive optical element A and a position at a height h on the object side of the refractive optical element A, Zb(h) denotes an optical axial distance between the apex of the object-side surface on the optical axis, of the refractive optical element A and a position at a height h on the image side of the refractive optical element A, a denotes a value defined by the following expression (3-1)

$$a=\{(IH)^2 \times \log_{10}(ft/fw)\}/fw \qquad (3\text{-}1).$$

12. An electronic image pickup apparatus comprising:
an image forming optical system; and
an image pickup element,
wherein
the image forming optical system comprises in order from an object side to an image side, a first lens group having a positive refractive power, a second lens group having a negative refractive power, and an image-side lens group having a positive refractive power, and a distance between the first lens group and the second lens group changes at the time of zooming, and a refractive optical element A having a positive refractive power is positioned in the first lens group, the first lens group comprises a cemented optical element D which is positioned on a most object-side, the cemented optical element D is arranged such that the refractive optical element A is positioned between an optical element B which is positioned on the object side and an optical element C which is positioned on the image side, and the refractive optical element A satisfies the following conditional expression (3-2)

$$0<(Zb(3.3a)-Za(3.3a))/(Zb(2.5a)-Za(2.5a))<0.895 \qquad (3\text{-}2)$$

where, fw denotes a focal length of the image forming optical system, at a wide angle end, ft denotes a focal length of the image forming optical system, at a telephoto end, IH denotes the maximum image height on the image pickup element, Za(h) denotes an optical axial distance between an apex of an object-side surface on an optical axis, of the refractive optical element A and a position at a height h on the object side of the refractive optical element A, Zb(h) denotes an optical axial distance between the apex of the object-side surface on the optical axis, of the refractive optical element A and a position at a height h on the image side of the refractive optical element A, a denotes a value defined by the following expression (3-1)

$$a=\{(IH)^2 \times \log_{10}(ft/fw)\}/fw \qquad (3\text{-}1).$$

13. The electronic image pickup apparatus according to claim 12, wherein the electronic image pickup apparatus satisfies the following conditional expression (1-1), conditional expression (1-2), and conditional expression (2).

$$vd_A<30 \qquad (1\text{-}1)$$

$$0.54<\theta gF_A<0.9 \qquad (1\text{-}2)$$

$$|fG1/fG2|>6.4 \qquad (2)$$

where, $nd_A$, $nC_A$, $nF_A$, and $ng_A$ denote refractive indices of the refractive optical element A for a d-line, a C-line, an F-line, and a g-line respectively, $vd_A$ denotes Abbe's number $(nd_A-1)/(nF_A-nC_A)$ of the refractive optical element A, $\theta gF_A$ denotes a partial dispersion ratio $(ng_A-nF_A)/(nF_A-nC_A)$ of the refractive optical element A, fG1 denotes a focal length of the first lens group, and fG2 denotes a focal length of the second lens group.

14. The electronic image pickup apparatus according to claim 12, comprising:
the refractive optical element A; and
the optical element B,
wherein
the refractive optical element A and the optical element B satisfy the following conditional expression (1-1), conditional expression (1-2), and conditional expression (4-3)

$$vd_A<30 \qquad (1\text{-}1)$$

$$0.54<\theta gF_A<0.9 \qquad (1\text{-}2)$$

$$0.05<(Tnglw(0.7)/Tbasw(0.7))/(Tngl(0)/Tbas(0))<0.75 \qquad (4\text{-}3)$$

where, $nd_A$, $nC_A$, $nF_A$, and $ng_A$ denote refractive indices of the refractive optical element A for a d-line, a C-line, an F-line, and a g-line respectively, $vd_A$ denotes Abbe's number $(nd_A-1)/(nF_A-nC_A)$ for the refractive optical element A, $\theta gF_A$ denotes a partial dispersion ratio $(ng_A-nF_A)/(nF_A-nC_A)$ of the refractive optical element A, Tngl(0) denotes a central thickness on an axis of the refractive optical element A, Tnglw(0.7) denotes a length of a light ray having a height 70% of the maximum light ray height on the image pickup element at the wide angle end, passing through the refractive optical element A, Tbas(0) denotes a central thickness on an axis of the optical element B, and Tbasw(0.7) denotes a length of a light ray having a height 70% of the maximum light ray height on the image pickup element at the wide angle end, passing through the optical element B.

15. The electronic image pickup apparatus according to claim 12, wherein the electronic image pickup apparatus satisfies one of the following conditional expression (10-1a), conditional expression (10-1b), conditional expression (10-1c), conditional expression (10-2a), and conditional expression (10-2b)

$$0.3 < Tngl(0)/Tbas(0) < 10 \quad (10\text{-}1a)$$

$$0.15 < Tnglt(0.7)/Tbast(0.7) < 3.0 \quad (10\text{-}1b)$$

$$0.1 < Tnglt(0.9)/Tbast(0.9) < 2.0 \quad (10\text{-}1c)$$

$$0.1 < (Tnglt(0.7)/Tbast(0.7))/(Tngl(0)/Tbas(0)) < 0.85 \quad (10\text{-}2a)$$

$$0.05 < (Tnglt(0.9)/Tbast(0.9))/(Tngl(0)/Tbas(0)) < 0.75 \quad (10\text{-}2b)$$

where,

Tngl(0) denotes the central thickness on the axis of the refractive optical element A, Tnglt(0.7) denotes a length of a light ray having a height 70% of the maximum light ray height on the image pickup element at the telephoto end, passing through the refractive optical element A, Tnglt (0.9) denotes a length of a light ray having a height 90% of the maximum light ray height on the image pickup element at the telephoto end, passing through the refractive optical element A, Tbas(0) denotes the central thickness on the axis of the optical element B, Tbast(0.7) denotes a length of a light ray having a height 70% of the maximum light ray height on the image pickup element at the telephoto end, passing through the optical element B, and Tbast(0.9) denotes a length of a light ray having a height 90% of the maximum light ray height on the image pickup element at the telephoto end, passing through the optical element B.

16. The electronic image pickup apparatus according to claim 12, wherein the electronic image pickup apparatus satisfies one of the following conditional expression (11a) and conditional expression (11b)

$$0.5 < (Tnglw(0.7)/(Tngl(0)) < 0.95 \quad (11a)$$

$$0.3 < (Tnglw(0.9)/(Tngle(0)) < 0.9 \quad (11b)$$

where,

Tngl(0) denotes the central thickness on axis of the refractive optical element A, Tnglw(0.7) denotes the length of the light ray having a height 70% of the maximum light ray height on the image pickup element at the wide angle end, passing through the refractive optical element A, and Tnglw(0.9) denotes a length of a light ray having a height 90% of the maximum light ray height on the image pickup element at the wide angle end, passing through the refractive optical element A.

17. The electronic image pickup apparatus according to claim 12, wherein the electronic image pickup apparatus satisfies one of the following conditional expression (12a) and conditional expression (12b)

$$0.5 < (Tnglt(0.7)/(Tngl(0)) < 0.95 \quad (12a)$$

$$0.3 < (Tnglt(0.9)/(Tngl(0)) < 0.9 \quad (12b)$$

where,

Tngl(0) denotes the central thickness on the axis of the refractive optical element A, Tnglt(0.7) denotes the length of the light ray having a height 70% of the maximum light ray height on the image pickup element at the telephoto end, passing through the refractive optical element A, and Tnglt(0.9) denotes the length of the light ray having a height 90% of the maximum light ray height on the image pickup element at the telephoto end, passing through the refractive optical element A.

18. The electronic image pickup apparatus according to claim 12, wherein the electronic image pickup apparatus satisfies one of the following conditional expression (13-1a), conditional expression (13-1b), conditional expression (13-1c), and conditional expression (13-2)

$$0.3 < Tngl(0)/Tbas(0) < 10 \quad (13\text{-}1a)$$

$$0.15 < Tnglw(0.7)/Tbasw(0.7) < 2.0 \quad (13\text{-}1b)$$

$$0 < Tnglw(0.9)/Tbasw(0.9) < 0.9 \quad (13\text{-}1c)$$

$$0 < (Tnglw(0.9)/Tbasw(0.9))/(Tngl(0)/Tbas(0)) < 0.5 \quad (13\text{-}2)$$

where,

Tngl(0) denotes the central thickness on the axis of the refractive optical element A, Tnglw(0.7) denotes the length of the light ray having a height 70% of the maximum light ray height on the image pickup element at the wide angle end, passing through the refractive optical element A, Tnglw (0.9) denotes the length of the light ray having a height 90% of the maximum light ray height on the image pickup element at the wide angle end, passing through the refractive optical element A, Tbas(0) denotes the central thickness on the axis of the optical element B, Tbasw(0.7) denotes the length of the light ray having a height 70% of the maximum light ray height on the image pickup element at the wide angle end, passing through the optical element B, and Tbasw(0.9) denotes a length of a light ray having a height 90% of the maximum light ray height on the image pickup element at the telephoto end, passing through the optical element B.

19. The electronic image pickup apparatus according to claim 12, wherein the electronic image pickup apparatus satisfies the following conditional expression (4-1), conditional expression (4-2), and conditional expression (2)

$$vd_A < 30 \quad (4\text{-}1)$$

$$0.54 < \theta gF_A < 0.9 \quad (4\text{-}2)$$

$$|fG1/fG2| > 6.4 \quad (2)$$

where, $nd_A$, $nC_A$, $nF_A$, and $ng_A$ denote refractive indices of the refractive optical element A for a d-line, a C-line, an F-line, and a g-line respectively, $vd_A$ denotes Abbe's number $(nd_A-1)/(nF_A-nC_A)$ of the refractive optical element A, $\theta gF_A$ denotes a partial dispersion ratio $(ng_A-nF_A)/(nF_A-nC_A)$ of the refractive optical element A, fG1 denotes a focal length of the first lens group, and fG2 denotes a focal length of the second lens group.

20. The electronic image pickup apparatus according to claim 12, wherein the electronic image pickup apparatus satisfies one of the following conditional expression (10-1a'), conditional expression (10-1b'), conditional expression (10-1c'), conditional expression (10-2a'), and conditional expression (10-2b')

$$0.3 < Tngl(0)/Tbas(0) < 3 \quad (10\text{-}1a')$$

$$0.2 < Tnglt(0.7)/Tbast(0.7) < 2.0 \quad (10\text{-}1b')$$

$$0.1 < Tnglt(0.9)/Tbast(0.9) < 1.4 \quad (10\text{-}1c')$$

$$0.2 < (Tnglt(0.7)/Tbast(0.7))/(Tngl(0)/Tbas(0)) < 0.85 \quad (10\text{-}2a')$$

$$0.10 < (Tnglt(0.9)/Tbast(0.9))/(Tngl(0)/Tbas(0)) < 0.75 \quad (10\text{-}2b')$$

where,
Tngl(0) denotes the central thickness on the axis of the refractive optical element A,
Tnglt(0.7) denotes a length of a light ray having a height 70% of the maximum light ray height on the image pickup element at the telephoto end, passing through the refractive optical element A,
Tnglt (0.9) denotes a length of a light ray having a height 90% of the maximum light ray height on the image pickup element at the telephoto end, passing through the refractive optical element A,
Tbas(0) denotes the central thickness on the axis of the optical element B,
Tbast(0.7) denotes a length of a light ray having a height 70% of the maximum light ray height on the image pickup element at the telephoto end, passing through the optical element B, and
Tbast(0.9) denotes a length of a light ray having a height 90% of the maximum light ray height on the image pickup element at the telephoto end, passing through the optical element B.

21. The electronic image pickup apparatus according to claim 12, wherein the electronic image pickup apparatus satisfies one of the following conditional expression (11a) and conditional expression (11b')

$$0.5 < (Tnglw(0.7)/(Tngl(0)) < 0.95 \quad (11a)$$

$$0.3 < (Tnglw(0.9)/(Tngle(0)) < 0.85 \quad (11b')$$

where,
Tngl(0) denotes the central thickness on the axis of the refractive optical element A,
Tnglw(0.7) denotes the length of the light ray having a height 70% of the maximum light ray height on the image pickup element at the wide angle end, passing through the refractive optical element A, and
Tnglw(0.9) denotes a length of a light ray having a height 90% of the maximum light ray height on the image pickup element at the wide angle end, passing through the refractive optical element A.

22. The electronic image pickup apparatus according to claim 12, wherein the electronic image pickup apparatus satisfies one of the following conditional expression (13-1a'), conditional expression (13-1b'), conditional expression (13-1c'), and conditional expression (13-2)

$$0.3 < Tngl(0)/Tbas(0) < 2.5 \quad (13\text{-}1a')$$

$$0.15 < Tnglw(0.7)/Tbasw(0.7) < 1.4 \quad (13\text{-}1b')$$

$$0 < Tnglw(0.9)/Tbasw(0.9) < 0.7 \quad (13\text{-}1c')$$

$$0 < (Tnglw(0.9)/Tbasw(0.9))/(Tngl(0)/Tbas(0)) < 0.5 \quad (13\text{-}2)$$

where,
Tngl(0) denotes the central thickness on the axis of the refractive optical element A,
Tnglw(0.7) denotes the length of the light ray having a height 70% of the maximum light ray height on the image pickup element at the wide angle end, passing through the refractive optical element A,
Tnglw (0.9) denotes the length of the light ray having a height 90% of the maximum light ray height on the image pickup element at the wide angle end, passing through the refractive optical element A,
Tbas(0) denotes the central thickness on the axis of the optical element B,
Tbasw(0.7) denotes the length of the light ray having a height 70% of the maximum light ray height on the image pickup element at the wide angle end, passing through the optical element B, and
Tbasw(0.9) denotes a length of a light ray having a height 90% of the maximum light ray height on the image pickup element at the telephoto end, passing through the optical element B.

23. An electronic image pickup apparatus comprising:
an image forming optical system; and
an image pickup element,
wherein
the image forming optical system comprises in order from an object side to an image side, a first lens group having a positive refractive power, a second lens group having a negative refractive power, and an image-side lens group having a positive refractive power, and a distance between the first lens group and the second lens group changes at the time of zooming, and
the first lens group comprises a cemented optical element D which is positioned on a most object-side, and
the cemented optical element D is arranged such that, a refractive optical element A having a positive refractive power is positioned between an optical element B which is positioned on the object side and an optical element C which is positioned on the image side, and
the electronic image pickup apparatus satisfies the following conditional expression (4-1), conditional expression (4-2), and conditional expression (4-3)

$$vd_A < 30 \quad (4\text{-}1)$$

$$0.54 < \theta gF_A < 0.9 \quad (4\text{-}2)$$

$$0.387 < (Tnglw(0.7)/Tbasw(0.7))/(Tngl(0)/Tbas(0)) < 0.525 \quad (4\text{-}3)$$

where,
$vd_A$ denotes Abbe's number $(nd_A-1)/(nF_A-nC_A)$ for the refractive optical element A,
$\theta gF_A$ denotes a partial dispersion ratio $(ng_A-nF_A)/(nF_A-nC_A)$ of the refractive optical element A,
$nd_A$, $nC_A$, $nF_A$, and $ng_A$ denote refractive indices of the refractive optical element A for a d-line, a C-line, an F-line, and a g-line respectively,
Tngl(0) denotes a central thickness on an axis of the refractive optical element A,
Tnglw(0.7) denotes a length of a light ray having a height 70% of the maximum light ray height on the image pickup element at the wide angle end, passing through the refractive optical element A,
Tbas(0) denotes a central thickness on an axis of the optical element B, and
Tbasw(0.7) denotes a length of a light ray having a height 70% of the maximum light ray height on the image pickup element at the wide angle end, passing through the optical element B.

24. The electronic image pickup apparatus according to claim 18, wherein the electronic image pickup apparatus satisfies the following conditional expression (2)

$$|fG1/fG2|>6.4 \tag{2}$$

where, fG1 denotes a focal length of the first lens group, and
fG2 denotes a focal length of the second lens group.

25. The electronic image pickup apparatus according to claim 23, wherein the electronic image pickup apparatus satisfies the following conditional expression (3-2)

$$0<(Zb(3.3a)-Za(3.3a))/(Zb(2.5a)-Za(2.5a))<0.895 \tag{3-2}$$

where, fw denotes a focal length of the image forming optical system, at a wide angle end,
ft denotes a focal length of the image forming optical system, at a telephoto end,
IH denotes the maximum image height on the image pickup element,
Za(h) denotes an optical axial distance between an apex of an object-side surface on an optical axis, of the refractive optical element A and a position at a height h on the object side of the refractive optical element A,
Zb(h) denotes an optical axial distance between the apex of the object-side surface on the optical axis, of the refractive optical element and a position at a height h on the image side of the refractive optical element A,
a denotes a value defined by the following expression (3-1)

$$a=\{(IH)^2 \times \log_{10}(ft/fw)\}/fw \tag{3-1}$$

\* \* \* \* \*

UNITED STATES PATENT AND TRADEMARK OFFICE
CERTIFICATE OF CORRECTION

PATENT NO. : 8,432,617 B2
APPLICATION NO. : 13/066203
DATED : April 30, 2013
INVENTOR(S) : A. Nakagawa et al.

It is certified that error appears in the above-identified patent and that said Letters Patent is hereby corrected as shown below:

Title Page, Item (75) should read as follows:

(75) Inventors: ~~Atitaka~~Akitaka Nakagawa, Kokubunji (JP);
Hisashi Goto, Tokyo (JP)

Signed and Sealed this
Twenty-fourth Day of September, 2013

Teresa Stanek Rea
*Deputy Director of the United States Patent and Trademark Office*